US012810555B2

(12) United States Patent
McKenzie et al.

(10) Patent No.: US 12,810,555 B2
(45) Date of Patent: Nov. 24, 2026

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Christopher D. McKenzie, Burlingame, CA (US); Sanket S. Dave, Sunnyvale, CA (US); Deepak Iyer, Mountain View, CA (US); Lauren A. Hastings, Orlando, FL (US); Madhur Ahuja, San Jose, CA (US); Natalia A. Fornshell, Woodinville, WA (US); Zoey C. Taylor, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 231 days.

(21) Appl. No.: 18/369,462

(22) Filed: Sep. 18, 2023

(65) Prior Publication Data

US 2024/0103679 A1 Mar. 28, 2024

Related U.S. Application Data

(60) Provisional application No. 63/470,921, filed on Jun. 4, 2023, provisional application No. 63/409,748, filed on Sep. 24, 2022.

(51) Int. Cl.
*G06F 3/02* (2006.01)
*G06F 3/0346* (2013.01)
(Continued)

(52) U.S. Cl.
CPC .............. *G06T 19/006* (2013.01); *G06F 3/02* (2013.01); *G06F 3/0346* (2013.01);
(Continued)

(58) Field of Classification Search
CPC ......... G06T 19/006; G06T 17/00; G06F 3/02; G06F 3/0346; G06F 3/04815;
(Continued)

(56) References Cited

U.S. PATENT DOCUMENTS

2011/0304648 A1* 12/2011 Kim ........................ G06F 3/016 345/633
2015/0135310 A1* 5/2015 Lee ........................ G06F 1/163 726/20
(Continued)

FOREIGN PATENT DOCUMENTS

WO WO 2018/052735 A1 3/2018

OTHER PUBLICATIONS

Office Action, dated May 14, 2025, received in U.S. Appl. No. 18/369,502, 20 pages.
(Continued)

*Primary Examiner* — Jitesh Patel
(74) *Attorney, Agent, or Firm* — Morgan, Lewis & Bockius LLP

(57) ABSTRACT

A wearable device, while a respective session is active in a respective application, detects a first signal indicating that the wearable device in no longer being worn. In response, the wearable device causes the respective session of the respective application to become inactive. While the respective application is inactive, the wearable device detects a second signal indicating that the wearable device is being put on, and in response to detecting the second signal, in accordance with a determination that respective criteria are met, the wearable device resumes the respective session of the respective application. Further, in accordance with a determination that respective criteria are not met, the wearable device forgoes resuming the respective session of the respective application, wherein the respective criteria
(Continued)

include a criterion that is met when a current user of the wearable device is determined to be an authorized user of the wearable device.

29 Claims, 63 Drawing Sheets

(51) Int. Cl.

| | |
|---|---|
| ***G06F 3/04815*** | (2022.01) |
| ***G06F 9/451*** | (2018.01) |
| ***G06T 17/00*** | (2006.01) |
| ***G06T 19/00*** | (2011.01) |
| ***H04N 21/439*** | (2011.01) |
| ***H04N 21/472*** | (2011.01) |

(52) U.S. Cl.
CPC .......... *G06F 3/04815* (2013.01); *G06F 9/451* (2018.02); *G06T 17/00* (2013.01); *H04N 21/4396* (2013.01); *H04N 21/47217* (2013.01)

(58) Field of Classification Search
CPC ........ G06F 9/451; G06F 1/1626; G06F 1/163; G06F 3/011; G06F 3/012; G06F 3/013; G06F 3/017; G06F 3/0362; G06F 3/0482; H04N 21/4396; H04N 21/47217; G02B 27/0093; G02B 2027/0138; G02B 27/0172
See application file for complete search history.

(56) References Cited

U.S. PATENT DOCUMENTS

| | | | | |
|---|---|---|---|---|
| 2017/0115728 | A1 | 4/2017 | Park et al. | |
| 2018/0011686 | A1* | 1/2018 | Zhao | G06F 1/163 |
| 2018/0302559 | A1* | 10/2018 | Lee | H04N 23/667 |
| 2021/0176608 | A1* | 6/2021 | Kumar Agrawal | H04W 68/00 |
| 2022/0091722 | A1 | 3/2022 | Faulkner et al. | |
| 2022/0210230 | A1* | 6/2022 | Yu | G06F 21/84 |
| 2022/0319108 | A1 | 10/2022 | Jagannathan et al. | |
| 2022/0397988 | A1 | 12/2022 | Whelan et al. | |
| 2023/0351702 | A1* | 11/2023 | Tan | G10L 15/22 |
| 2024/0104860 | A1 | 3/2024 | McKenzie et al. | |
| 2024/0104861 | A1 | 3/2024 | Lemay et al. | |
| 2024/0119682 | A1 | 4/2024 | Rudman et al. | |
| 2024/0152244 | A1 | 5/2024 | Lemay et al. | |
| 2025/0094211 | A1* | 3/2025 | Spittle | H04R 5/04 |

OTHER PUBLICATIONS

Invitation to Pay, dated Jan. 3, 2024, received in International Patent Application No. PCT/US2023/033285, which corresponds with U.S. Appl. No. 18/369,628, 14 pages.
International Search Report and Written Opinion, dated Feb. 26, 2024, received in International Patent Application No. PCT/US2023/033285, which corresponds with U.S. Appl. No. 18/369,628, 23 pages.

* cited by examiner

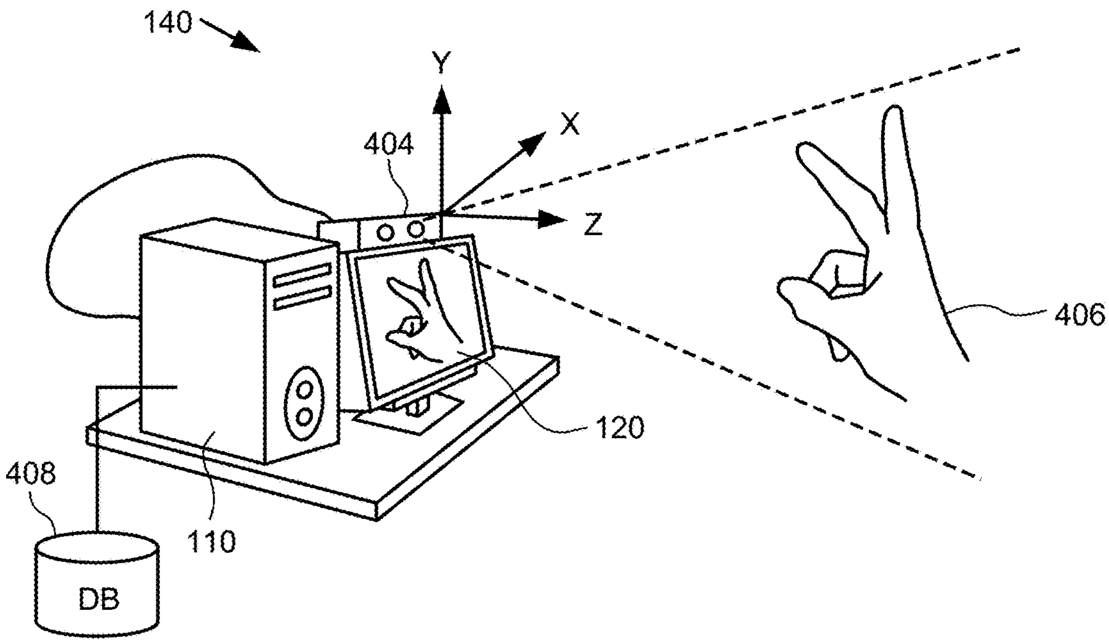
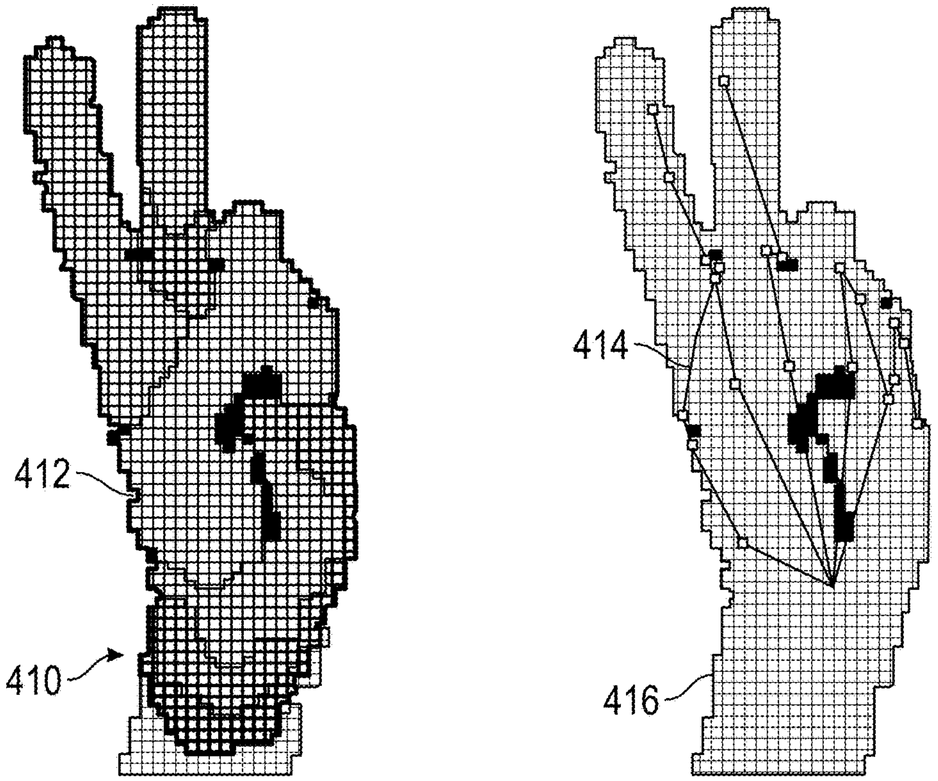
Figure 4

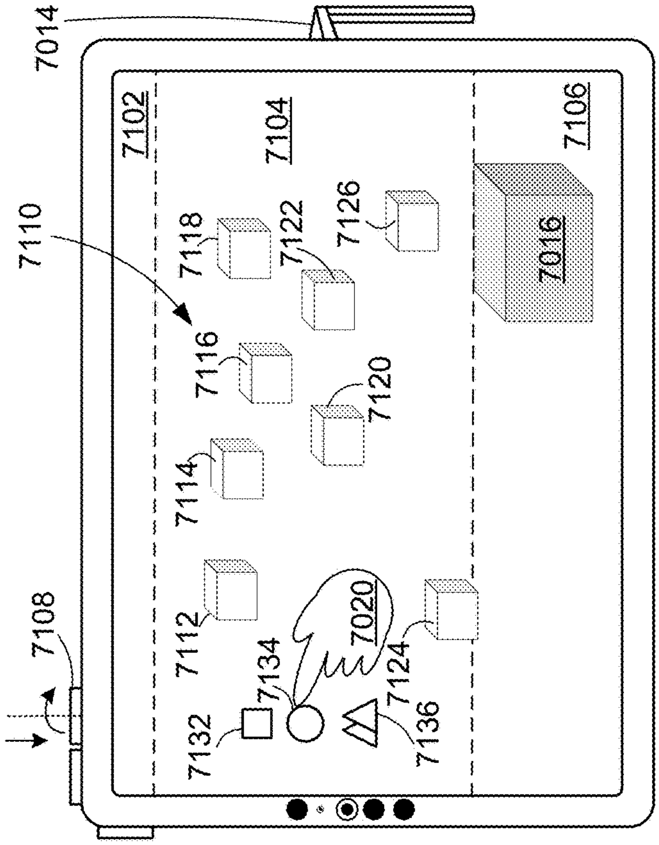
Figure 7C1
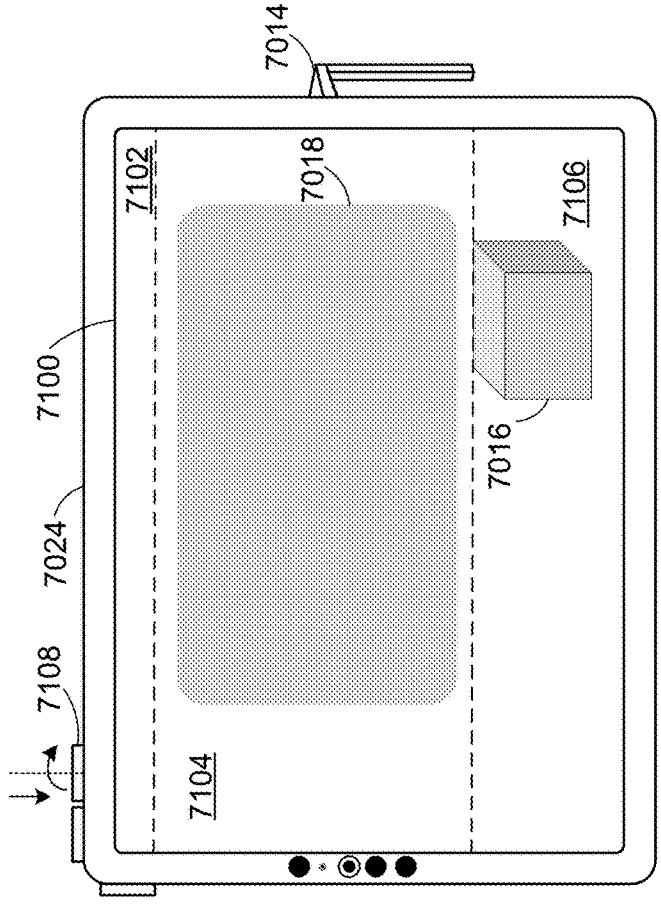
Figure 7B

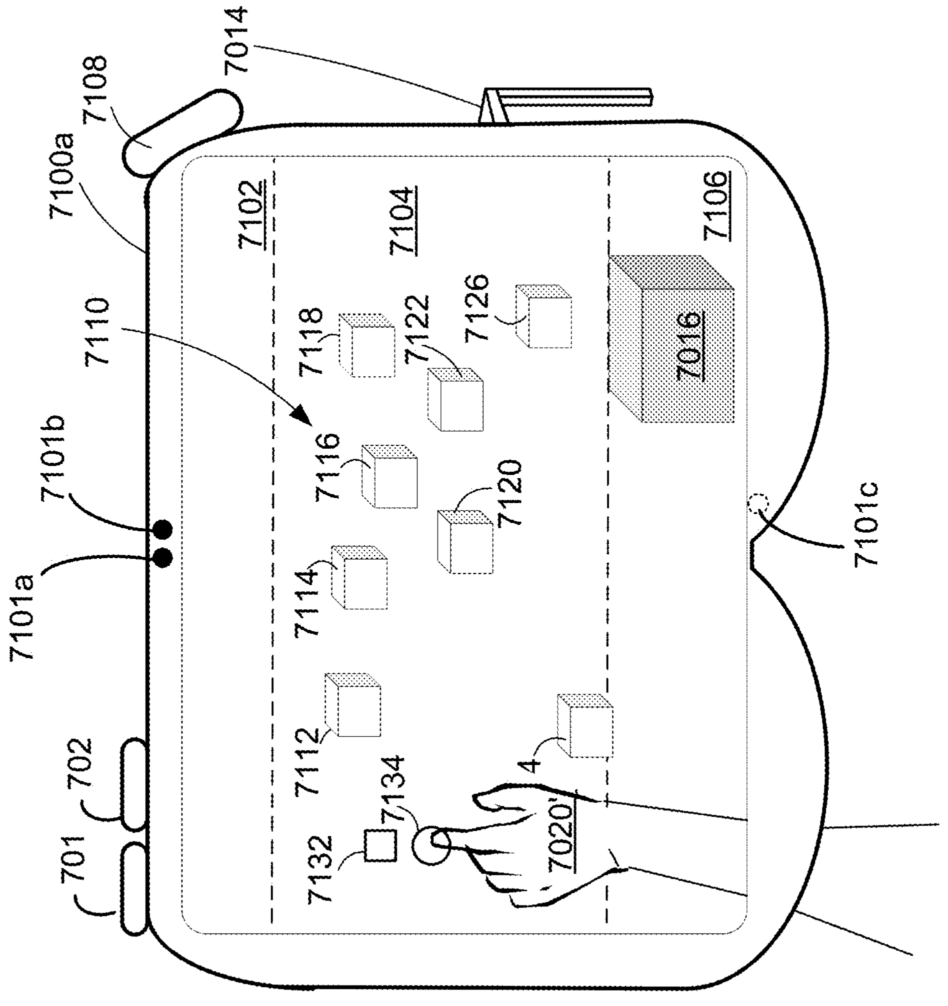
Figure 7C2
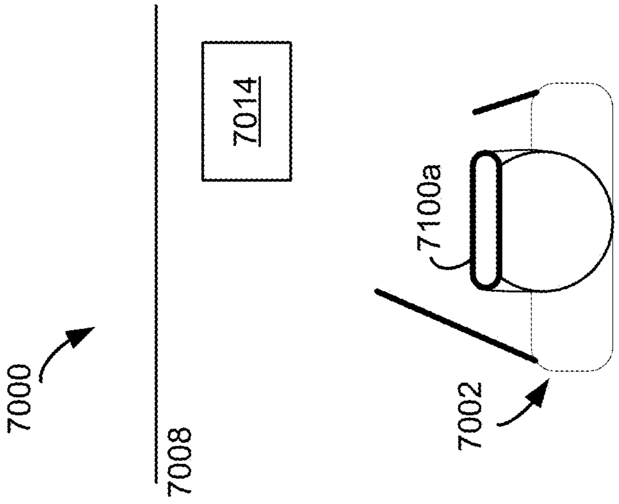
Figure 7C3

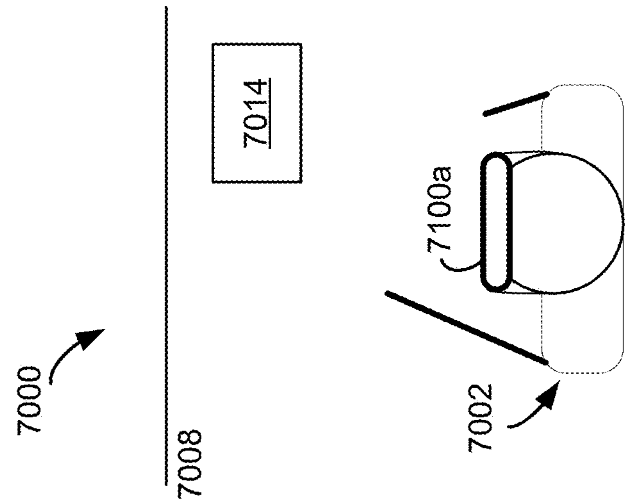
Figure 8C2
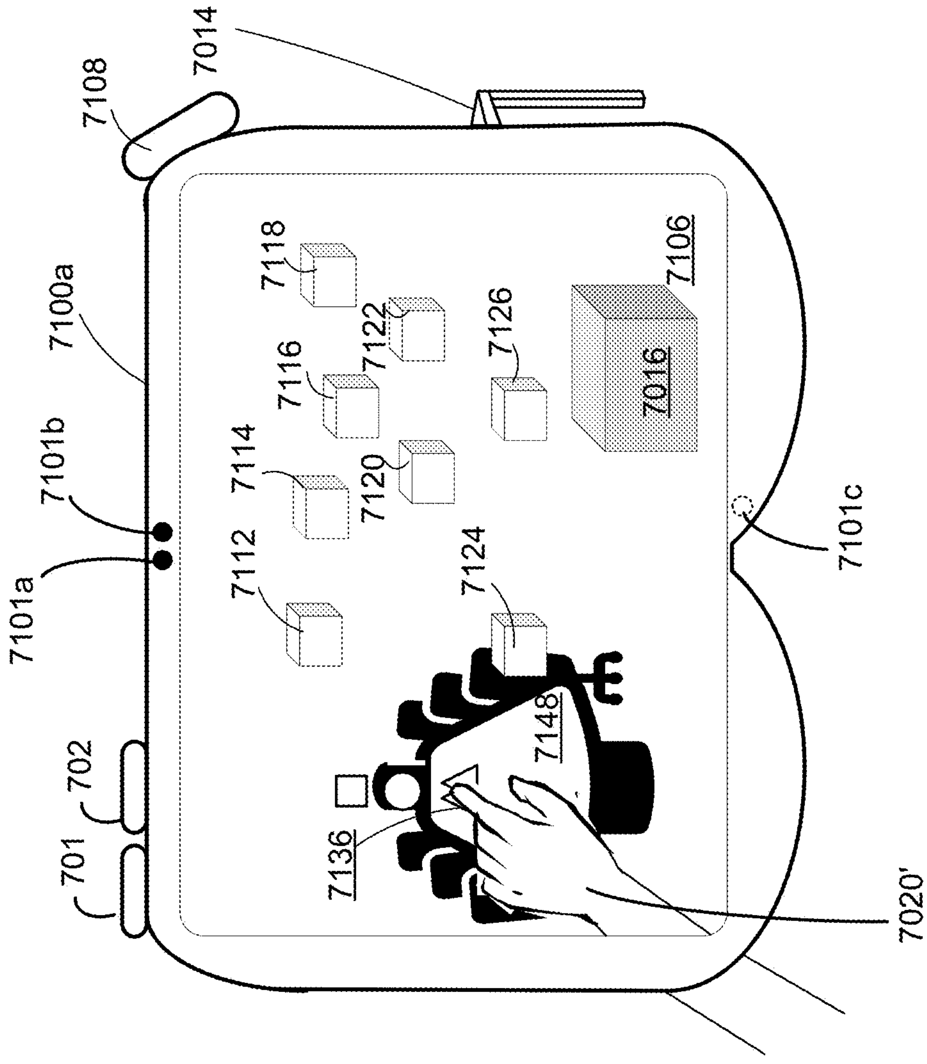
Figure 8C1

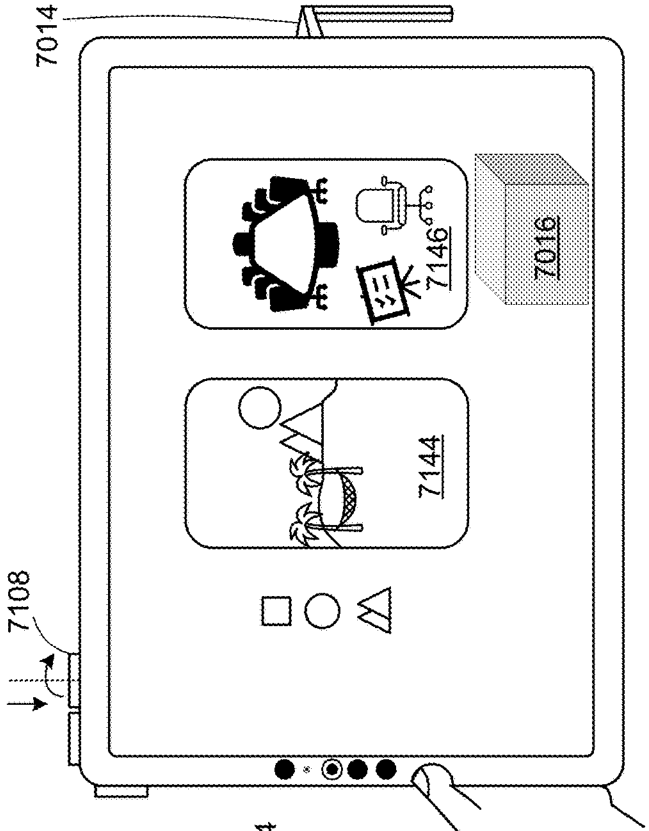
Figure 8D
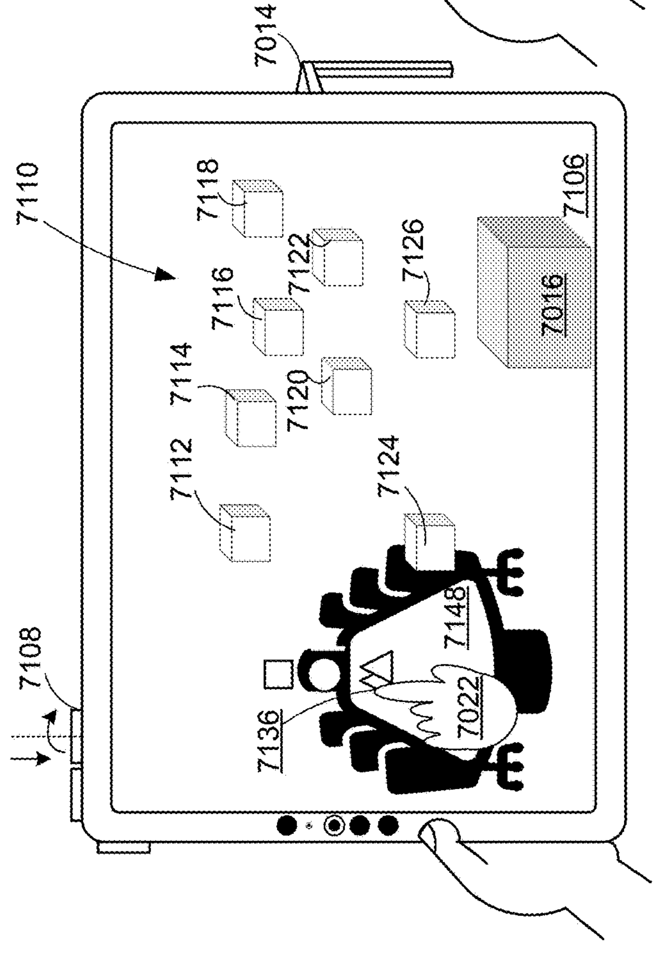
Figure 8C3

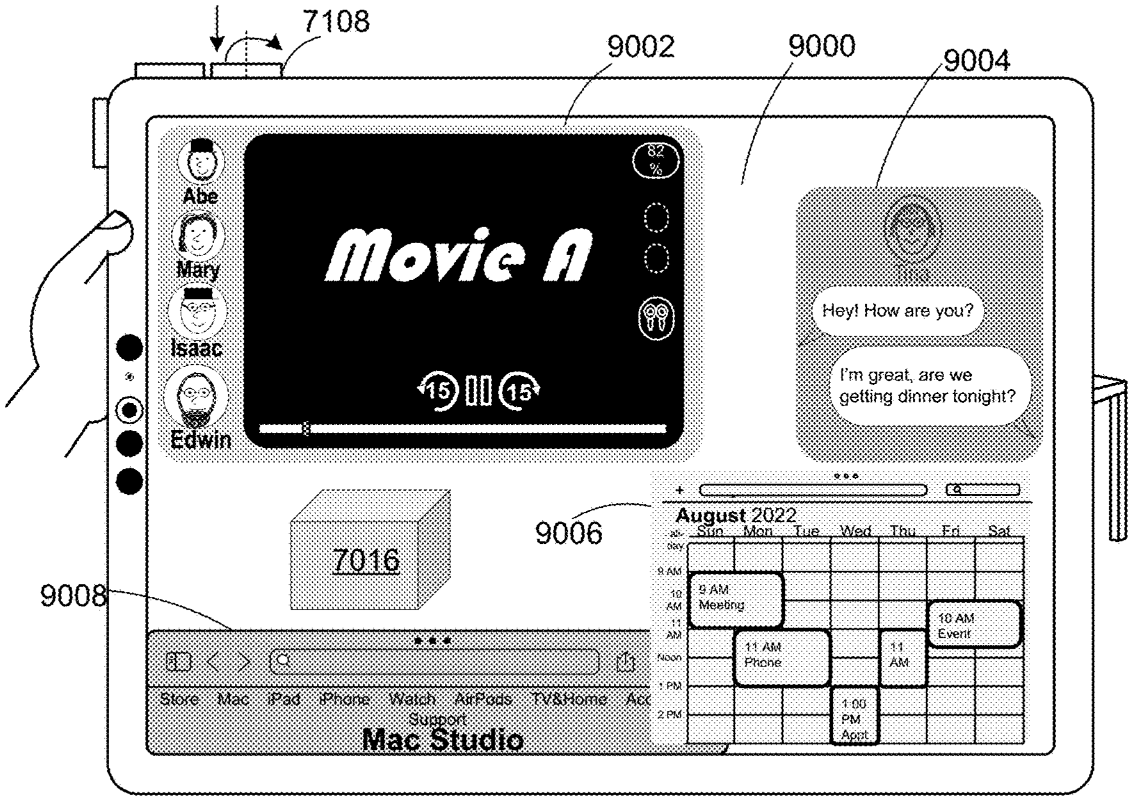
Figure 9A
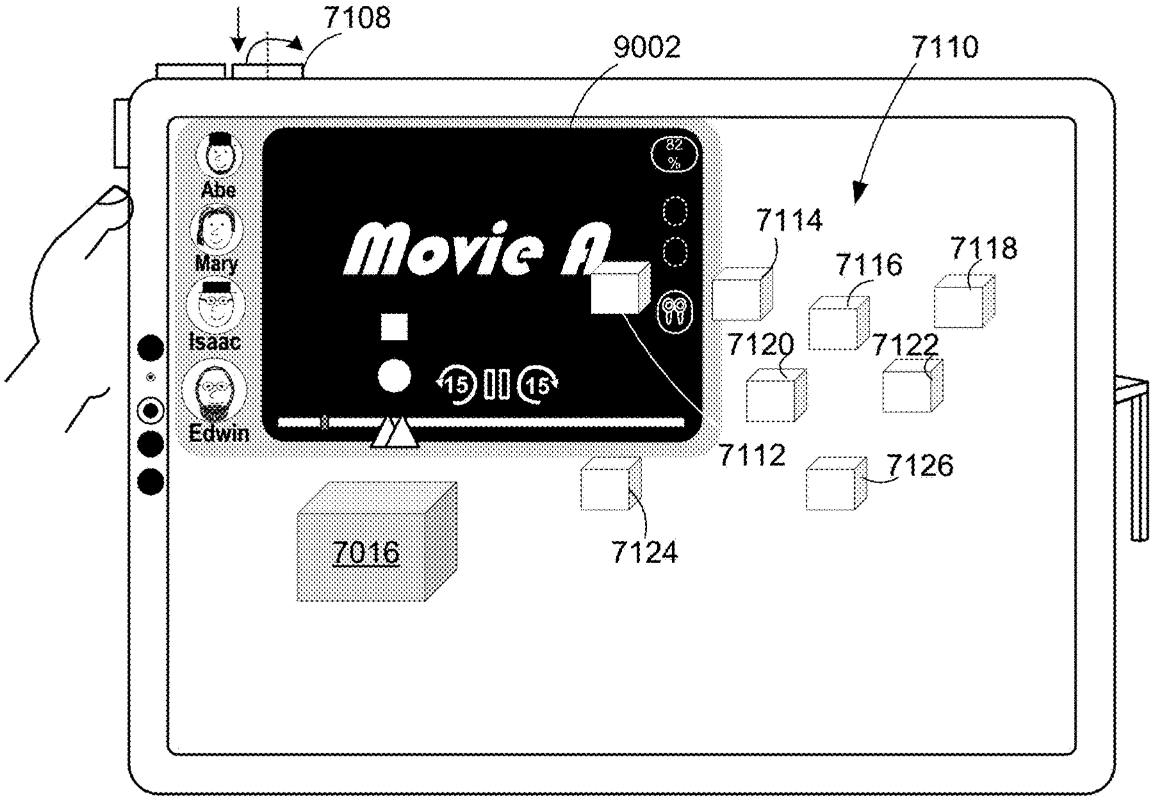
Figure 9B1

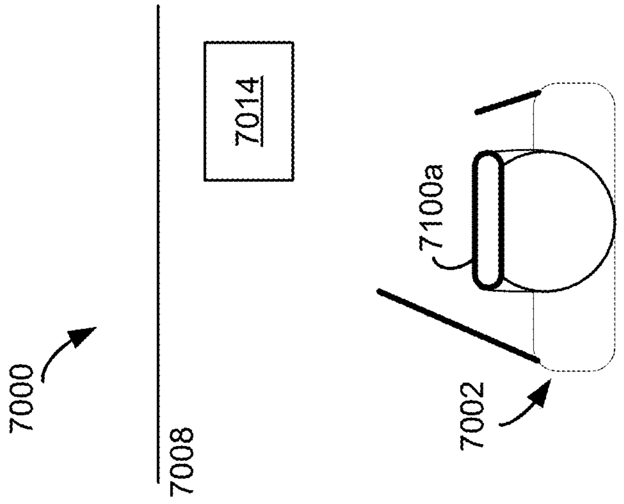
Figure 9B3
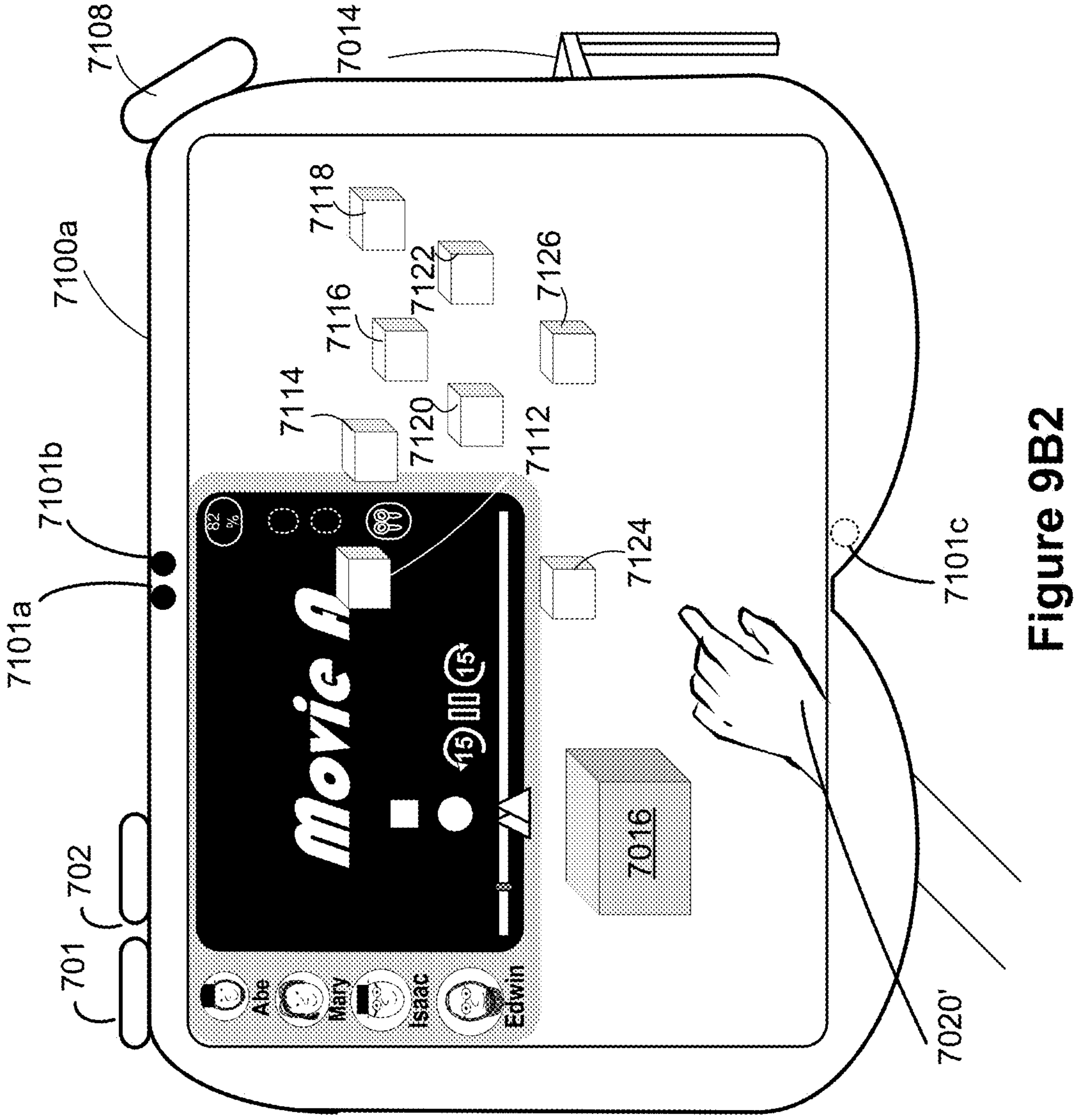
Figure 9B2

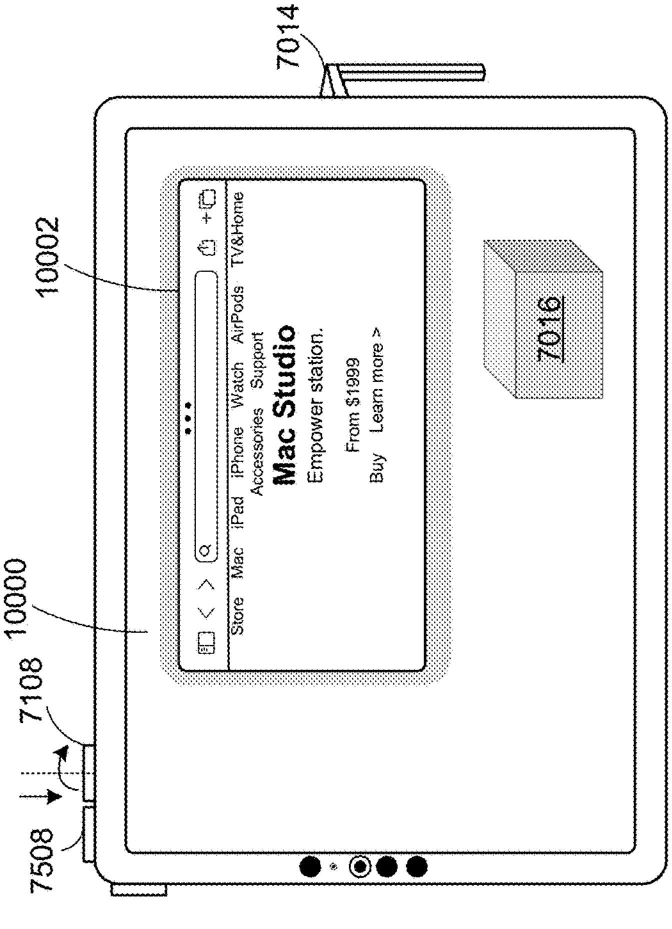
Figure 10A
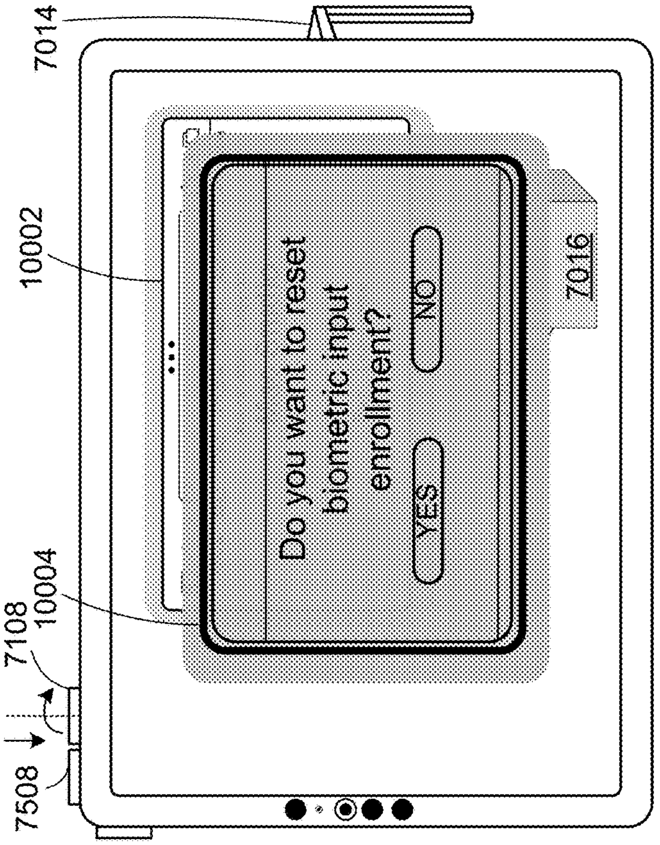
Figure 10B1

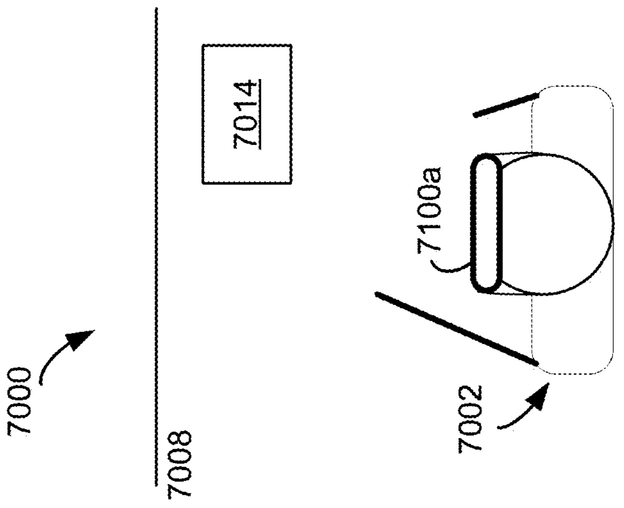
Figure 10B3
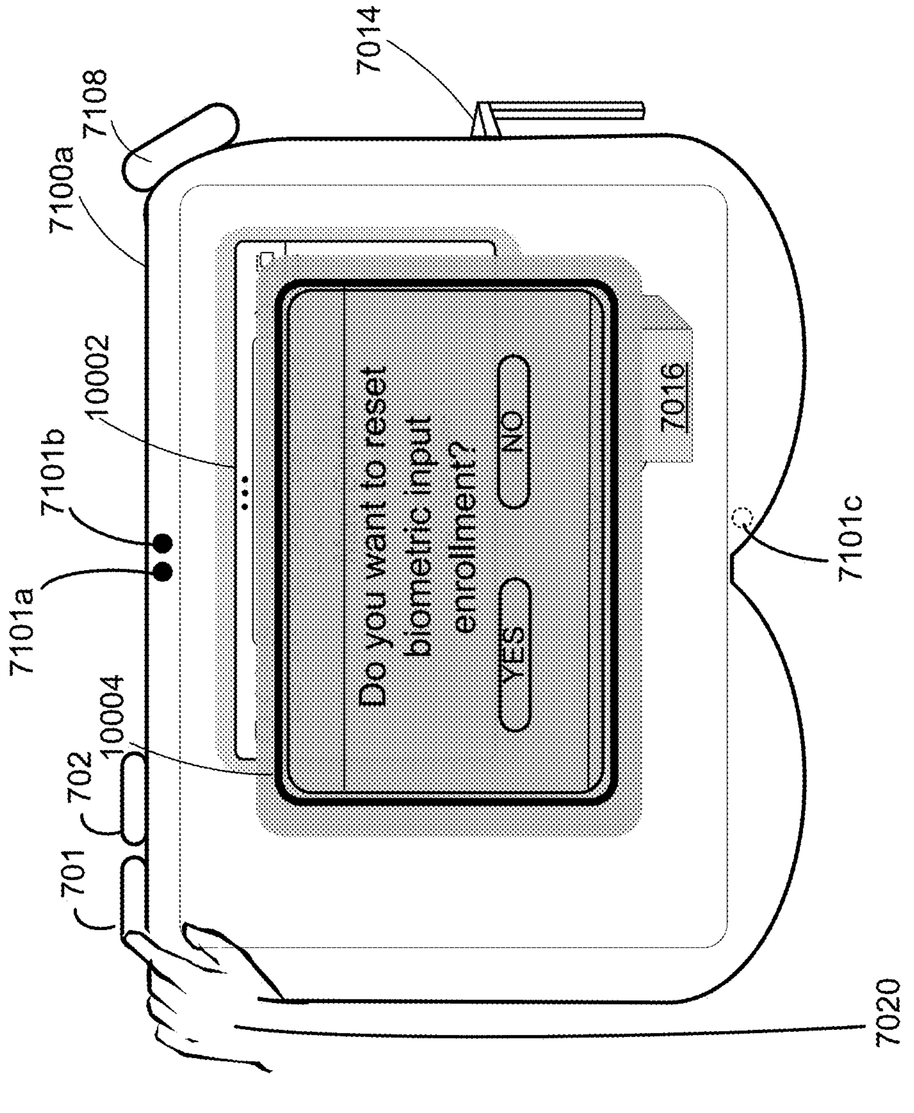
Figure 10B2

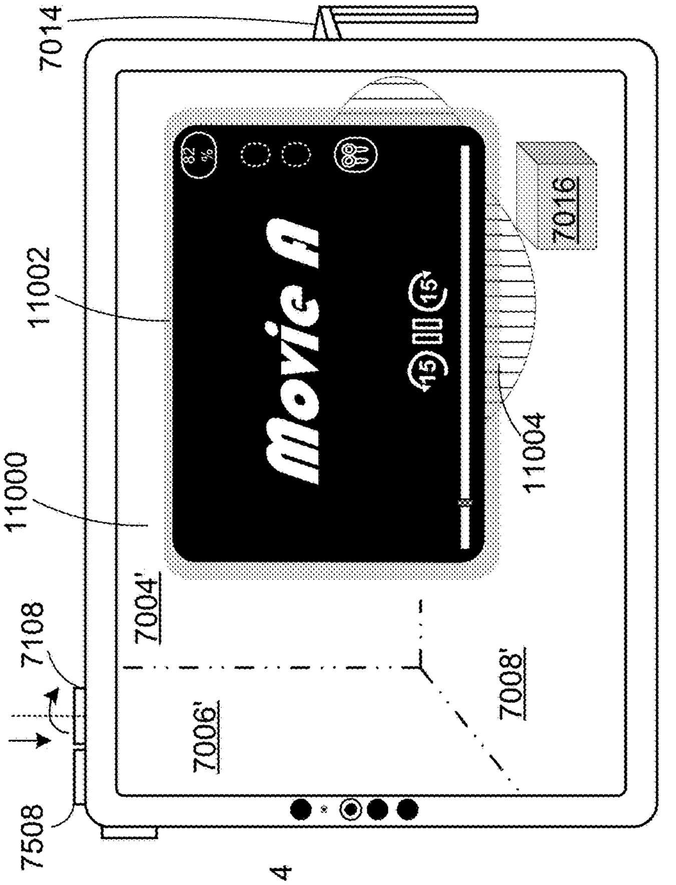
Figure 11B1
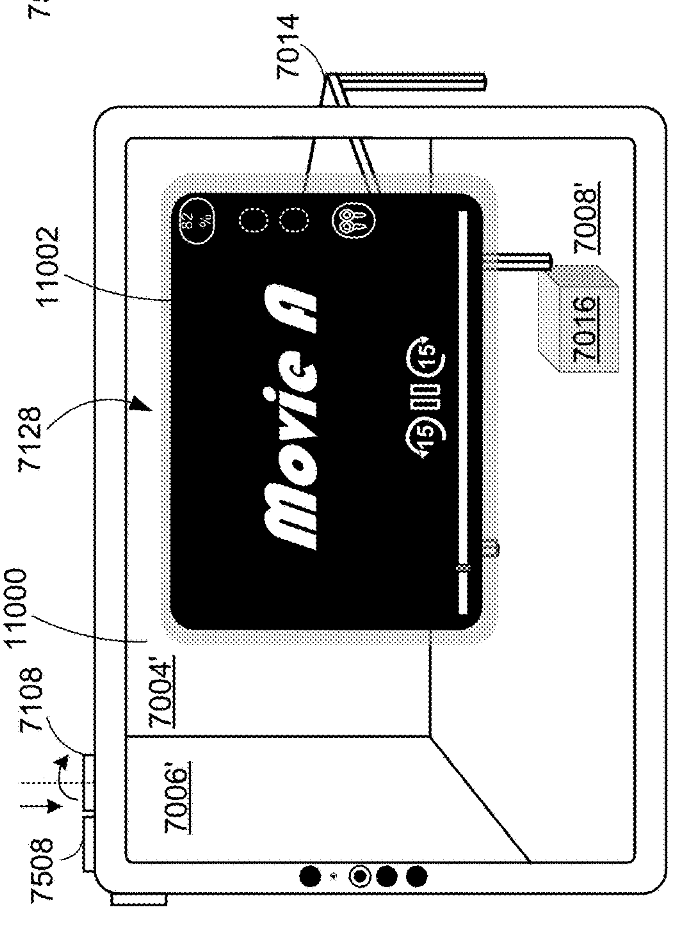
Figure 11A

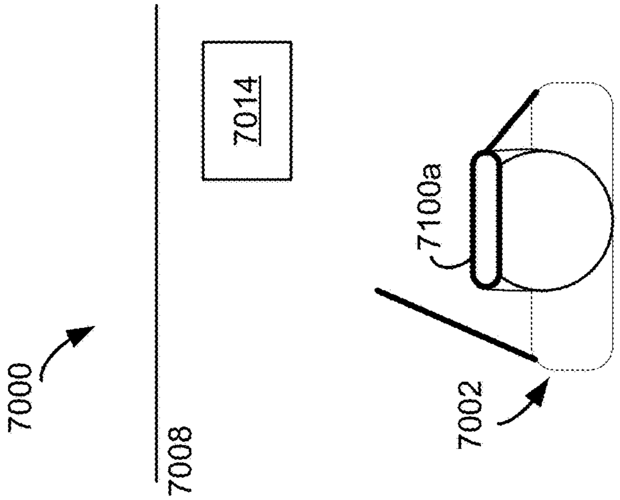
Figure 11B3
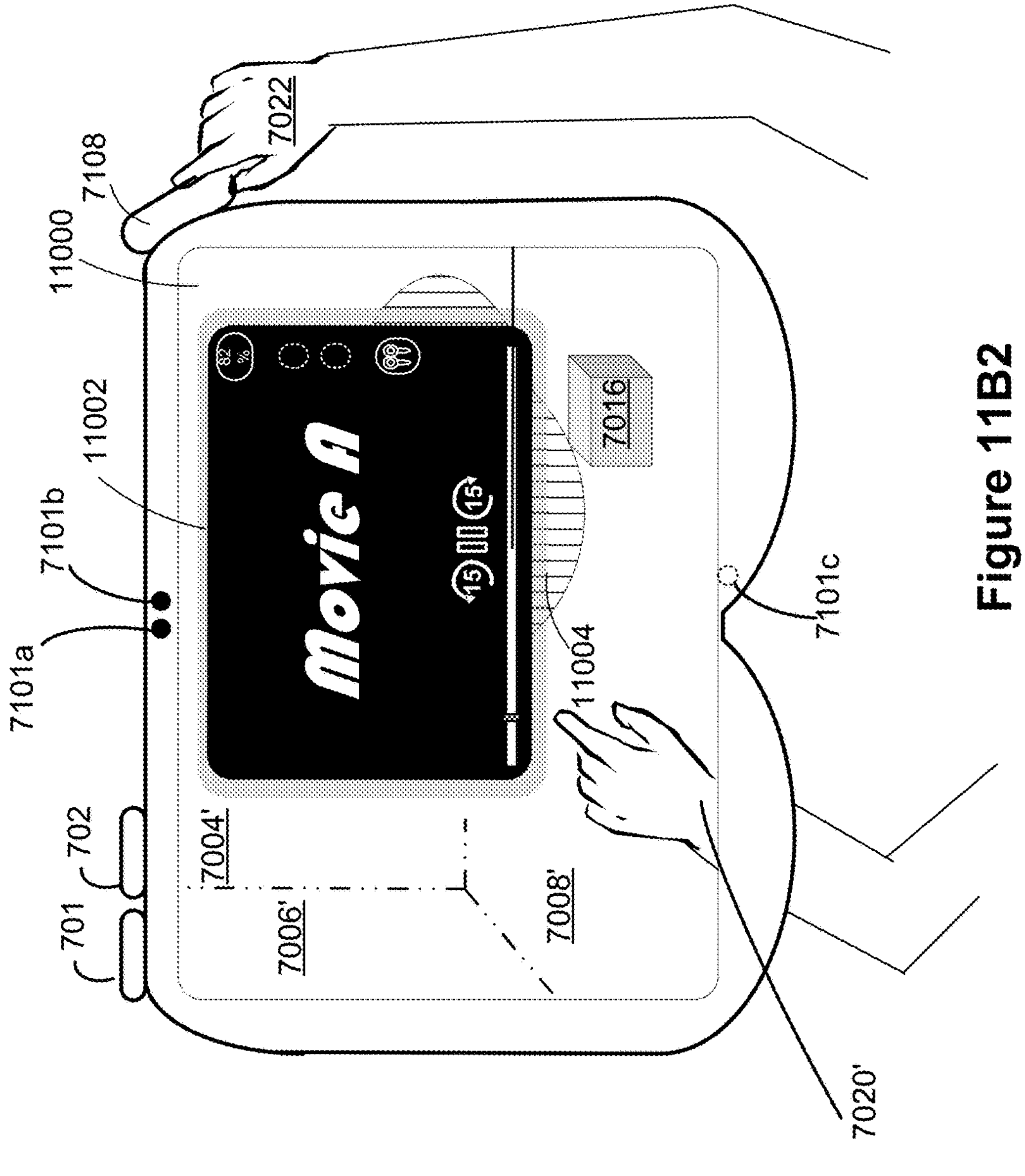
Figure 11B2

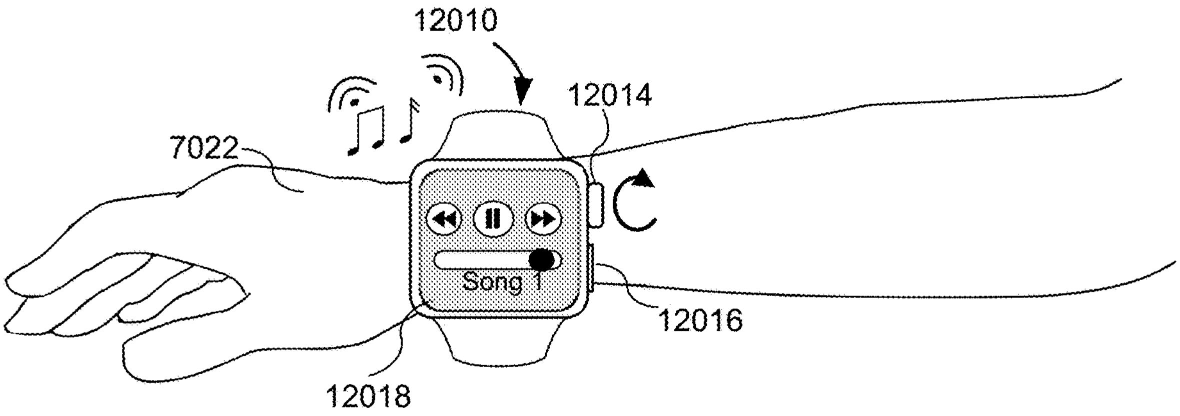
Figure 12B1
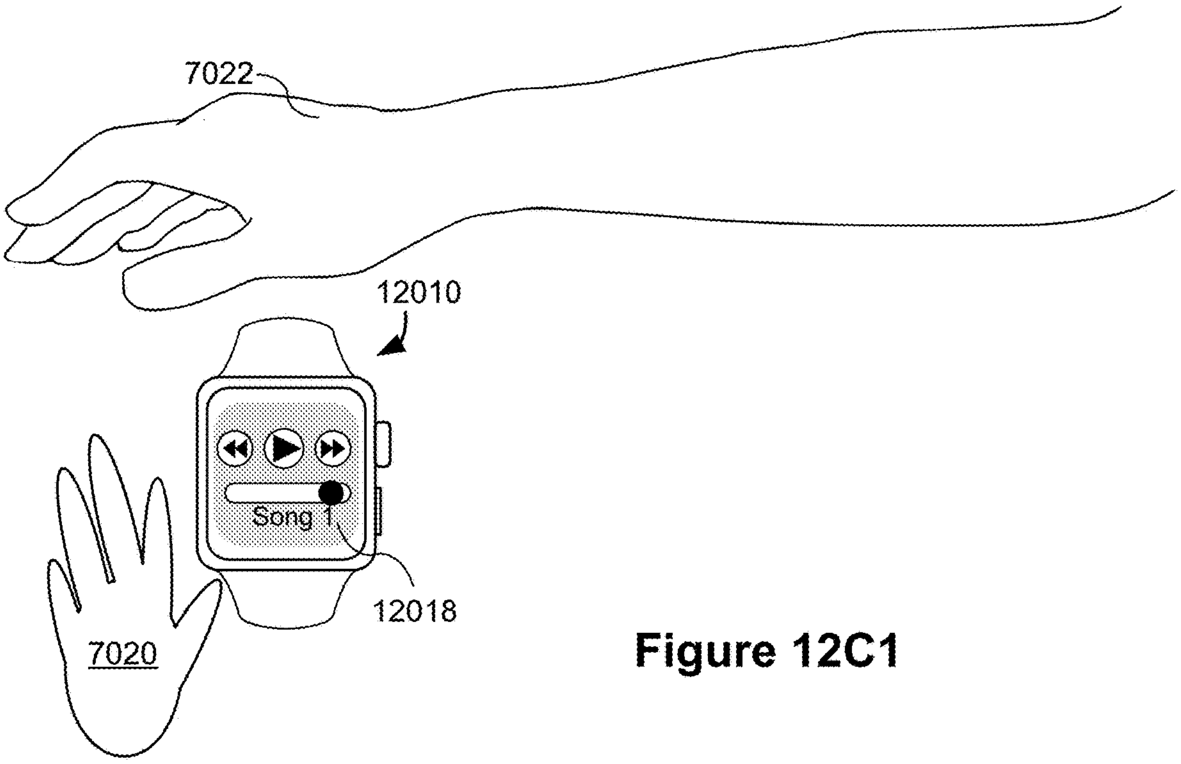
Figure 12C1

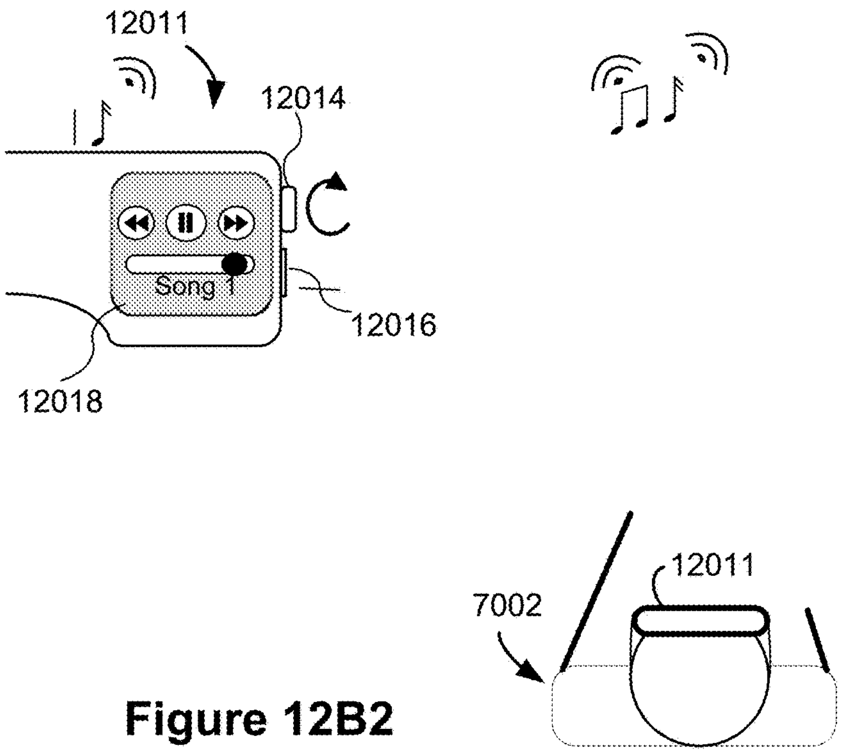
Figure 12B2
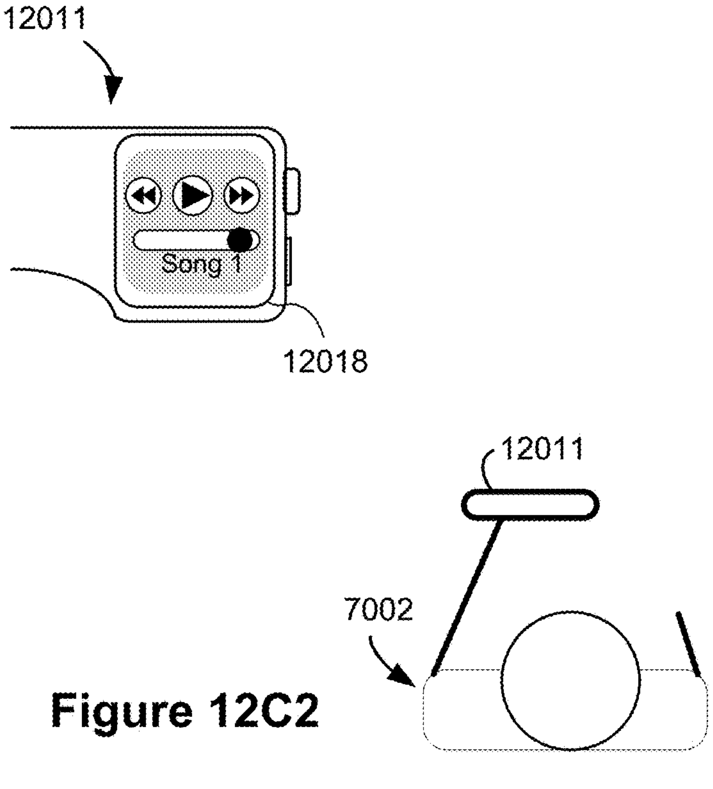
Figure 12C2

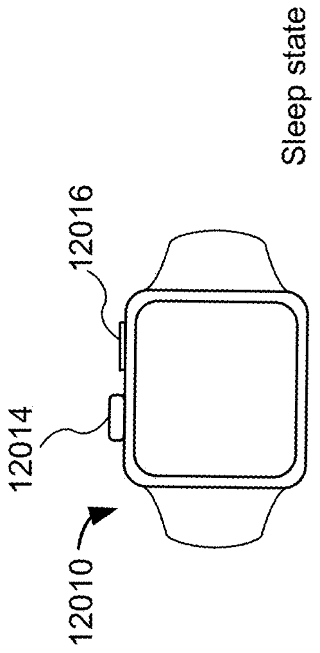
Figure 12D1
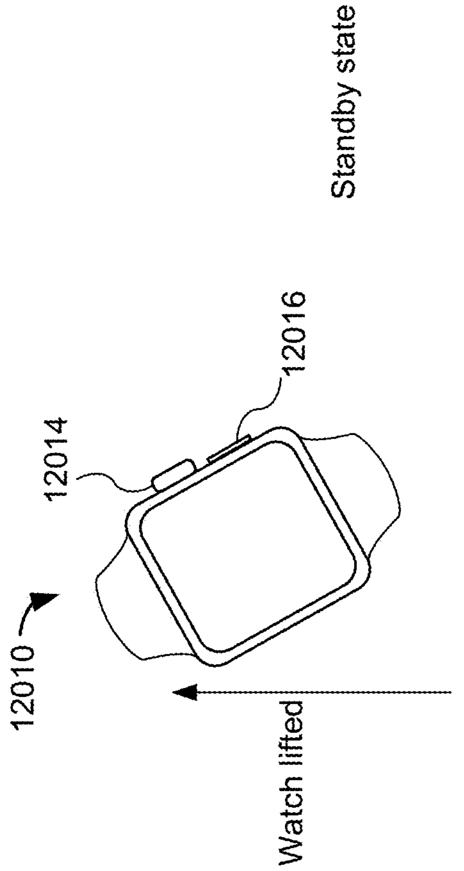
Figure 12E1

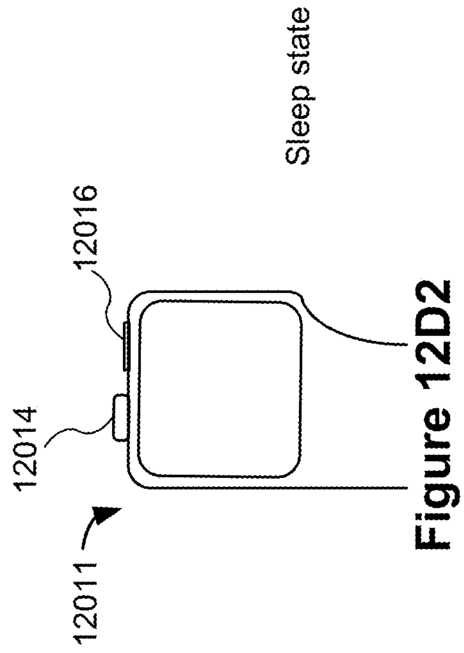
Figure 12D2
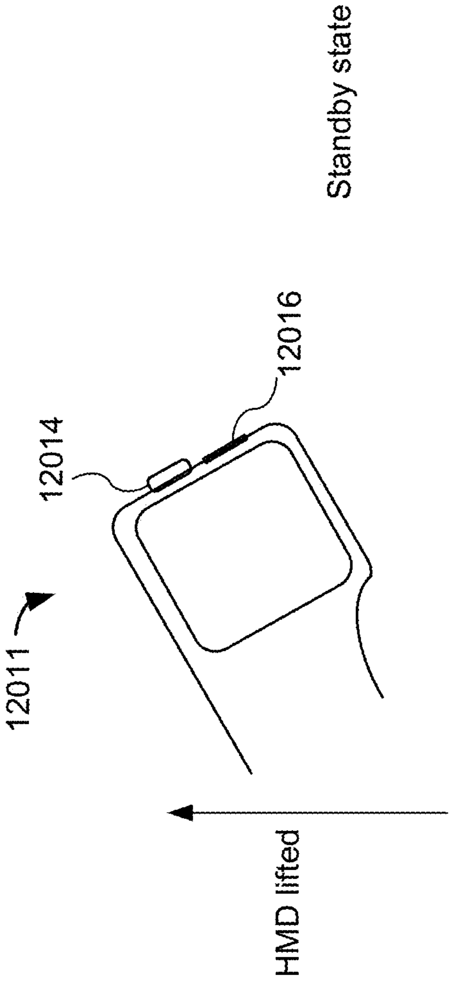
Figure 12E2

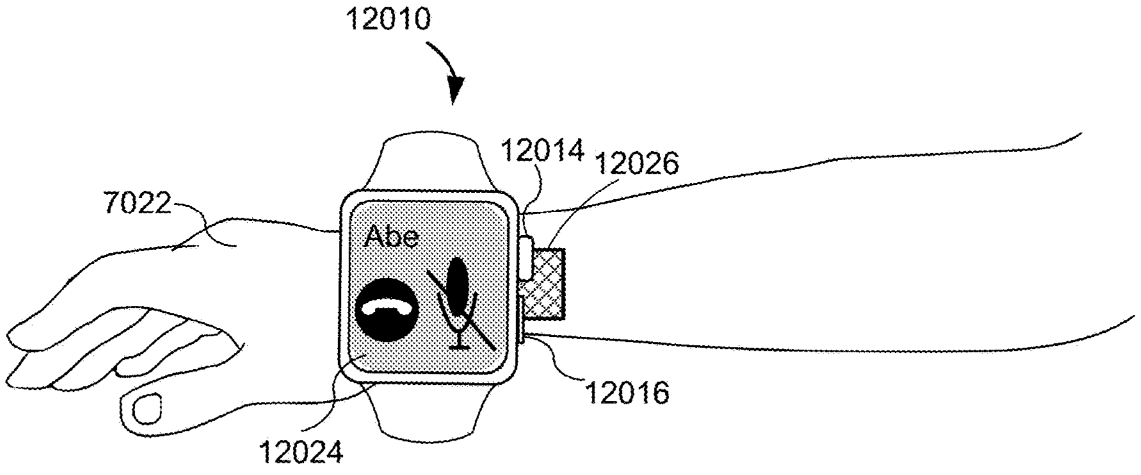
Figure 12F1
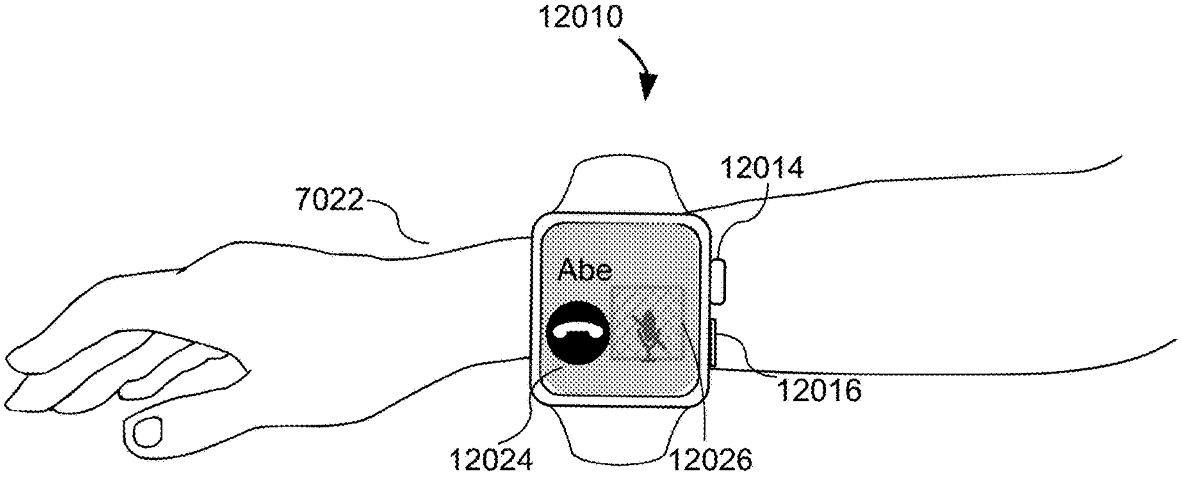
Figure 12G1

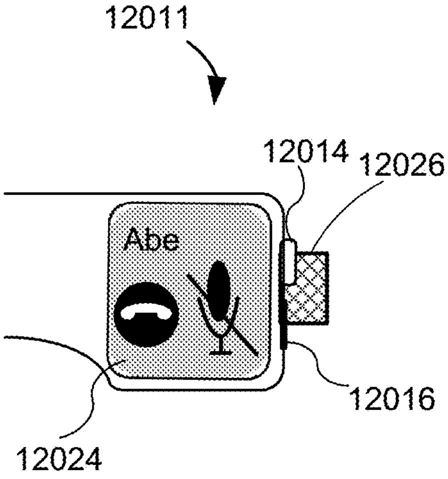
Figure 12F2
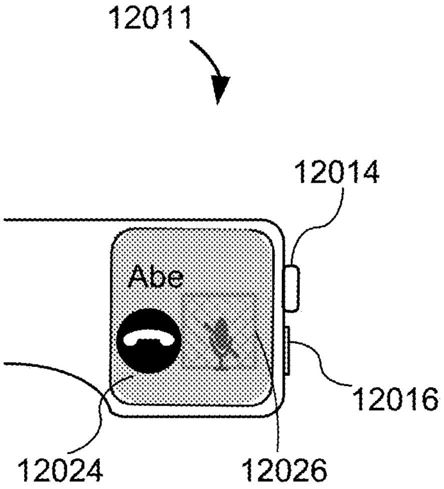
Figure 12G2

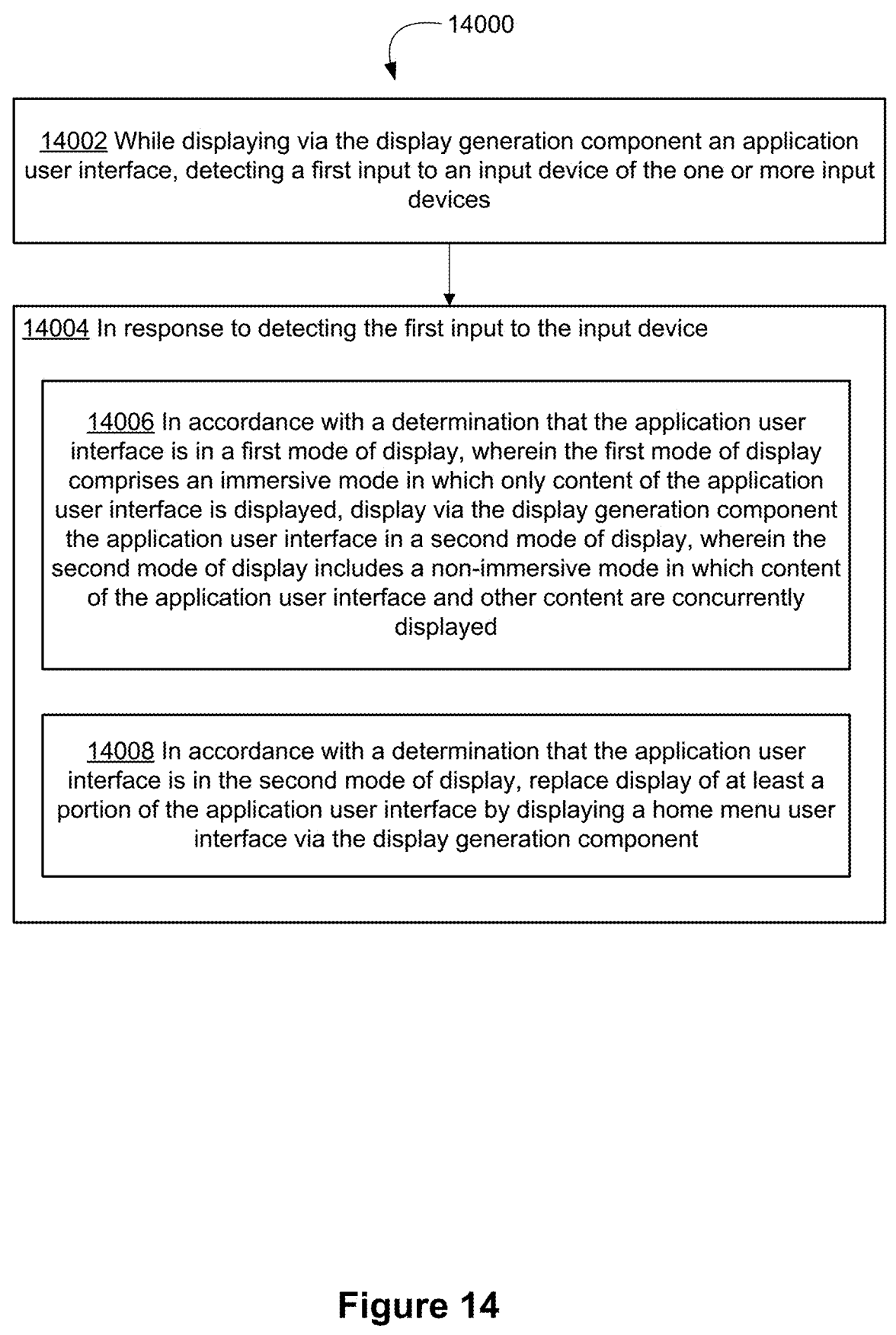

14000

14002 While displaying via the display generation component an application user interface, detecting a first input to an input device of the one or more input devices 14004 In response to detecting the first input to the input device 14006 In accordance with a determination that the application user interface is in a first mode of display, wherein the first mode of display comprises an immersive mode in which only content of the application user interface is displayed, display via the display generation component the application user interface in a second mode of display, wherein the second mode of display includes a non-immersive mode in which content of the application user interface and other content are concurrently displayed 14008 In accordance with a determination that the application user interface is in the second mode of display, replace display of at least a portion of the application user interface by displaying a home menu user interface via the display generation component

Figure 14

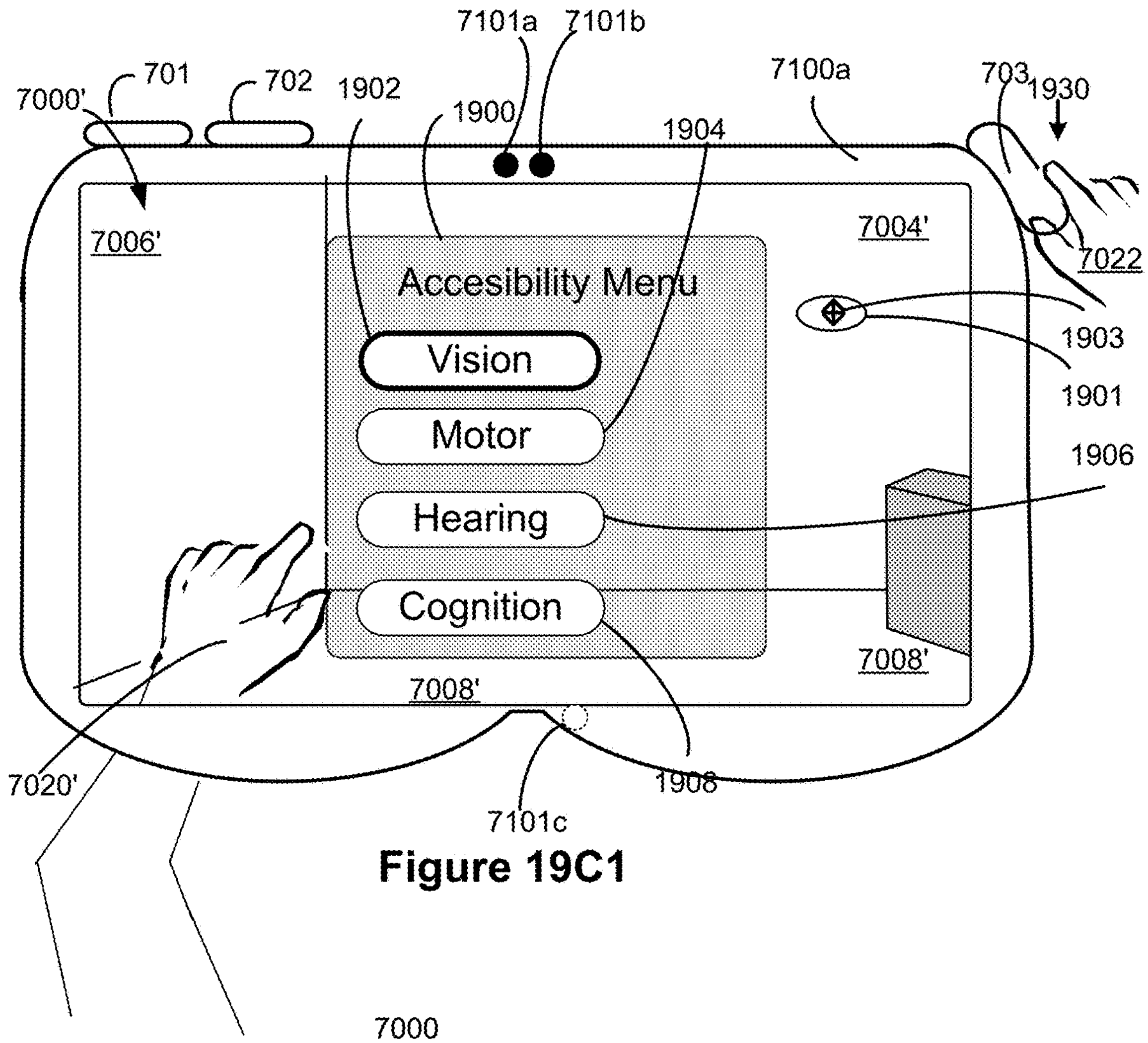
Figure 19C1
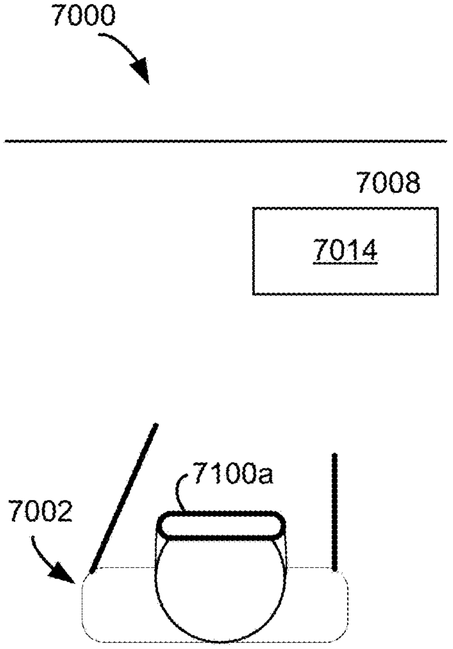
Figure 19C2

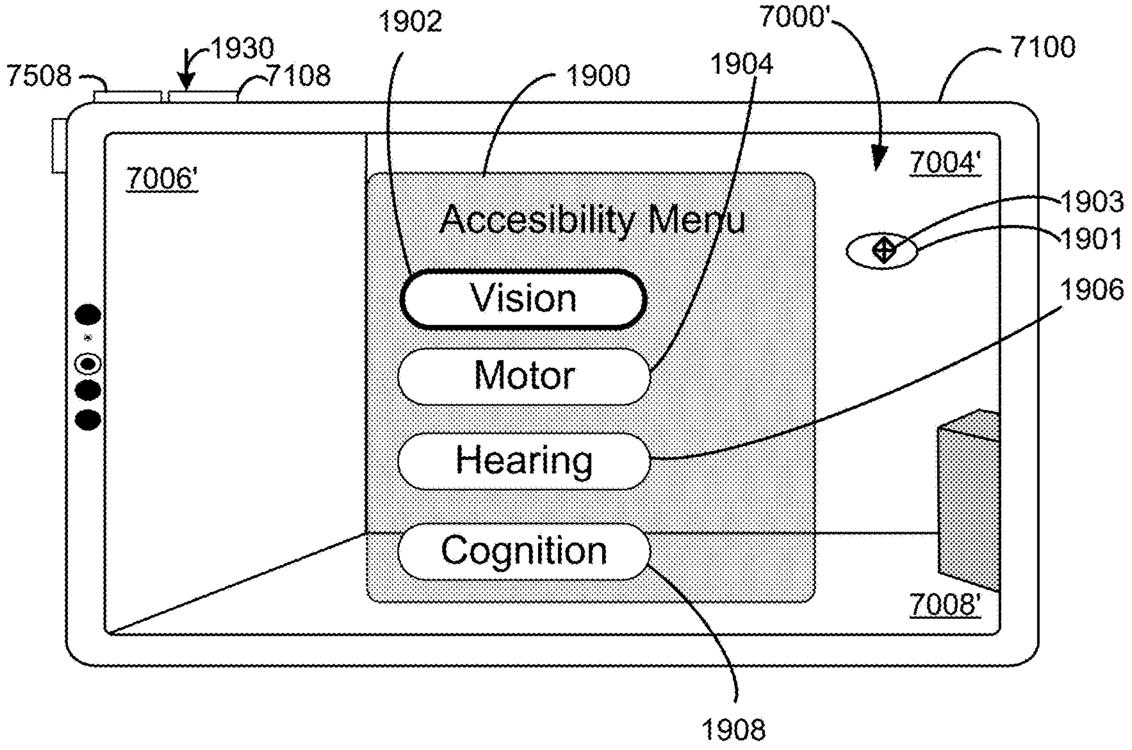
Figure 19C3
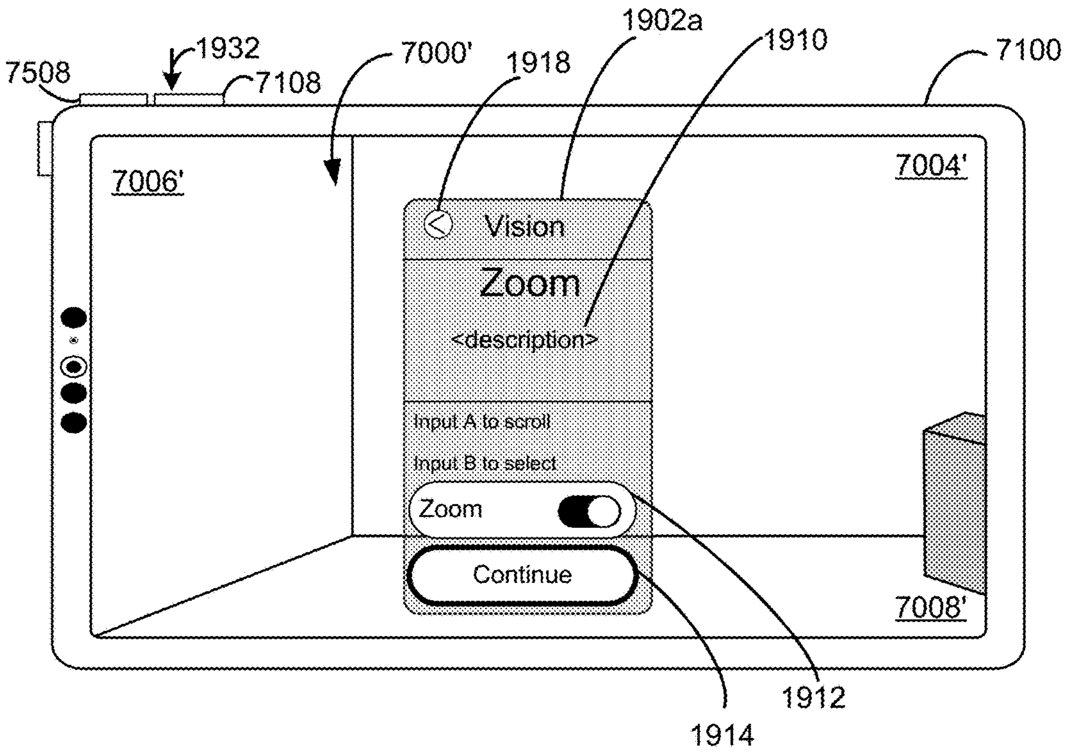
Figure 19D

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Application 63/470,921, filed Jun. 4, 2023, and U.S. Provisional Application 63/409,748, filed Sep. 24, 2022, each of which is hereby incorporated by reference in its entirety.

TECHNICAL FIELD

The present disclosure relates generally to computer systems that are in communication with a display generation component and, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, extended reality environments that include augmented reality environments, mixed reality environments, and virtual reality environments) are cumbersome, inefficient, and limited. For example, systems that provide insufficient avenues or mechanisms for performing actions associated with navigating within an extended reality environment, systems that require a series of inputs to achieve a desired outcome in the extended reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is performed at a device that includes or is in communication with one or more display generation components and one or more input devices. The method includes, while displaying via the one or more display generation components an application user interface, detecting a first input to an input device of the one or more input devices, the input device provided on a housing of the device that includes the one or more dis-play generation components, and in response to detecting the first input to the input device provided on the housing of the device: replacing display of at least a portion of the application user interface by displaying a home menu user interface via the one or more display generation components. The method includes while displaying via the one or more display generation components the home menu user interface, detecting a second input to the input device provided on the housing of the device; and in response to detecting the second input to the input device provided on the housing of the device: dismissing the home menu user interface.

In accordance with some embodiments, a method is performed at a computer system that includes or is in communication with a display generation component and one or more input devices. The method includes while displaying via the display generation component an application user interface, detecting a first input to an input device of the one or more input devices; and in response to detecting the first input to the input device: in accordance with a determination that the application user interface is in a first mode of display, wherein the first mode of display includes an immersive mode in which only content of the application user interface is displayed, displaying via the display generation component the application user interface in a second mode of display, wherein the second mode of display includes a non-immersive mode in which respective content of the application user interface and other content are concurrently displayed, and in accordance with a determination that the application user interface is in the second mode of display, replacing display of at least a portion of the application user interface by displaying a home menu user interface via the display generation component.

In accordance with some embodiments, a method is performed at a computer system that includes or is in communication with a display generation component and one or more input devices. The method includes while displaying via the display generation component an application user interface of an application, detecting a first input to an input device of the one or more input devices, and in response to detecting the first input to the input device: displaying a home menu user interface via the display generation component, and in accordance with a determination that the application is currently being shared in a content-sharing session in which content of the application is concurrently visible to multiple participants in the content-sharing session, maintaining display of at least a portion of the application user interface while displaying the home menu user interface; and in accordance with a determination that the application is not being shared in the content-sharing session, ceasing display of the application user interface.

In accordance with some embodiments, a method is performed at a computer system that includes or is in communication with a display generation component and one or more input devices. The method includes while the computer system is in operation, detecting a first input of a first type of input via an input device of the one or more input devices, wherein the first type of input is determined based on a location and/or movement of a first biometric feature, and in response to detecting the first input via the input device, performing a first operation in accordance with the first input. The operation is determined at least in part by first input enrollment information from a previous input enrollment process for the first type of input. The method includes after performing the first operation in accordance with the first input, detecting a second input of a second type of input via an input device of the one or more input devices; and in response to detecting the second input, initiating a process for input enrollment for the first type of input.

In accordance with some embodiments, a method is performed at a computer system that includes or is in communication with a display generation component and one or more input devices. The method includes detecting a first input on a rotatable input mechanism of an input device of the one or more input devices. The method includes in response to detecting the first input on the rotatable input mechanism, in accordance with a determination that the first input is a first type of input: changing an immersion level associated with display of an extended reality (XR) environment generated by the display generation component to a first immersion level in which display of the XR environment concurrently includes virtual content from an application and a passthrough portion of a physical environment of the computer system. The method includes in accordance with a determination that the first input is a second type of input: performing an operation different from changing the immersion level associated with display of the XR environment.

In accordance with some embodiments, a method is performed at a wearable device that includes or is in communication with a display generation component and one or more input devices. The method includes while a respective session is active in a respective application and while the wearable device is being worn, detecting a first signal indicating that the wearable device has been taken off, and in response to detecting the first signal: causing the respective session of the respective application to become inactive. The method includes while the respective application is inactive, detecting a second signal indicating that the wearable device is being put on; and in response to detecting the second signal: in accordance with a determination that respective criteria are met: resuming the respective session of the respective application; and in accordance with a determination that respective criteria are not met: forgoing resuming the respective session of the respective application, wherein the respective criteria include a criterion that is met when a current user of the wearable device is determined to be an authorized user of the wearable device.

In accordance with some embodiments, a method is performed at a computer system that includes or is in communication with one or more display generation components and one or more input devices. The method includes, while a configuration of the computer system is being performed, detecting a first input directed to a first input device of the one or more input devices, wherein the computer system includes one or more sensors that detect inputs including one or more of air gestures and gaze inputs. The method further includes, in response to detecting the first input to the first input device, displaying a menu including a plurality of selectable options for configuring one or more interaction models.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 8A-8G illustrate example techniques for performing different operations based on an input to an input device, depending on a current mode of display, in accordance with some embodiments.

FIGS. 9A-9D illustrate example techniques for performing one or more different operations based on an input to an input device depending on a characteristic of a displayed application user interface, in accordance with some embodiments.

FIGS. 10A-10D illustrate example techniques for resetting an input enrollment process, in accordance with some embodiments.

FIGS. 11A-11F illustrate example techniques for adjusting a level of immersion of a user's extended reality (XR) experience in a three-dimensional environment, in accordance with some embodiments.

FIGS. 12A-12G2 illustrate example techniques for controlling a computer system based on physical positioning and changes in the physical position of the computer system relative to a user, and a state of the computer system, in accordance with some embodiments.

FIG. 14 is a flow diagram of methods of performing different operations based on an input to an input device, depending on a current mode of display, in accordance with various embodiments.

DESCRIPTION OF EMBODIMENTS

Figure 1A:
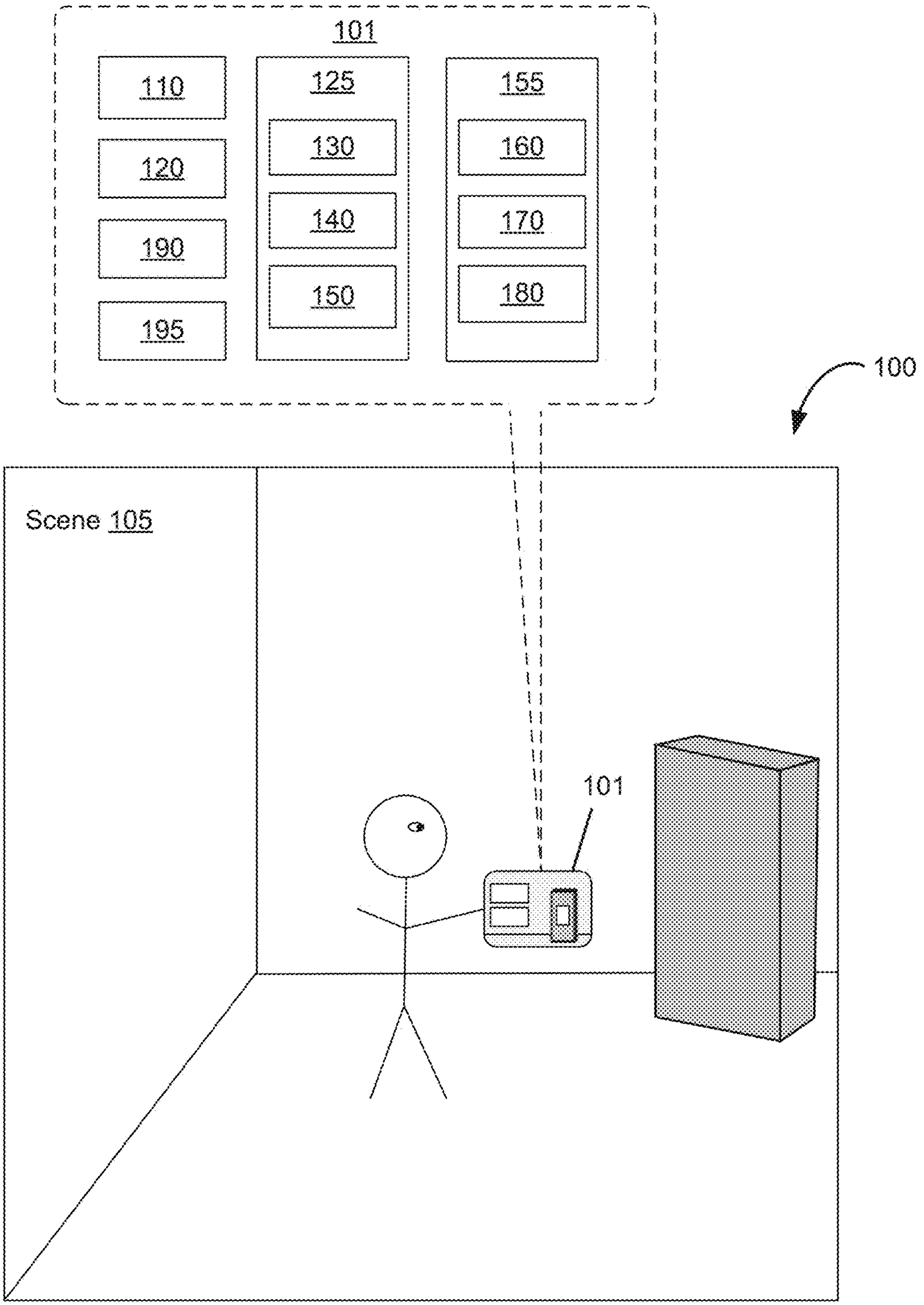
FIG. 1A is a block diagram illustrating an operating environment of a computer system for providing extended reality (XR) experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a device allows a user to use a single input to an input device (e.g., provided on a housing of one or more display generation components, through which portions of the physical environment and the virtual environment are rendered visible), to gain access to different collections of representations, without displaying additional controls. The use of the single input to the input device reduces the amount of time needed to navigate within a virtual environment or transition out of the virtual environment. The physical location of the input device provides an intuitive and reliable mechanism (e.g., a tactile touch/mechanical actuation mechanism) for receiving user inputs, which improves the reliability and operational efficiency of the device (e.g., computer system).

In some embodiments, a single input to an input device transitions the computer system from a high level of immersion (e.g., a fully immersive mode, in which only content of a respective application is displayed) into a less immersive mode or non-immersive mode, or from a non-immersive mode to one in which a home menu user interface is also displayed), and provides intuitive top level access to different collections of representations, when the user is in a non-immersive experience, without displaying additional controls (e.g., without requiring the user to navigate through user interface elements), thereby increasing operational efficiency of user-machine interactions based on the single input. The use of the single input to the input device reduces the amount of time needed to navigate within a virtual environment or transition out of a virtual environment.

In some embodiments, a single input to an input device maintains a display of application user interfaces of one or more shared applications while ceasing to display the application user interface(s) of one or more private applications, and helps to reduce the amount of disruption a user may experience while in a group interaction session. Dismissing one or more private applications while continuing to display shared applications in response to the single input enables the user to bring the shared applications into focus, without having to display additional controls. Further, the number of inputs needed to dismiss the private applications and maintain display of the shared application is reduced-instead of having to individually minimize or dismiss the one or more private applications, a single input is sufficient to maintaining display of the one or more shared applications while ceasing to display the one or more private applications.

In some embodiments, a second type of input initializes a biometric input enrollment reset for a first type of input, allowing more precise and accurate input enrollment information to be used for calibration and/or performing operations based on the first type of input. Instead of having a user navigate through user interface elements (e.g., menus or other control elements) using the first type of input in order to reset the input enrollment for the first type of input (e.g., first type of input may need to be reset due to inaccurate calibration, making it difficult to use the inaccurately calibrated first type of input to navigate interface control elements), using a second type of input to initialize input enrollment improves operational efficiency, reduces user frustration, and reduces the number of inputs needed for initializing an input enrollment reset process. The use of the second type of input to reset input enrollment also helps to reduce the amount of time needed to begin the input enrollment reset process. For example, the use of the second type of input enables input enrollment reset to be initialized without displaying additional controls (e.g., navigating through user interface elements using the first type of input).

In some embodiments, a single input device accepts two or more different types of input, which reduces the number of distinct input devices that have to be provided to request and/or instruct different functionalities. The use of a rotational input mechanism allows the user to provide a continuous range of inputs, and bidirectionality of the rotational input mechanism allows the input to be easily and intuitively varied, in either direction, without having to display additional controls to the user. The same rotational input mechanism is able to receive a second type of input that accomplishes discrete functions. Reducing the number of input devices that have to be provided reduces physical clutter on the device, freeing up more physical space on the device and helps to prevent accidental inputs from inadvertent contacts. The use of the rotational input mechanism provides direct access to changes in immersion levels and the performance of different operations, reducing the amount of time needed to effect particular outcomes, thereby improving operational efficiency of the computer system. Increasing an immersion level helps to remove constraints in a physical environment of the computer system (e.g., a more spacious virtual environment is realistically simulated by blocking out sensory out inputs from the physical environment (e.g., blocking visual input of a confined room, and/or removing (audio) echoes from a small physical space) to provide a virtual environment that is more conducive for the user to interact with the application.

In some embodiments, using respective criteria to determine whether to automatically resume a respective session of a respective application enables the respective session to be resumed without any active user input and without displaying additional controls. Using the respective criteria causes the device to automatically resume the respective session when the respective criteria are met, providing a more efficient man-machine interface for the wearable device, which provides a more efficient way for the user to control a wearable device, while minimizing disruptions, or requiring a user to navigate through additional control element before the respective session can be resumed. Determining whether a current user of the wearable device is an authorized user of the wearable device provides improved security and/or privacy by ensuring that the respective session of the respective application is only resumed when an authorized user is detected.

In some embodiments, while a configuration of the computer system is being performed, a computer system detects a first input directed to a first input device of the one or more input devices, wherein the computer system includes one or more sensors that detect inputs including one or more of air gestures and gaze inputs; and in response to detecting the first input to the first input device, displays a menu including a plurality of selectable options for configuring one or more interaction model. Providing (e.g., whether displaying and/or reading aloud) a menu of options for different interaction models with a computer system during configuration of the computer system (e.g., during initial setup of the computer system) enables a user to choose upfront their preferred ways of interacting with the computer system, including ways that are more intuitive to the user, so as to later reduce the number and/or extent of inputs and/or the amount of time needed to interact with the computer system, and especially to enable a user who uses interaction models that are different from the default and who would otherwise require assistance to use the computer system to need only one-time assistance (e.g., at the outset of initializing the computer system) to set up the computer system with interaction models appropriate for the user, so that the user can later use the computer system independently.

Figure 1B:
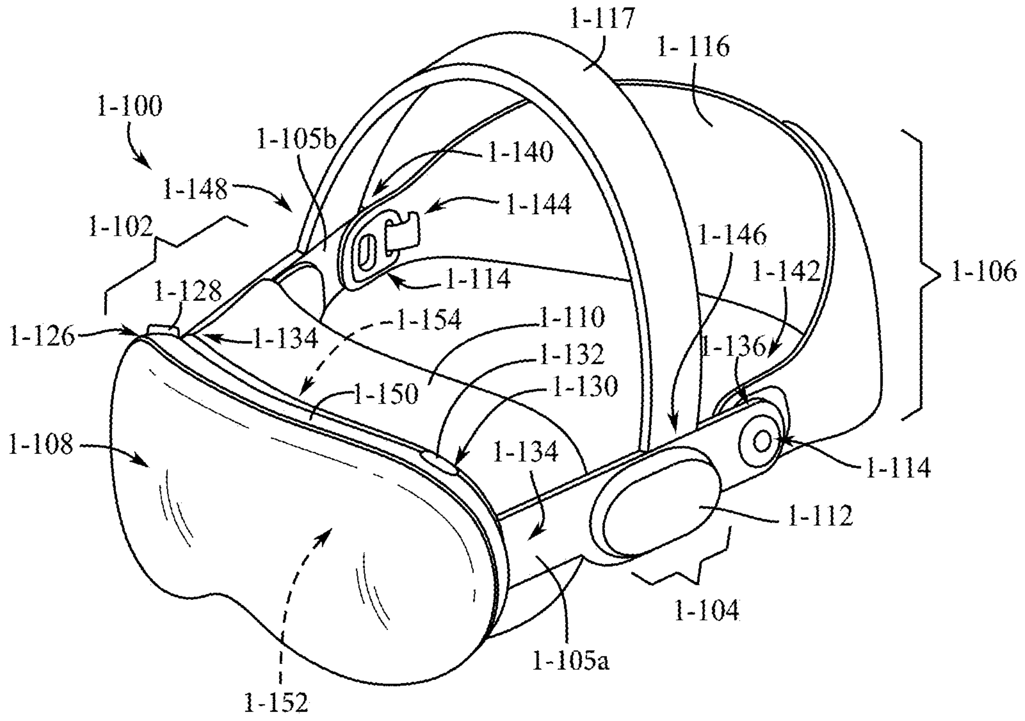
FIGS. 1B-1P are examples of a computer system for providing XR experiences in the operating environment of FIG. 1A.
Figure 1C:
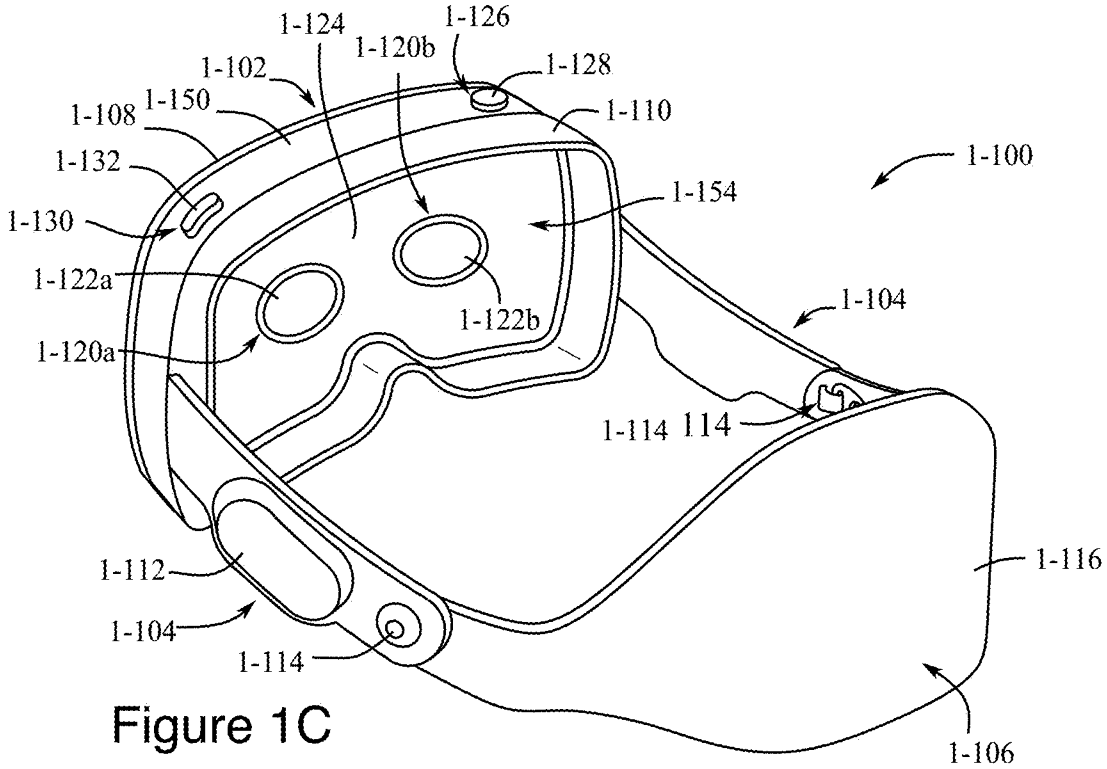
Figure 1D:
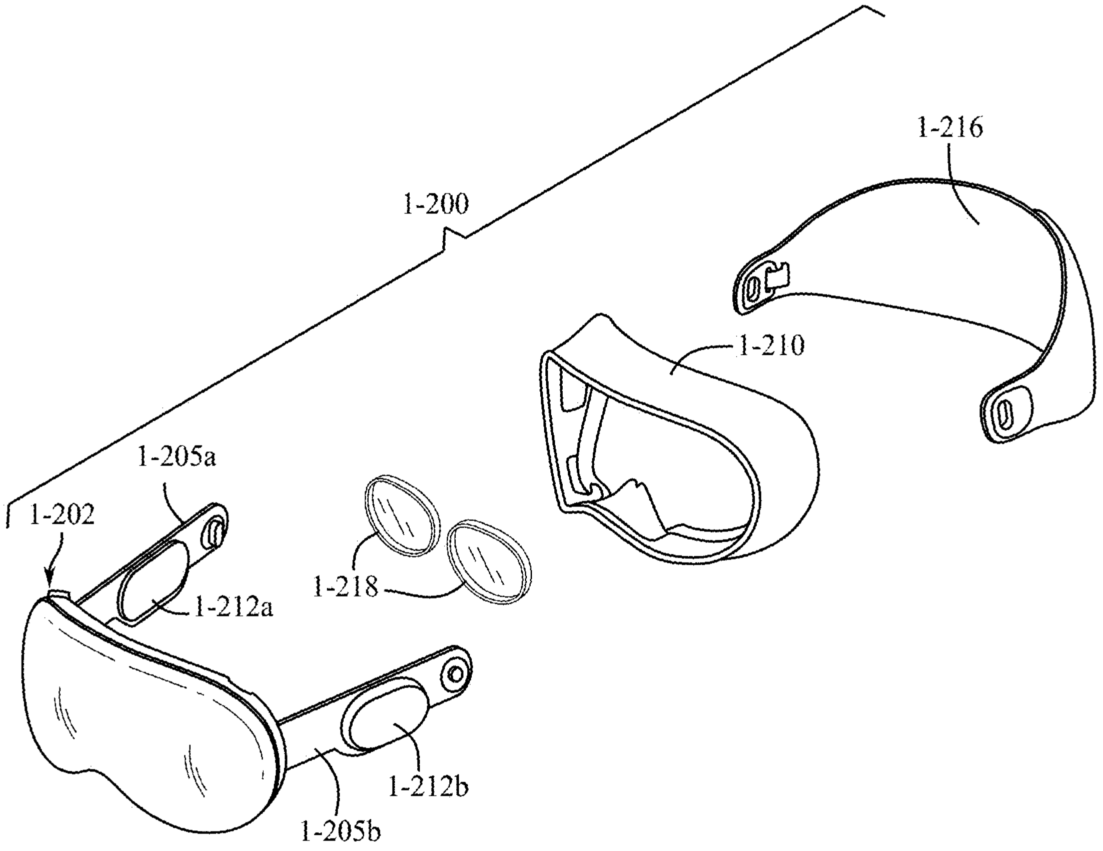
Figure 1E:
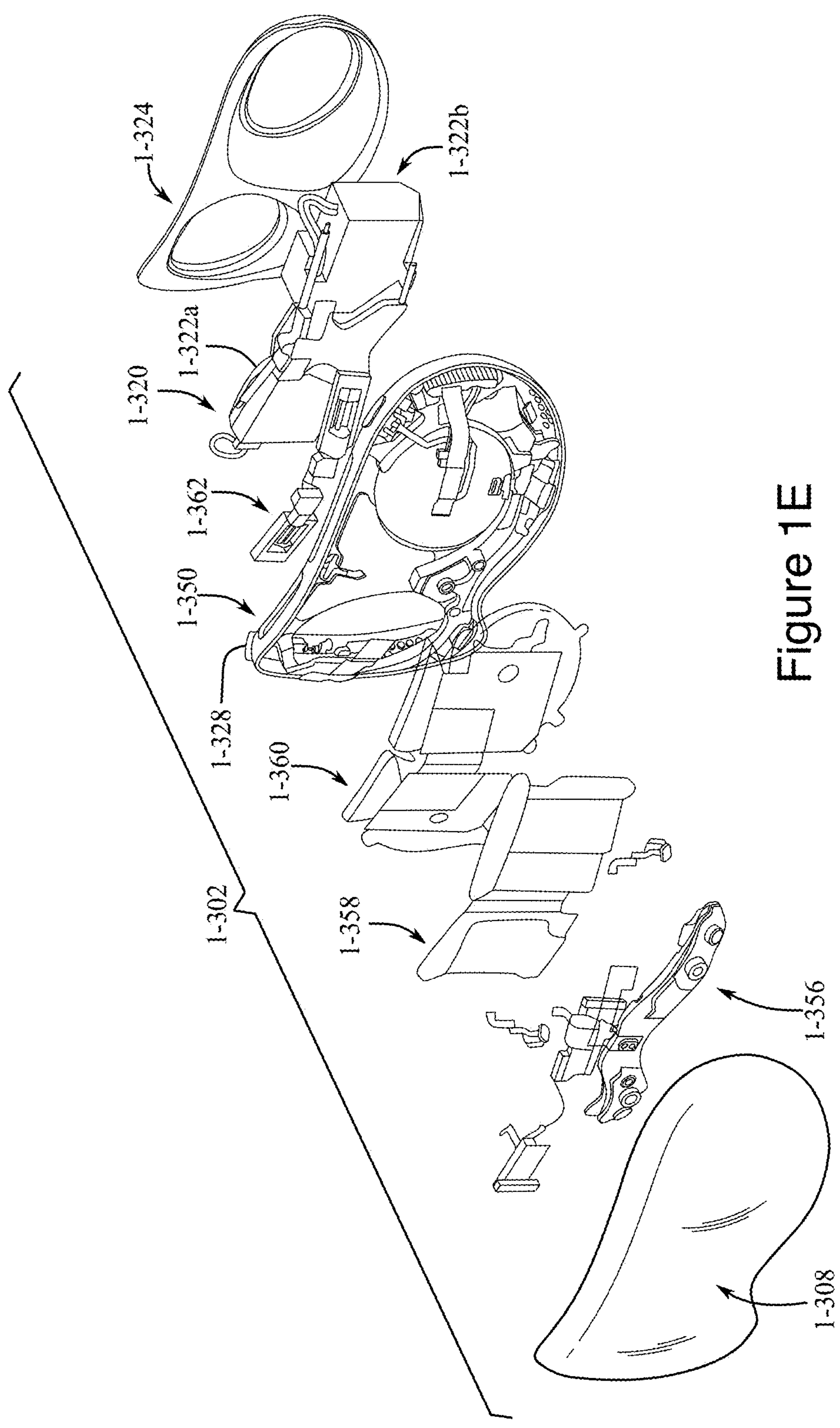
Figure 1F:
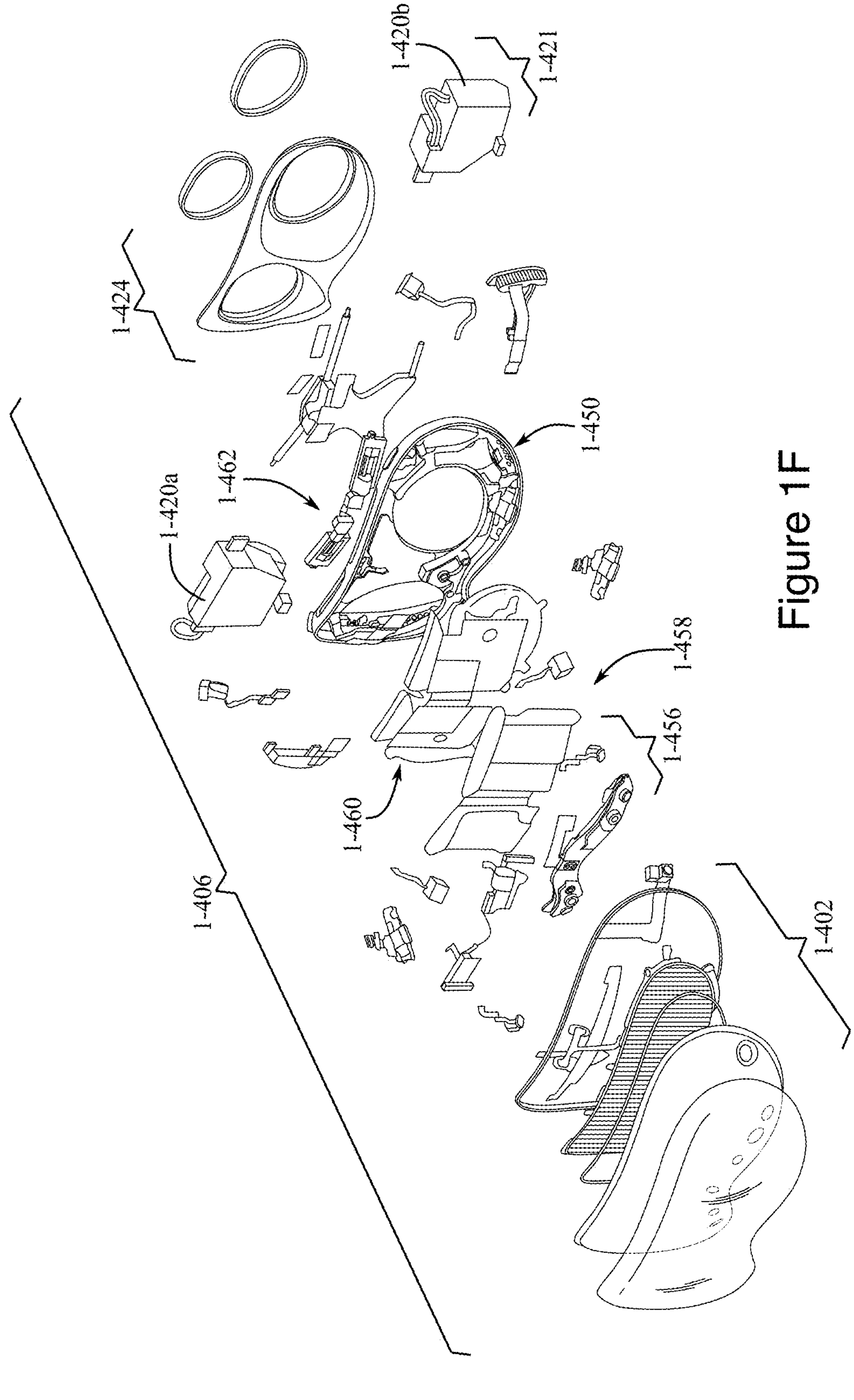
Figure 1G:
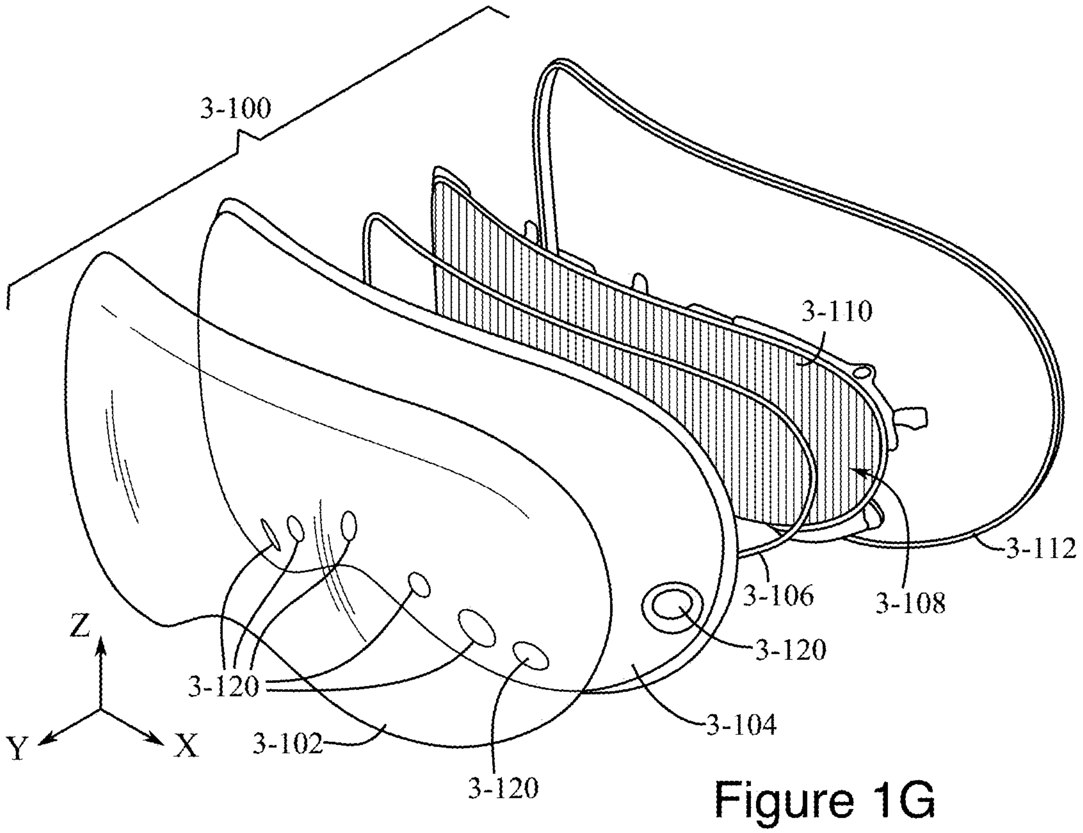
Figure 1H:
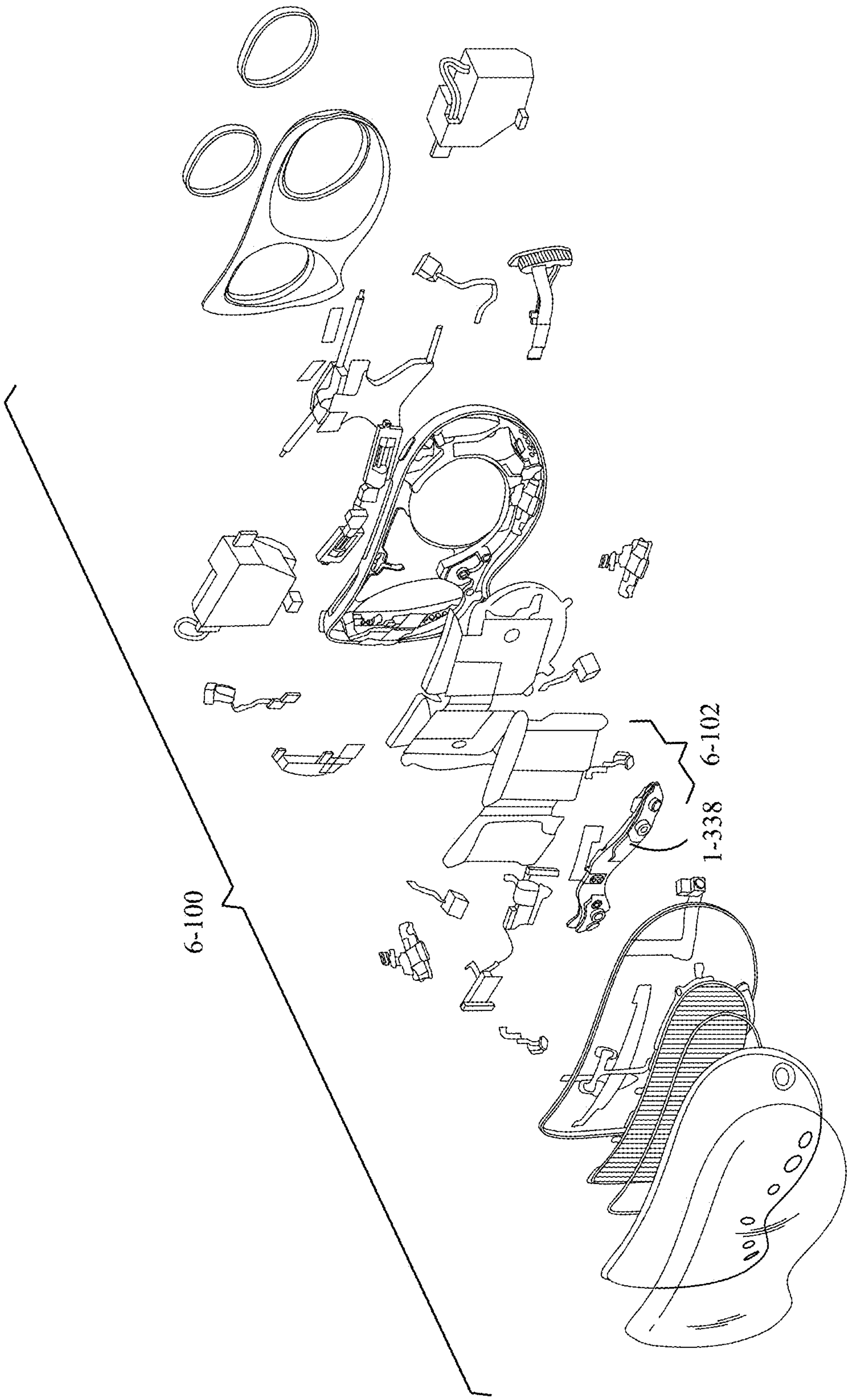
Figure 1I:
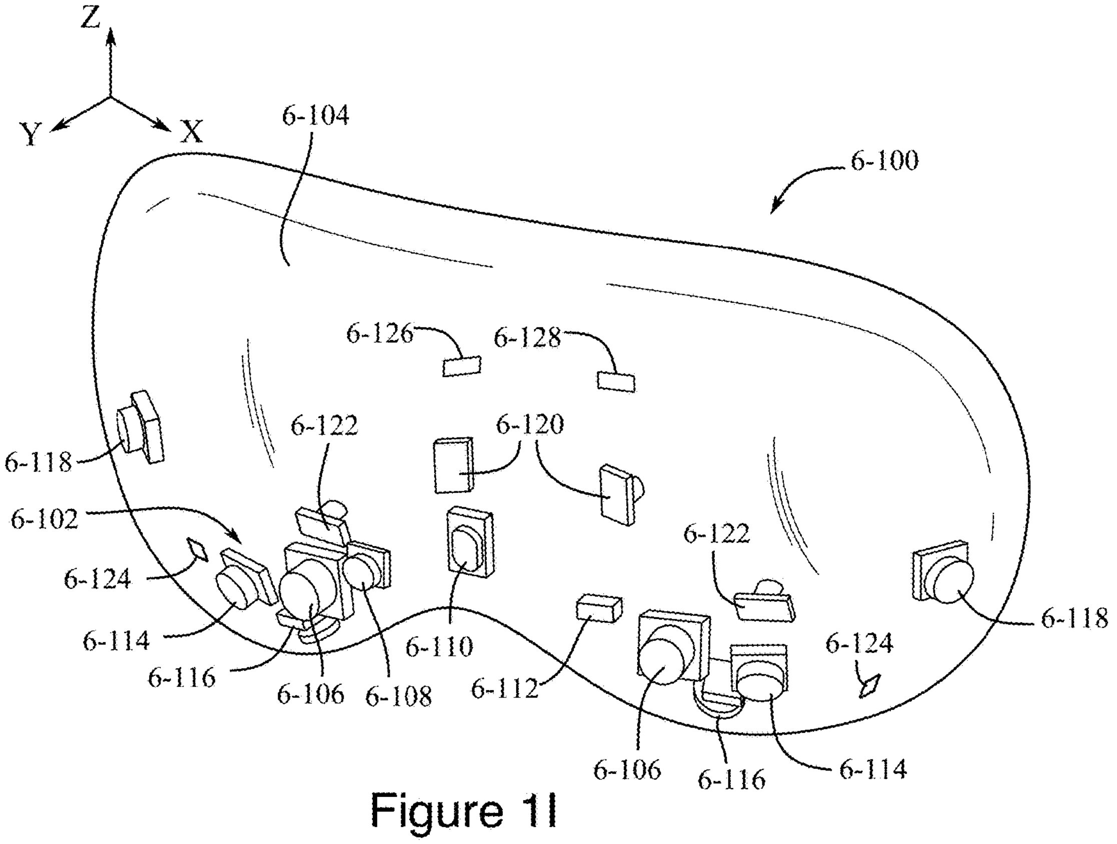
Figure 1J:
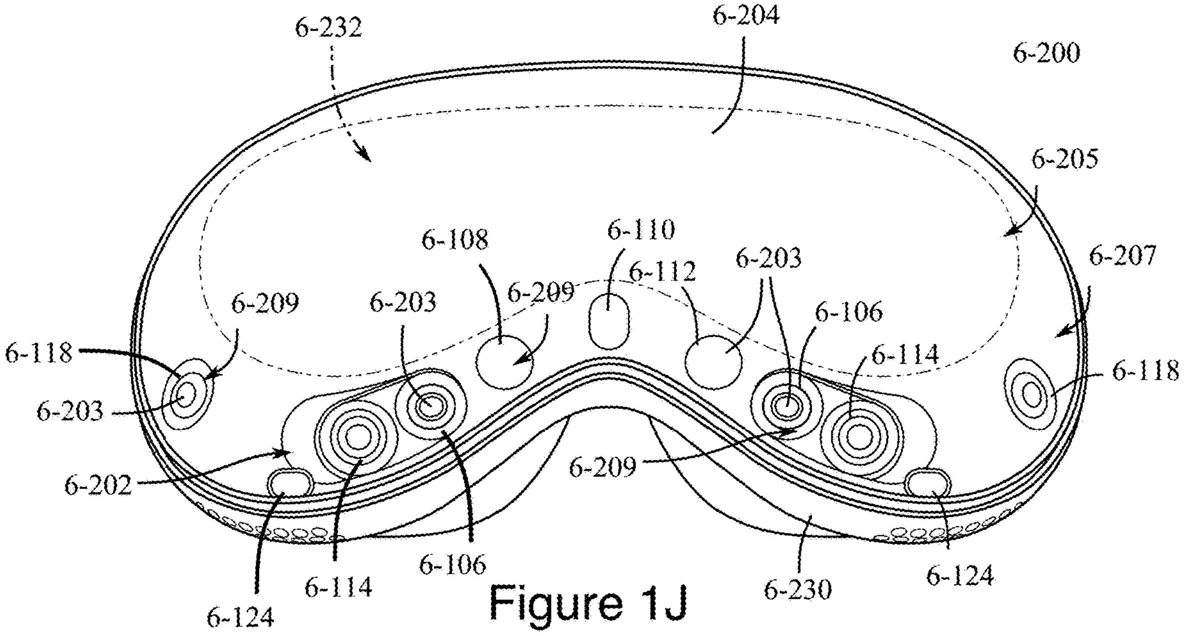
Figure 1K:
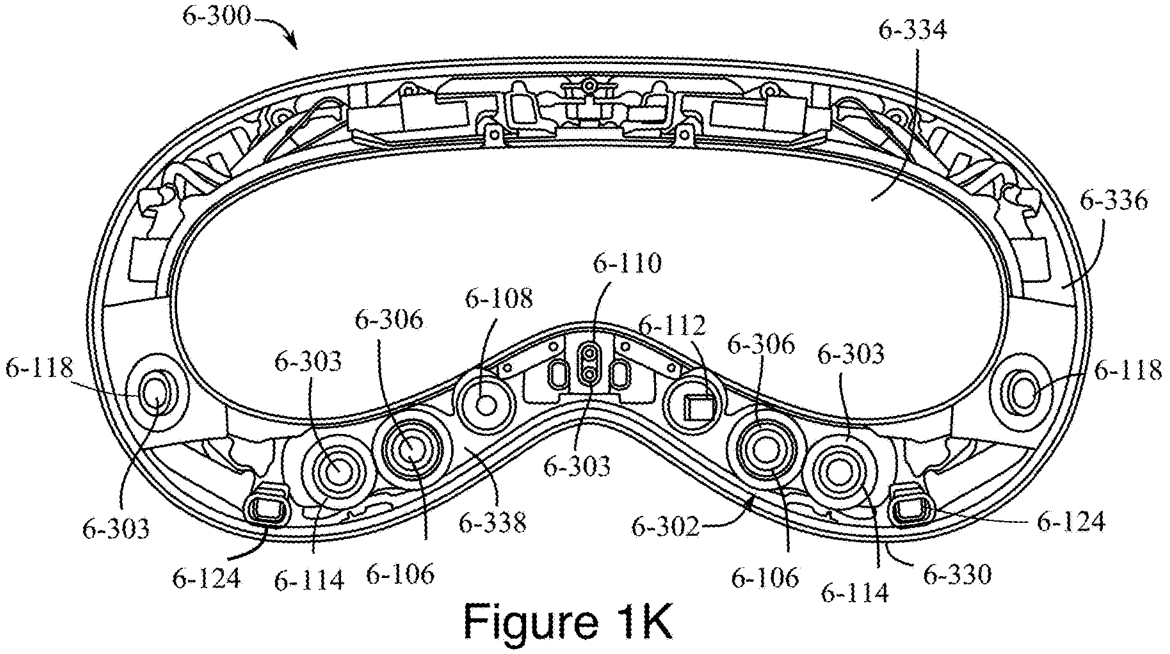
Figure 1L:
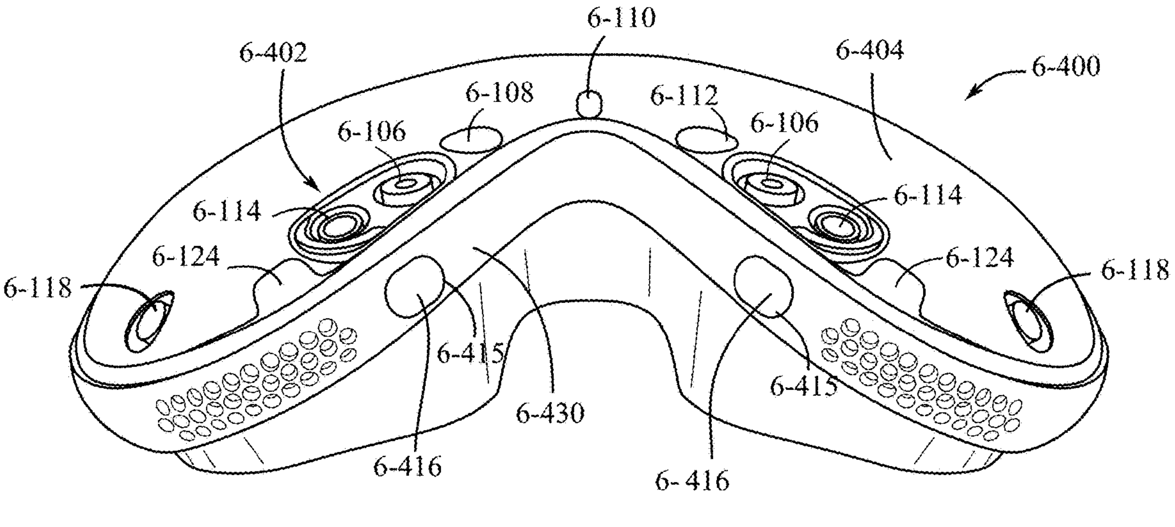
Figure 1M:
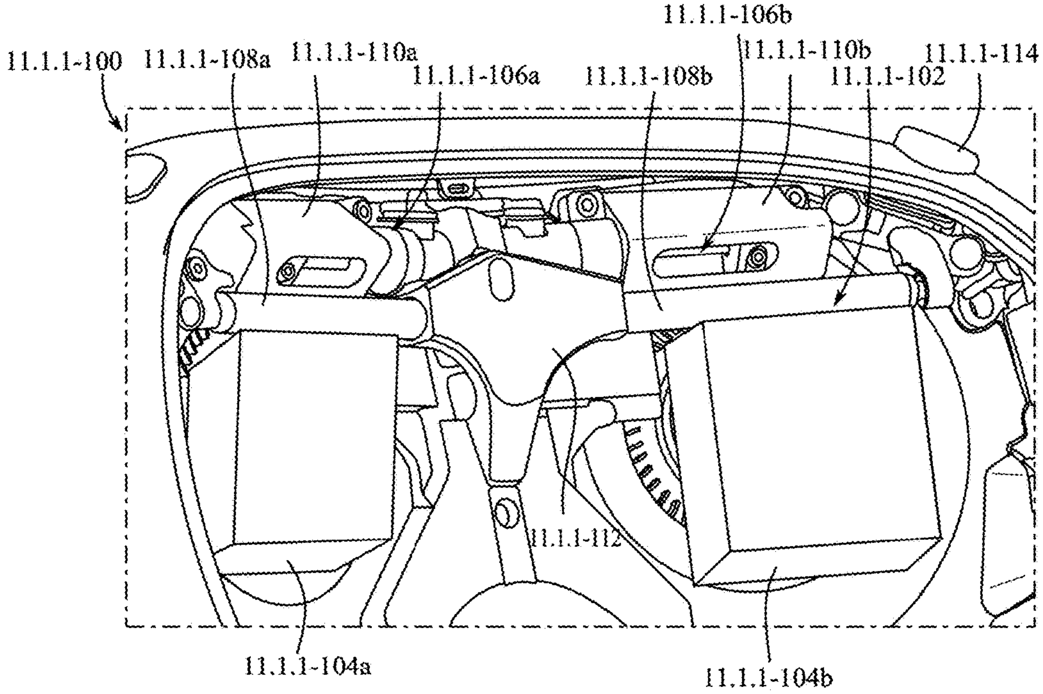
Figure 1N:
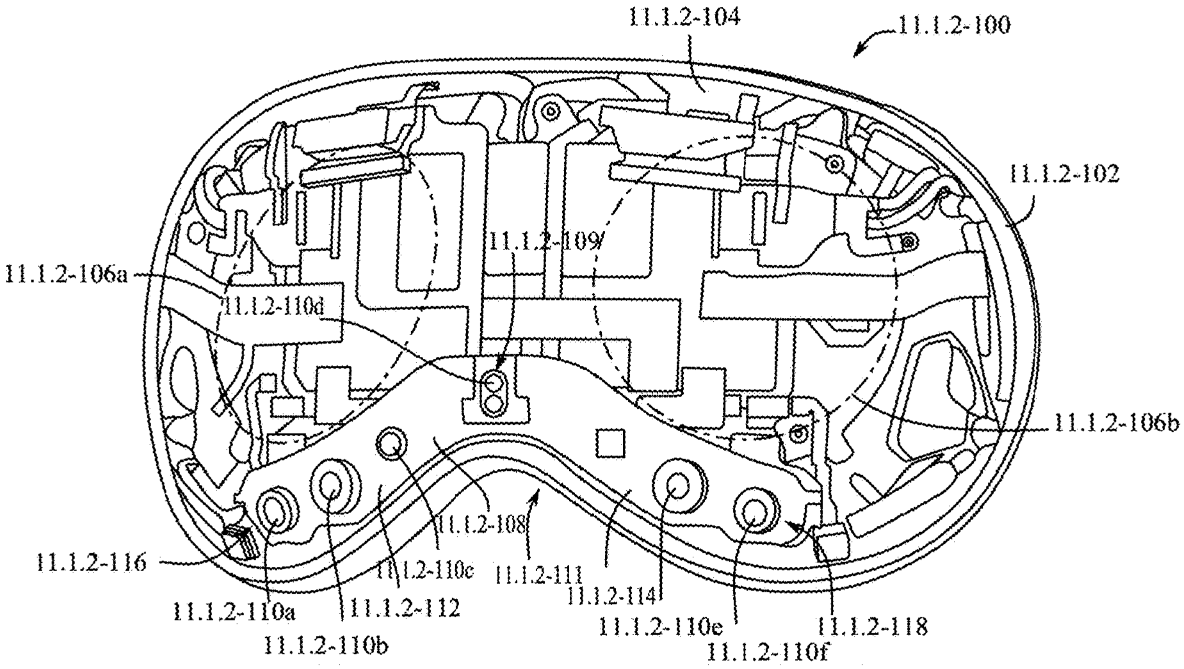
Figure 1O:
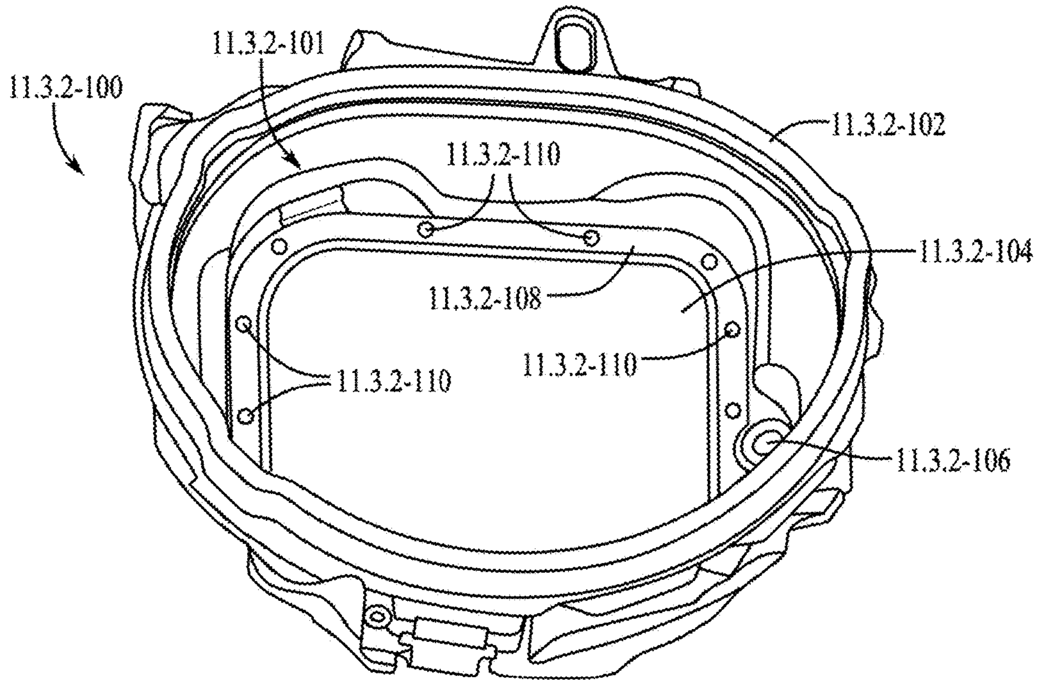
Figure 1P:
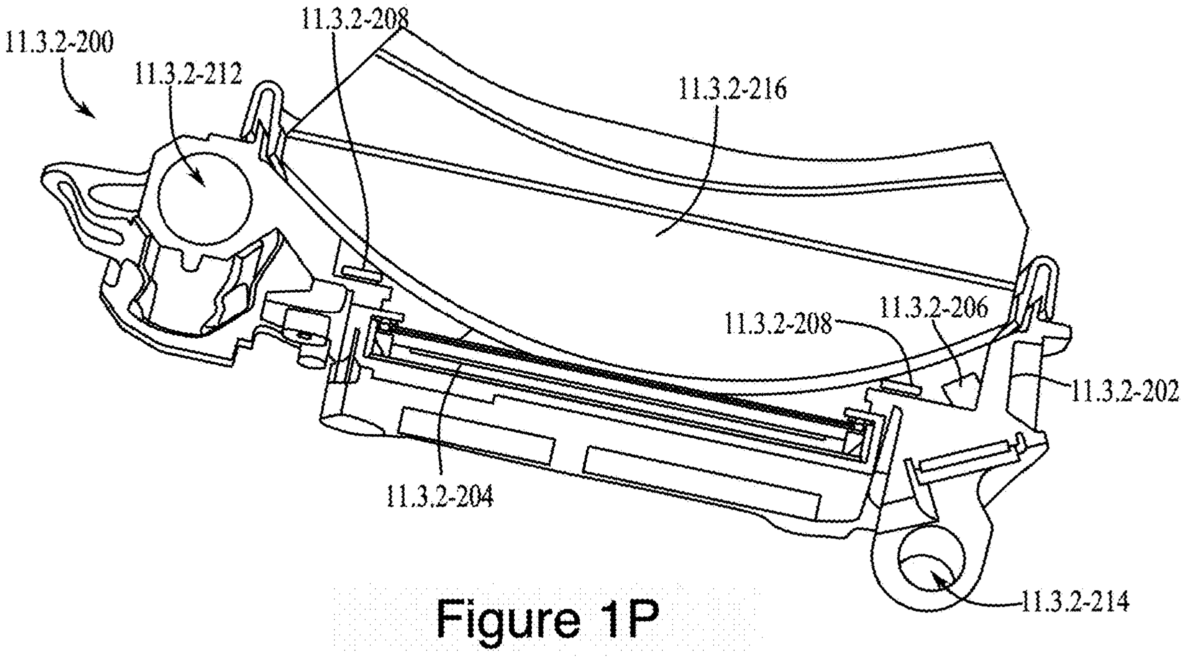
Figure 2:
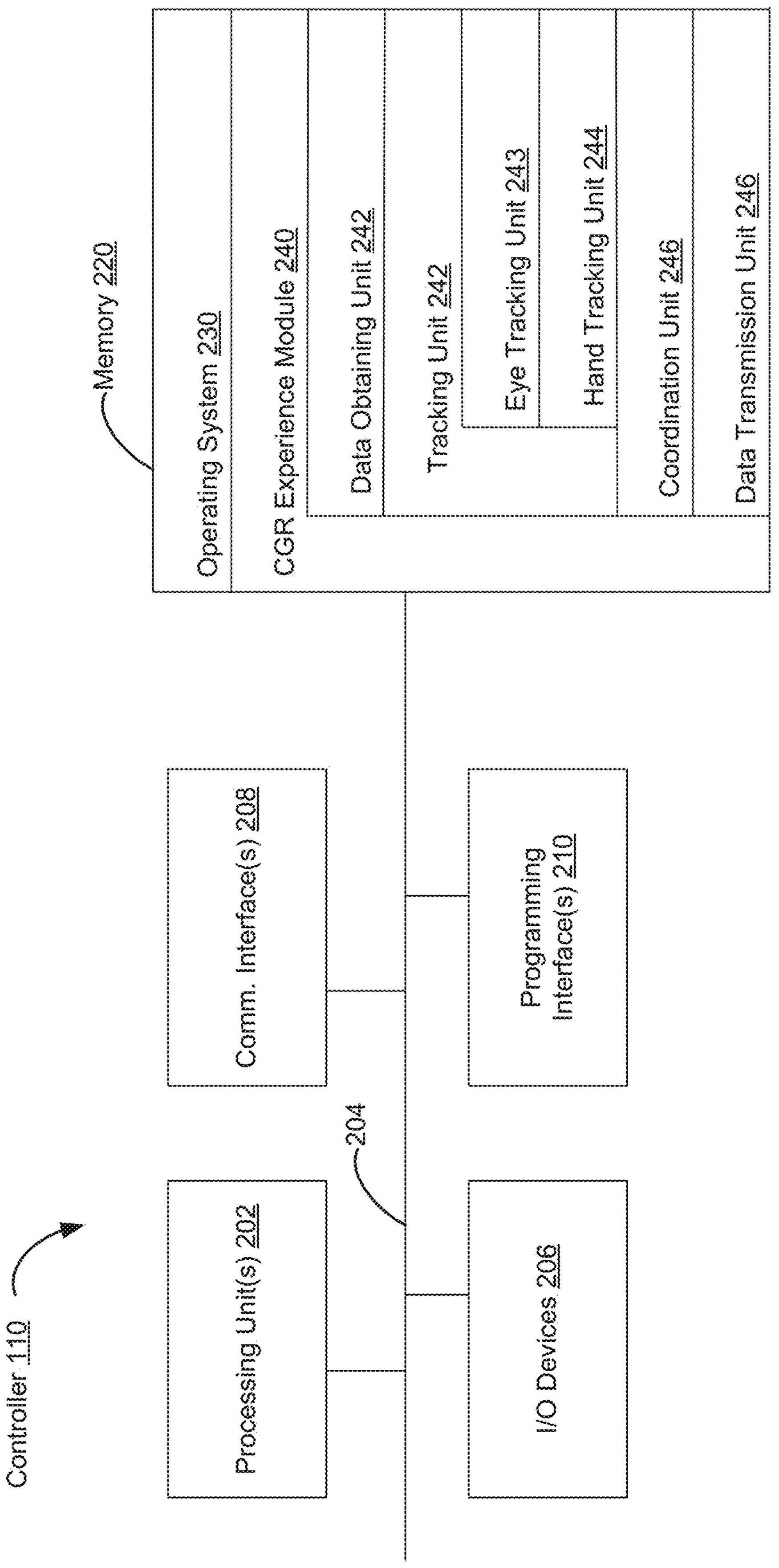
FIG. 2 is a block diagram illustrating a controller of a computer system that is configured to manage and coordinate an XR experience for the user in accordance with some embodiments.
Figure 12A:
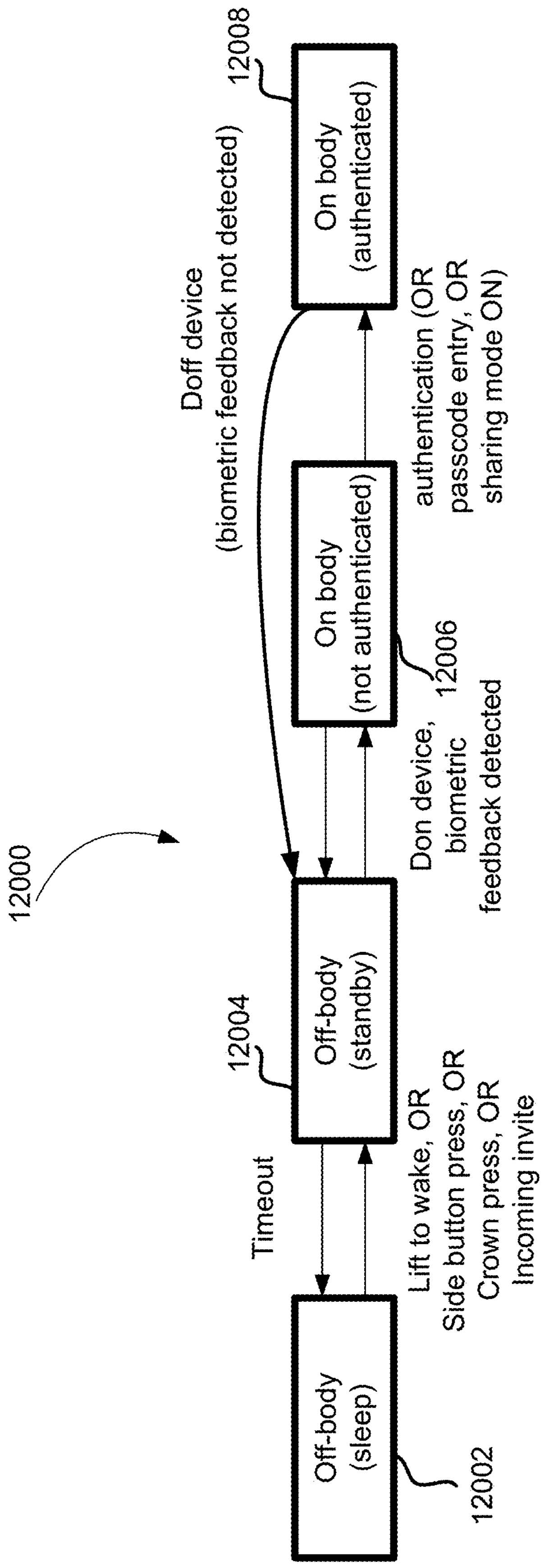
Figure 13:
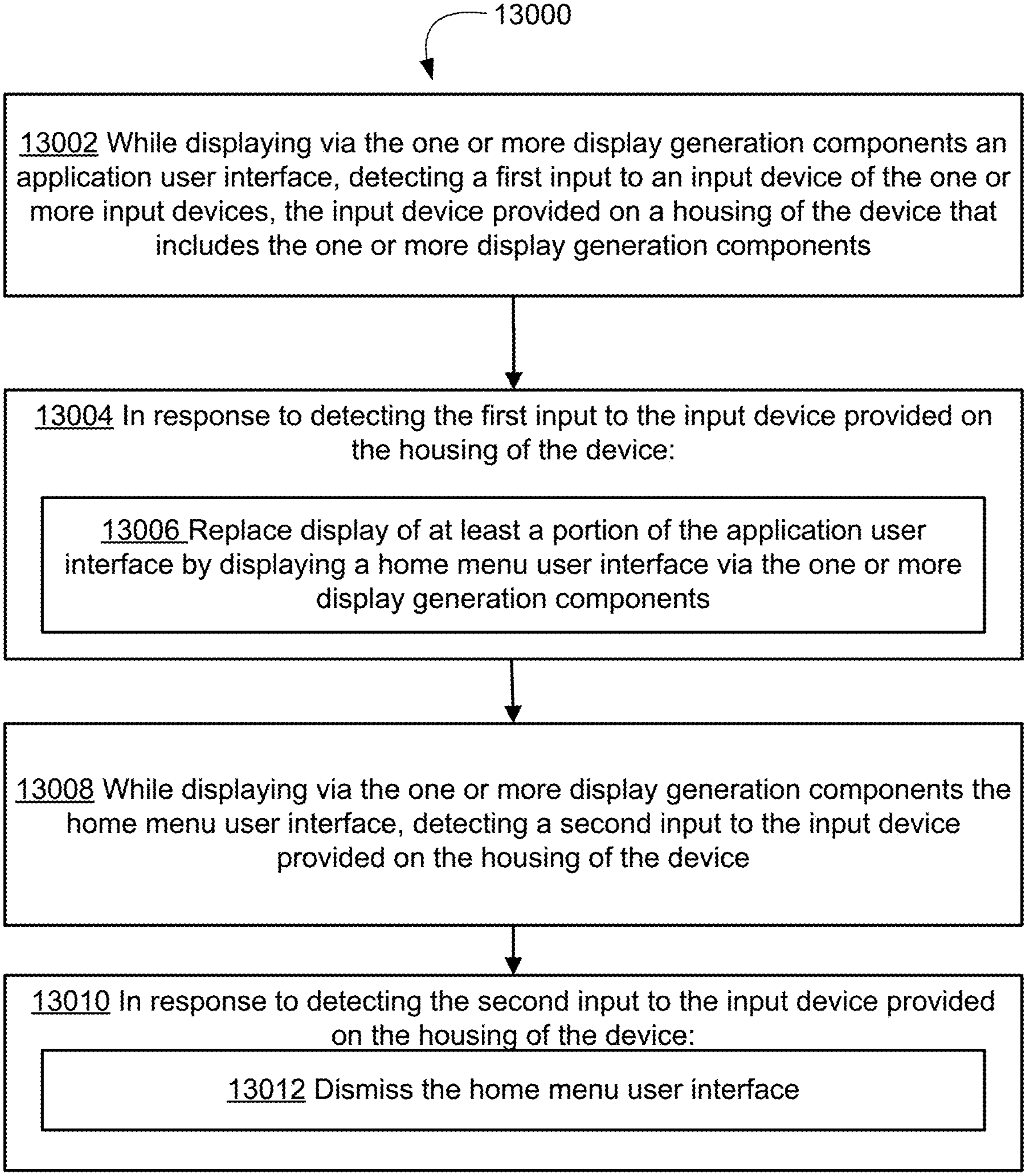
FIG. 13 is a flow diagram of methods of displaying a home menu user interface within a three-dimensional environment, in accordance with various embodiments.
Figure 15:
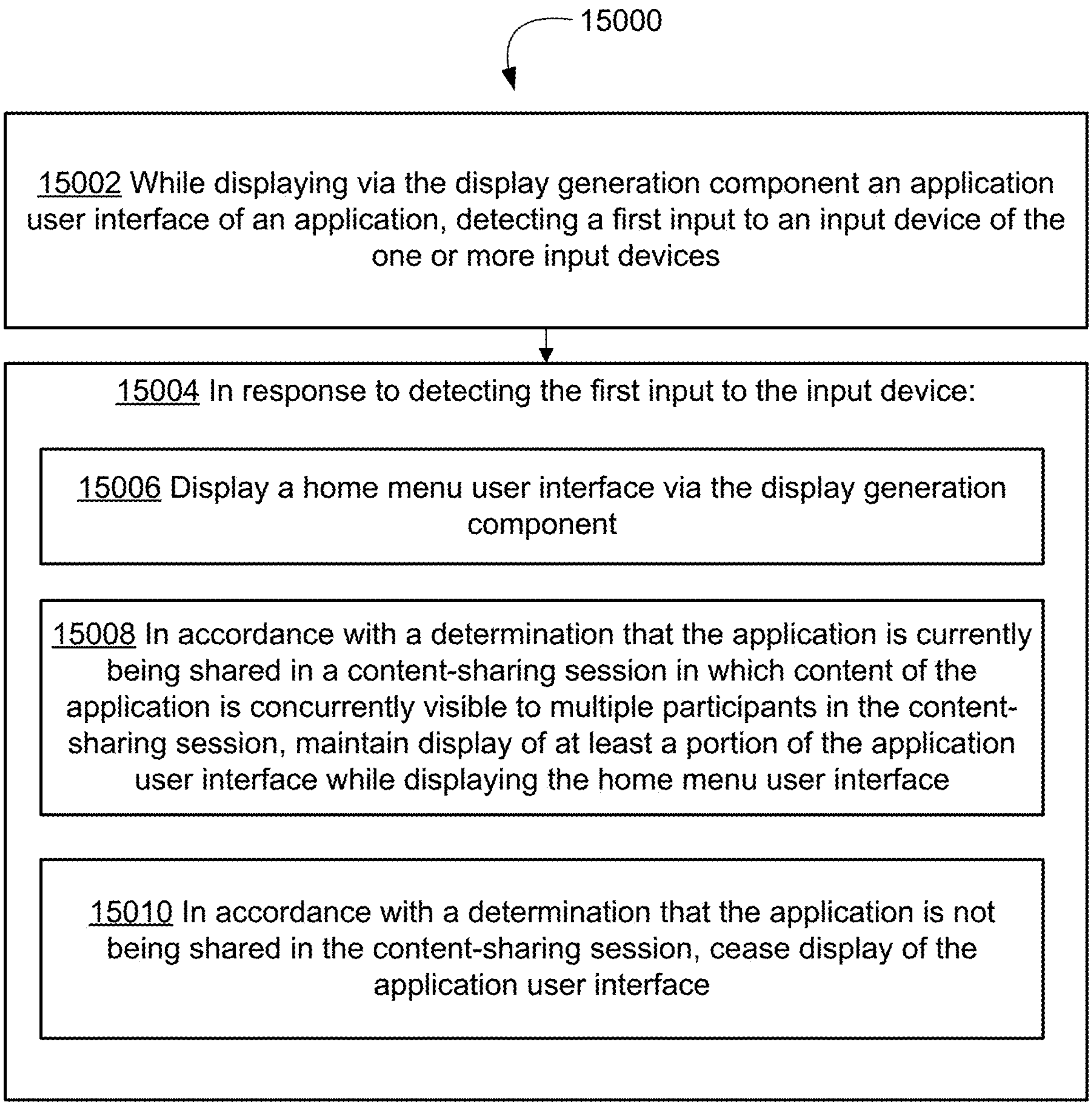
FIG. 15 is a flow diagram of methods of performing one or more different operations based on an input to an input device depending on a characteristic of a displayed application user interface, in accordance with various embodiments.
Figure 16:
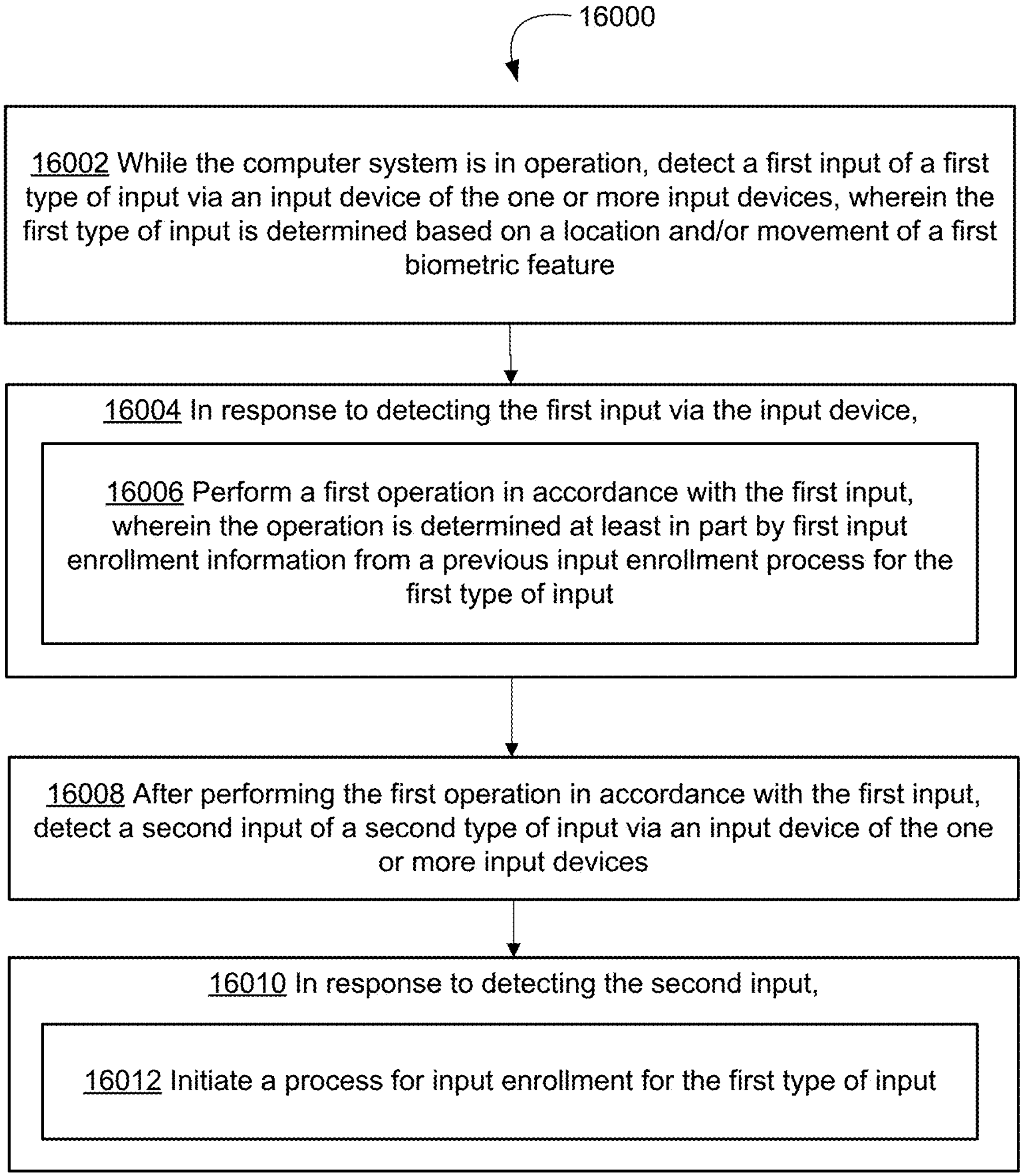
FIG. 16 is a flow diagram of methods of resetting a biometric input enrollment process, in accordance with various embodiments.
Figure 17:
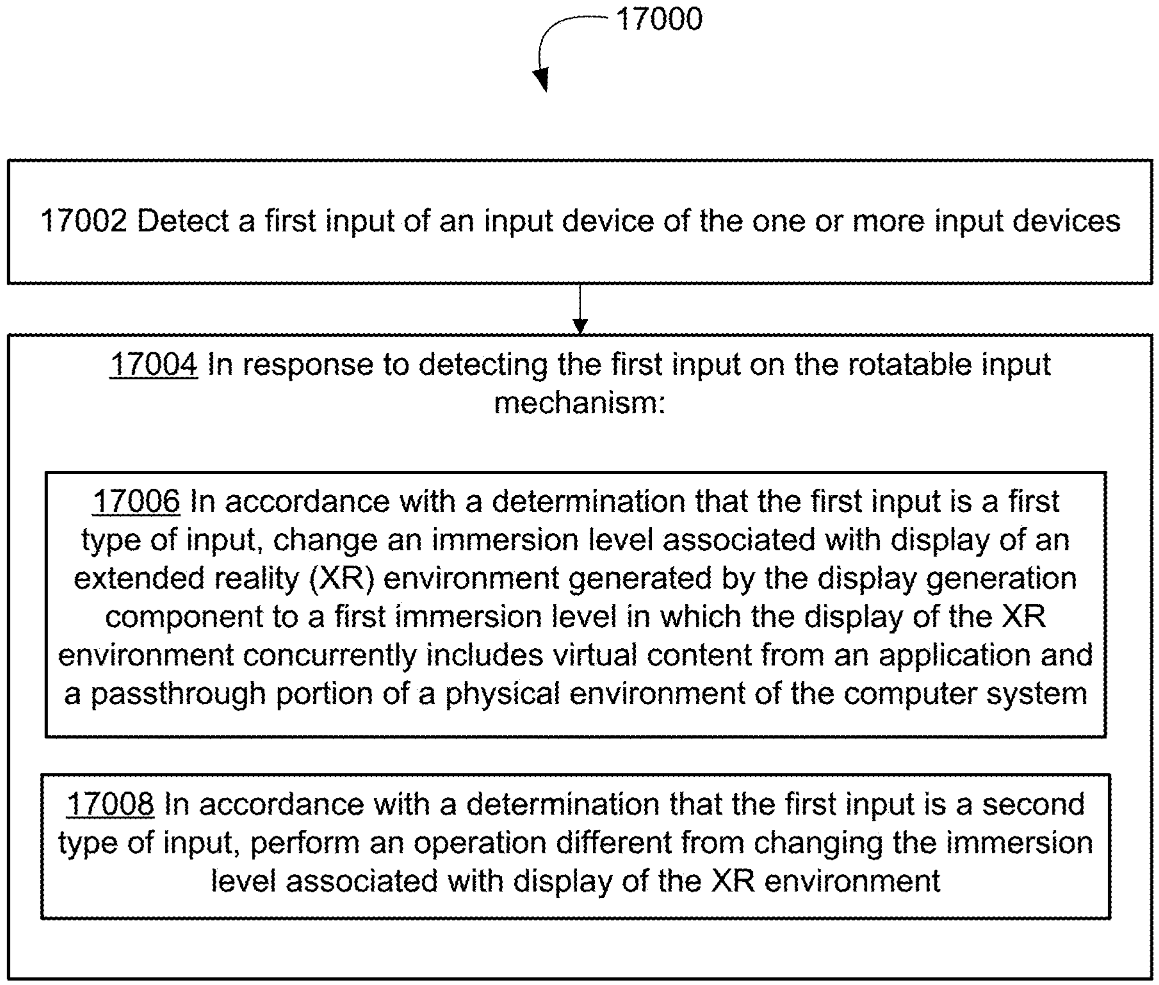
FIG. 17 is a flow diagram of methods of adjusting a level of immersion of a user's extended reality (XR) experience in a three-dimensional environment, in accordance with various embodiments.
Figure 18:
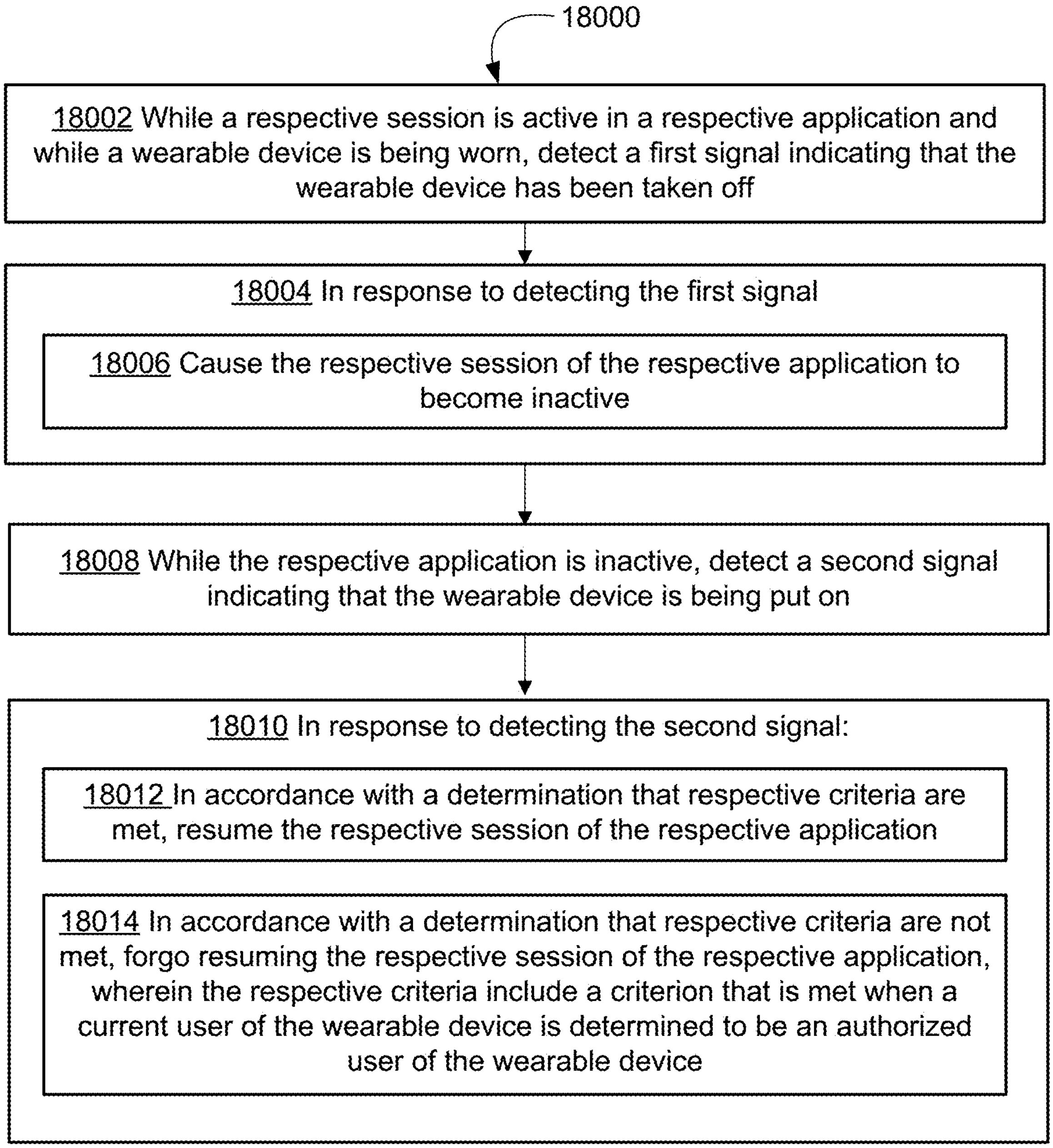
FIG. 18 is a flow diagram of methods of controlling a computer system based on physical positioning and changes in the physical position of the computer system relative to a user, and a state of the computer system, in accordance with various embodiments.
Figure 19A:
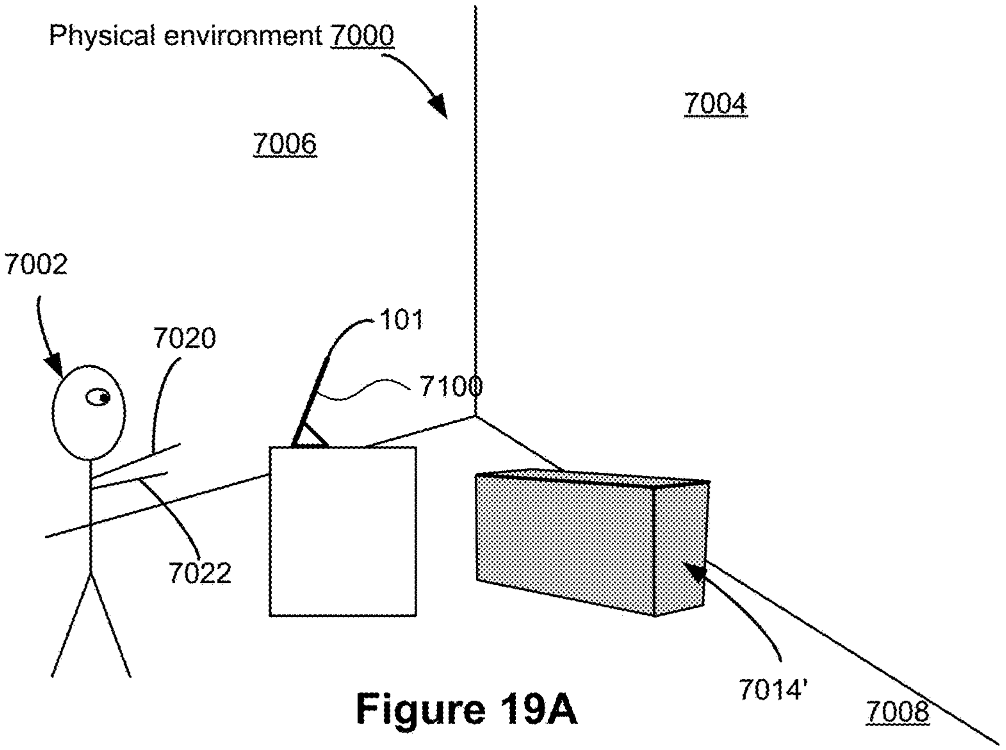
FIG. 19A-19P illustrate example techniques for navigating an accessibility menu during system configuration, in accordance with some embodiments.
Figure 19P:
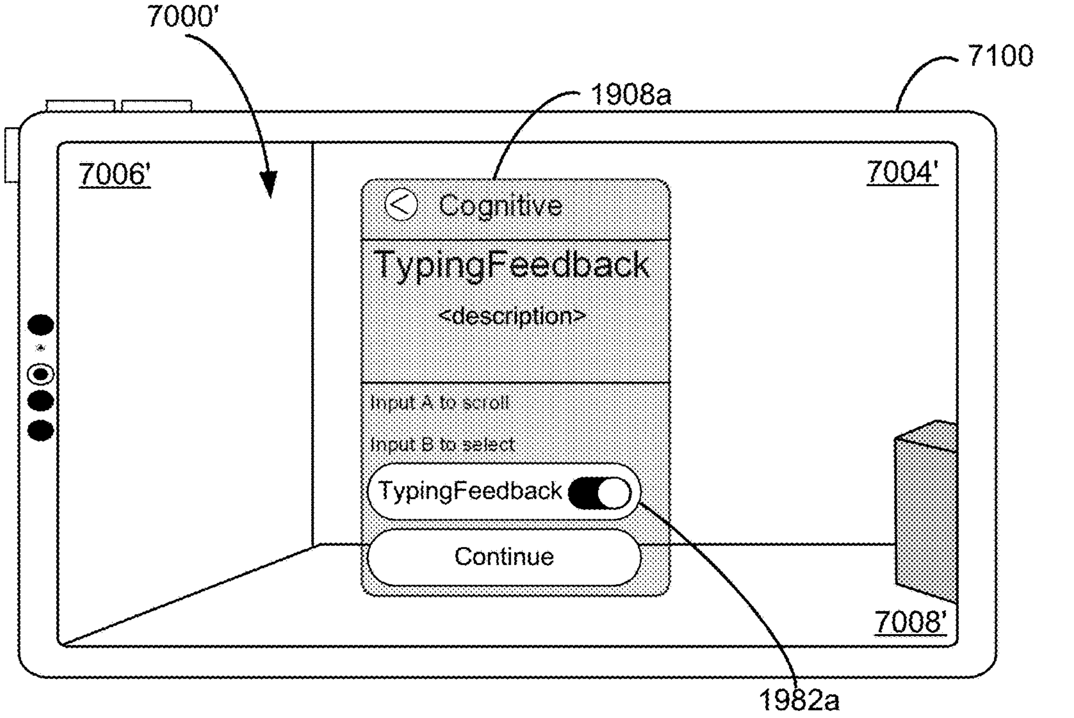
Figure 20:
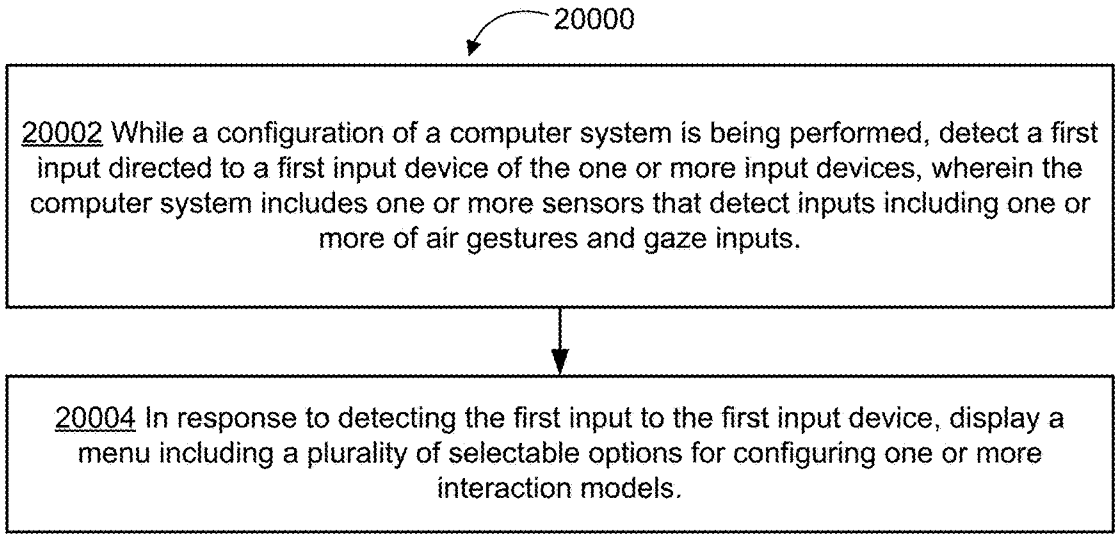
FIG. 20 is a flow diagram of methods of navigating an accessibility menu during system configuration, in accordance with some embodiments.

FIGS. 1A-6 provide a description of example computer systems for providing XR experiences to users. FIGS. 7A-7O illustrate example techniques for displaying a home menu user interface within a three-dimensional environment, in accordance with some embodiments. FIG. 13 is a flow diagram (also called a flowchart) of methods of displaying a home menu user interface within a three-dimensional environment, in accordance with various embodiments. The user interfaces in FIGS. 7A-7O are used to illustrate the processes in FIG. 13. FIGS. 8A-8G illustrate example techniques for performing different operations based on an input to an input device, depending on a current mode of display, in accordance with some embodiments. FIG. 14 is a flow diagram of methods of performing different operations based on an input to an input device, depending on a current mode of display, in accordance with various embodiments. The user interfaces in FIGS. 8A-8G are used to illustrate the processes in FIG. 14. FIGS. 9A-9D illustrate example techniques for performing one or more different operations based on an input to an input device depending on a characteristic of a displayed application user interface, in accordance with some embodiments. FIG. 15 is a flow diagram of methods of performing one or more different operations based on an input to an input device depending on a characteristic of a displayed application user interface, in accordance with various embodiments. The user interfaces in FIGS. 9A-9D are used to illustrate the processes in FIG. 15. FIGS. 10A-10D illustrate example techniques for resetting an input enrollment process, in accordance with some embodiments. FIG. 16 is a flow diagram of methods of resetting an input enrollment process, in accordance with various embodiments. The user interfaces in FIGS. 10A-10D are used to illustrate the processes in FIG. 16. FIGS. 11A-11F illustrate example techniques for adjusting a level of immersion of a user's extended reality (XR) experience in a three-dimensional environment, in accordance with some embodiments. FIG. 17 is a flow diagram of methods of adjusting a level of immersion of a user's extended reality (XR) experience in a three-dimensional environment, in accordance with various embodiments. The user interfaces in FIGS. 9A-9D are used to illustrate the processes in FIG. 17. FIGS. 12A-12G2 illustrate example techniques for controlling a computer system based on physical positioning and changes in the physical position of the computer system relative to a user, and a state of the computer system, in accordance with some embodiments. FIG. 18 is a flow diagram of methods of controlling a computer system based on physical positioning and changes in the physical position of the computer system relative to a user, and a state of the computer system, in accordance with various embodiments. The user interfaces in FIGS. 12A-12G2 are used to illustrate the processes in FIG. 18. FIGS. 19A-19P illustrate example techniques for navigating an accessibility menu during system configuration, in accordance with some embodiments. FIG. 20 is a flow diagram of methods of navigating an accessibility menu during system configuration, in accordance with some embodiments. The user interfaces in FIGS. 19A-19P are used to illustrate the processes in FIG. 20.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, or a touch-screen), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, or velocity sensors), and optionally one or more peripheral devices 195 (e.g., home appliances, or wearable devices). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, or central server). In some embodiments, the controller 110 is communicatively coupled with the display generation component 120 (e.g., an HMD, a display, a projector, or a touch-screen) via one or more wired or wireless communication channels 144 (e.g., BLUETOOTH, IEEE 802.11x, IEEE 802.16x, or IEEE 802.3x). In another example, the controller 110 is included within the enclosure (e.g., a physical housing) of the display generation component 120 (e.g., an HMD, or a portable electronic device that includes a display and one or more processors), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, or on his/her hand). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-IF can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-IF and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. For hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a*-fare cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, or location data) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, or location data) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
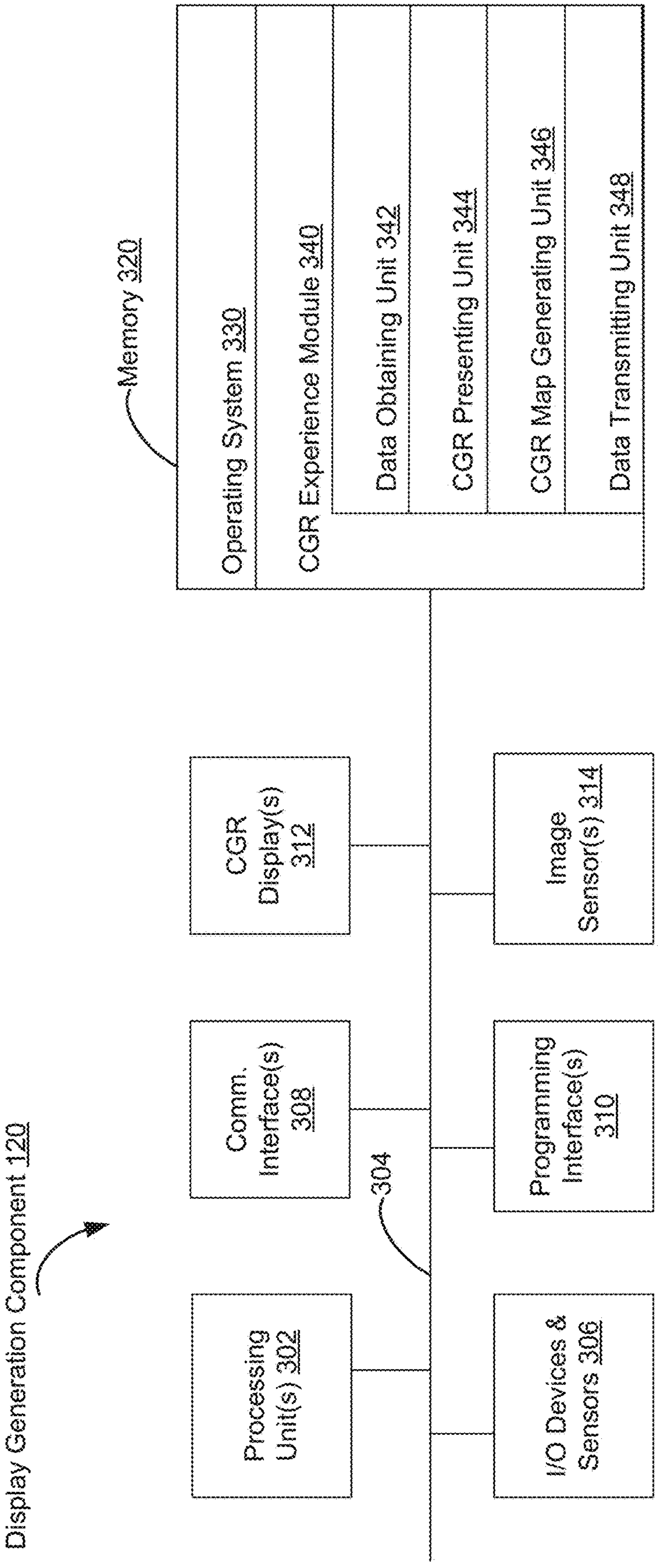
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, or blood glucose sensor), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (ICoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, or holographic waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, or location data) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, or location data) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, or end of the hand connecting to wrist) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
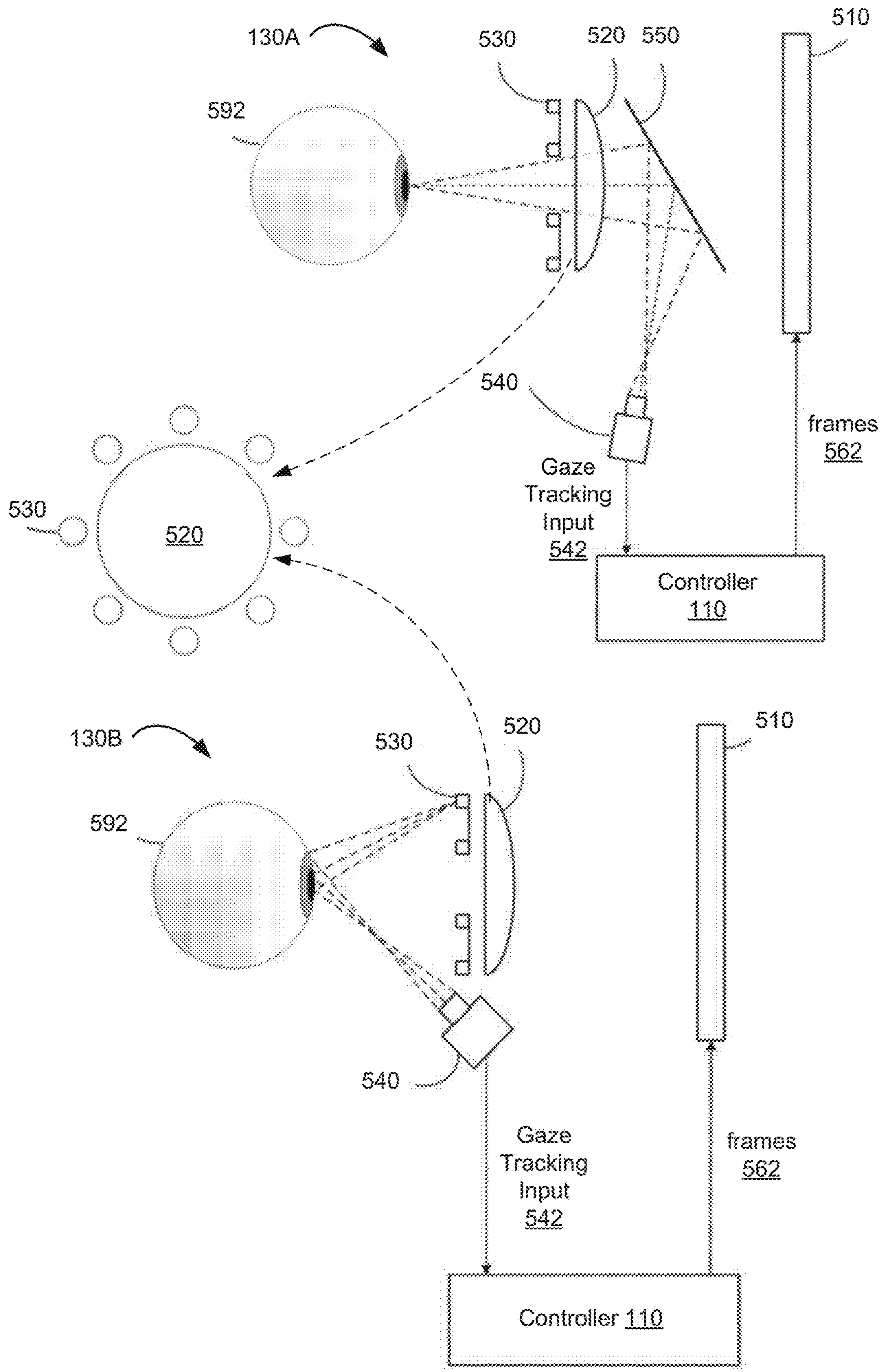
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, or eye spacing. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, or a projector) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
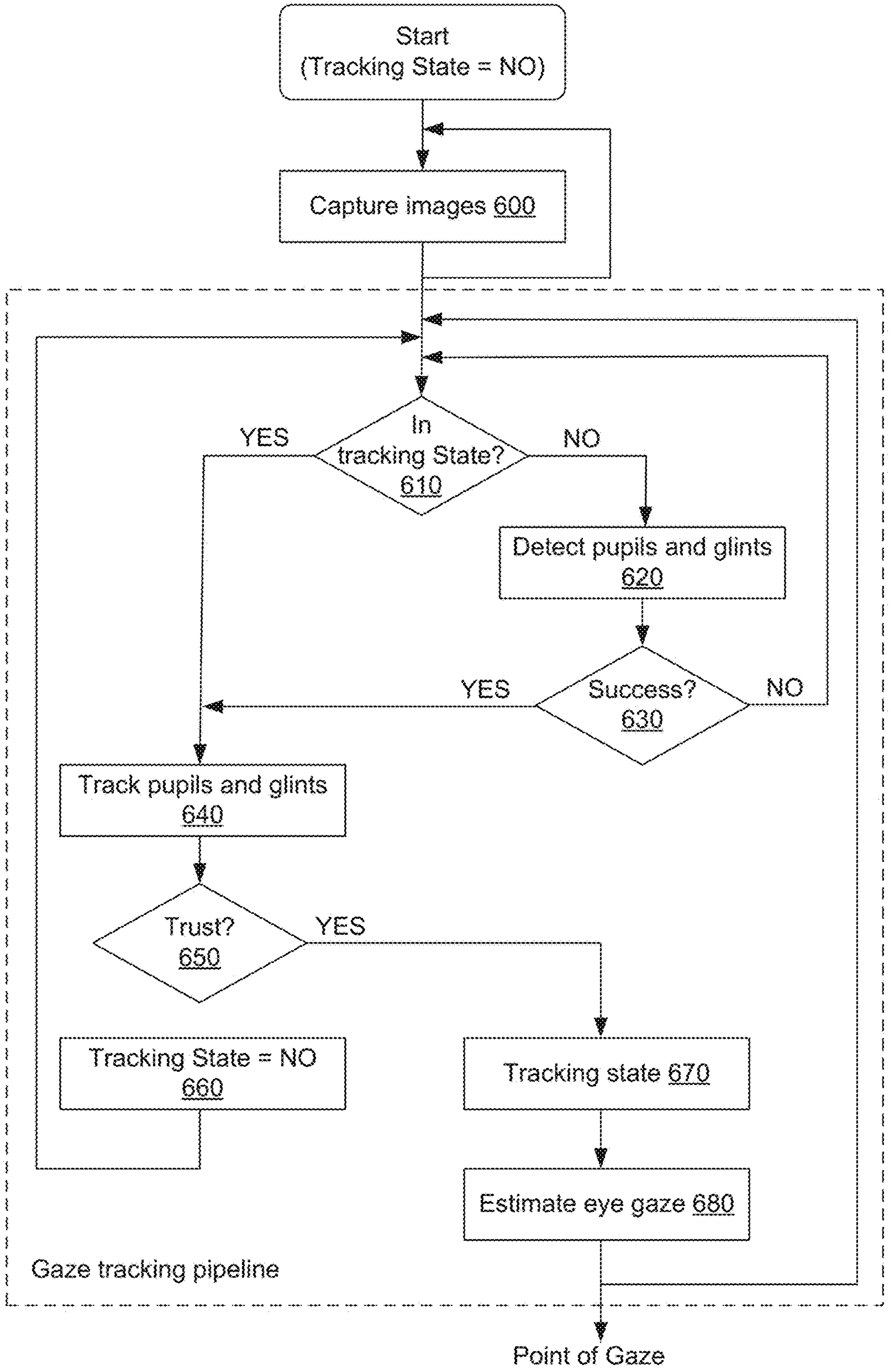
FIG. 6 is a flow diagram illustrating a glint-assisted gaze tracking pipeline in accordance with some embodiments.
Figure 7A:
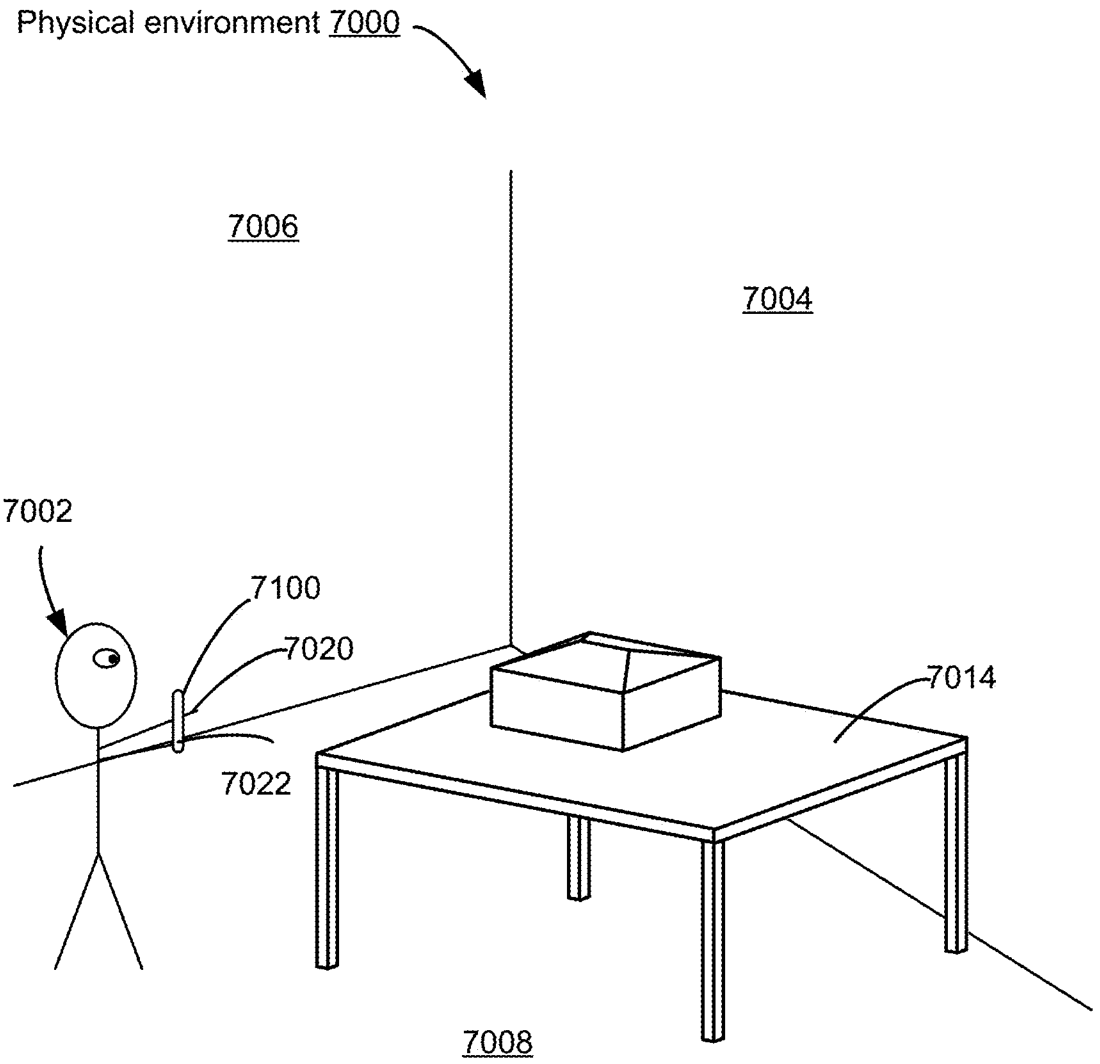
FIGS. 7A-7O illustrate example techniques for displaying a home menu user interface within a three-dimensional environment, in accordance with some embodiments.
Figure 7E:
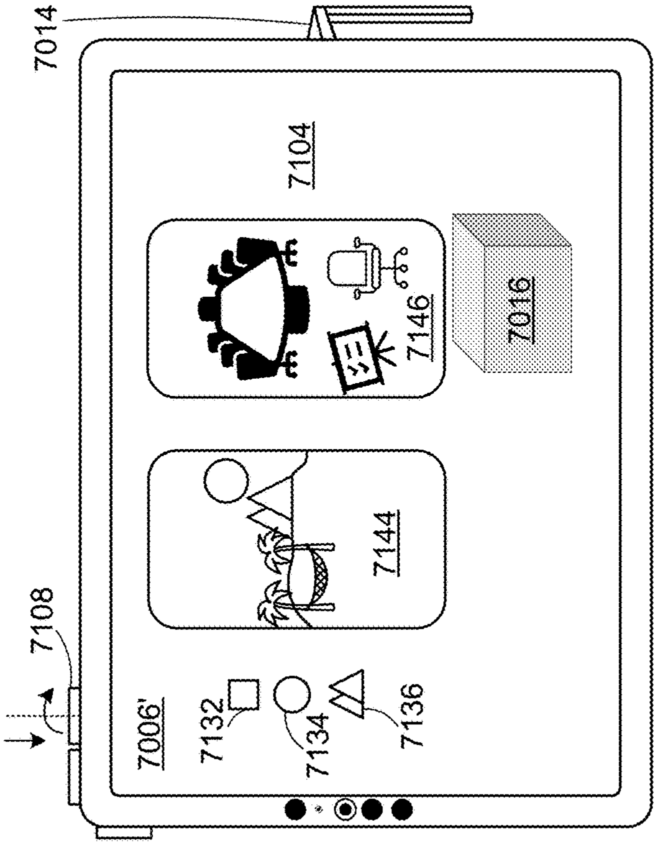

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points).

In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and optionally one or cameras.

FIGS. 7A-7O, 8A-8G, 9A-9D, 10A-10D, 11A-11F, 12A-12G2 and 19A-19P illustrate three-dimensional environments that are visible via a display generation component (e.g., a display generation component 7100, display generation component 7100-*t*, or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed. In some embodiments, the pass-through portion of the display generation component is a transparent or semi-transparent (e.g., see-through) portion of the display generation component revealing at least a portion of a physical environment surrounding and within the field of view of a user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7O, 8A-8G, 9A-9D, 10A-10D, 11A-11F, 12A-12G2, and 19A-19P the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7O illustrate examples of displaying a home menu user interface within a three-dimensional environment. FIG. 13 is a flow diagram of an example method 1300 for displaying a home menu user interface within a three-dimensional environment. The user interfaces in FIGS. 7A-7O are used to illustrate the processes described below, including the processes in FIG. 13.

FIG. 7A illustrates an example physical environment 7000 that includes user 7002 interacting with computer system 101. As shown in the examples in FIGS. 7A-7O, display generation component 7100 of computer system 101 is a touchscreen operated by user 7002. The physical environment 700 includes physical walls 7004, 7006, and floor 7008. The physical environment 7000 also includes a physical object 7014, e.g., a table. User 7002 is holding display generation component 7100 with hand 7020 or hand 7022, or both. In some embodiments, the display generation component of computer system 101 is a head-mounted display worn on user 7002's head (e.g., what is shown in FIGS. 7A-7O as being visible via display generation component 7100 of computer system 101 corresponds to user 7002's field of view when wearing a head-mounted display). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. For example, in some embodiments, while the user's hand 7020 is within the field of view of the one or more sensors of HMD 7100*a* (e.g., within the field of view of the user), a representation of the user's hand 7020' is displayed in the user interface displayed (e.g., as a passthrough representation and/or as a virtual representation of the user's hand 7020) on the display of HMD 7100*a*. in some embodiments, while the user's hand 7022 is within the field of view of the one or more sensors of HMD 7100*a* (e.g., within the field of view of the user), a representation of the user's hand 7022' is displayed in the user interface displayed (e.g., as a passthrough representation and/or as a virtual representation of the user's hand 7022) on the display of HMD 7100*a*. In some embodiments, the user's hand 7020 and/or the user's hand 7022 are used to perform one or more gestures (e.g., one or more air gestures), optionally in combination with a gaze input. In some embodiments, the one or more gestures performed with the user's hand(s) 7020 and/or 7022 include a direct air gesture input that is based on a position of the representation of the user's hand(s) 7020' and/or 7022' displayed within the user interface on the display of HMD 7100*a*. For example, a direct air gesture input is determined as being directed to a user interface object displayed at a position that intersects with the displayed position of the representation of the user's hand(s) 7020' and/or 7022' in the user interface. In some embodiments, the one or more gestures performed with the user's hand(s) 7020 and/or 7022 include an indirect air gesture input that is based on a virtual object displayed at a position that corresponds a position at which the user's attention is currently detected (e.g., and/or is optionally not based on a position of the representation of the user's hand(s) 7020' and/or 7022' displayed within the user interface). For example, an indirect air gesture is performed with respect to a user interface object while detecting the user's attention (e.g., based on gaze or other indication of user attention) on the user interface object, such as a gaze and pinch (e.g., or other gesture performed with the user's hand).

In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

In some embodiments, the display generation component 7100 comprises a head mounted display (HMD) 7100*a* and/or HMD 12011 (e.g., FIG. 12). For example, as illustrated in FIG. 7C2 (e.g., and FIGS. 7C3, 8C1-8C2, 9B2-9B3, 10B2-10B3, 11B2-11B3, 12B2-12G2, and 19C1-19C2), the head mounted display 7100*a* (e.g., and/or HMD 12011) includes one or more displays that displays a representation of a portion of the three-dimensional environment 7000' that corresponds to the perspective of the user, while an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures. In some embodiments, HMD 7100*a* includes one or more sensors (e.g., one or more interior- and/or exterior-facing image sensors 314), such as sensor 7101*a*, sensor 7101*b* and/or sensor 7101*c* for detecting a state of the user, including facial and/or eye tracking of the user (e.g., using one or more inward-facing sensors 7101*a* and/or 7101*b*) and/or tracking hand, torso, or other movements of the user (e.g., using one or more outward-facing sensors 7101*c*). In some embodiments, HMD 7100*a* includes one or more input devices that are optionally located on a housing of HMD 7100*a*, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIG. 7C2 (e.g., and FIGS. 8C1, 9B2, 10B2, 11B2, 12B2-12B2-12G2, and 19C1), HMD 7100*a* includes one or more of button 701, button 702 and digital crown 703 (e.g., and/or other hardware input element 7108) for providing inputs to HMD 7100*a*. It will be understood that additional and/or alternative input devices may be included in HMD 7100*a*.

FIG. 7C3 (e.g., and FIGS. 8C2, 9B3, 10B3, 11B3, and 19C2) illustrates a top-down view of the user 7002 in the physical environment 7000. For example, the user 7002 is wearing HMD 7100*a*, such that the user's hand(s) 7020 and/or 7022 (e.g., that are optionally used to provide air gestures or other user inputs) are physically present within the physical environment 7000 behind the display of HMD 7100*a*.

FIG. 7C2 (e.g., and FIGS. 7C3, 8C1-8C2, 9B2-9B3, 10B2-10B3, 11B2-11B3, 12B2-12G2, and 19C1-19C2) illustrates an alternative display generation component of the computer system than the display illustrated in FIGS. 7A-7C1, 7D-8B, 8C3-9B1, 9C-10B1, 10C-11B1, 11C-11F, 12B1-12G1, 19A-19B and 19C3-19P. It will be understood that the processes, features and functions described herein with reference to the display generation component 7100 described in FIGS. 7A-7C1, 7D-8B, 8C3-9B1, 9C-10B1, 10C-11B1, 11C-11F, 12B1-12G1, 19A-19B and 19C3-19P*a* re also applicable to HMD 7100*a*, illustrated in FIGS. 7C2-7C3, 8C1-8C2, 9B2-9B3, 10B2-10B3, 11B2-11B3, 12B2-12G2, and 19C1-19C2.

FIG. 7B shows application user interface 7018 displayed in a virtual three-dimensional environment having a top portion 7102, a middle portion 7104, and a bottom portion 7106. In addition, the virtual three-dimensional environment includes one or more computer-generated objects, also called virtual objects, such as box 7016 (e.g., which is not a representation of a physical box in physical environment 7000). In some embodiments, application user interface 7018 corresponds to a user interface of a software application executing on computer system 101 (e.g., an email application, a web browser, a messaging application, a maps application, a video player, or an audio player, or other software application). In some embodiments, the application user interface 7018 is displayed in the middle portion 7104 of the virtual three-dimensional environment within a central portion of a field of view of a user of the device (e.g., along a gaze direction of a user, providing the user 7002 with a head-on view of the application user interface 7018 such that the application user interface 7018 appears substantially at eye-level to the user 7002).

In some embodiments, display generation component 7100 is provided within housing 7024 of computer system 101. Hardware input element 7108 (e.g., button, crown, or rotatable and depressible input element) is provided on housing 7024 that encloses or surrounds display generation component 7100. Hardware input element 7108 (e.g., button, crown, or rotatable and depressible input element) is configured to detect two or more types of input. The first type of input to the hardware input element 7108 is a press input, as illustrated by the downward arrow shown in FIG. 7B. Hardware input element 7108 is also able to receive a second type of input that is a rotational input. For example, hardware input element 7108 is rotatable about a rotational axis in a counter-clockwise fashion as shown by the dotted line and curved arrow in FIG. 7B. In some embodiments, hardware input element 7108 (e.g., button, crown, or rotatable and depressible input element) is configured to receive clockwise rotational inputs. In some embodiments, hardware input element 7108 (e.g., button, crown, or rotatable and depressible input element) is configured to receive both counter-clockwise and clockwise rotational inputs. In some embodiments, computer system 101 is able to detect an amount of rotation (e.g., the number of degrees through which the hardware input element 7108 (e.g., button, crown, or rotatable and depressible input element) is turned), and a direction of the rotation (e.g., counter-clockwise or clockwise) and perform a function based on the amount of rotation and the direction of the rotation. In some embodiments, hardware input element 7108 is a rotatable input element (e.g., a crown).

In response to detecting a user input on hardware input element 7108 (e.g., button, crown, or rotatable and depressible input element), home menu user interface 7110 is presented in the virtual three-dimensional environment as shown in FIG. 7C (e.g., FIGS. 7C1, 7C2 and 7C3, where a user interface shown in FIG. 7C1 is displayed on HMD 7100*a* in FIG. 7C2). In some embodiments, the user input is a single press input to hardware input element 7108 (e.g., button, crown, or rotatable and depressible input element). In some embodiments, application user interface 7018 is dismissed by the single press input (e.g., prior to home menu user interface 7110 being displayed, or concurrently to home menu user interface 7110 being displayed), as shown in FIG. 7C. In some embodiments, the home menu user interface 7110 is displayed in a central portion of a user's field of view, e.g., in the middle portion 7104 of the virtual three-dimensional environment, and thus is not displayed below a display of the application user interface 7018.

Home menu user interface 7110 includes collections of various representations, such as application icons, widgets, communication options, and/or affordances for displaying VR and/or AR backgrounds. In some embodiments, home menu user interface 7110 includes (e.g., at least) three collections of representations. FIG. 7C shows a first collection of representations that includes representation 7112, representation 7114, representation 7116, representation 7118, representation 7120, representation 7122, representation 7124, representation 7126 arranged in the virtual three-dimensional environment. The representations 7112-7126 can occupy positions anywhere within the virtual three-dimensional environment. In general, the representations are presented in the middle portion 7104 of the virtual three-dimensional environment (e.g., presenting the home menu user interface 7110 substantially in a central portion of a field of view of user 7002, displaying representations 7110-7126 substantially at eye level to user 7002). Presenting the home menu user interface 7110 substantially in a central portion of a field of view of user 7002 of the device improves operational efficiency by obviating further inputs (e.g., lowering or elevating user 7002's gaze, or visually searching for the home menu user interface 7110 and/or tilting/rotating user 7002's head to focus on the home menu user interface 7110), and reduces the amount of time needed to begin navigating within the home menu user interface 7110, improving the operational efficiency of the computer system 101.

In some embodiments, the representations 7112-7126 are arranged in a regular pattern (e.g., in a grid pattern, along a line, radially, circumferentially). In some embodiments, representations 7112-7126 correspond to various software applications that can be executed on computer system 101 (e.g., an email application, a web browser, a messaging application, a maps application, a video player, or an audio player, or other software application).

Home menu user interface 7110 includes tab 7132 for displaying representations of software applications, tab 7134 for displaying representations of one or more other people, each representation for initiating or maintaining (e.g., continuing) communication with a corresponding person (e.g., representations of one or more other users interacting with, or capable of interacting with user 7002), and tab 7136 for displaying one or more virtual environments that can be displayed as (or in) the virtual three-dimensional environment. In some embodiments, the virtual environment includes virtual content that is computer generated content distinct from a passthrough portion of the physical environment. In some embodiments, additional tabs for displaying other representations are provided in home menu user interface 7110. In some embodiments, one or more of tab 7132, tab 7134, or tab 7136 are not presented in home menu user interface 7110. FIG. 7C shows tab 7132, tab 7134, and tab 7136 arranged substantially linearly on a left portion of home menu user interface 7110. In some embodiments, tab 7132, tab 7134, and tab 7136 are displayed in other portions of the home menu user interface 7110 (e.g., top, right, bottom.) In some embodiments, tab 7132, tab 7134, and tab 7136 are not arranged in any specific spatial order with respect to one another.

Figure 7D:
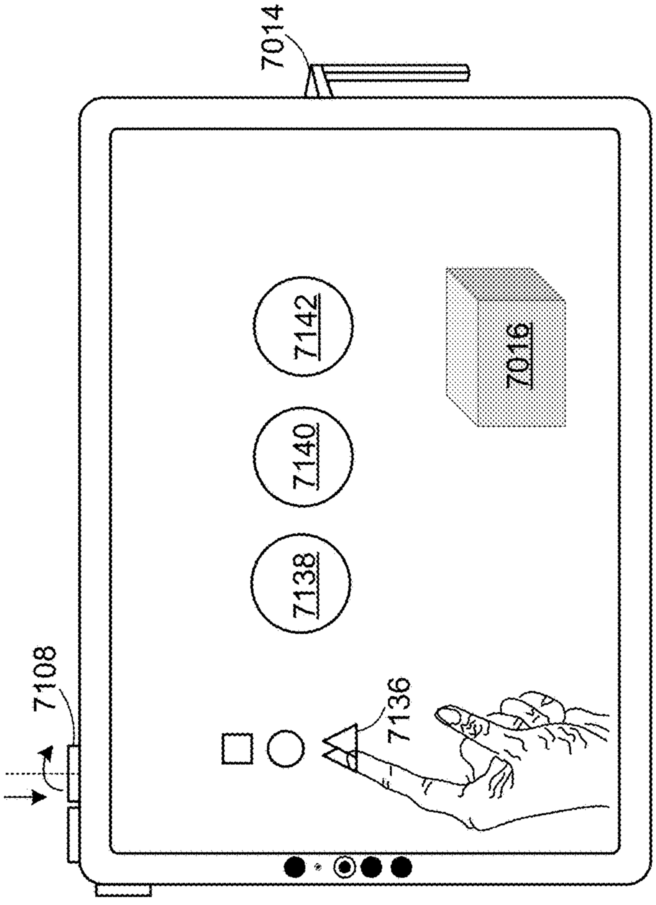

In response to detecting a user input directed to (e.g., corresponding to, or on) tab 7134, home menu user interface 7110 updates to display representations of one or more other people, each representation for initiating or maintaining communication with a corresponding person (e.g., representations of one or more other users interacting with, or capable of interacting with user 7002) as shown in FIG. 7D. For example, FIG. 7D shows representation 7138 of a first user, representation 7140 of a second user, and representation 7142 of a third user. In some embodiments, representation 7138, representation 7140, and representation 7142 are displayed in the middle portion 7104 of the virtual three-dimensional environment, in a central portion of a field of view of user 7002 (e.g., representation 7138 of a first user, representation 7140 of a second user, and representation 7142 are presented substantially at eye-level to user 7002).

In some embodiments, representations of one or more users currently in a co-presence session with user 7002 are displayed on home menu user interface 7110 (e.g., one or more of the first user, the second user, or the third user are in a co-presence session with user 7002). In some embodiments, in a co-presence session (or a spatial communication session), representations of users are arranged within a shared three-dimensional environment relative to each other (e.g., such that a respective user views the positions of the other users relative to the viewpoint of the respective user). For example, user 7002's viewpoint includes a representation of the first user to the left (or to the right) of a representation of the second user. Co-presence sessions and spatial communication sessions are further described in reference to FIG. 9D.

In some embodiments, representations of one or more users not yet in a co-presence session but capable of entering into a co-presence session with user 7002 are additionally displayed on home menu user interface 7110 (e.g., one or more of the first user, the second user, or the third user who are not yet in a co-presence session with user 7002, but are capable of joining a co-presence session with user 7002).

In some embodiments, representations of one or more users in a contact list of user 7002 are additionally displayed on home menu user interface 7110 (e.g., one or more of the first user, the second user, or the third user are in a contact list of user 7002). By providing a user input directed to (e.g., corresponding to, or on) one or more representations of one or more other users in home menu user interface 7110, user 7002 is able to initiate or maintain communication with and/or interact with the one or more other users. For example, in response to a user input directed to (e.g., corresponding to, or on) representation 7138, the computer system 101 facilitates user 7002 in communicating and/or interacting with the first user in the virtual three-dimensional environment. In some embodiments, instead of a fully virtual three-dimensional environment, user 7002 communicates and/or interact with the first user in a mixed reality environment that includes sensory inputs from the physical environment 7000, or a representation thereof, in addition to including computer-generated sensory inputs (e.g., box 7016).

In some embodiments, the user input directed to a representation in the home menu user interface, or other user interface, includes a pinch input, a tap input, or a gaze input In response to detecting a user input directed to (e.g., corresponding to, or on) tab 7136, home menu user interface 7110 is updated to display representations (sometimes called options) of virtual environments that can be displayed as (or in) the virtual three-dimensional environment, as shown in FIG. 7E. Representation 7144 corresponds to a virtual environment that provides beach scenery. Representation 7146 corresponds to a virtual environment that provides an office setting. Displaying a home menu user interface 7110 that provides quick access to a collection of selectable virtual environments offers a way to alter a user's virtual experience, without displaying additional controls, minimizing the number of inputs required to select a desired virtual environment, thereby improving performance and operational efficiency of the computer system 101.

In some embodiments, representation (e.g., option) 7144 and representation (e.g., option) 7146 are displayed in the middle portion 7104 of the virtual three-dimensional environment, a central portion of a field of view of user 7002 (e.g., option 7144 and option 7146 are presented substantially at eye-level to user 7002).

Figure 7F:
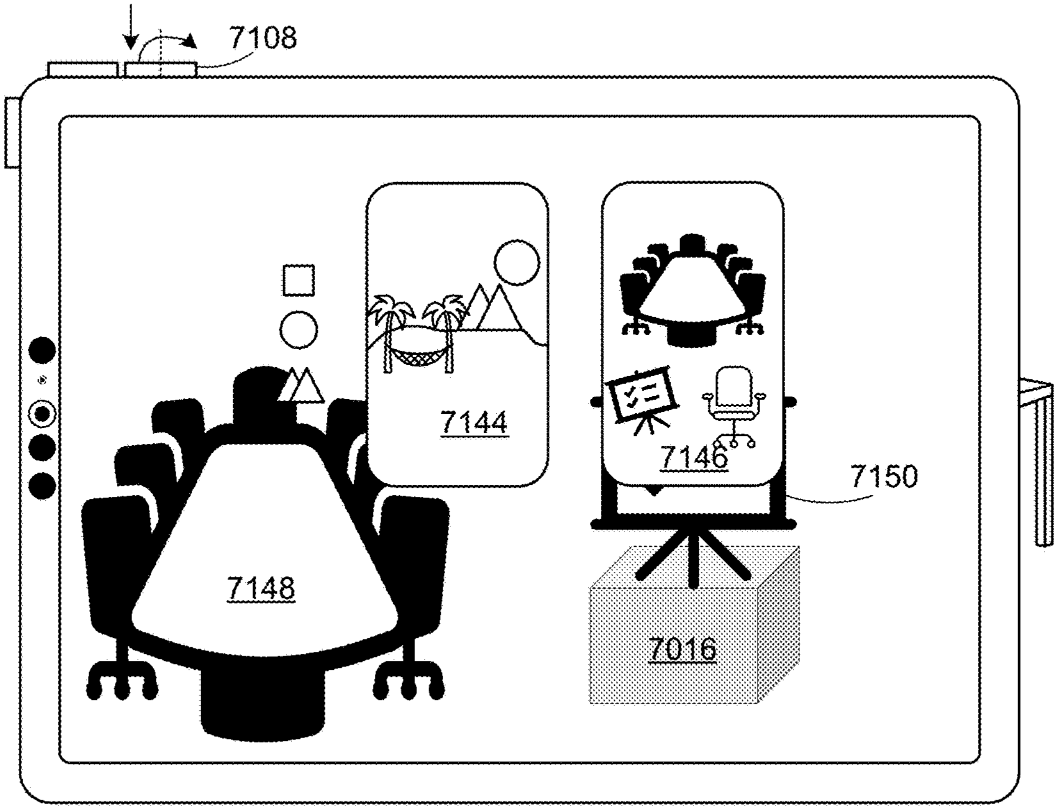

In response to detecting a user selection of the virtual environment that provides an office setting (e.g., the computer system 101 detecting a user input corresponding to or on option 7146), the virtual three-dimensional environment is updated to include office table 7148, and display board 7150 as shown in FIG. 7F. In some embodiments, a virtual object, such as box 7016 that is present prior to the display of a particular virtual environment, continues to persist after the selection of the virtual environment. For example, display board 7150 is displayed as resting on, and being supported by box 7016. In some embodiments, the virtual environment includes virtual objects that permit user interaction (e.g., user 7002 can reposition conference chairs surrounding office table 7148, user 7002 can reposition display board 7150, user 7002 can reposition office table 7148). In some embodiments, the virtual environment includes virtual objects that do not permit user interaction (e.g., user 7002 cannot reposition any of the items in the virtual environment). In some embodiments, a virtual object, such as box 7016 that is present prior to the display of a particular virtual environment ceases to be displayed after the selection of the virtual environment. For example, in such embodiments, box 7016 is no longer displayed when display board 7150 and office table 7148 are displayed.

In response to detecting a user input corresponding to or on tab 7132, home menu user interface 7110 is updated to return to displaying representations of software applications in the virtual three-dimensional environment, as shown in FIG. 7C.

From home menu user interface 7110, user 7002 is able to access collections of various representations by selecting a respective tab (e.g., a collection of representations of software applications is viewable by selecting tab 7132; a collection of representations of one or more other users interacting with, or capable of interacting with user 7002 is viewable by selecting tab 7134; a collection of representations of one or more selectable virtual environments is viewable by selecting tab 7136). A single input (e.g., a single press input) to hardware input element 7108 (e.g., button, crown, or rotatable and depressible input element) provides user 7002 with a home menu user interface 7110 from which user 7002 can navigate to other software applications, interact with other users, or experience a different virtual environment). Allowing a single input to trigger display of the home menu user interface 7110 allows user 7002 to quickly access and navigate a collection of applications in the home menu user interface 7110 and/or change a virtual environment for that user and/or interact with additional users regardless of whatever process (e.g., while a first application is running) is in progress, without displaying additional controls, minimizes the number of inputs required to select a desired operation, and improves performance and efficiency of the computer system 101. Furthermore, providing in response to the first input a home menu user interface 7110 having sections that can be navigated by the user efficiently provides the user with a larger range of applications, people, virtual environments or other operations than would be possible with a static home menu user interface.

In FIGS. 7B and 7C, the application user interface 7018 is hidden when home menu user interface 7110 is displayed (e.g., the application user interface 7018 is hidden prior to home menu user interface 7110 being displayed, or the application user interface 7018 is hidden concurrently with displaying home menu user interface 7110). In some embodiments, even though the application user interface 7018 is hidden, the application associated with application user interface 7018 continues running in the background. In contrast, FIGS. 7G-7I show embodiments in which a different user interface of the same software application is provided to user 7002 while user 7002 navigates home menu user interface 7110.

Figure 7G:
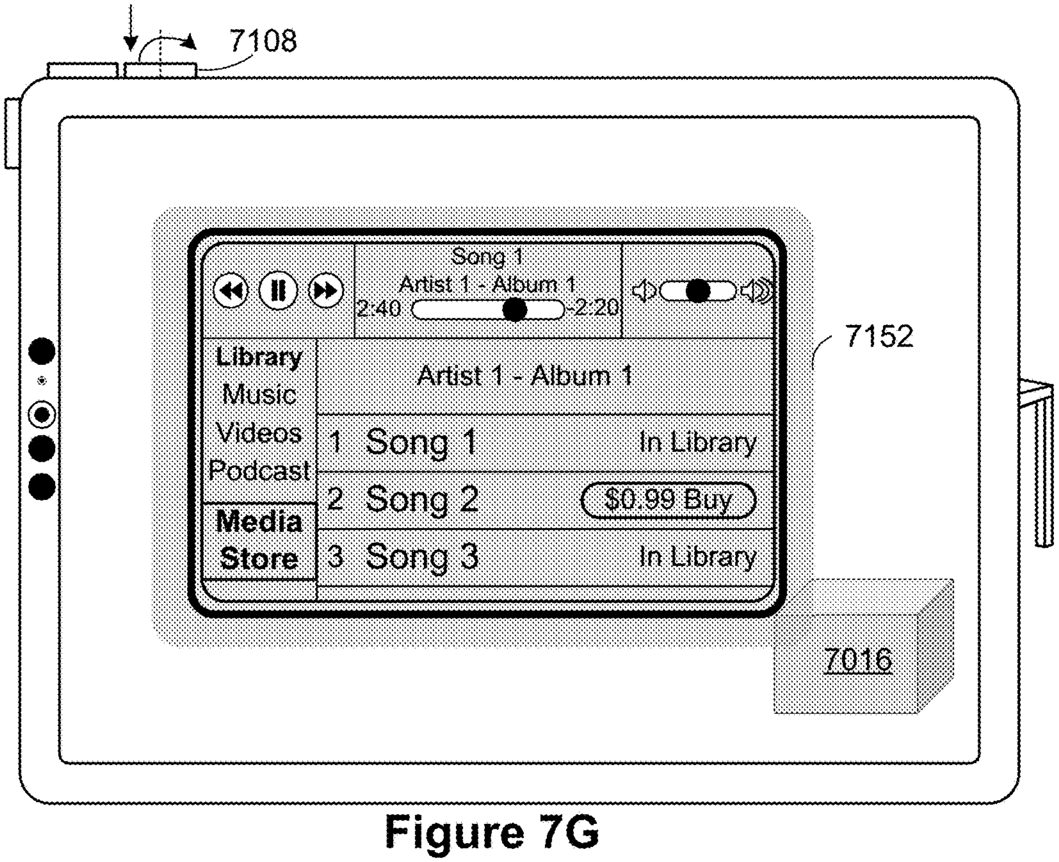

FIG. 7G shows application user interface 7152 displayed in a virtual three-dimensional environment that includes box 7016, a computer-generated virtual object. Application user interface 7152 is a user interface of an audio player software application executing on computer system 101. In some embodiments, the application user interface 7152 is displayed in the middle portion 7104 of the virtual three-dimensional environment, substantially in a central portion of a field of view of user 7002 (e.g., the application user interface 7152 appears substantially at eye-level to user 7002).

Figure 7H:
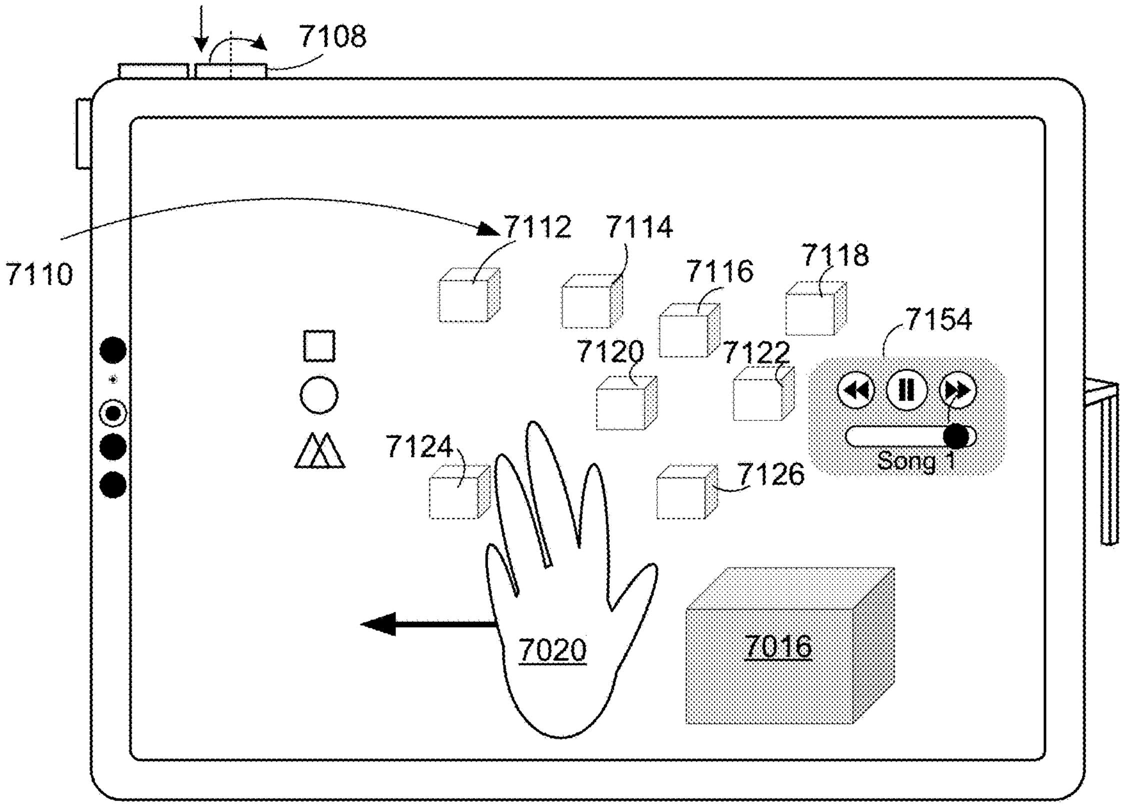
Figure 7I:
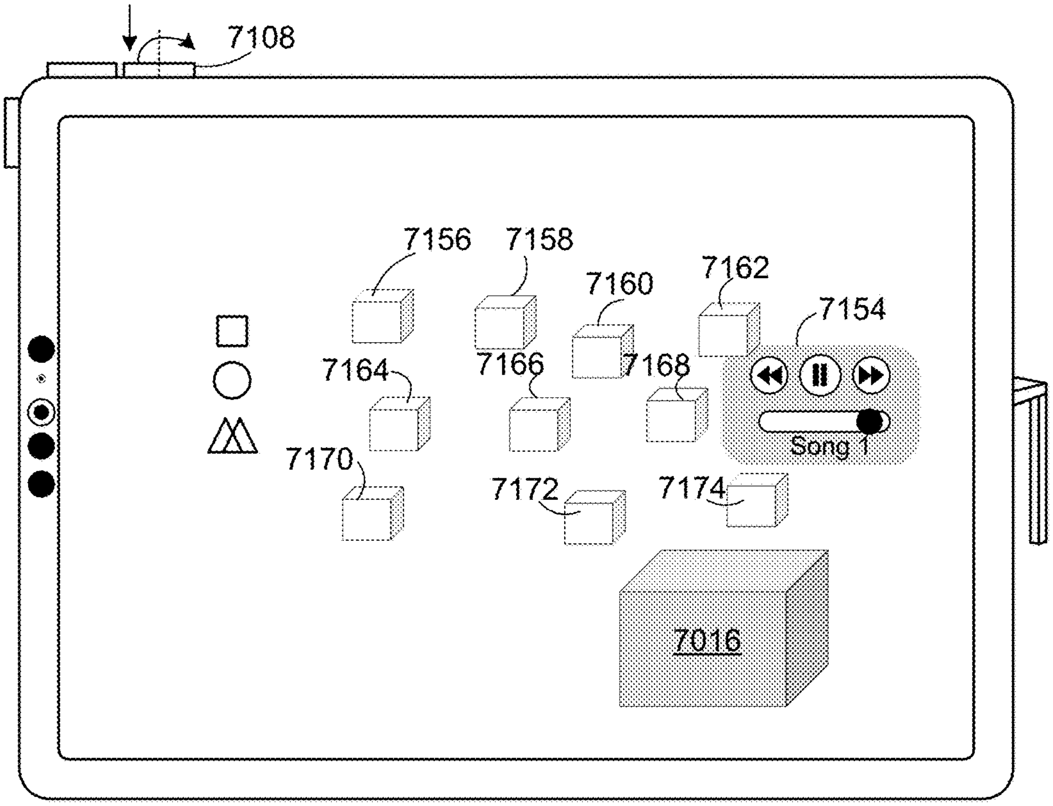
Figure 7K:
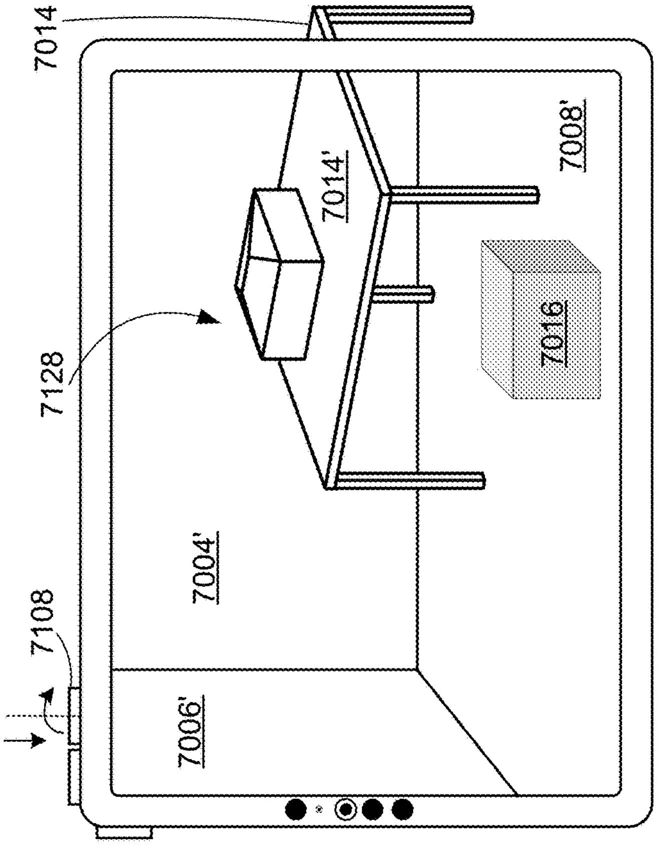

In response to detecting a user input directed to hardware input element 7108 (e.g., button, crown, or rotatable and depressible input element), home menu user interface 7110 is presented in the virtual three-dimensional environment as shown in FIG. 7H. In some embodiments, the user input is a single press input to hardware input element 7108 (e.g., button, crown, or rotatable and depressible input element). In some embodiments, application user interface 7152 is dismissed by the single press input (e.g., prior to home menu user interface 7110 being displayed, or concurrently with displaying home menu user interface 7110) and replaced by mini player user interface 7154, as shown in FIG. 7H. Mini player user interface 7154 occupies a smaller region of the virtual three-dimensional environment compared to application user interface 7152. In some embodiments, mini player user interface 7154 is displaced to a more peripheral portion of the virtual three-dimensional environment than application user interface 7152, which was displayed in a central portion of a field of view of user 7002. In some embodiments, mini player user interface 7154 is displayed at substantially the same position as application user interface 7152 (e.g., a central location of application user interface 7152 substantially coincides with a central location of mini player user interface 7154).

Presenting mini player user interface 7154 provides a way for user 7002 to multitask and continue a media experience (at least in some capacity) while navigating virtually via the home menu user interface 7110, which improves performance and efficiency of the computer system 101. Displaying mini player user interface 7154 (e.g., an audio mini-player) allows a user control over the media experience (e.g., by providing playback controls in the min-player), and/or indicates to the user a current "location" of a user's media experience (e.g., by displaying a time index, or, for video content, a representation of a current video frame) while the user navigates the home menu user interface, without displaying additional controls. While not shown in FIGS. 7H-7J, in some embodiments, a mini player user interface includes providing a video Picture-in-Picture (PiP) player that optionally includes a representation of a current video frame.

User 7002 is able to scroll through representations of software applications displayed in home menu user interface 7110. For example, a first collection of representations of software applications include representation 7112, representation 7114, representation 7116, representation 7118, representation 7120, representation 7122, representation 7124, and representation 7126. In some embodiments, the first collection of representations of software applications includes static representations (e.g., static application icons, or static content snapshots, or other static information) of software applications arranged in a first region of the virtual three-dimensional environment. In some embodiments, the first collection of representations of software applications are dynamic representations (e.g., animated representations, periodically animated representations). In response to detecting a user input (e.g., a user gesture) for navigating to a different collection of representations of software applications, home menu user interface 7110 presents a second collection of representations of software applications that includes representation 7156, representation 7158, representation 7160, representation 7162, representation 7164, representation 7166, representation 7168, and representation 7170, representation 7172, and representation 7174, as shown in FIG. 7I. In some embodiments, the user input is a drag gesture, shown by the left pointing arrow in FIG. 7H, that allows the representations of the software applications to be scrolled (e.g., the drag gesture is construed by the computer system 101 as instructions to scroll the representations of the software applications).

Providing the second collection of representations of software applications in substantially the same region as the first collection of representations of software applications (e.g., the first collection of representations is replaced by the second collection of representations) allows user 7002 to navigate sequentially through a large number of representations of software applications without being overwhelmed by the simultaneous/concurrent display of the large number of representations in the virtual three-dimensional environment, aiding the timely selection of a desired operation, without displaying additional controls. Furthermore, a scrollable home menu user interface efficiently provides the user with a larger range of applications, people, virtual environments or other operations than would be possible with a static, non-scrollable home menu user interface.

In some embodiments, different collections of representations of software applications are arranged on respective pages of home menu user interface 7110. User 7002 can access a respective page, e.g., a page that includes a collection of representations of software applications of the home menu user interface 7110. In some embodiments, the pages are sequenced with a specific directionality, making it easier for a user to navigate to a specific (e.g., previously accessed) page. User 7002's navigation in the home menu user interface 7110 may lead to operations that cause the display of the home menu user interface 7110 to be dismissed (e.g., when an immersive experience is initiated from a representation of a software application). When user 7002 returns to the home menu user interface 7110 within a preset time threshold (e.g., less than 1 hour, less than 10 minutes, less than 1 minute) a last accessed section (e.g., a specific page of applications, a section displaying a list of contacts with whom user 7002 can initiate communication, a section displaying various selectable virtual environments) of the home menu user interface is maintained and displayed to user 7002. In contrast, if user 7002 returns to the home menu user interface 7110 after the preset time threshold has lapsed (e.g., the next day, at a next session, after more than one hour), a display of the home menu user interface 7110 resets to a predetermined section (e.g., a first page of the representation of applications). In some embodiments, the preset time threshold depends on the section of the home menu user interface (e.g., an application section resets within a smaller time threshold compared to a people/contacts section). Retaining information about the last accessed section on the home menu user interface 7110 reduces disruptions, allowing user 7002 to quickly return to a previously accessed portion of the home menu user interface 7110 when the user 7002 accesses, within a preset time threshold, the home menu user interface 7110 after leaving it, without displaying additional controls. Such a feature helps save a user's time, obviating the need to re-navigate through various sections of the home menu user interface 7110 to return to a previously accessed section of the home menu user interface 7110, when a user leaves the home menu user interface briefly to execute a different operation, such as an operation in a particular application.

Figure 7J:
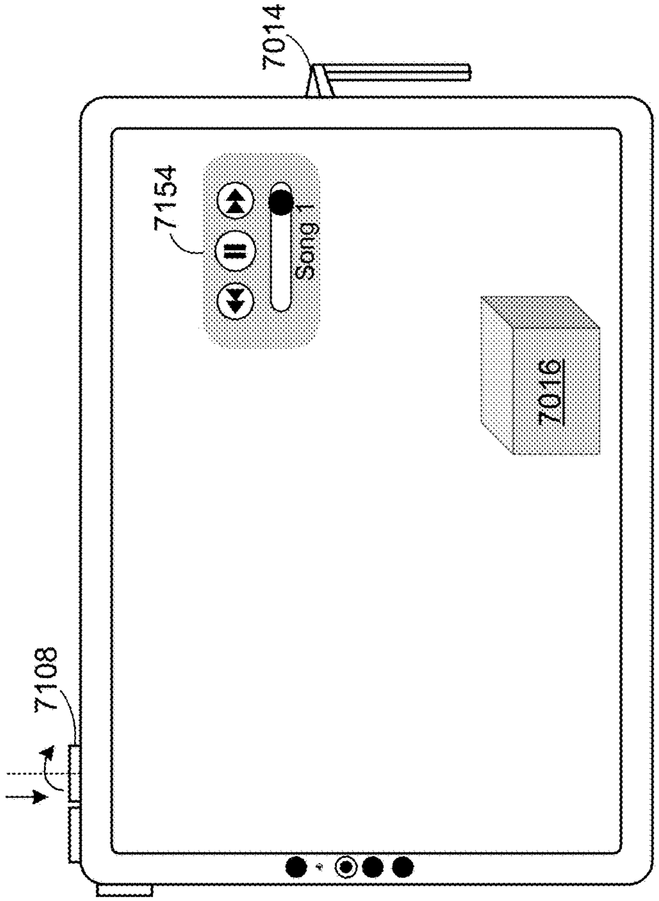

While home menu user interface 7110 is displayed, in response to detecting a second user input to hardware input element 7108 (e.g., button, crown, or rotatable and depressible input element), home menu user interface 7110 is dismissed, as shown in FIG. 7J. In some embodiments, the second user input is a second press input to hardware input element 7108 (e.g., button, crown, or rotatable and depressible input element). In some embodiments, dismissing home menu user interface 7110 does not impact the display of virtual objects (e.g., box 7016) in the virtual three-dimensional environment. Having the mini-player persist after the home menu user interface 7110 is dismissed provides an uninterrupted media experience to user 7002, even after the navigation in the virtual environment via the home menu user interface 7110 has concluded, thereby improving operational efficiency of the computer system 101. For example, the user does not need to re-launch the media application after navigating and then dismissing the home menu user interface 7110.

In response to detecting a third user input to hardware input element 7108 (e.g., button, crown, or rotatable and depressible input element), a view of three-dimensional environment 7128 is visible to user 7002 via display generation component 7100 of computer system 101, as shown in FIG. 7K. Three-dimensional environment 7128 of FIG. 7K optionally includes representations of objects in a physical environment such as physical environment 7000 (e.g., as captured by one or more cameras of computer system 101). For example, in FIG. 7K, three-dimensional environment 7128 includes representation 7014' of physical object 7014, representations 7004' and 7006' of physical walls 7004 and 7006, respectively, and representation 7008' of physical floor 7008. In some embodiments, detecting the third user input to hardware input element 7108 (e.g., button, crown, or rotatable and depressible input element) causes computer system 101 to provide a mixed reality experience to user 7002. For example, both computer-generated virtual objects (e.g., box 7016) and representations of objects in the physical environment 7000 are displayed to user 7002. For example, a first portion of the virtual three-dimensional environment includes computer-generated virtual objects that are not present in the physical environment 7000, and a second portion of the virtual three-dimensional environment includes representations of objects in physical environment 7000 displayed as three-dimensional environment 7128.

In some embodiments, instead of using three sequential inputs to hardware input element 7108 (e.g., button, crown, or rotatable and depressible input element) to display the user interfaces shown in FIG. 7J (e.g., after two sequential inputs to hardware input element 7108 (e.g., button, crown, or rotatable and depressible input element)) and FIG. 7K (e.g., after three sequential inputs to hardware input element 7108 (e.g., button, crown, or rotatable and depressible input element)), the user interface shown in FIG. 7K is displayed after two sequential inputs (e.g., the second input is a long press on the hardware input element 7108 (e.g., button, crown, or rotatable and depressible input element)), and the user interface shown in FIG. 7J is skipped.

Dismissing the home menu user interface 7110 by replacing display of the home menu user interface with a presentation of a passthrough portion of a physical environment of the computer system 101 (e.g., a head-mounted device) via the display generation component improves safety for user 7002, allowing user 7002 to be cognizant of the physical environment of the computer system 101 (via the passthrough portion of the physical environment of the computer system 101). For example, user 7002 may need to respond to an emergency or other situations that require user 7002's attention or require user 7002 to interact with the physical environment after the user is done navigating the home menu user interface 7110. Using a second input or a third input to activate display of a passthrough portion allows user 7002 to retreat from the virtual environment and view at least a portion of the physical environment, without displaying additional controls. In some embodiments, in addition to presenting the passthrough portion, a display of a virtual environment in which the home menu user interface 7110 is displayed also ceases. Ceasing to display a virtual environment while dismissing the home menu user interface 7110 allows the user to retreat from the virtual environment and view at least a portion of the physical environment (e.g., dismissing a display of the virtual environment), by having the second input function similarly to an input to an escape button, without displaying additional controls.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display (sometimes called "optical passthrough"). In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "virtual passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

Figure 7M:
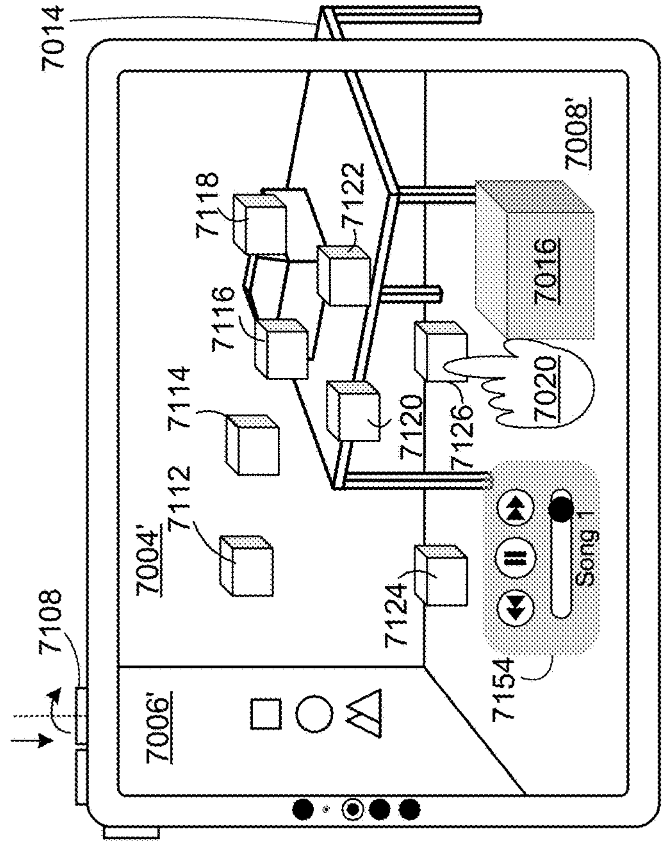
Figure 7L:
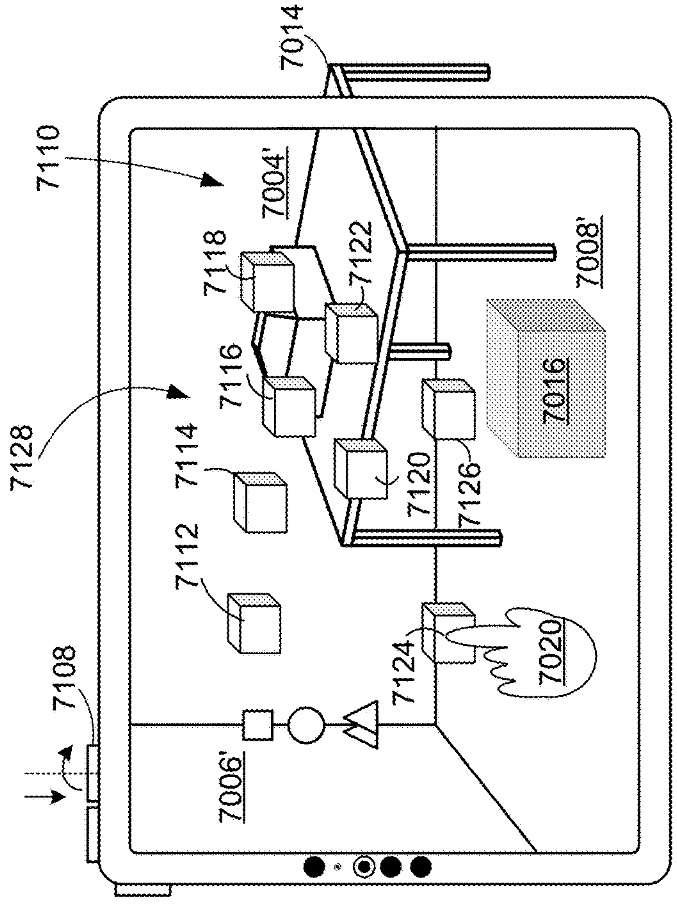

While in the mixed reality/pass-through mode (e.g., while displaying three-dimensional environment 7128), in response to detecting a user input to hardware input element 7108 (e.g., button, crown, or rotatable and depressible input element), home menu user interface 7110 is overlaid on three-dimensional environment 7128, as shown in FIG. 7L. In some embodiments, the user input is a press input to hardware input element 7108 (e.g., button, crown, or rotatable and depressible input element). In some embodiments, home menu user interface 7110 is presented in a middle portion of three-dimensional environment 7128. In response to detecting a user input (e.g., a user gesture) directed to representation 7124, computer system 101 causes a software application associated with representation 7124 to be displayed. In some embodiments, representation 7124 corresponds to an audio player application, and the user input selecting representation 7124 causes a mini player user interface 7154 to be presented concurrently with home menu user interface 7110, as shown in FIG. 7M.

In response to detecting a user input (e.g., a user gesture) directed to representation 7126, computer system 101 causes a software application associated with representation 7126 to be displayed. In some embodiments, representation 7126 corresponds to a web browsing application, and the user gesture selecting representation 7126 causes a web browsing application user interface 7178 to be displayed, as shown in FIG. 7O.

In some embodiments, characteristics of the software application determine whether a display of home menu user interface 7110 is maintained. For example, display of home menu user interface 7110 is maintained when a representation of an audio player application (or a video player application) is selected, and display of home menu user interface 7110 ceases when a representation of a web browsing application (or a document editing application, a calendar application, or an email application) is selected. In some embodiments, display of home menu user interface 7110 is maintained until a predetermined number of applications have been selected (e.g., display of home menu user interface 7110 is maintained until after a representation of a second software application has been selected, display of home menu user interface 7110 is maintained until after a representation of a third software application has been selected, or display of home menu user interface 7110 is maintained until after a representation of a fourth software application has been selected).

Even though not shown in FIGS. 7L and 7M, in some embodiments, an application (e.g., an audio player application) is already running on the computer system 101 before the home menu user interface 7110 is displayed in response to the first user input. In response to detecting a user input (e.g., a user gesture, a pinch and drag gesture) on the application, a first user interface object (e.g., an instance of the application or an object extracted or dragged out of the application, sometimes herein called a "quick look object") is extracted from the application and displayed. In some embodiments, the quick look object is an object pulled out of the application before a portion of the application (e.g., all of the application) is replaced with a display of the home menu user interface 7110, and the quick look object continues to be displayed after the portion of the application is replaced with display of the home menu user interface 7110.

For example, the first user interface object may be a musical track of a music album that is being played on the audio player application. Alternatively, the first user interface object may be a text portion that is extracted or dragged from a document editing application that is running on the computer system 101. Alternatively, the first user interface object may be a web page that is extracted or dragged from a web browsing application that is running on the computer system 101. Alternatively, the first user interface object may be an image file or video file that is extracted or dragged from a media displaying application (e.g., a web browsing application, a video player, a photo displaying application) that is running on the computer system 101.

Providing the first user interface object allows user 7002 to maintain use of an application (e.g., using an instance of the application) or maintaining display of data associated with the application even after the application's main user interface is dismissed (e.g., the quick look object is an instance replicated from the application). Maintaining display of such user interface objects allows user 7002 to continue controlling the application while multitasking (e.g., navigating on the home menu user interface 7110), without displaying additional controls. The multitasking functionality is not affected by the presence of the home menu user interface 7110 triggered by the first input, improving performance and efficiency of the computer system 101.

In some embodiments, in response to detecting a user input (e.g., a user gesture) directed to a representation of a second application displayed in the home menu user interface 7110, execution of the second application is initiated (e.g., and starts running) while quick look object is displayed. Launching a second application from home menu user interface 7110 while the first user interface object is displayed (e.g., continues to be displayed) obviates the need for displaying additional controls. Maintaining display of the first user interface object provides a visual reminder to user 7002 that may be helpful for selecting a suitable second application. In some circumstances, the displayed first user interface object provides information that can be used in the second application, without the user having to re-launch the first application after the second application is launched, allowing multiple tasks to be accomplished at the same time, improving performance and operational efficiency of the computer system 101.

In some embodiments, user 7002 can direct the first user interface object to the second application (e.g., drag the quick look object into the second application) to perform an operation in second application based on first user interface object. For example, the quick look object may be an image from a media displaying application, and the second application is a text messaging application, or a document editing application. Directing the image to the document editing application allows the image to be directly added to an open document in the document editing application.

In some embodiments, the first user interface object is dismissed when the home menu user interface 7110 is dismissed (e.g., by an input to the hardware input element 7108 (e.g., button, crown, or rotatable and depressible input element)). Dismissing both the first user interface object and the home menu user interface 7110 using a single input (e.g., the second button press) obviates the need for displaying additional controls. The user does not need to waste time separately closing the first user interface object and/or navigating to special user interface control elements to manually close the first user interface object, thereby improving performance and operational efficiency of the computer system 101.

Figure 7N:
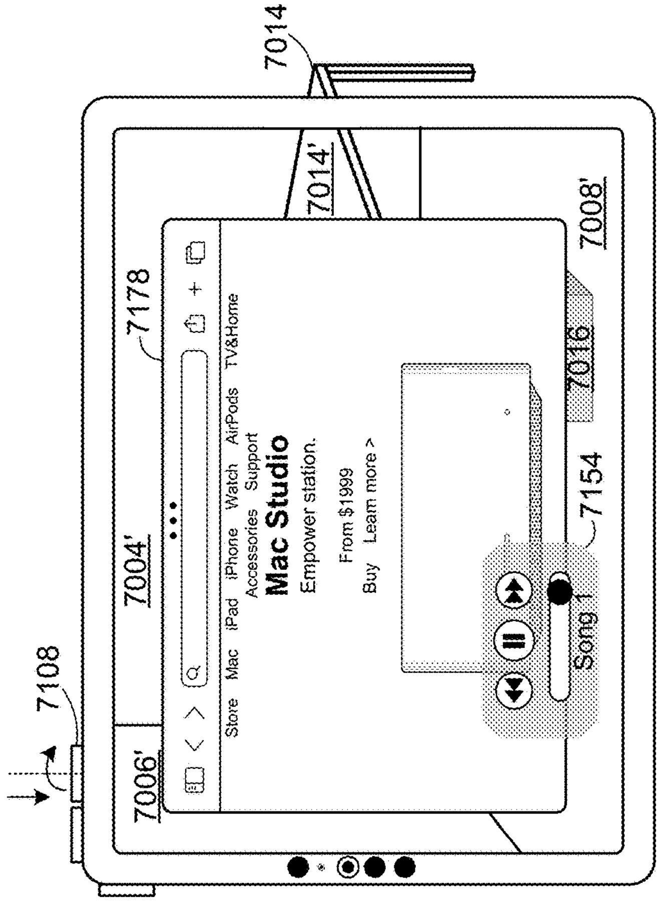
Figure 7O:
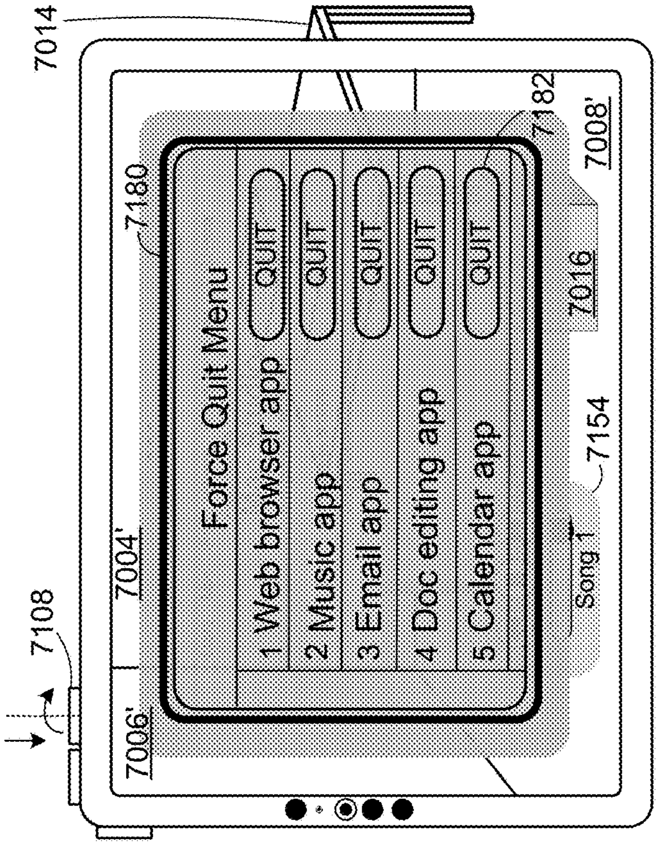

After dismissal of the home menu user interface 7110 (e.g., as shown in FIG. 7N), a subsequent user input to hardware input element 7108 (e.g., button, crown, or rotatable and depressible input element) causes home menu user interface 7110 to be displayed in the three-dimensional environment 7128. An additional input enables redisplaying the home menu user interface 7110 after it has been dismissed, without displaying additional controls. Allowing the additional input to redisplay home menu user interface 7110 provides an easy way for user 7002 to return to the home menu user interface 7110 based on a single input, regardless of which process user 7002 might have been using on the computer system 101 after dismissing the home menu user interface 7110. The input serves as a universal mechanism that enables user 7002 to directly navigate to a top-level home menu user interface 7110, and then to navigate through different collections of representations (e.g., representation of applications, people, and/or virtual environments) in the home menu user interface 7110, without displaying additional controls.

Hardware input element 7108 (e.g., button, crown, or rotatable and depressible input element) is configured to receive various user inputs. For example, in response to detecting two press inputs in close succession (e.g., two press inputs within 2 seconds of each other, two press inputs within 1 second of each other, two press inputs within 0.5 seconds of each other), an application management user interface (e.g., system interface 7180) is presented in virtual three-dimensional environment as shown in FIG. 7O. In some embodiments, system interface 7180 is overlaid on the applications (which may include two or more applications) running in the foreground (e.g., audio player/music application, and web browser application, as shown in FIGS. 7N and 7O) and three-dimensional environment 7128 (e.g., presented at a location in a field of view of user 7002 that is closer to user 7002 than the two applications running in the foreground). Triggering multiple system operations (e.g., displaying of a force quit menu) using different types of inputs on a single input device (e.g., triggering operations not specific to a particular application) reduces the number of distinct input devices that have to be provided to accomplish different tasks (e.g., N input devices can effect M operations, where N<M). Reducing the number of input devices that need to be provided in order to give a user direct access to various system functions reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret distinct inputs from a smaller number of input devices. Using the same user input device, user 7002 can quickly get to an application management user interface without having to presented with additional/intermediary controls.

In the example shown in FIG. 7O, system interface 7180 provides a force quit menu that shows all the applications that are currently running on the computer system 101. The applications include both applications running in the foreground and applications running in the background (e.g., email application, document editing application and calendar application). User 7002 is able to close a specific application by providing a user gesture to a quit button 7182 associated with each application. In some embodiments, the force quit menu includes a button that causes all applications running on the computer system 101 to close. In some embodiments, the application management user interface is a system interface that allows multitasking on the computer system 101.

In some embodiments, the system user interface (e.g., a user interface that is application-agnostic, a user interface that is used to apply system-wide settings of the computer system 101) responds in the same way to a user input on the input device (e.g., the hardware input element 7108 (e.g., button, crown, or rotatable and depressible input element)) as application user interfaces (e.g., a press input on the hardware input element 7108 (e.g., button, crown, or rotatable and depressible input element) while a system user interface is displayed causes at least a portion of the system user interface to be replaced with the home menu user interface. Streamlining (e.g., by standardizing) the display of a home menu user interface 7110 in response to detecting a respective input that is of the same type of input as the first input, without regard to the user interface that is being currently displayed (e.g., system user interface, or an application user interface), reduces the number of distinct control elements needed by the device, and allows user 7002 to navigate through different collections of representations (e.g., representations of applications, people, and virtual environments), without displaying additional controls.

FIGS. 8A-8G illustrate examples of performing different operations based on an input to an input device, depending on a current mode of display. FIG. 14 is a flow diagram of an example method 1400 for performing different operations based on an input to an input device, depending on a current mode of display. The user interfaces in FIGS. 8A-8G are used to illustrate the processes described below, including the processes shown in FIG. 14.

Figure 8B:
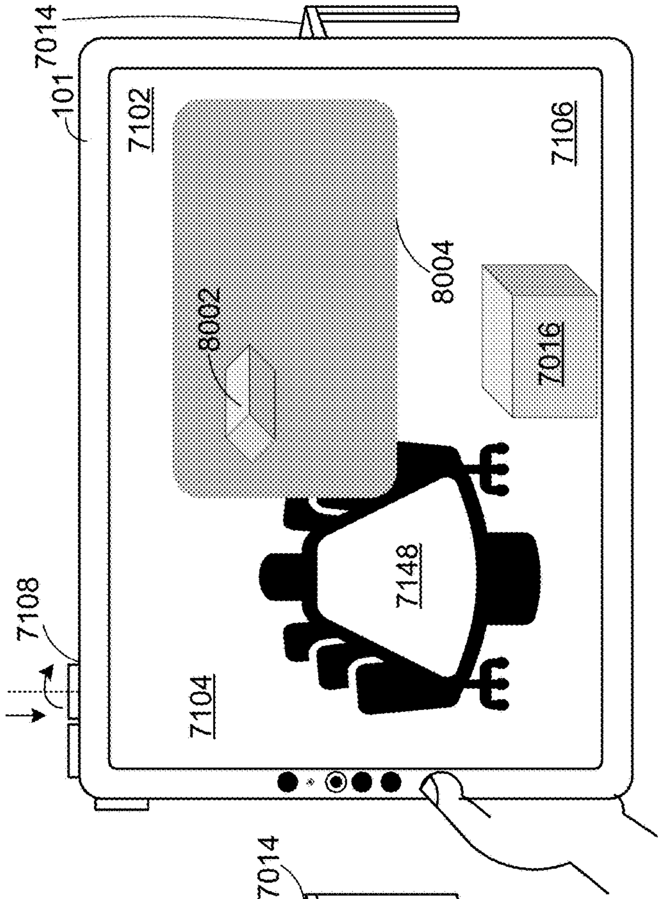
Figure 8A:
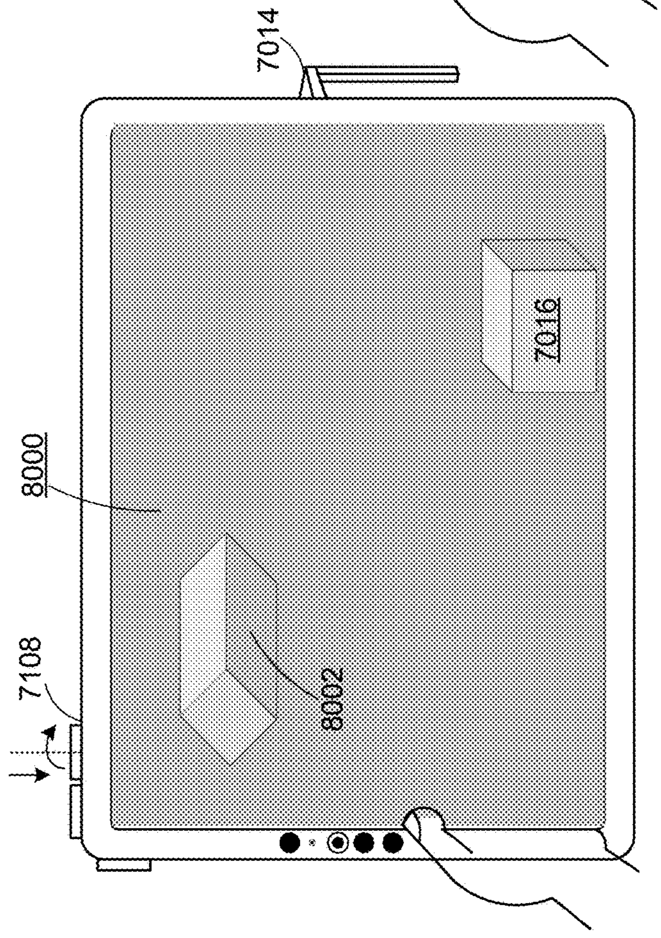

FIG. 8A shows application user interface 8000 displayed in a virtual three-dimensional environment. Application user interface 8000 fully occupies an entire field of view of user 7002 in the virtual three-dimensional environment. For example, the application user interface 8000 is displayed in the top portion 7102, the middle portion 7104, and the bottom portion 7106 of the virtual three-dimensional environment. The various portions of the virtual three-dimensional environment are described in reference to FIGS. 7A-7B. In some embodiments, application user interface 8000 corresponds to a user interface of a software application (e.g., a video player, a web browser, a maps application, a video-conferencing application, a messaging application, an email application, an audio player, or other software application) executing on computer system 101. In some embodiments, the virtual three-dimensional environment includes virtual content 8002 displayed by (or in) the application user interface 8000 of an application executed by the computer system 101. In some embodiments, computer-generated virtual content (e.g., box 7016) that is displayed in the virtual three-dimensional environment has no correspondence in the physical environment 7000, and/or is not part of the application corresponding to the application user interface 8000. Optionally, one or more elements of the computer-generated virtual content is overlaid on top of the immersive application user interface 8000 (e.g., presented closer to a viewpoint of user 7002 in user 7002's field of view compared to application user interface 8000).

When an application is presented in an immersive mode (e.g., in a fully-immersive mode, or offering user 7002 a fully-immersive experience), the application user interface associated with the application completely fills a user's field of view (e.g., an angle of view that extends 180° from a respective orientation of the user's head (e.g., from a left shoulder to a right shoulder). In some embodiments, the fully-immersive mode provides a field of view having an angle of view of 180° around the user 7002's head. In some embodiments, a full 360° angle of view is provided to the user, in all directions as the user rotates her head and/or body). In some embodiments, the immersive mode is also described as a "full-screen" display mode that fully occupies an entire display provided by the display generation component of (or coupled to) computer system 101. In some embodiments, a first mode of display includes the immersive mode in which only content of the application user interface (e.g., application user interface 8000) is displayed (e.g., content of the application user interface is displayed within user 7002's field of view without displaying content other than content of the application user interface, and/or the content of the application user interface substantially occupies all of user 7002's field of view).

In some embodiments, in addition to completely filling up a visual field of a user, when an application is presented in an immersive mode, audio input from the physical environment is canceled out, or substantially (e.g., more than 60%, 70% or 80%) reduced, or prevented from reaching the user. Similarly, in some embodiments, no audio input from any other applications running on the computer system 101 is provided to the user when the application user interface 8000 is presented to the user in the immersive mode. In some embodiments, the computer-generated virtual content (e.g., box 7016) provides notifications (e.g., an incoming communication request, updates from another application running in the background of computer system 101) to user 7002 while user 7002 is in the immersive mode.

While the display generation component presents content to user 7002 in the immersive mode, in response to detecting a user input (e.g., a single press input) on hardware input element 7108 (e.g., button, crown, or rotatable and depressible input element), application user interface 8000 is dismissed by the single press input, and replaced by a resized application user interface 8004, as shown in FIG. 8B. In some embodiments, similar content is displayed in the resized application user interface 8004 as was displayed in application user interface 8000. For example, virtual content 8002 provided by the application user interface 8000 continues to be displayed, albeit on a reduced scale, in the resized application user interface 8004. In some embodiments, virtual content such as box 7016 that was previously displayed in the immersive application user interface 8000 continues to be displayed (e.g., displayed at the same location, and/or displayed with the same visual characteristics).

As shown in FIG. 8B, in some embodiments, the resized application user interface 8004 reveals an underlying virtual environment (e.g., an office virtual environment that includes conference chairs surrounding office table 7148) that was previously occluded by the immersive application user interface 8000. In some embodiments, the resized application user interface 8004 is displayed in the middle portion 7104 of the virtual three-dimensional environment, near a central portion of user 7002's field of view. In some embodiments, the resized application user interface 8004 is in a "non-full-screen" display mode because contents from the resized application user interface 8004 do not fully occupy an entire display provided by the display generation component of computer system 101. The display generation component also presents the office virtual environment, and thus not all portions of the virtual environment display content from the resized application user interface 8004. In other words, the second mode of display includes a non-immersive mode in which respective content of the application user interface (e.g., resized application user interface 8004) and other content are concurrently displayed (e.g., content of the resized application user interface 8004 and content other than content of the resized application user interface resized are both displayed within user 7002's field of view; the content of the resized application user interface 8004 occupies only a portion of user 7002's field of view).

The virtual environment (e.g., office virtual environment) forms a part of the user experience when interacting with an application user interface in a non-immersive mode. Displaying the application user interface in a non-immersive experience (e.g., resized application user interface 8004) while maintaining display of the virtual environment after the first input is detected minimizes disruption to the user.

While the display generation component presents both the virtual environment and the resized application user interface 8004 to user 7002, as shown in FIG. 8B, in response to detecting a second user input (e.g., a second single press input) on hardware input element 7108 (e.g., button, crown, or rotatable and depressible input element), resized application user interface 8004 is dismissed by the second single press input. For example, resized application user interface 8004 is dismissed prior to home menu user interface 7110 being displayed, or concurrently with displaying home menu user interface 7110. The resized application user interface 8004 is replaced by a home menu user interface 7110 that is presented in the virtual three-dimensional environment, while display of the virtual environment (e.g., office virtual environment) is maintained, as shown in FIG. 8C (e.g., FIGS. 8C1, 8C2 and 8C3, where a user interface analogous to the user interface shown in FIG. 8C3 is shown on HMD 7100*a* in FIG. 8C1). In some embodiments, the home menu user interface 7110 is displayed in a central portion of a user's field of view, e.g., in the middle portion 7104 of the virtual three-dimensional environment, and thus is not displayed below a display of the previously displayed resized application user interface 8004.

Continuing to display the virtual environment (e.g., office virtual environment) while the home menu user interface is displayed minimizes disruption to the user while navigating the home menu user interface 7110, without displaying additional controls. By maintaining display of the virtual environment, a user does not need to re-initialize the virtual environment after navigation in the home menu user interface 7110, improving performance and efficiency of the computer system.

As previously described in reference to FIGS. 7B-7E, home menu user interface 7110 provides access to different collections of user navigable items, including applications, people (e.g., representations of particular people) or contact lists, and virtual environments. In some embodiments, the home menu user interface 7110 includes application icons, widgets, communication options, and/or affordances for displaying XR backgrounds. In some embodiments, the home menu user interface 7110 is superimposed over the application user interface (e.g., resized application user interface 8004). In some embodiments, objects (e.g., application icons, virtual user interface icons, and other objects) in the home menu user interface 7110 are either opaque or partially transparent, thereby blocking or obscuring corresponding portions of the application user interface (e.g., resized application user interface 8004). For example, those portions of the application user interface positioned behind the home menu user interface 7110 are blocked or obscured. In some embodiments, the home menu user interface 7110 includes a platter with a plurality of objects on the platter, and the platter is either opaque or partially transparent, thereby blocking or obscuring those portions of the application user interface positioned behind the home menu user interface 7110.

While the home menu user interface 7110 is displayed, in response to detecting a user input (e.g., a tap input, a long press input, or a pinch and drag input) directed to the respective representation of the software application, an application user interface of the software application is displayed (e.g., in a foreground of the three-dimensional environment, causing the software application corresponding to the representation to run in the foreground, as a focused application).

Allowing a single input to trigger display of the home menu user interface allows a user to quickly access and navigate a collection of representations in the home menu user to interact with other people, regardless of whatever operation (e.g., while a first application is running) is in progress, without displaying additional controls, minimizing the number of inputs required to select a desired operation, improving performance and operational efficiency of the device (e.g., computer system).

In some embodiments, the home menu user interface 7110 is world-locked. For example, after the home menu user interface 7110 is presented (e.g., in response to the press input to the hardware input element 7108 (e.g., button, crown, or rotatable and depressible input element)), as shown in FIGS. 8C, as user 7002 rotates her head (e.g., for example, to the left of FIGS. 8C, toward the office table 7148), the home menu user interface 7110 stays in substantially the same position in the virtual three-dimensional environment, such that representation 7118 is no longer displayed to user 7002 when representation 7118 leaves the field of view of user 7002 due to the rotation of user 7002's head. In some embodiments, the home menu user interface 7110 is head-locked, such that the after the home menu user interface 7110 is presented, the home menu user interface 7110 is re-displayed in a same portion of the user 7002's field of view independently of how user 7002 moves her head.

In some embodiments, the resized application user interface 8004 shown in FIG. 8B responds similarly to the application user interface 7018 shown in FIG. 7B to user input provided to hardware input element 7108 (e.g., button, crown, or rotatable and depressible input element). In some embodiments, box 7016 is displayed by the display generation component in both FIG. 7B and FIG. 8B. In some embodiments, the presence of the office virtual environment that includes conference chairs surrounding office table 7148 does not influence the display operation (e.g., of the home menu user interface 7110) triggered by the press input to the hardware input element 7108 (e.g., button, crown, or rotatable and depressible input element). In some embodiments, virtual content such as box 7016, continues to be displayed when home menu user interface 7110 is presented to user 7002 in response to the press input.

While the home menu user interface 7110 is presented, as shown in FIGS. 8C, in response to a user input (e.g., a direct air gesture, an indirect air gesture, a tap input, a long press input, and/or a pinch and drag input) directed to tab 7136, a collection of representations of one or more selectable virtual environments is presented to user 7002, as shown in FIG. 8D. For example, in FIG. 8C1, the user input is shown as a direct air gesture in which the position of the representation of the user's hand 7020' corresponds to tab 7136. In some embodiments, the user input is an indirect air gesture that is based on tab 7136 being displayed at a position that corresponds a position at which the user's attention is currently detected while one or more gestures are performed with the user's hand(s) 7020 and/or 7022. For example, a representation an option 7114 corresponding to a beach scenery virtual environment, and an option 7146 corresponding to a virtual office environment are presented as selectable virtual environments to user 7002, in response to the user input directed to tab 7136. In some embodiments, virtual content such as box 7016, continues to be displayed when home menu user interface 7110 is presented to user 7002 in response to the press input. In some embodiments, the previously present virtual environment is dismissed when the selectable virtual environments are presented to user 7002. For example, as shown in FIG. 8D, the office virtual environment is no longer displayed in FIG. 8D. In some embodiments, the previously present virtual environment is maintained when the selectable virtual environments are presented to user 7002. In some embodiments, representations of more than two selectable virtual environments are presented to user 7002. In some embodiments, the representations of more than two selectable virtual environments may all be displayed in a single snapshot to user 7002. In some embodiments, in response to a user input (e.g., a pinch and drag input, a tap input, a long press input) directed to an edge of the user 7002's field of view, representations of additional selectable virtual environments are scrolled (e.g., by computer system 101) into the user 7002's field of view. For example, a pinch and drag input directed to a right edge of the virtual environment in user 7002's field of view, causes additional selectable virtual environments to enter into the user 7002's field of view, from the right.

Figure 8E:
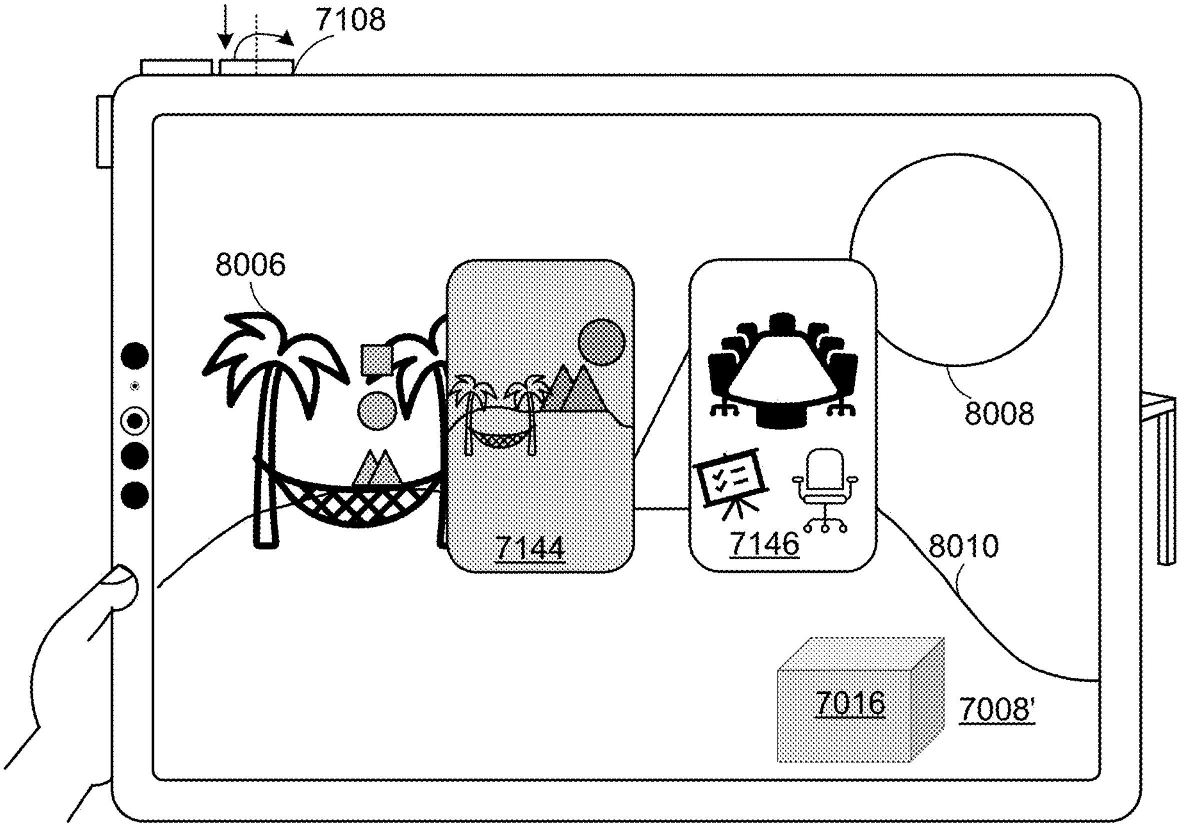

While the representations of selectable virtual environments are presented to user 7002, as shown in FIG. 8D, in response to a user input directed to the option 7144 corresponding to a representation of beach scenery, the office virtual environment is replaced by the beach scenery the virtual environment that includes a coconut tree 8006, sun 8008, and a shoreline 8010, as shown in FIG. 8E. In some embodiments, virtual content such as box 7016, continues to be displayed when the virtual environment is updated in response to user input. In some embodiments, display of the representations of selectable virtual environments is not immediately dismissed upon selection by user 7002 of the option 7144 corresponding to the representation of beach scenery. For example, the representations of selectable virtual environments persist for a first amount of time (e.g., about 3 seconds, or about 5 seconds) in case the user 7002 wishes to make a different selection after the selected virtual environment is displayed. In some embodiments, in the absence of further user input to the selectable representations after the first amount of time, display of the representations of selectable virtual environments ceases.

Displaying a home menu user interface that provides quick access to a collection of selectable virtual environments, offers a way to alter a user's virtual experience, without displaying additional controls, minimizing the number of inputs required to select a desired virtual environment, and improving performance and efficiency of the computer system.

Figure 8F:
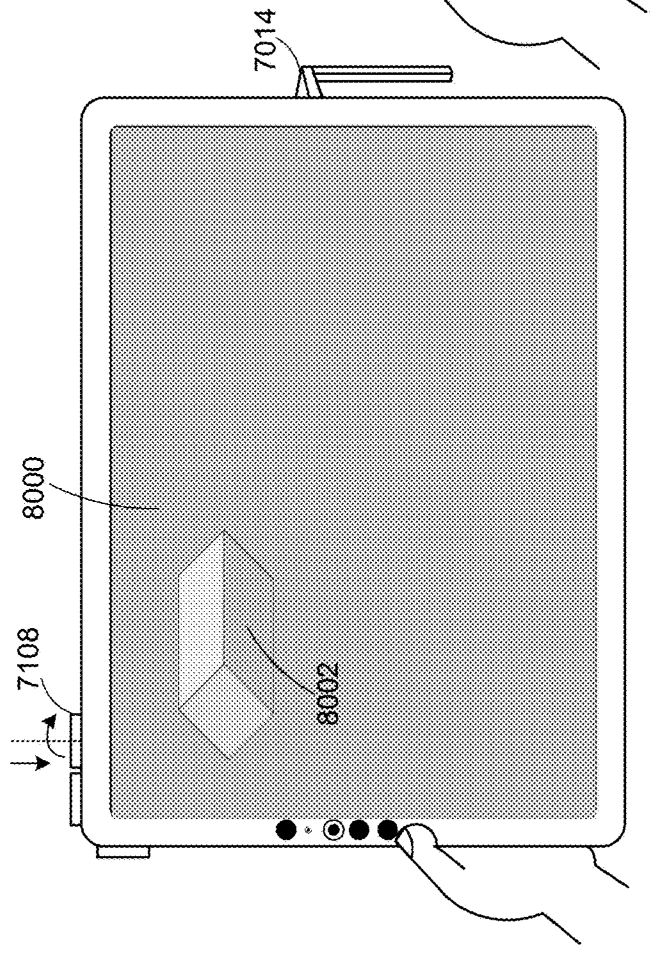

In some embodiments, as shown in FIG. 8F, the immersive application user interface 8000 is displayed to user 7002 without the presence of any computer-generated virtual content not provided by the application associated with application user interface 8000 (e.g., immersive application user interface 8000 is displayed without displaying box 7016, which is not provided by the application associated with the application user interface 8000).

Figure 8G:
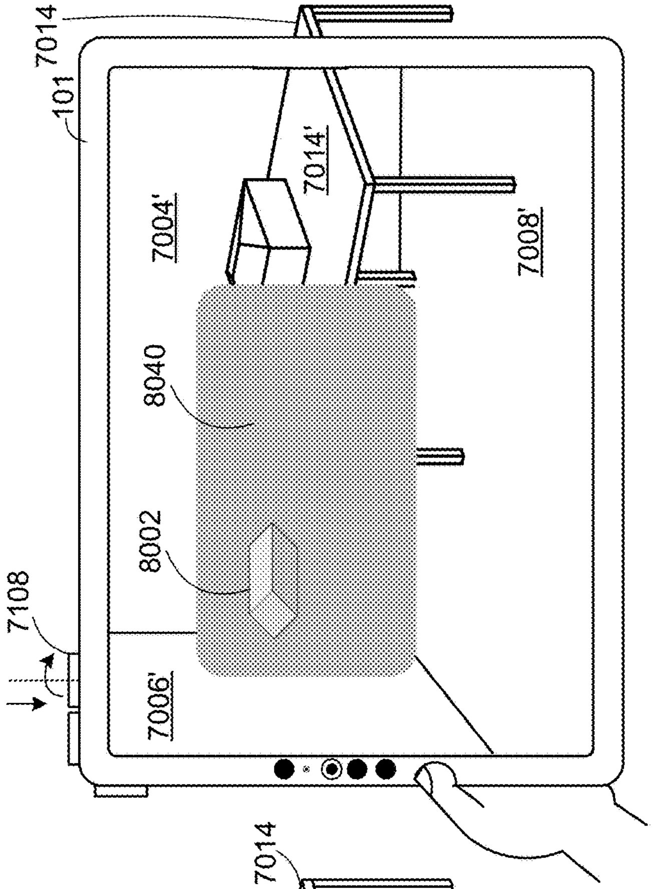

While the immersive application user interface 8000 is displayed to user 7002, as shown in FIG. 8F, in response to detecting a user input (e.g., a single press input) on hardware input element 7108 (e.g., button, crown, or rotatable and depressible input element), application user interface 8000 is dismissed by the single press input, and replaced by an updated application user interface 8040, as shown in FIG. 8G. In some embodiments, similar content is displayed in the updated application user interface 8040 as in application user interface 8000. For example, virtual content 8002 provided by the application user interface 8000 continues to be displayed, albeit on a reduced scale, in the updated application user interface 8040. In some embodiments, the updated application user interface 8040 is presented in the absence of any virtual environment, and/or without any additional virtual content. In some embodiments, as shown in FIG. 8G, when no virtual environment is displayed to user 7002, the updated application user interface 8040 is presented with a presentation of a passthrough portion of a physical environment of the computer system 101 (e.g., a head-mounted device) via the display generation component. In some embodiments, updated application user interface 8040 corresponds to resized application user interface 8004. In some embodiments, updated application user interface 8040 corresponds to a mini player application interface (e.g., mini player user interface 7154 as shown in FIGS. 7G-7I, or mini player user interface 11012 as shown in FIG. 11D).

In some embodiments, more than a single user input causes the transition shown from FIG. 8F to FIG. 8G. For example, while in an immersive mode, a first input (e.g., a press input) to the hardware input element 7108 (e.g., button, crown, or rotatable and depressible input element), causes application content in the immersive mode (e.g., in a full-screen mode) to be displayed in a non-immersive mode (e.g., in the form of a resized application user interface, in a non-full-screen mode). While the non-immersive mode is displayed, in response to detecting a second input (e.g., a second press input), home menu user interface 7110 is displayed, as shown in FIG. 8C. In some embodiments, the updated application user interface 8040 persists, for example, as a mini-player application user interface. For example, application user interface 8000 corresponds to a media player in a full-screen mode (e.g., a video player application that presents a movie in a full-screen mode), and the updated application user interface 8040 corresponds to a mini player application user interface. While the home menu user interface is displayed concurrently with the mini player application user interface, in response to detecting a third input (e.g., a third press input), home menu user interface 7110 is dismissed, and a passthrough portion is presented as shown in FIG. 8G. In some embodiments, the mini-player application interface is maintained while the passthrough portion is presented, as shown in FIG. 8G. In some embodiments, a display of the mini-player application interface ceases while the passthrough portion is presented. Using the third input to dismiss the home menu user interface while the device is operation in a non-immersive mode (e.g., providing a non-immersive experience to the user) provides an efficient way to terminate navigational activities on the home menu user interface without disrupting the application user interface (e.g., as shown in FIG. 8G) in the non-immersive experience. No additional controls have to be provided to the user, and the user does not need to navigate through any additional user interface control elements to exit the home menu user interface, improving operational efficiency of the computer system.

Dismissing the home menu user interface 7110 by replacing display of the home menu user interface with a presentation of a passthrough portion of a physical environment of the computer system 101 (e.g., a head-mounted device) via the display generation component improves safety for user 7002, allowing user 7002 to be cognizant of the physical environment of the computer system 101 (via the passthrough portion of the physical environment of the computer system 101). For example, user 7002 may need to respond to an emergency or other situations that require user 7002's attention or require user 7002 to interact with the physical environment after the user is done navigating the home menu user interface 7110. Using a second input or a third input (e.g., on a physical button) to activate display of a passthrough portion allows user 7002 to retreat from the virtual environment and view at least a portion of the physical environment, without displaying additional controls. In some embodiments, in addition to presenting the passthrough portion, a display of a virtual environment in which the home menu user interface 7110 is displayed also ceases. Ceasing to display a virtual environment while dismissing the home menu user interface 7110 allows the user to retreat from the virtual environment and view at least a portion of the physical environment (e.g., dismissing a display of the virtual environment), by having the second input function similarly to an input to an escape button, without displaying additional controls.

A single input to an input device can be used by the user to transition the device from a high level of immersion (e.g., a fully immersive mode, in which only content of a respective application is displayed) into a less immersive mode or non-immersive mode, or from a non-immersive mode to one in which a home menu user interface is also displayed), and provides intuitive top level access to different collections of representations, when the user is in a non-immersive experience, without displaying additional controls (e.g., without requiring the user to navigate through user interface elements), thereby increasing operational efficiency of user-machine interactions based on the single input. The use of the single input to the input device reduces the amount of time needed to navigate within a virtual environment or transition out of a virtual environment.

In some embodiments, the input device at which the aforementioned single input and other inputs described herein with reference to FIGS. 8A-8G are received, is hardware input element 7108 (e.g., button, crown, or rotatable and depressible input element). In some embodiments, the hardware input element 7108 (e.g., button, crown, or rotatable and depressible input element) is a hardware button. In some embodiments, the hardware input element 7108 (e.g., button, crown, or rotatable and depressible input element) is a solid state button. Using inputs to a hardware or solid-state button to control the level of immersion (e.g., from a fully immersive mode to a non-immersive mode) with which application content is provided, or to display a home menu user interface, provides intuitive top level access to basic operational functions of the computer system, without displaying additional controls (e.g., without requiring the user to navigate through user interface elements), thereby improving the operational efficiency of the computer system. A solid-state button reduces the number of moving parts, which improves reliability, and allows the system to be reconfigurable (e.g., by a firmware update that allows the solid-state button to provide different feedback, to offer other functionality, to receive additional types of inputs), improving performance and efficiency of the computer system.

FIGS. 9A-9D illustrate examples of how one or more different operations are triggered by an input to an input device depending on a characteristic of a displayed application user interface. FIG. 15 is a flow diagram of an example method 1500 for performing one or more different operations based on (e.g., triggered by) an input to an input device depending on a characteristic of a displayed application user interface. The user interfaces in FIGS. 9A-9D are used to illustrate the processes described below, including the processes in FIG. 15.

FIG. 9A shows application user interface 9002, application user interface 9004, application user interface 9006, and application user interface 9008, displayed in a virtual three-dimensional environment 9000. In some embodiments, application user interface 9002 corresponds to a user interface of a media player application (e.g., a video player application), application user interface 9004 corresponds to a user interface of a messaging application, application user interface 9006 corresponds to a user interface of a calendar application, and application user interface 9008 corresponds to a user interface of a web browsing application.

In some embodiments, the media player application having application user interface 9002 is used in a content-sharing session. For example, user 7002, while playing a movie in the video player application of the application user interface 9002, shares the movie with participants Abe, Mary, Isaac, and Edwin, of the content-sharing session. In some embodiments, representations of the participants in a content-sharing session are displayed as avatars on a portion (e.g., representations of the participants are arranged on a left portion, representations of the participants arranged on a right portion, representations of the participants are arranged on a top portion, representations of the participants are arranged on a bottom portion) of the application user interface 9002. In some embodiments, a content-sharing session that includes two or more participants is also called a group interaction session. For example, participants of a content-sharing session can interact with one another (e.g., by chat messaging, audio call, or video call) while jointly viewing the shared content in the group interaction session.

A particular application can be used in a content-sharing session (e.g., media player application having application user interface 9002) or in a non-content-sharing session (e.g., media player application having application user interface 11002, as described in reference to FIGS. 11A and 11B) in which content is presented by the display generation component of computer system 101 to user 7002, without being presented to additional users or participants. In some embodiments, an application running on computer system 101 of user 7002 in a content-sharing session only shares a portion of the displayed information with other participants. For example, a document editing application in a content-sharing session with two different teams of participants only shares portions of the application user interface with participants from the first team who have permission to view the shared content in a first portion of the application user interface, and a different portion of the application user interface is shared with participants from the second team, who have a different permission level or setting.

An application having a respective session (e.g., a content-sharing session) that includes content that is shared with (e.g., displayed to) more than the user on whose computer system 101 the application is running, is also called a "shared application." An application that does not have a respective session (e.g., a content-sharing session) that includes content that is shared with or displayed to more than the user on whose computer system 101 the application is running on, is called a "private application." Thus, the same application may be a "private application" in the absence of any active content-sharing sessions for that application even when multiple participants are able to content-share the application, and is considered a "shared application" when there is an active content-sharing session for that application.

FIG. 9A shows application user interfaces of multiple applications being displayed concurrently. The multiple applications include private applications (e.g., message application, calendar application, and web browsing application) and/or applications used in a content-sharing session (e.g., media player application). Concurrently displaying application user interfaces of two or more applications allows user 7002 to multi-task, provides more information to user 7002 without requiring additional user input, and increases operational efficiency of the computer system.

In addition to sharing media content for joint consumption with multiple participants (e.g., via a video player application), content-sharing sessions can also include sharing video conferencing content between multiple participants of a video conference, and/or sharing or streaming gaming content to multiple participants in a gaming application. For example, an ongoing game (e.g., an individual user's game) is broadcast to multiple participants in a content-sharing session of the gaming application. In some embodiments, a content-sharing session may include screen mirroring. In screen mirroring, a display output provided by display generation component of computer system 101 is additionally provided to one or more other display device(s) distinct from computer system 101. In some embodiments, screen mirroring is used when the application user interface is in an immersive mode (e.g., no other application is running in a foreground of computer system 101 of user 7002), as described with respect to FIG. 8A and FIG. 8F. In some embodiments, participants in a content-sharing session for an application user interface that is screen mirroring in an immersive mode can also experience the shared content in an immersive mode (e.g., screen mirroring provides visual output to respective wearable devices of the participants).

In some embodiments, the gaming application is a multi-player gaming application (e.g., multiplayer online battle arena (MOBA) video games), in which users in the content-sharing sessions do not view the same output display (e.g., each player is presented with a viewpoint from a perspective of a respective game character), and the gaming application runs on respective computer systems of the players. In some embodiments, the multi-player gaming application includes a content-sharing session in which a team member (e.g., in the gaming application) of user 7002 receives a video feed (e.g., of the same display (e.g., screen mirroring) or similar display presented to user 7002 by the display generation component of computer system 101) and audio feed from user 7002 during the MOBA gaming session.

In contrast, in some embodiments, application user interfaces 9004, 9006, and 9008 as shown in FIG. 9A, are all application user interfaces of applications used in non-content-sharing sessions. In some embodiments, one or more of application user interfaces 9004, 9006, and 9008 are used in a content-sharing session. For example, user 7002 is able to place a web browsing application into a content-sharing session so that participants can view webpage content (e.g., webpage content that include media clips) from the web browsing application in a content-sharing session in real-time.

In some embodiments, one or more virtual objects (e.g., box 7016) are presented in virtual three-dimensional environment 9000 that includes application user interfaces of private applications and shared applications.

While displaying application user interfaces of private applications, and a shared application, in response to a press input to hardware input element 7108 (e.g., button, crown, or rotatable and depressible input element), all private applications are dismissed, and a home menu user interface 7110 is overlaid on the shared application (e.g., the home menu user interface is presented in front of the application user interface 9002, closer to the user 7002 in a z-direction than the application user interface 9002), as shown in FIG. 9B (e.g., FIGS. 9B1, 9B2 and 9B3, where a user interface analogous to the user interface shown in FIG. 9B1 is shown on HMD **7100*a* in FIG. 9B2**).

In some embodiments, hardware input element 7108 (e.g., button, crown, or rotatable and depressible input element) includes a rotatable input element or mechanism such as a digital crown. Hereinafter, hardware input element 7108 (e.g., button, crown, or rotatable and depressible input element) is also referred to as rotatable input element 7108 or rotatable input mechanism 7108. In some embodiments, hardware input element 7108 (e.g., button, crown, or rotatable and depressible input element) is a hardware button. In some embodiments, hardware input element 7108 (e.g., button, crown, or rotatable and depressible input element) is a solid-state button. Providing a dedicated hardware input element 7108 (e.g., button, crown, or rotatable and depressible input element) to receive the first input allows a user (e.g., without having to interact with the user interface of any software application) to more quickly and responsively distinguish between shared applications and private applications.

Displaying the home menu user interface 7110 in front of the application user interface 9002 allows a user to navigate a collection of applications in the home menu user interface and/or change a virtual environment for that user and/or interact with additional users while an ongoing content-sharing session is in progress, increasing operational efficiencies by obviating the need to disrupt (e.g., by having to close out of) the content-sharing session of a shared application (e.g., application user interface 9002) in order for a particular user to navigate the home menu user interface 7110. Reducing the number of inputs needed to dismiss private applications and bring shared applications into focus enhances the operability of computer system 101 and makes the user-device interface more efficient which, additionally, reduces power usage and improves battery life of computer system 101 by enabling the user to use the device more quickly and efficiently.

In some embodiments, when two application user interfaces are displayed, one application user interface being a shared application while the other application user interface being a private application, a press input to hardware input element 7108 (e.g., button, crown, or rotatable and depressible input element) ceases a display of the private application while maintaining display of the shared application that is used in a content-sharing session. In some embodiments, multiple application user interfaces of private applications (e.g., having no on-going content-sharing session), and multiple application user interface of shared applications are displayed. A press input to hardware input element 7108 (e.g., button, crown, or rotatable and depressible input element) ceases display of the multiple application user interfaces of the private applications while maintaining display of the multiple application user interfaces of the shared applications that are used in content-sharing sessions. In some embodiments, multiple application user interfaces of shared applications are displayed, and an application user interface of a private application is displayed. A press input to hardware input element 7108 (e.g., button, crown, or rotatable and depressible input element) ceases a display of the private application while maintaining display of the multiple application user interfaces of shared applications used in content-sharing sessions.

In some embodiments, virtual content such as box 7016 continues to be displayed when home menu user interface 7110 is presented to user 7002 in response to the press input. In some embodiments, the home menu user interface 7110 is also called a home screen user interface, and the home screen user interface does not necessarily block or replace all other displayed content. For example, “home screen” refers to a virtual user interface that is optionally displayed in an XR environment, not a default landing user interface that is displayed to a user in response to specific predefined user interactions with the computer system 101. In other words, the home screen user interface is distinct from a default landing user interface that automatically displays various representations to a user without specific user inputs.

Using the first input to the input device to dismiss private applications of a user while not affecting any shared applications minimizes disruption to both the user and other users during the shared experience, and prioritizes multi-user interactions over private application usage. The ability to use the first input to distinguish between shared applications and private (e.g., not-shared) applications allows separate control of the two categories of applications (e.g., prioritizing the shared applications over the private applications), without having to display additional controls. The amount of disruption the user may experience while in a group interaction session is reduced by the ability to quickly dismiss private applications using the first input, and to more readily bring shared applications into focus. Further, the number of inputs needed to dismiss the private applications and maintain display of the shared application is reduced-instead of having to individually minimize or dismiss the application user interfaces 9004, 9006, and 9008 of private applications, the first input is sufficient to maintaining display of the shared application while ceasing to display application user interfaces of private applications.

Figure 9C:
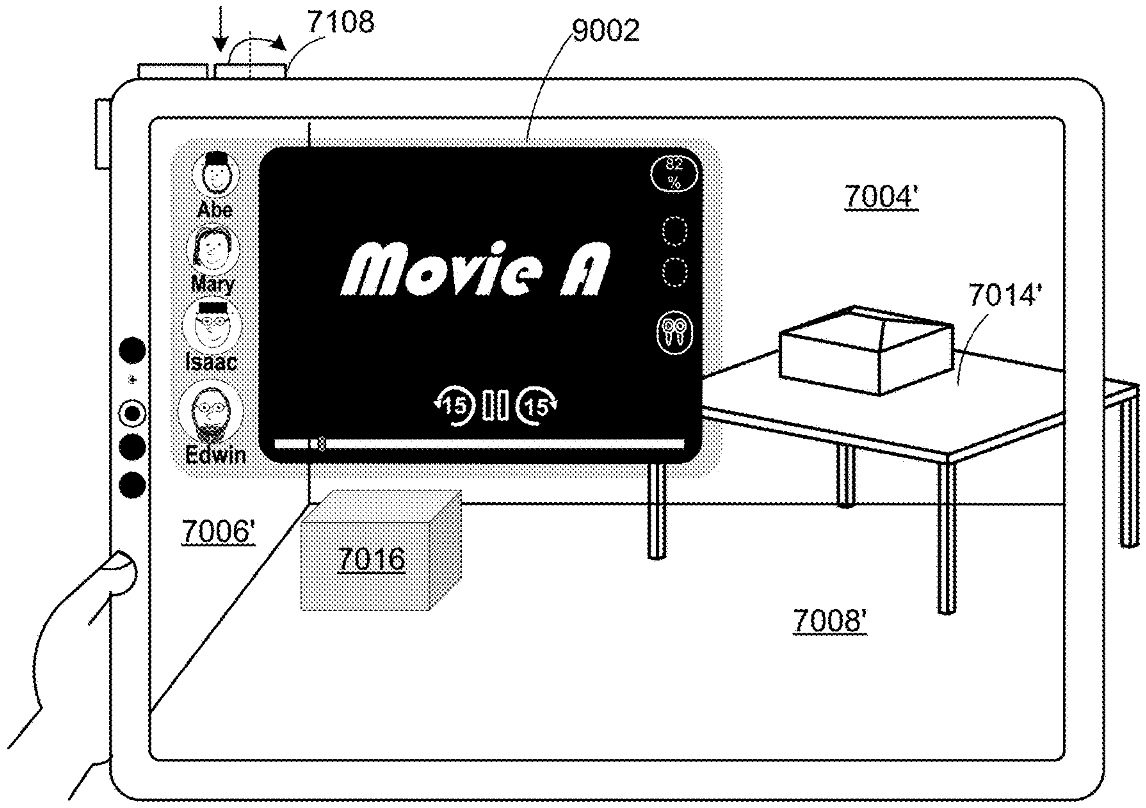

While displaying both the home menu user interface 7110 and at least the portion of the application user interface 9002 of the application currently being shared in the content-sharing session (as shown in FIGS. 9B, this state is reached after the first press input), in response to a second press input to the hardware input element 7108 (e.g., button, crown, or rotatable and depressible input element), the home menu user interface 7110 is dismissed, and a passthrough portion is presented (e.g., showing a representation 7014' of a table 7014 in the physical environment 7000, as shown in FIG. 9C. As a result, the shared application of application user interface 9002 is displayed concurrently with a passthrough portion of a physical environment of computer system 101. In other words, the second press input to the hardware input element 7108 (e.g., button, crown, or rotatable and depressible input element) is a repeat “home input” to the hardware input element 7108 (e.g., button, crown, or rotatable and depressible input element) that ceases a display of the home menu user interface 7110 while maintaining display of application user interface 9002 of the shared application, resulting in display of application user interface 9002 of the shared application without presenting the home menu user interface 7110.

Dismissing the home menu user interface 7110 by replacing display of the home menu user interface with a presentation of a passthrough portion of a physical environment of the computer system 101 (e.g., a head-mounted device) via the display generation component, as shown in FIG. 9C, improves safety for user 7002, allowing user 7002 to be cognizant of the physical environment of the computer system 101 (via the passthrough portion of the physical environment of the computer system 101) while not disrupting an ongoing content-sharing session that involves more than one user. For example, user 7002 may need to respond to an emergency or other situations that require user 7002’s attention or require user 7002 to interact with the physical environment 7000 after user 7002 is done navigating the home menu user interface 7110. Using a second input to activate display of a passthrough portion the physical environment of the computer system 101 allows user 7002 to retreat from the virtual environment and view at least a portion of the physical environment, without displaying additional controls. In some embodiments, in addition to presenting the passthrough portion in response to the second input, a display of a virtual environment in which the home menu user interface 7110 is displayed also ceases. Ceasing to display a virtual environment while dismissing the home menu user interface 7110 allows the user to retreat from the virtual environment and view at least a portion of the physical environment (e.g., dismissing a display of the virtual environment), by having the second input function similarly to an input to an escape button, without displaying additional controls. In some embodiments, virtual content such as box 7016 continues to be displayed, as shown in FIG. 9C, when home menu user interface 7110 is dismissed in response to the second input, but in other embodiments display of virtual content such as box 7016 is also dismissed in response to the second input.

Using a second input, such as a press input, to dismiss the home menu user interface provides an efficient way to terminate navigational activities on the home menu user interface 7110 without disrupting the content-sharing session of the shared application 9002. No additional controls have to be provided to the user, and the user does not need to navigate through any additional user interface control elements to exit the home menu user interface 7110, improving operational efficiency of the device.

Figure 9D:
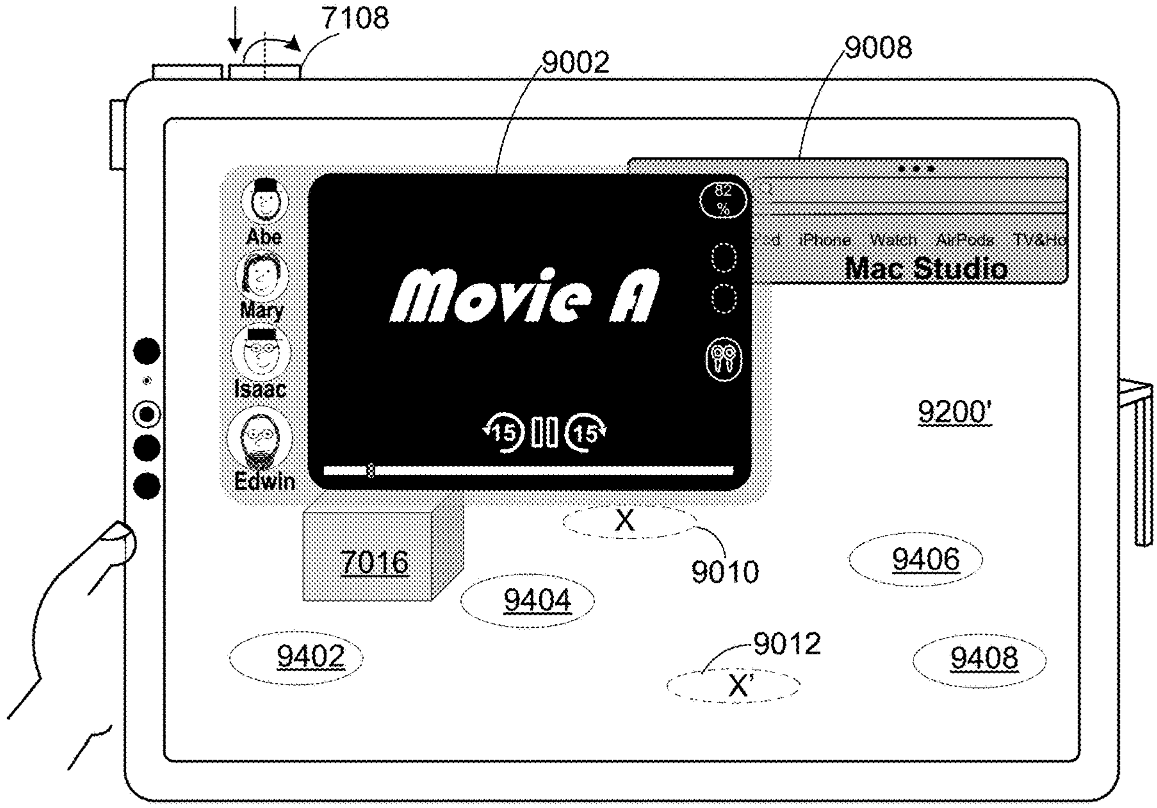

FIG. 9D shows the application user interface 9002 in a content-sharing session with four participants, and an application user interface 9008 of an application (e.g., a web browsing application) that is not in any content-sharing session, in accordance with some embodiments. In some embodiments, as illustrated in FIG. 9D, the representations of the participants are arranged within the shared three-dimensional environment 9200' relative to one another (e.g., such that a respective user (or participant) views the positions of the other users (participants) relative to the viewpoint of the respective user), referred to herein as a copresence communication session (or a spatial communication session). Both the application user interface 9002 and the application user interface 9008 are displayed in a shared three-dimensional environment 9200' that is used for the spatial communication session.

In some embodiments, each participant in the content-sharing session of the application user interface 9002 has a corresponding virtual location in the spatial communication session. For example, a representation of Abe (e.g., an avatar, a video stream of Abe, an image of Abe) is located at a position 9402 in the spatial communication session, a representation of Mary (e.g., an avatar, a video stream of Mary, an image of Mary) is located at a position 9404 in the spatial communication session, a representation of Isaac (e.g., an avatar, a video stream of Isaac, an image of Isaac) is located at a position 9406 in the spatial communication session, and a representation of Edwin (e.g., an avatar, a video stream of Edwin, an image of Edwin) is located at a position 9408 in the spatial communication session. User 7002's viewpoint includes the representation of Abe at the position 9402 to the left of the representation of Mary at the position 9404. In some embodiments, the display generation component 7100 also presents a displayed representation of user 7002 (e.g., where the representation of user 7002's self is displayed in a dedicated region of the display generation component (e.g., the top-right corner)). In some embodiments, representations of one or more active participants in a communication session are not displayed relative to one another within the shared three-dimensional environment 9200' (e.g., active participants are displayed in a list or gallery view, as shown in FIGS. 9A-9C). In some embodiments, a communication session includes a combination of users that are participating in a copresence communication session (e.g., and view representations of other users as being arranged relative to each other in a three-dimensional environment) as well as additional users that do not view other users as being arranged relative to each other in the three-dimensional space (e.g., users that view other participants in a list or gallery view).

In some embodiments, the shared three-dimensional environment 9200' updates in real-time while the users are communicating with each other (e.g., using audio, physical movement, and/or shared applications) in a copresence communication session. In some embodiments, the users in the copresence communication session are not collocated with (e.g., within a predefined physical proximity of) each other in the physical environment, but share the three-dimensional environment 9200'. For example, the users view the shared three-dimensional environment 9200' (e.g., which may include one or more properties of a physical environment of one or more of the users), from different physical environments.

In some embodiments, as described above, the shared three-dimensional environment 9200' includes a representation for each user that is participating in the copresence communication session. In some embodiments, a control user interface object includes one or more affordances for displaying additional content related to the communication session, such as an affordance for changing the virtual environment (e.g., virtual scenery) for the communication session. For example, the user is enabled to add virtual objects (e.g., by selecting a control user interface object) to the copresence communication session (e.g., virtual object 7016) and/or to control placement of the virtual objects within the shared three-dimensional environment 9200' that adjusts virtual properties of the shared three-dimensional environment 9200'. For example, the shared three-dimensional environment is enabled to be displayed with one or more themes, referred to herein as immersive experiences (e.g., which include immersive animations or environments) that are applied to the three-dimensional environment 9200'. For example, the user is provided (e.g., using a control user interface object) with options for adding, removing, and/or changing virtual scenery, virtual lighting, and/or virtual wallpaper in the three-dimensional environment. In some embodiments, in response to a user selecting to change a current immersive experience, the modified immersive experience is provided to all of the users participating in the copresence communication session (e.g., the respective display generation components for each participating user displays virtual content for the immersive experience).

In some embodiments, a content-sharing session runs within the spatial communication session in the shared three-dimensional environment 9200', as shown in FIG. 9D. For example, the application user interface 9002 currently in the content-sharing session with the multiple participants (as shown in FIGS. 9A-9C) runs in a real-time communication session. For example, the multiple participants of the real-time communication session can communicate with one another using audio (e.g., via microphones and/or speakers that are in communication with the respective computer systems of the users) and video, and/or a 3D representation such as an avatar that represents changes in a position and/or expression of a participant in the real-time communication session over time. In some embodiments, audio received from a respective user is simulated as being received from a position corresponding to the respective user's current position in the three-dimensional environment 9200'. In some embodiments, the location in the three-dimensional environment 9200' where the content-sharing session occurs is different from a location of representations of the multiple participants.

Providing a content-sharing session within a real-time communication session (e.g., a "copresence session") expands the range of media experience in the real-time communication session. Instead of only exchanging participant-originated data (e.g., video conference audio and video data of or generated by the participants), independent sources of data (e.g., media content, gaming content, web content) can be shared in the real-time communication session with multiple participants.

In some embodiments, multiple participants can control playback of media (e.g., music, video, or animated content) shared in the content-sharing session, e.g., by performing media playback control actions such as scrubbing (e.g., positioning a control element of a scrub bar), fast forwarding, rewinding and/or playing/pausing. When user 7002 provides a press input to the hardware input element 7108 (e.g., button, crown, or rotatable and depressible input element) while the real-time spatial communication session is displayed as shown in FIG. 9D, the press input causes the home menu user interface 7110 to be displayed to user 7002, while application user interface 9008 is dismissed because the application user interface 9008 is not in any content-sharing session. While home menu user interface 7110 is displayed, another participant in the communication session can move application user interface 9002 of the content-sharing session. Movement of the application user interface 9002 by the other participant will cause a corresponding movement of the application user interface 9002, from user 7002's viewpoint that results in a consistent spatial relationship between the user 7002, the application user interface 9002, and the representation of the other participant in the shared three-dimensional environment 9200'.

For example, Abe, one of the participants of the real-time communication session whose representation is located at the position 9402 (see FIG. 9D) in the shared three-dimensional environment 9200', moves the application user interface 9002 from an original position closer to a location 9010 to a new position at location 9012. In some embodiments, the movement of the application user interface 9002 by Abe occurs while a home menu user interface 7110 is presented by the display generation component to user 7002 (e.g., after user 7002 provides a press input to hardware input element 7108 (e.g., button, crown, or rotatable and depressible input element)). In response to Abe's movement of the application user interface 9002, while user 7002 is navigating the home menu user interface 7110, a spatial location of the application user interface 9002 is also updated for user 7002, from the viewpoint of user 7002.

Allowing other participants to move the user interface of the application while a first participant is navigating a home menu user interface on her individual computer system helps to minimize disruption to the multi-user experience (e.g., the content-sharing session of an application). For example, other participants can continue to interact with the user interface of the application that is in the content-sharing session without having to take into account or be constrained by the fact that a home menu user interface is displayed for the first participant. Further, allowing simultaneous changes in spatial relationships in a self-consistent way between user interface objects that represent respective content to different participants increases the realism of the multi-user experience and better simulates a content-sharing experience in the physical environment. Simultaneous changes to a position of the user interface of the application for two or more participants also obviates the need to sequentially or manually apply the same changes to the application user interface as seen by (e.g., displayed by respective computer systems of the) multiple participants, improving communication efficiency for the multiple participants.

In some embodiments, the application user interface 9002 of the shared application, or an element or a respective portion of the application user interface 9002 has a shared spatial relationship relative to multiple participants in the real-time communication session such that one or more user interface objects that are visible to the multiple participants in the content-sharing session in a real-time communication session have a consistent spatial relationship from different viewpoints of the multiple participants in the content-sharing session. In some embodiments, when the application user interface for one shared application is moved by a first participant of the real-time communication session, the application user interface for that shared application is also moved correspondingly, for other participants from their respective viewpoints. In other words, when a user interface object of a shared application is moved by one participant, the user interface object is moved for all participants of the real-time communication system in a way that maintains consistent spatial relationships between the user interface object and all the participants.

For example, when application user interface 9002 is moved from an original position close to the location 9010 to the new position at location 9012, Edwin, whose representation is located at position 9408 in the shared three-dimensional environment 9200' will have an updated spatial relationship to the repositioned application user interface 9002 that reflects the closer spatial proximity between the application user interface 9002 at the location 9012 to the position 9408 of Edwin's representation. Similarly, from the viewpoint of Edwin's representation at the position 9408, Mary (whose representation is at position 9404) would appear behind the application user interface 9002 (at new location 9012) instead of being in front of the application interface 9002, as was the case when the application user interface 9002 was at the previous position of 9010.

Maintaining a consistent spatial relationship between a user interface object and participants includes, for example, for a first user interface object that represents respective content to a first participant (e.g., if Mary is the first participant, and application user interface 9002 is the first user interface object that represents media content to Mary) and a viewpoint of the first participant from a perspective of the first participant (e.g., from a perspective of Mary at position 9404, a viewpoint of Mary may include a direct line of view to Edwin, prior to movement of the application user interface 9002 from the location 9010 to the location 9012, but the application user interface 9002 blocks the direct view of Edwin after the application user interface 9002 is moved to location 9012) is consistent with a spatial relationship between a second user interface object that represents the respective content to a second participant (e.g., if Edwin is the second participant, the second user interface object presents application user interface 9002 to Edwin at his computer system relative to virtual spatial location at 9408) and a representation of the first participant from a perspective of the second participant (e.g., from the perspective of Edwin, Mary is located in front of box 7016, and in front of application user interface 9002 prior to the movement of the application user interface 9002 to new location 9012).

Further, a spatial relationship between the second user interface object that represents the respective content to the second participant and a viewpoint of the second participant from the perspective of the second participant (e.g., from a perspective of Edwin at position 9408, a viewpoint of Edwin may include a direct line of view to Abe at position 9402, prior to movement of the application user interface 9002 from the location 9010 to the location 9012, but the application user interface 9002 blocks Edwin's direct view of Abe at position 9402 after the application user interface 9002 is moved to location 9012) is consistent with a spatial relationship between the first user interface object that represents the respective content to the first participant and a representation of the second participant from the perspective of the first participant (from the perspective of Mary, the representation of Edwin at the position 9408 would appear behind the application user interface 9002 at the new location 9012).

Allowing one participant to move the user interface of the application for another participant obviates the need to sequentially or manually apply the same changes to multiple participants, improving communication efficiency for the multiple participants. Allowing simultaneous changes in spatial relationships in a self-consistent way between user interface objects that represent respective content to different participants increases the realism of the multi-user experience and better simulates a content-sharing experience in the physical environment. Each participant can independently position herself at a location in the shared three-dimensional environment 9200' relative to a user interface object that represents respective content that is selected for/fine-tuned to the particular user. A spatial relationship (between the user interface object and the representation of a particular user) selected for a particular user would not impact the spatial relationship that is desired for another user. Allowing different spatial relationships between an application, or elements or portions of the application, and different users enhances the ability of the different users to control their individual interactions (e.g., viewing interaction) with the application, or elements or portions of the application.

FIGS. 10A-10D illustrate examples of resetting an input enrollment process. FIG. 16 is a flow diagram of an example method 1600 for resetting an input enrollment process. The user interfaces in FIGS. 10A-10D are used to illustrate the processes described below, including the processes in FIG. 16.

FIG. 10A shows application user interface 10000 displayed in a virtual three-dimensional environment. The virtual three-dimensional environment includes one or more computer-generated objects, also called virtual objects, such as box 7016 (e.g., which is not a representation of a physical box in physical environment 7000). In some embodiments, application user interface 10000 corresponds to a user interface of a software application (e.g., a web browser, a messaging application, a maps application, a video player, or an audio player, an email application, or other software application) executing on computer system 101. In some embodiments, the application user interface 10000 is displayed in a middle portion of the virtual three-dimensional environment within a central portion of a field of view of a user of the device (e.g., along a gaze direction of a user, providing user 7002 with a head-on view of the application user interface 10000 such that the application user interface 7018 appears substantially at eye-level to user 7002).

Although not shown in FIG. 10A, user 7002 interacts with the application user interface 10000 using a user input, such as a hand gesture or a gaze input. For example, user 7002 uses a hand gesture directed to a hyperlink in the application user interface 10000 of a web browsing application (e.g., direct a tap input on a hyperlink) to view, using the web browsing application, the webpage associated with the hyperlink. Alternatively, user 7002 uses a pinch and drag gesture directed to the web browsing application to scroll to a different webpage (e.g., a previously accessed webpage) in the web browsing application. In addition to hand gestures, in some embodiments, user 7002 directs her gaze at a portion of the application user interface 10000 (e.g., for a time period longer than a preset threshold) to trigger different operations in the application user interface 10000 (e.g., to select a hyperlink in a web browsing application, to magnify a display of a portion of the application user interface 10000, to play or pause a media item (e.g., a video clip, an audio clip) in the application user interface 10000)).

A prior biometric input enrollment process provides first input enrollment information to computer system 101 to parse user 7002's hand gestures and gaze inputs so that computer system 101 (1) maps inputs from user 7002 as being directed to corresponding locations in a virtual three-dimensional environment, and (2) interprets user 7002's hand gestures or gaze input as corresponding to specific operations (e.g., a tap input, a pinch and drag input, a gaze input of a particular duration) that interact with control elements in the application user interface 10000.

In some embodiments, the prior biometric input enrollment process was initiated when computer system 101 was used for the first time, or when the computer system 101 was re-initialized after a software update of computer system 101.

When first input enrollment information collected from a prior biometric input enrollment process introduces errors (e.g., calibration errors) such that a user's gaze inputs or hand gestures are not properly interpreted by the computer system 101 when user 7002 interacts with the application user interface 10000 (e.g., an unwanted offset (e.g., lateral, vertical, or medial offset) in the tap input causing a user interface control element (e.g., a hyperlink) to the left or right (or up or down) of the intended target to be triggered; a pinch and drag input not being registered as detecting a pinch or a drag; a gaze input that is detected with an unwanted offset causes operations to be performed on a portion of the application user interface 10000 different from an intended portion), further user-machine interactions via hand gestures and/or gaze inputs become difficult and frustrating.

In some embodiments, the first input enrollment information includes information about a first type of input (e.g., user's gaze inputs or hand gestures) that is determined based on a location and/or movement of a first biometric feature of user 7002 (e.g., a position and/or movement of an eye, pupil, face, head, body, arm, hand, finger, leg, foot, toe, or other biometric feature of user 7002).

In some embodiments, errors from the biometric input enrollment process are due to an impairment that changes the appearance or other characteristics of a user's fingers, wrist, arms, eyes (e.g., due to infection or change of contact lens types/colors), or voice (e.g., due to illness)).

Instead of using the inaccurately calibrated user input (e.g., gaze or hand input) to trigger a reset process for collecting new biometric input enrollment information for those same inputs, user 7002 is able to initiate a new biometric input enrollment process by providing a user input to an input device having a different modality (e.g., a button, a dial, a rotatable input element, a switch, a movable component, or a solid state component, or touch-sensitive surfaces (e.g., a device that detects localized sensor input such as intensity or force sensor input, which the computer system uses to trigger corresponding operations and optionally provides tactile feedback such as haptic feedback corresponding to the detected inputs)) than those user 7002 wants to reset. For example, allowing a biometric input enrollment reset for eyes/gaze or hand gestures using a different type of input (e.g., pressure/touch) on a different input device (e.g., a hardware button such as button 7508) allows an input of a first modality (e.g., tactile touch/mechanical actuation) to reset calibration for input of a different modality (e.g., gaze, or hand gesture). Calibration corrections in one modality (gaze/eye tracking) can be initialized using a more reliable mode of input that does not require calibration (e.g., tactile touch/mechanical actuation on a hardware/solid state button), which improves the reliability and operational efficiency of computer system 101.

Table 1 below describes the behavior of the computer system 101 in response to different operations on button 7508 (e.g., a hardware button, a solid-state button), in accordance with some embodiments.

| Number of presses | Device On (Worn) | Device On (Not Worn) | Device Off |
|---|---|---|---|
| 1 press | Capture toggle (video start/stop recording) | Standby (temporary tracking state) | N/A |
| 2 presses | Payment confirmation (only during transaction) | N/A | N/A |
| 3 presses | N/A | N/A | N/A |
| 4 presses | Reset store demo mode OR trigger input enrollment | N/A | N/A |
| Press and hold | Capture while holding | N/A | Power On |

For a computer system 101 that is a wearable device (e.g., a head-mounted device, a strapped-on device, a watch), while the wearable device is turned on and worn on the body of user 7002, in response to detecting four consecutive presses within a preset time period (e.g., less than 7 seconds, less than 5 seconds, less than 3 seconds) to button 7508 (e.g., and/or button 701, button 702 and/or digital crown 703 and/or 7108 of HMD 7100*a*) (e.g., a hardware button, a solid state button or other hardware input element), a biometric input enrollment process is triggered and a user interface 10004 is displayed as shown in FIG. 10B (e.g., FIGS. 10B1, 10B2 and 10B3, where a user interface analogous to the user interface shown in FIG. 10B1 is shown on HMD 7100*a* in FIG. 10B2). In some embodiments, the wearable device is placed in a "store mode" (e.g., for display to shoppers in a store) and the four consecutive presses within the preset time period causes the device to reset a store demonstration mode (e.g., a mode in which the computer system runs through different functionalities of the wearable device to showcase product features to a customer). In some embodiments, the wearable device is placed in a "ship mode" (e.g., for shipping to customers, for use outside the store) and the four consecutive presses within the preset time period causes the device to reset a biometric input enrollment mode.

Besides triggering a biometric input enrollment reset, inputs to button 7508 cause the wearable device to perform various operations. While the wearable device is turned on and worn on the body of user 7002, in response to detecting a single press input to the button 7508, a capture toggle of the wearable device is triggered. For example, in some embodiments, a single press allows the wearable device to start video recording. A second press after the wearable device has started video recording then causes the wearable device to stop recording. In some embodiments, the video recording is a recording of a three-dimensional virtual environment displayed by the display generation components of the wearable device. In some embodiments, the video recording is a recording of a three-dimensional extended reality (XR) environment that includes both computer generated content, and a passthrough portion of a physical environment of the wearable device, visible via the display generation components of the wearable device. In some embodiments, the video recording is a recording only of the physical environment of the wearable device.

In some embodiments, a single press toggles the video recording mode off or on. For example, a first single press toggles the video recording mode on. When a press and hold input is detected on the button 7508, video is captured while the button 7508 is being held. A second single press toggles the video recording mode off, and a press and hold input detected on the button 7508 does not cause the wearable device to record any video.

In some embodiments, press inputs to button 7508 causes the wearable device to capture still media and/or video media (e.g., capturing media rendered visible via the display generation component).

In some embodiments, while the wearable device is turned on and worn on the body of user 7002, the press and hold input on the button 7508 is used to capture a screenshot of the display generated by the display generation component. For example, a screenshot is captured when the button 7508 receives a press and hold input.

While the wearable device is turned on and worn on the body of user 7002, in response to detecting two press inputs to the button 7508 within a preset time period (e.g., less than 3 seconds, less than 2 seconds, less than 1 seconds) to the button 7508, and in accordance with a determination that a transaction (e.g., a purchasing transaction, a funds transfer transaction, or a payment transaction) is active (e.g., ongoing, or in a current session) on the wearable device, a payment confirmation for the transaction is activated (e.g., displaying a visual indication that a payment process is confirmed for the transaction).

In some embodiments, the button 7508 is also used to turn the wearable device on or off. While the wearable device is turned off, a press input on the button 7508 that is held (e.g., persists) for a preset time duration (e.g., about 2 second, or about 5 second) causes the wearable device to turn on.

In some embodiments, while the wearable device is turned on, but not worn on the body of user 7002, in response to detecting a press input to button 7508, the wearable device transitions from a sleep state to a standby state, as explained in more details in FIGS. 12A-12G2. Thus, button 7508 is also used to wake the wearable device from a sleep mode (or state) to a standby mode.

Providing a dedicated button 7508 (e.g., solid state button, hardware button) to reset other types of user input (e.g., hand tracking or gaze tracking) allows user 7002 (e.g., while using any software application) to more quickly and responsively trigger an input enrollment reset. Instead of wasting time closing applications and/or navigating to special user interface control elements using inaccurately calibrated biometric input, using a physical button 7508 (e.g., hardware, solid state button) to quickly trigger a user input enrollment reset for inputs of the first type without relying on inaccurately calibrated inputs, e.g., biometric inputs, to trigger the user input enrollment reset improves the operational efficiency of the computer system 101.

FIG. 10B shows a user interface 10004 for a biometric input enrollment process. The user interface 10004 provides a confirmation prompt to user 7002 whether to reset biometric input enrollment. In some embodiments, user interface 10004 is displayed in a central portion of a field of view of user 7002, for example, overlaying other displayed content (e.g., computer-generated content, like box 7016, which is not a representation of a physical box in physical environment 7000; or passthrough portions of physical environment 7000 of the wearable device.) In some embodiments, user interface 10004 overlays content when it is displayed closer to user 7002 within a field of view of user 7002 compared to other displayed content, from a viewpoint of user 7002.

Figure 10C:
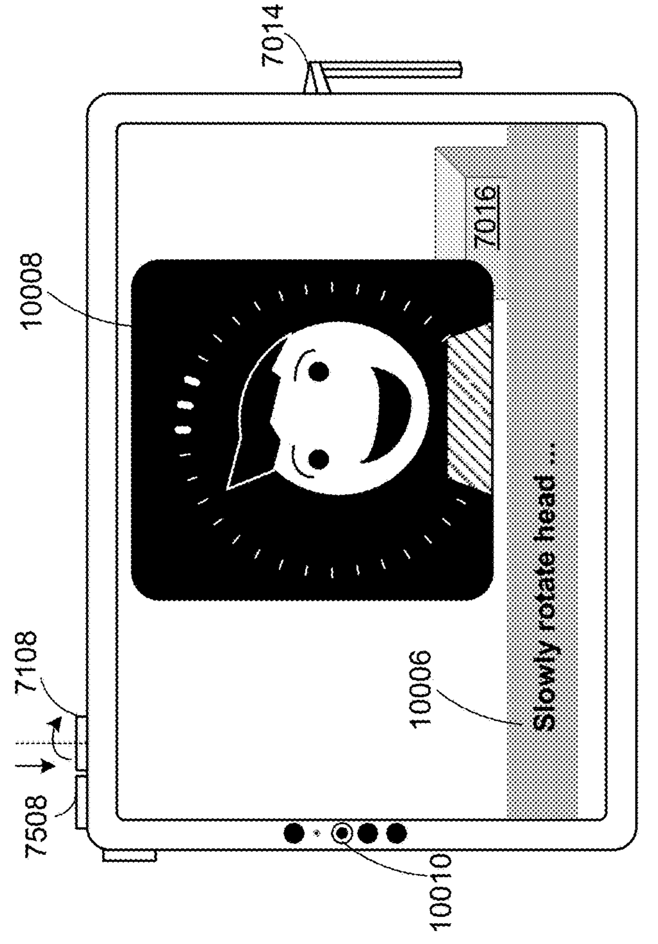
Figure 10D:
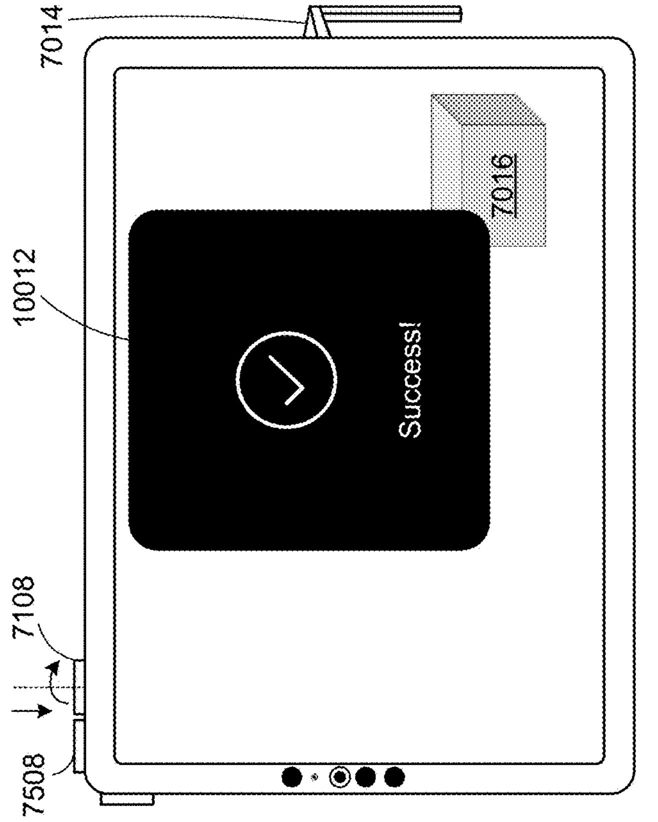

In response to user 7002 confirming, on the user interface 10004, that biometric input enrollment should be reset (e.g., by directing a user input (a tap input, a gaze input) to a "yes" user interface control element), one or more display generation components displays a biometric input enrollment experience to user 7002, as shown in FIG. 10C.

In response to user 7002 indicating that biometric input enrollment should not be reset (e.g., by directing a user input (a tap input, a gaze input) to a "no" user interface control element in the user interface 10004), user interface 10004 is dismissed, and user 7002 is able to continue navigating in the virtual 3D environment using biometric data collected from the prior biometric input enrollment process (e.g., no biometric input enrollment experience would be provided to user 7002). For example, user 7002 may have changed her mind after providing the press inputs to button 7508, or user 7002 may have made inadvertent press inputs that caused the unintended display of user interface 10004.

FIG. 10C shows an example of a biometric input enrollment process, in accordance with some embodiments. During the biometric input enrollment process, user interface element 10006 presents instructions to user 7002 for completing the biometric input enrollment process for a first type of input (e.g., user 7002's gaze, or user 7002's hand tracking). For example, the instructions include asking user 7002 to rotate her head slowly. For example, images captured while user 7002's head is rotated slowly can calibrate various characteristics of user 7002's eyes, for example, a displacement of user 7002's eyes as a function of a rotation of user 7002's head. The instructions can include asking user 7002 to rotate her head in a particular direction, asking user 7002 to gaze at a displayed virtual object (e.g., as the virtual object is moved, or displayed at a fixed location), move user 7002's hands to various locations, and/or perform different hand gestures. Based on user actions performed in accordance with the presented instructions second input enrollment information (new input enrollment information) for the first type of input is collected.

For example, when user 7002's gaze enrollment is to be reset, the second input enrollment information is derived from first biometric features extracted from data collected by one or more input devices. In some embodiments, the one of more input devices used to obtain the second input enrollment information includes camera 10010 that is integrated on the wearable device. In some embodiments, the one or more input device might be a device that is physically separated from the wearable device (e.g., a beacon or scanner located in a physical environment of the wearable device).

In some embodiments, while second input enrollment information is being collected, a user interface element 10008 displays a progress indicator (e.g., a status bar, or a circular arrangements of tick marks in which illuminated or highlighted tick marks indicate a progress of the input enrollment process) for the input enrollment process. In some embodiments, a user is provided with a visual indication of the second input enrollment information that is being collected (e.g., an image of a face of user 7002 as user 7002's head rotates, an image of a user 7002's hand(s)).

Examples of first biometric features include a position and/or movement of the user's eye, determining and/or calibrating an interpupillary distance of user 7002, size of an iris of user 7002, and/or a range of angular movement of user 7002's eye. In some embodiments, the one or more input devices includes a camera (an optical/visible spectrum RGB camera, an infrared camera, or a thermal camera) that captures two-dimensional images of biometric features of user 7002.

For example, when enrollment of the user 7002's hand movements (e.g., hand gesture and/or other tracking of hand movements) is to be reset, the second input enrollment information is derived from first biometric features extracted from data collected by one or more input devices. Examples of first biometric features include a position and/or movement of one or more portions of user 7002's hand (e.g., determining and/or calibrating a size of user 7002's hand, a range of motion of user 7002's hand or wrist, lengths of different articulated joints in user 7002's hand, and/or range of motion of different articulated joints in the hand). In some embodiments, the one or more input devices includes a camera (an optical/visible spectrum RGB camera, an infrared camera, or a thermal camera) that captures two-dimensional images of biometric features of user 7002.

In some embodiments, statistical information from the previous input enrollment process and the second input enrollment information are extracted, and the first type of input is calibrated using a weighted average of all collected input enrollment information.

When the second input enrollment information has been collected, the wearable device provides an indication (e.g., a visual indication 10012 provided by the display generation components, an audio indication provided by an audio system of the wearable device, and/or a haptic indication provided by the wearable device) to user 7002 that the input enrollment has been successfully reset.

Performing new operations based at least in part on the second input enrollment information of the first type of input allows the new operations to be performed using the first type of input that is better calibrated, updated, and/or improved, increasing operational efficiency of user-machine interactions based on the first type of input.

Allowing an input enrollment reset for hand tracking using a different type of input (e.g., pressure/touch) on a different input device (e.g., hardware/solid state button) allows an input of a first modality (e.g., tactile touch/mechanical actuation) to reset calibration for input of a different modality (e.g., hand tracking, visual hand tracking, infrared hand tracking). Calibration corrections in one modality (hand-tracking) can be initialized using a more reliable mode that does not require calibration (e.g., tactile touch/mechanical actuation on a hardware/solid state button), which improves the reliability and operational efficiency of computer system 101. Instead of having user 7002 navigate through user interface elements (e.g., menus or other control elements) using the first type of input (e.g., gaze input, hand gestures) in order to reset the input enrollment for the first type of input, using a second type of input (e.g., press input to button 7508) to initialize input enrollment improves operational efficiency, reduces user frustration, and reduces the number of inputs needed for initializing an input enrollment reset process. The use of the second type of input to reset input enrollment also helps to reduce the amount of time needed to begin the input enrollment reset process. For example, the use of the second type of input enables input enrollment reset to be initialized without displaying additional controls (e.g., navigating through user interface elements using the first type of input).

Table 2 below describes the behavior of the computer system 101 in response to different inputs to button 7508 (e.g., a hardware button, a solid-state button), and a second input device (a second button) in accordance with some embodiments. In some embodiments, the inputs to the button 7508 are concurrent or overlapping with inputs to the second input device, and the inputs to the button 7508 are detected in conjunction with the inputs to the second input device. In some embodiments, which system operation(s) is (are) performed depends depending on a duration and a pattern of the inputs to the button 7508 and the second input device. Concurrently detected inputs are sometimes called chorded inputs.

Using button 7508, in combination with one or more other input device, as a chorded input to perform other system operations (e.g., operations not specific to a particular application) allows various system operations to be performed without displaying additional controls. Furthermore, the combined use of more than one input device to effect system operations (e.g., operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret chorded inputs from a smaller number of input devices.

Table 2 below describes the behavior of the computer system 101 in response to different joint operations on a first input device (e.g., button 7508) and a second input device (e.g., hardware input element 7108 (e.g., button, crown, or rotatable and depressible input element)), in accordance with some embodiments.

| Combined control | Device On (Worn) | Device Off (Power cable attached) |
|---|---|---|
| Press/release both | Take screenshot | N/A |
| Press & hold both | Power off | N/A |
| Press & hold both (longer) | Force restart | N/A |
| Press & hold both then release side button while holding the rotatable input element | Device Firmware Update (DFU) mode | Device Firmware Update (DFU) mode |

For a computer system 101 that is a wearable device (e.g., a head-mounted device, a strapped-on device, a watch), while the wearable device is turned on and worn on the body of user 7002, in response to detecting press inputs on both button 7508 and the second input device (e.g., a hardware input element 7108 (e.g., button, crown, or rotatable and depressible input element)) and a concurrent release of the press inputs on both button 7508 and the second input device, the wearable device captures a screenshot of the display provided by the display generation component.

While the wearable device is turned on and worn on the body of user 7002, in response to detecting press inputs on both button 7508 and the second input device (e.g., a second button) and held for a first inputs on both button 7508 and the second input device, the wearable device captures a screenshot of the display provided by the display generation component. In some embodiments, the screenshot is a snapshot of a three-dimensional virtual environment displayed by the display generation components of the wearable device. In some embodiments, the screenshot is a snapshot of a three-dimensional mixed reality environment that includes both computer generated content, and a pass-through portion of a physical environment of the wearable device, visible via the display generation components of the wearable device. In some embodiments, the screenshot is a snapshot only of the physical environment of the wearable device.

While the wearable device is turned on and worn on the body of user 7002, in response to detecting press inputs on both button 7508 and the second input device (e.g., a second button) and detecting that both press inputs are held for a first time threshold (e.g., longer than 2 seconds, longer than 5 seconds, longer than 10 seconds), the combined inputs power off the wearable device.

While the wearable device is turned on and worn on the body of user 7002, in response to detecting press inputs on both button 7508 and the second input device (e.g., a hardware input element 7108 (e.g., button, crown, or rotatable and depressible input element)) and detecting that both press inputs are held for a second time threshold longer than the first time threshold (e.g., longer than 3 seconds, longer than 7 seconds, longer than 14 seconds), the combined inputs force the wearable device to restart (e.g., the wearable device shuts down and reinitializes a start-up procedure, all applications previously running prior to the detection of the press inputs are closed).

In response to detecting press inputs on both button 7508 and the second input device (e.g., hardware input element 7108 (e.g., button, crown, or rotatable and depressible input element)) and detecting a release of the press input from the button 7508 while the press input is still applied to the second input device, the combined inputs activate a Device Firmware Update (DFU) mode. In some embodiments, the DFU mode allows the wearable device to partially or fully, update the firmware on a device. In some embodiments, DFU is an alternative boot mode for systems, similar to a recovery mode. In at least some such embodiments, the same combined inputs activate the DFU mode, both when the wearable device is turned on and worn by user 7002, and when the wearable device is turned off and connected to a power cable.

FIGS. 11A-11F illustrate examples of adjusting a level of immersion of a user's extended reality (XR) experience in a three-dimensional environment. FIG. 17 is a flow diagram of an example method 1700 for adjusting a level of immersion of the user's XR experience. The user interfaces in FIGS. 11A-11F are used to illustrate the processes described below, including the processes in FIG. 17.

FIG. 11A shows application user interface 11002 displayed in three-dimensional environment 11000 that includes representation 7014' of physical object 7014 (e.g., a physical table), representations 7004' and 7006' of physical walls 7004 and 7006, respectively, and representation 7008' of physical floor 7008. In some embodiments, both computer-generated virtual objects that do not correspond to any specific objects in the physical environment 7000 (e.g., box 7016) and representations of objects in the physical environment 7000 are displayed to user 7002.

In some embodiments, as shown in FIG. 11A, application user interface 11002 provides media content to user 7002. For example, application user interface 11002 is a video player that includes a display of playback controls. In some embodiments, physical environment 7000 is a spatially constrained space (e.g., indoor space) surrounded by walls, physical objects, or other obstructions. Features of physical environment 7000 can be visible in the three-dimensional environment 11000 (e.g., an XR environment) displayed to user 7002, as shown in FIG. 11A, by the of presence of representations 7004' and 7006' of physical walls 7004 and 7006, representation 7008' of physical floor 7008, and representation 7014' of physical object 7014 (e.g., a table). In some embodiments, computer generated virtual content, such as box 7016, which has no correspondence in the physical environment 7000 is also displayed to user 7002 by computer system 101.

As shown in FIG. 11A, a first portion of the three-dimensional environment 11000 includes computer-generated virtual objects that are not present in the physical environment 7000, and a second portion of the virtual three-dimensional environment includes representations of objects in physical environment 7000 displayed as a part of three-dimensional environment 11000. FIG. 11A shows a first level of immersion generated by the display generation component of computer system 101 in which a display of the XR environment concurrently includes a passthrough portion of a physical environment 7000 of computer system 101, virtual content from the application user interface 11002, and computer-generated virtual content, such as box 7016, that is distinct from the content provided by application user interface 11002.

In some embodiments, when a level of immersion is increased, an amount of input signals from the physical environment 7000 that user 7002 receives is reduced. For example, reducing inputs from the physical environment 7000 by not displaying representations 7004', 7006', and 7008' to user 7002, and/or displaying computer generated virtual content that provide visual inputs to user 7002 to simulate a more spacious environment (e.g., open fields, outdoor spaces, or outer space) than that offered by physical environment 7000, increases a level of immersion that is provided to user 7002 in the three-dimensional environment 11000. In some embodiments, increasing a level of immersion that is provided to user 7002 decreases an influence the physical environment 7000 has on user 7002.

User 7002 may wish to be more fully immersed in the content of the media that is provided through application user interface 11002. Without exiting the application user interface 11002, user 7002 provides rotational inputs to rotational input element 7108 (e.g., by turning rotational input element 7108). In some embodiments, user 7002 provides a first rotational input to rotational input element 7108 by turning in a first rotational direction (e.g., a clockwise rotation, or a counter-clockwise rotation). The first rotational direction changes a level of immersion presented by the display generation component (e.g., increases a level of immersion, or decreases a level of immersion). For example, by turning in a first rotational direction that increases the level of immersion, passthrough portions of physical environment 7000 are displayed with lower fidelity and/or fewer passthrough portions of physical environment 7000 are displayed (e.g., some passthrough portions of the experience cease to be displayed) than before the first rotational input. For example, representation 7014' ceases to be displayed, as shown in FIG. 11B (e.g., FIGS. 11B1, 11B2 and 11B3, where a user interface analogous to the user interface shown in FIG. 11B1 is shown on HMD 7100*a* in FIG. 11B2). Instead, computer generated content, shown by dash lines, is presented as virtual content 11004 to user 7002.

In addition to increasing a level of immersion during a media consumption experience (e.g., watching a video, or listening to music), the level of immersion can also be increased to help user 7002's concentration and focus while working. For example, increasing the level of immersion reduces noises from the ambient physical environment, and/or content from a smaller number of applications (e.g., a single application, a word processing application) is presented to user 7002 (e.g., notifications from other applications are blocked while user 7002 is using a particular application at a high level of immersion).

Increasing a proportion of virtual (e.g., computer generated) content that is not a representation of the physical environment 7000, increases a level of immersion presented to user 7002. Virtual content refers generally to content that is distinct from representations of the physical world (e.g., physical environment 7000). For example, presenting a larger number of computer-generated virtual content, such as box 7016, which has no correspondence in the physical environment 7000, increases a level of immersion presented to user 7002. In some embodiments, as the immersion level increases, computer generated content previously presented at a lower immersion level continues to be displayed (e.g., maintaining display of computer-generated content as level of immersion increases).

In some embodiments, a level of immersion presented to user 7002 is related to an associated size (e.g., a magnitude) of a spatial extent (e.g., an angular range) of a field of view within which computer-generated content is displayed. At a lower level of immersion, computer generated virtual content is displayed within a smaller field of view. At a higher level of immersion, computer generated virtual content is displayed within and covers a larger field of view.

For example, in FIG. 11A, although box 7016 is computer-generated virtual content, it appears in a peripheral portion of a field of view of user 7002. In contrast, as shown in FIGS. 11B, in response to detecting a rotational input to the rotatable input element 7108 along the first direction, the passthrough portion showing representation 7014' ceases to be displayed, and a first portion (e.g., central portion) of the user 7002's field of view is replaced with computer-generated virtual content 11004. In some embodiments, the computer-generated virtual content occupies an extended portion of user 7002's field of view, starting in the central portion of user 7002's field of view.

In some embodiments, the central portion of the user 7002's field of view coincides with a middle region of the application user interface 110002. In some embodiments, a level of immersion has an associated angle of view, which is an angular size of a view cone of the field of view within which computer-generated virtual content is displayed. A higher level of immersion has a larger associated angle of view, and a lower level of immersion has a smaller associated angle of view.

In some embodiments, for the level of immersion shown in FIGS. 11B, the angle of view is about ±10°. For example, for an angle of view of about ±10°, computer generated virtual content is displayed, from a perspective of user 7002, starting at an angle of about 10° to the left, to about 10° to the right, and from about 10° above, to about 10° below an axis of user 7002 (e.g., an axis lying in a sagittal plane of user 7002, for example, the axis of user 7002 projects forward, perpendicularly from a front surface plane of user 7002's body). In some embodiments, computer generated virtual content occupies (e.g., completely occupies) the field of view of user 7002 within the angle of view. In some embodiments, computer generated virtual content partially occupies a portion of the field of view of user 7002 within the angle of view, but no input from the physical environment 7000 of computer system 101 is provided, within the angle of view, in the field of view of user 7002.

In some embodiments, decreasing a level of immersion involves changing a level of immersion from an initial virtual reality (VR) environment in which no passthrough portion of a physical environment of the computer system is displayed to a first immersion level that includes a display of the XR environment. In some embodiments, a highest level of immersion for a three-dimensional environment is a virtual reality environment in which no passthrough portion of the physical environment is provided.

Level of immersion influences a user's perception experience by changing properties of a mixed reality three-dimensional environment. Changing a level of immersion changes a relative prominence of virtual content to content from the physical world (visual and/or audio). For example, for audio components, increasing an immersion level includes, for example, increasing noise cancellation, increasing a spatiality of spatial audio associated with the XR environment (e.g., by moving audio sources to more points around the user or increasing a number and/or volume of point sources of audio), and/or by increasing a volume of audio associated with the virtual environment. In some embodiments, increasing a level of immersion changes a degree to which the mixed-reality environment reduces (or eliminates) signals from the physical world that are presented to the user (e.g., audio and/or visual passthrough of a portion of the physical environment of the computer system). For example, increasing an immersion level includes increasing a proportion of the visual field of view that displays the virtual content, or decreasing a prominence of a representation of the real world (e.g., physical environment 7000) by dimming, fading, or reducing an amount of the representation of the real world that is displayed to the user.

Changing a level of immersion can also include changing a visual presentation of the mixed-reality environment, including an extent of a field of view and a degree to which visibility of the external physical environment is reduced. Changing a level of immersion can include varying a number or extent of sensory modalities that a user can use to interact with the mixed-reality three-dimensional environment (e.g., interacting through user's voice, gaze, and body motion). Changing a level of immersion can also include changing an extent of a fidelity and a resolution with which the mixed-reality environment simulates a desired environment. Changing a level of immersion can also include modifying an extent to which a viewpoint of the mixed-reality environment is modified to match a user's viewpoint or perspective, e.g., through capture of the user's motion and timely adjustment of portions of the three-dimensional environment that lie within a field of view.

At the level of immersion shown in FIGS. 11B, some visual inputs from the physical environment 7000 are still provided to user 7002. In some embodiments, the representations 7004', 7006', and 7008' are provided at a lower fidelity (e.g., less focused, with less contrast, or more monochromatic) in the level of immersion shown in FIG. 11B compared to the level of immersion shown in FIG. 11A. Thus, while inputs from the physical environment 7000 are still provided to user 7002, the visibility of the external physical environment is reduced at a higher level of immersion compared to a lower level of immersion.

Rotatable input mechanism 7108, in addition to changing a level of immersion presented to user 7002, is also able to receive one or more press inputs that cause the computer system (e.g., a wearable device) to perform various operations, as described in Table 3 below.

The use of a single input device (e.g., rotatable input mechanism 7108) that accepts two (or more) different types of input (e.g., rotational inputs as a first type of input, and/or press inputs as a second type of input) reduces the number of distinct input devices that have to be provided to request or instruct performance of different functionalities. Reducing the number of input devices that have to be provided reduces manufacturing costs of the computer system, and reduces the number of components in the computer system that can fails. Reducing the number of components reduces the cost and complexity of manufacturing the computer system, and increases the reliability of the computer system. Reducing the number of input devices also reduces physical clutter on the computer system 101, freeing up more physical space on the computer system 101 and helps to prevent accidental inputs from inadvertent contacts.

Table 3 below describes the behavior of the computer system 101 in response to different operations on hardware input element 7108 (e.g., button, crown, or rotatable and depressible input element) (e.g., a hardware button, a solid-state button), in accordance with some embodiments.

| Number of presses | Device On (Worn) | Device On (Not Worn) | Device Off |
|---|---|---|---|
| 1 press | Show home UI or passthrough or exit full screen | Standby (temporary tracking state) | N/A |
| 2 presses | Force quit menu | N/A | N/A |
| 3 presses | Accessibility mode | N/A | N/A |
| Turn | Change immersion | N/A | N/A |
| Press and hold | Re-center (fade out and fade in) | N/A | N/A |

For a computer system 101 that is a wearable device (e.g., a head-mounted device, a strapped-on device, or a watch), while the wearable device is turned on and worn on the body of user 7002, in response to detecting a rotational input to rotatable input element 7108 (e.g., a bidirectional rotatable input element), a level of immersion presented by the wearable device changes in the manner described above in reference to FIGS. 11A and 11B. For example, a level of immersion increases when a rotational input in the first rotational direction is provided to rotatable input element 7108. In another example, when the wearable device is turned on but not worn on the body of a user (e.g., user 7002), in response to detecting a rotational input to rotatable input element 7108, no operation is triggered (e.g., the wearable device remains in a sleep state).

For a computer system 101 that is a wearable device (e.g., a head-mounted device, a strapped-on device, or a watch), while the wearable device is turned on and worn on the body of user 7002, in response to detecting a single press input to rotatable input element 7108, a home menu user interface is presented to user 7002, as described in reference to FIGS. 7A-7O, or an application user interface that was in an immersive or full-screen display mode when the single press input was detected exits the full-screen or immersive display mode, as described in reference to FIGS. 8A-8G. Thus, the wearable device is configured to perform different operations depending on a type of user input provided to the rotatable input element 7108 (e.g., a press input, or a rotational input).

For a computer system 101 that is a wearable device (e.g., a head-mounted device, a strapped-on device, or a watch), while the wearable device is turned on but not worn on the body of user 7002, in response to detecting a single press input to rotatable input element 7108, the wearable device transitions from a sleep state into a standby state, as described in reference to FIGS. 12A-12G2.

For a computer system 101 that is a wearable device (e.g., a head-mounted device, a strapped-on device, or a watch), while the wearable device is turned on and worn on the body of user 7002, in response to detecting two press inputs within a preset time interval (e.g., less than 3 seconds, less than 2 seconds, less than 1 second) to rotatable input element 7108, an operating system menu (e.g., a force quit menu) is presented to user 7002, as described in reference to FIG. 7O.

For a computer system 101 that is a wearable device (e.g., a head-mounted device, a strapped-on device, or a watch), while the wearable device is turned on and worn on the body of user 7002, in response to detecting three press inputs within a preset time interval (e.g., less than 5 seconds, less than 3 seconds, less than 2 second) to rotatable input element 7108, an option to enter an accessibility mode is presented to user 7002.

In some embodiments, the rotatable input mechanism 7108 is also used to re-center a field of view of user 7002. For example, instead of having a central portion of the view of field of view of user 7002 be aligned with a middle portion of the application user interface 11002, user 7002 recenters a central portion of his field of view to a different location in the three-dimensional environment 11000. For example, the new center of user 7002's field of view corresponds to a point along an intersection of representations 7004' and 7006'. In some embodiments, recentering a field of view includes a display of computer generated virtual content fading out of the user 7002's field of view at the previous center location of the user 7002's field of view and then fading in, at the newly defined center location of the field of view of user 7002, computer generated virtual content in that region. Optionally, the virtual content is presented with a higher fidelity or displayed with a higher contrast than prior to the recentering of the field of view of the user. While the wearable device is turned on and worn on the body of user 7002, a press input on the rotatable input mechanism 7108 that is held (e.g., persists) for a preset time duration (e.g., about 2 second, or about 5 second) causes the wearable device to begin the re-centering operation described above. While the press input is held, user 7002 can rotate or move her head so a central portion of her field of view is re-positioned to a new location. Upon selecting the new location, releasing the press input recenters the central portion of user 7002's field of view to the new location.

As shown in Table 3, different numbers of inputs (e.g., individual or sequential inputs) of a type distinct from rotational inputs (e.g., press inputs) cause different operations to be performed by computer system 101. For example, in some embodiments, for a single press input: (1) a home menu user interface is displayed, (2) a passthrough portion of the physical environment is provided, or (3) the application exits a full-screen mode. For two press inputs provided in close succession (e.g., within 3 seconds, within 2 seconds, within 1 second), a force quit menu is displayed. For three press inputs provided in close succession (e.g., within 5 seconds, within 3 seconds, within 2 seconds), an accessibility mode is activated, or an option to activate the accessibility mode is provided.

Using the number of press inputs to determine which operation(s) to perform reduces the number of distinct input devices that have to be provided to accomplish different. Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret more types of inputs (e.g., based on a number of press inputs) from a particular input device.

The use of a rotational input mechanism allows the user to easily provide a range of inputs, which may be a continuous range or a range that encompasses a sequence of discrete steps or values, and bidirectionality of the rotational input mechanism allows the input to be easily and intuitively varied, in either direction, without having to display additional controls to the user. The same rotational input mechanism 7108 is able to receive a second type of input (e.g., a press input) that requests or instructs performance of discrete functions (e.g., dismiss or display a user interface object). Reducing the number of input devices that have to be provided reduces physical clutter on the device, freeing up more physical space on the device and helps to prevent accidental inputs from inadvertent contacts. The use of the rotational input mechanism provides direct access to changes in immersion levels and the performance of different operations, reducing the amount of time needed to effect particular outcomes (e.g., the user does not have to navigate through menus or visually displayed control elements to make a selection for performing the operation and/or changing an immersion level), thereby improving operational efficiency of the computer system.

With respect to immersion level, increasing an immersion level can helps to lessen constraints imposed by the physical environment of the computer system. For example, a more spacious virtual or XR environment can be realistically simulated by blocking out sensory out inputs from the physical environment (e.g., blocking visual input of a small/confined room, removing (audio) echoes from a small physical space) to provide a virtual environment that is more conducive for the user to interact with an application in the three-dimensional environment 11000.

Figure 11C:
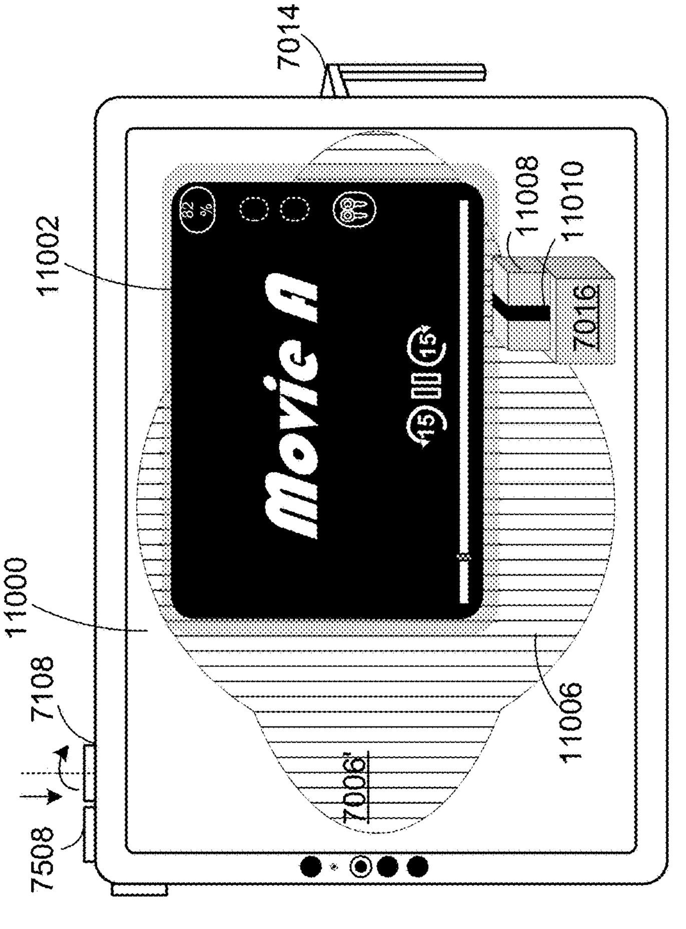
Figure 11D:
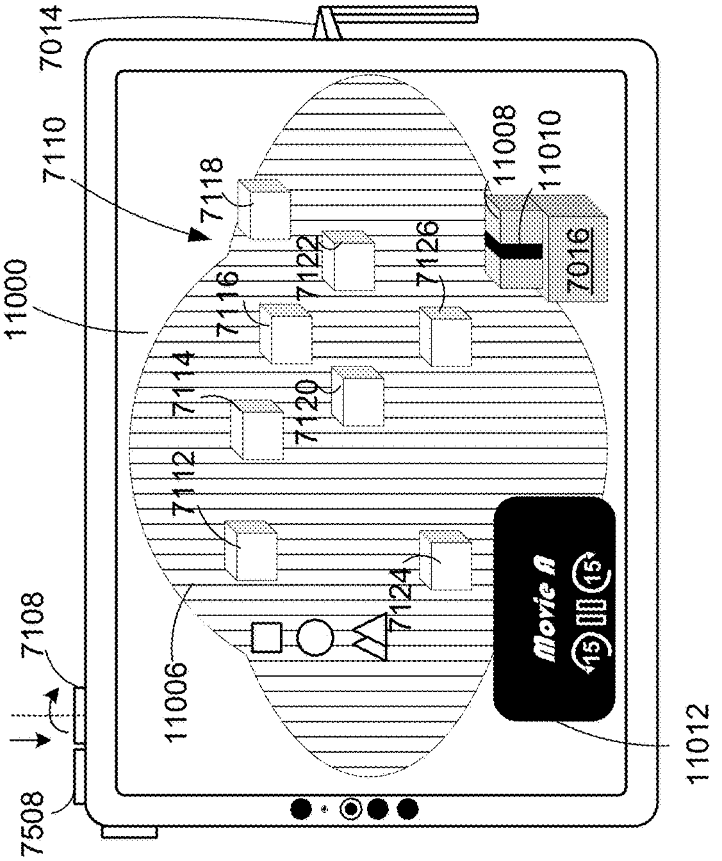

User 7002 further increases a level of immersion from the level of immersion shown in FIG. 11B by applying a further rotational input in the same direction (e.g., the first rotational direction) as that applied to increase the level of immersion from that shown in FIG. 11A to FIG. 11B. In response to a second rotational input, the immersion level associated with display of the XR environment generated by the display generation component shown in FIGS. 11B, increases to a second immersion level by displaying additional virtual content 11006 to user 7002, as shown in FIG. 11C.

For the level of immersion shown in FIG. 11C, virtual content 11006 distinct from the passthrough portion of the physical environment 7000 are displayed in a field of view of user 7002 that has an angle of view that is about ±40°. For example, for an angle of view of about ±40° from a perspective of user 7002, computer generated virtual content is displayed starting at an angle of about 40° to the left, to about 40° to the right, and from about 40° above, to about 40° below an axis of user 7002 (e.g., a sagittal axis of user 7002). In some embodiments, computer generated virtual content occupies (e.g., completely occupies) the field of view within the angle of view. As shown in FIG. 11C, the three-dimensional environment 11000 displayed in FIG. 11C is without any representation of the physical environment 7000. In some embodiments, computer generated virtual content partially occupies a portion of the field of view within the angle of view, and no input from physical environment 7000 of computer system 101 is provided in the field of view within the angle of view.

In additional to virtual content that substantially and/or contiguously fill up or occupy user 7002's field of view, starting from a central portion of the user's field of view, additional discrete virtual content can also be provided at more peripheral regions of user 7002's field of view. For example, second box 11008 having ribbon 11010 is placed on top of box 7016 at the second immersion level shown in FIG. 11C. In this example, none of box 7016, second box 11008, or ribbon 11010 have any correspondence in the physical environment 7000.

In some embodiments, virtual content is displayed with a different level of fidelity (e.g., the same virtual content is displayed at a higher fidelity (e.g., in sharper contrast, at a higher resolution, and/or with a more realistic representation) at the second immersion level shown in FIG. 11C than the immersion level shown in FIGS. 11B. In another example, the same virtual content is displayed at a lower fidelity (e.g., in lower contrast, at a lower resolution, and/or with a less realistic representation, or blends more into the display of the XR environment) at a lower immersion level, than that shown in FIG. 11B. In some embodiments, computer generated virtual content is eliminated from an immersion level that is a lower immersion level (not shown in the figures) than the immersion level shown in FIG. 11B.

In some embodiments, at a highest level of immersion, the angle of view of computer generated virtual content displayed to user 7002 may be ±90°, covering a full angular range of 180° (e.g., spanning from a position on a left shoulder of user 7002 to a position on a right shoulder of user 7002). When user 7002 rotates her head, a newly oriented angular range of 180° is provided at the new position of her head, effectively providing a 360° range for the angle of view (e.g., providing a visual experience similar to that offered at a planetarium). Similarly, audio sources are positioned at suitable locations (e.g., simulated locations in the XR environment) to simulate sound sources that match the visual angle of view for an experience at a respective level of immersion.

The use of a rotational input mechanism allows the user to provide a range of inputs, continuous or discrete as described above, and observe direct visual changes in the XR environment in response to rotational inputs made using the rotational input mechanism, without having to display additional controls to the user. The use of the rotational input mechanism provides direct access to changes in immersion levels and the performance of different operations, reducing the amount of time needed to effect particular outcomes (e.g., the user does not have to navigate through menus or visually displayed control elements to make a selection for changing an immersion level), thereby improving operational efficiency of the computer system.

When user 7002 provides a third rotational input to the rotatable input element 7108 in a rotational direction opposite to that provided in the second rotational input, an immersion level of the three-dimensional environment 11000 decreases from the second immersion level shown in FIG. 11C to the lower immersion level shown in FIG. 11B. While computer system 101 is displaying the three-dimensional environment 11000 with the immersion level shown in FIG. 11B to user 7002, providing a fourth rotational input to the rotatable input element 7108 in the same direction as third rotational input further decreases the immersion level to that shown in FIG. 11A, in which passthrough portions are once again provided to user 7002.

A rotatable input element that is configured to receive bidirectional inputs allows changes in the immersion level to be presented to a user be based on a direction of rotation of the rotational input, without having to display additional controls to the user. For example, in accordance with a determination that the first input is a rotational input in a first direction, the immersion level presented to the user 7002 is increased. Conversely, in accordance with a determination that the first input is a rotational input in a second direction different from (e.g., opposite to) the first direction, the immersion level presented to the user 7002 is decreased. For example, the first direction is clockwise and the second direction is counterclockwise (or vice versa), a clockwise rotation increases the level of immersion, and a counterclockwise rotation decreases the level of immersion (or vice versa).

In some embodiments, while computer system 101 is displaying the immersion level shown in FIG. 11A to user 7002, providing a rotational input that is substantially equal in magnitude to the sum of the rotational angle turned through by the first rotational input and the second rotational input in the first rotational direction changes the level of immersion from that shown in FIG. 11A, to that shown in FIG. 11C, while transitioning (e.g., briefly) through the immersion level shown in FIG. 11B. Thus, the amount of change in the immersion level optionally is based on a magnitude of rotation and/or has a direction based on a direction of rotation.

The use of a rotational input mechanism allows the user to provide a continuous or semi-continuous range (e.g., five (or eight or ten) or more distinct input values or levels) of inputs, and bidirectionality of the rotational input mechanism allows the input to be easily and intuitively varied, in either direction, without having to display additional controls to the user. In some embodiments, a number of presses is matched to a level of immersion (e.g., three presses correspond to a higher level of immersion compared to two presses.

While consuming media (e.g., watching a video) via the application user interface 11002 at the second immersion level, as shown in FIG. 11C, user 7002 provides a user input to the rotatable input element 7108. In response to detecting the user input to the rotatable input element 7108 as a press input (e.g., computer system 101 determines that a press input is provided to rotatable input element 7108), and without changing the level of immersion (e.g., the level of immersion remains at the second immersion level), the display generation component of computer system 101 presents a home menu user interface 7110 to user 7002 in the three-dimensional environment 11000, at the second immersion level, as shown in FIG. 11D. In some embodiments, the home menu user interface 7110 is displayed in a foreground, closer to user 7002 than other objects or features of the XR environment. In some embodiments, the home menu user interface 7110 is presented concurrently with other content, such as passthrough content or virtual content in a 3D environment, outside the home menu user interface 7110.

The ability to navigate the home menu user interface 7110 (e.g., by accessing a collection of applications or a collection of contacts capable of interacting with the user) while an XR environment continues to be displayed reduces the amount of time needed to complete the user's desired operation, independently of the current display mode (e.g., VR or AR). Navigation of the home menu user interface is not restricted to specific display modes, and no additional controls need to be displayed to the user for accessing the home menu user interface.

In some embodiments, based on a type of application user interface that is presented to the user interface prior to detecting the press input to the rotatable input element 7108, application user interface 11002 is dismissed by the single press input (e.g., prior to home menu user interface 7110 being displayed, or concurrently with displaying home menu user interface 7110), and replaced by mini player user interface 11012, as shown in FIG. 11D.

Mini player user interface 11012, shown in FIG. 11D, occupies a smaller region of the three-dimensional environment 11000 compared to application user interface 11002, shown in FIG. 11C. In some embodiments, mini player user interface 11012 is displaced to a more peripheral portion of the three-dimensional environment 11000 than application user interface 11002, which was displayed in a central portion of a field of view of user 7002. In some embodiments, mini player user interface 11012 is displayed at substantially the same position as application user interface 11002 (e.g., a central location of application user interface 11002 substantially coincides with a central location of mini player user interface 11012).

Presenting mini player user interface 11012 provides a way for user 7002 to multitask and continue a media experience (at least in some capacity) while navigating the home menu user interface 7110, which improves performance and efficiency of the computer system 101. Displaying mini player user interface 11012 (e.g., a video Picture-in-Picture (PiP) player that optionally includes a representation of a current video frame) allows a user control over the media experience (e.g., by providing playback controls in the min-player), and/or indicates to the user a current "location" of a user's media experience (e.g., by displaying a time index, or, for video content, a representation of a current video frame) while the user navigates the home menu user interface 7110, without displaying additional controls. In some embodiments, display of computer-generated virtual content (e.g., box 7016, second box 11008, and/or ribbon 11010) is maintained when the home menu user interface 7110 is displayed.

Figure 11F:
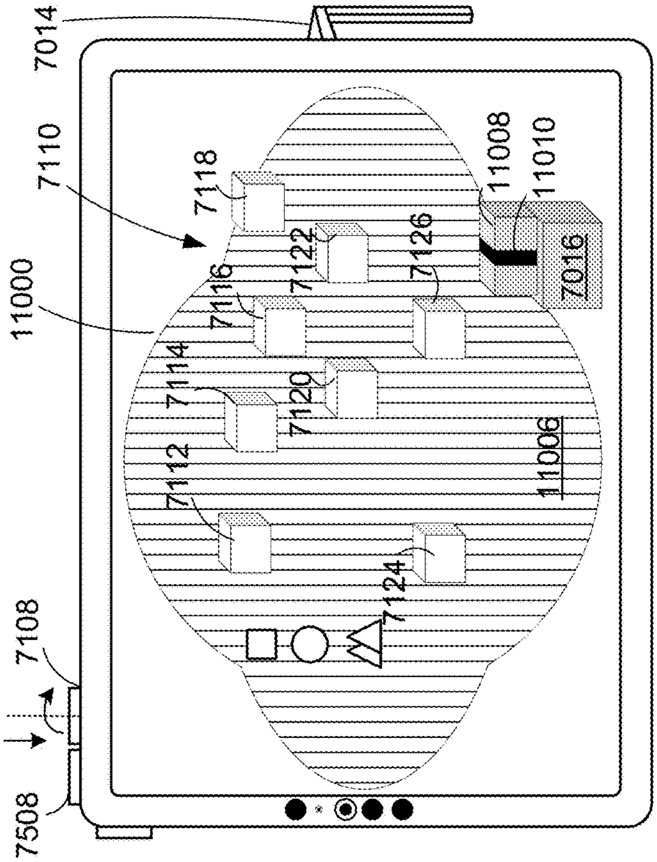
Figure 11E:
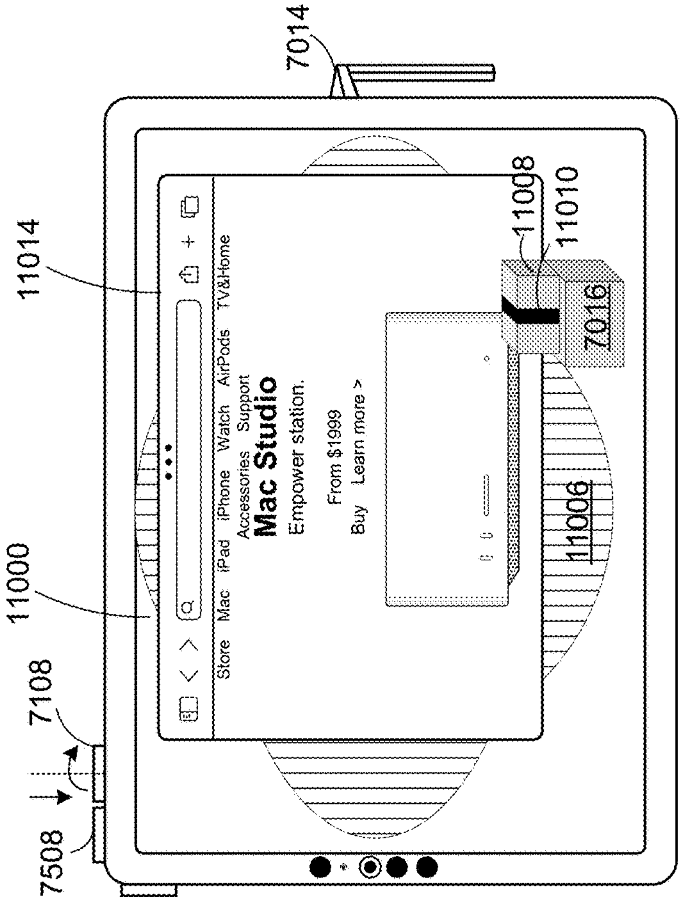

FIG. 11E shows another application user interface 11014 displayed at the same immersion level (e.g., second immersion level) as that shown in FIG. 11C. While browsing a webpage via the application user interface 11014 at the second immersion level, as shown in FIG. 11E, user 7002 provides a user input to the rotatable input element 7108. In response to detecting the user input to the rotatable input element 7108 as a press input (e.g., computer system 101 determines that a press input is provided to rotatable input element 7108), and without changing the level of immersion (e.g., the level of immersion remains at the second immersion level), the display generation component of computer system 101 presents a home menu user interface 7110 to user 7002 in the three-dimensional environment 11000, at the second immersion level, as shown in FIG. 11F. In some embodiments, the home menu user interface 7110 is displayed in a central portion of a user's field of view, e.g., in the middle portion 7104 of the three-dimensional environment 11000, and thus is not displayed below a previous display of the application user interface 11014.

In some embodiments, application user interface 11014 is dismissed by the single press input (e.g., prior to home menu user interface 7110 being displayed, or concurrently to home menu user interface 7110 being displayed), as shown in FIG. 11F. In some embodiments, dismissing an active application (e.g., application user interface 11014) using the single press input includes running the application (e.g., associated with application user interface 11014) in the background of computer system 101, and not terminating the application.

In some embodiments, although not shown in FIG. 11F, virtual objects like box 7016, second box 11008 and/or ribbon 11010 are dismissed in response to the computer system 101 detecting the press input to the rotatable input element 7108. In some embodiments, dismissing a virtual object further includes displaying a respective passthrough portion of the physical environment 7000 of computer system 101. In some embodiments, all virtual objects are dismissed and the computer system is transitioned to (or remains in) the lowest level of immersion (e.g., no immersion) in response to the press input to the rotatable input element 7108. In some embodiments, in response to the press input to the rotatable input element 7108, the immersion level decreases (e.g., more aspects of the physical environment are presented to user 7002) but virtual content from the application running in a foreground is still displayed.

As described in Table 3 and explained with respect to FIG. 7O, in response to detecting two press inputs in close succession (e.g., two press inputs within 2 seconds of each other, two press inputs within 1 second of each other, two press inputs within 0.5 seconds of each other) to rotatable input element 7108, an application management user interface (e.g., system interface 7180) is presented in virtual three-dimensional environment as shown in FIG. 7O. In some embodiments, system interface 7180 is overlaid on the applications (which may include one or more, or two or more, applications) running in the foreground (e.g., audio player/music application, and web browser application, as shown in FIGS. 7N and 7O) in the three-dimensional environment 7128 (e.g., presented at a location in a field of view of user 7002 that is closer to user 7002 than the two applications running in the foreground). In some embodiments, the application management user interface is a system interface that allows multitasking on the computer system 101.

As described with reference to Table 3, in response to detecting three press inputs in close succession (e.g., three press inputs within 4 seconds, three press inputs within 3 seconds, three press inputs within 1 second) to rotatable input element 7108, an accessibility mode is activated, or an option to enter an accessibility mode is presented to user 7002. In some embodiments, the option to enter an accessibility mode is overlaid on the applications (which may include one or more, or two or more, applications) running in the foreground (e.g., audio player/music application, and web browser application). In some embodiments, the three press inputs toggle between an accessibility mode being active and the accessibility mode being inactive, or displays an option for enabling or disabling an accessibility mode.

As described in Table 3, for a computer system 101 that is a wearable device (e.g., a head-mounted device, a strapped-on device, or a watch), while the wearable device is turned on and worn on the body of user 7002, in response to detecting a single press input to rotatable input element 7108 that is held (e.g., persists) for a first time period (e.g., more than 2 second, more than 4 seconds, more than 6 seconds), a field of view of user 7002 is re-centered. In some embodiments, re-centering a field of view includes a display of computer generated virtual content fading out of the user 7002's field of view at a previous center location of the user 7002's field of view and fading in, at a newly defined center location of the field of view of user 7002, the computer generated virtual content. Optionally, the virtual content is presented with a higher fidelity or with a higher contrast than prior to the recentering of the field of view of the user. In some embodiments, re-centering user 7002's field of view includes redisplaying in the XR environment a plurality of previously displayed user interface elements (e.g., home menu or home screen user interface elements). In some embodiments, the new center of the field of view of user 7002 is selected, as the user 7002 faces or focuses on the new center of the field of view, by terminating the press input (e.g., when user 7002 stops applying a press input to rotatable input element 7108).

The same rotational input mechanism is able to receive a second type of input (e.g., a press input) that requests or instructs performance of discrete/binary-type (e.g., on or off) functions (e.g., dismissing an active application; entering an accessibility mode, or dismissing a virtual object), as described in reference to Table 3. Using different numbers of press inputs to determine which of two or more different operation(s) to perform reduces the number of distinct input devices that have to be provided to accomplish different tasks.

In some embodiments, computer system 101 is also configured to perform different operations for press inputs of different durations. For example, as explained in reference to Table 3, pressing and holding the rotatable input element 7108 causes the display to re-center (e.g., fade out and fade in), whereas a tap or short, single press input causes (1) the home menu user interface to be displayed, (2) a passthrough portion of the physical environment to be provided, or (3) an application to exit a full-screen mode.

The use of an input duration to determine which system operations (e.g., operations not specific to a particular application) to perform reduces the number of distinct input devices that have to be provided to accomplish different tasks. Reducing the number of input devices also reduces the need to provide additional hardware wiring within the device, and instead, the processor can be programmed to interpret more types of inputs (e.g., a short press, a long press and hold) from a particular input device.

As explained with reference to Table 2, the second type of input (e.g., press input) for the hardware input element 7108 (e.g., button, crown, or rotatable and depressible input element) can be used in a chorded input for concurrently detected inputs with other input devices (e.g., button 7508) to request or instruct performance of a third operation that depends on a duration and/or pattern of inputs. In some embodiments, the inputs to the hardware input element 7108 (e.g., button, crown, or rotatable and depressible input element) are concurrent or overlapping with inputs to the second input device (e.g., the button 7508, or a camera), and the inputs to the hardware input element 7108 (e.g., button, crown, or rotatable and depressible input element) are detected in conjunction with the inputs to the second input device (e.g., the button 7508). Chorded inputs can be concurrent or overlapping inputs. The use of chorded inputs enables system operations (e.g., operations not specific to a particular application) such as capturing screenshots, powering off, restarting the computer and resetting the computer system to be performed without displaying additional controls.

The combined use of more than one input device to request or instruct respective system operations (e.g., operations not specific to a particular application) reduces the number of distinct input devices that have to be provided to accomplish different tasks (e.g., N input devices can be used to request or instruct M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret chorded inputs from a smaller number of input devices.

FIGS. 12A-12G2 illustrate examples of controlling a computer system based on physical positioning and changes in the physical position of the computer system relative to a user, and a state of the computer system. FIG. 18 is a flow diagram of an example method 1800 for controlling a computer system based on physical positioning and changes in the physical position of the computer system relative to a user, and the state of the computer system. The user interfaces in FIGS. 12A-12G2 are used to illustrate the processes described below, including the processes in FIG. 18.

FIG. 12A shows a state diagram 12000 associated with a computer system 101. As shown in the examples depicted in FIGS. 12B1-12G2 (e.g., FIGS. 12B1-12G1 (FIGS. 12B1, 12C1, 12D1, 12E1, 12F1 and 12G1) and FIGS. 12B2-12G2 (FIGS. 12B2, 12C2, 12D2, 12E2, 12F2, 12G2)), in some embodiments, display generation component 7100 of computer system 101 is a watch 12010 (e.g., FIGS. 12B1-12G1) or HMD 12011 (e.g., FIGS. 12B2-12G2) (e.g., and/or HMD 7100*a*) worn by user 7002. In some embodiments, the display generation component of computer system 101 is a head-mounted display worn on user 7002's head (e.g., what is shown in FIGS. 12B-12G2 as being visible via display generation component 7100 of computer system 101 corresponds to user 7002's field of view when wearing a head-mounted display, as illustrated in FIGS. 12B2-12G2). In some embodiments, the computer system 101 is a wearable device, such as watch 12010, a pair of head phones, a head-mounted device, or a strapped-on device.

In some embodiments, the display generation component is a standalone display, a projector, or another type of display. In some embodiments, the computer system is in communication with one or more input devices, including biometric sensors, cameras or other sensors and input devices that detect movement of the user's hand(s), movement of the user's body as whole, and/or movement of the user's head in the physical environment. The one or more input devices also optionally include a pulse sensor (e.g., for measuring the rate of the user's pulse), a thermal sensor (e.g., for measuring the user's temperature), and inertial measurement sensors (e.g., for detecting or measuring movement of the user). In some embodiments, the one or more input devices detect the movement and the current postures, orientations, and positions of the user's hand(s), face, and/or body as a whole. In some embodiments, the one or more input devices includes a button, a dial, a crown, a switch, a movable component, or a solid state component; e.g., the one of more input devices may include a device that detects localized sensor input such as intensity or force sensor input, and in some embodiments computer system 101 uses that input to trigger corresponding operations and optionally provides tactile feedback such as haptic feedback corresponding to the detected inputs.

In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

State diagram 12000, shown in FIG. 12A, includes four states of a computer system 101. In some embodiments, computer system 101 is a watch. The computer system is in first state 12002, or a sleep state, when it is off-body (e.g., user 7002 is not wearing the computer system (e.g., a watch) on a wrist or another portion of the user 7002's body). When the computer system is lifted, or a side button of the computer system is pressed, or when the computer system receives an incoming call invitation (e.g., phone call), the watch transitions from the first state 12002 (sleep) to second state 12004, or a standby state. The computer system is off-body in both first state 12002 and second state 12004.

When the computer system (e.g., watch) is put on the body of user 7002, and the computer system detects biometric feedback from user 7002, the computer system transitions to third state 12006. Biometric feedback may include sensor data detected by the computer system that indicates a pulse of user 7002, a skin temperature of user 7002, gaze location, iris pattern, facial expression, eye color and/or shape, or other biometric or physiological measurement of user 7002. In this third state 12006, the computer system is on-body but not yet authenticated. The computer system enters an authenticated state, or fourth state 12008, upon biometric authentication, a passcode entry, or activation of a sharing mode is activated on the computer system.

While the computer system is in fourth state 12008, if the computer system no longer detects any biometric feedback from user 7002, the computer system determines that it is no longer being worn on a body of user 7002 and transitions from fourth state 12008 directly to second state 12004.

Similarly, when the computer system is in third state 12006, and it no longer detects any biometric feedback from user 7002, and the computer system determines that it is no longer being worn on a body of user 7002, the computer system transitions to second state 12004.

After a timeout period (e.g., a minute, five minutes, 10 minutes), the computer system transitions from second state 12004 to first (e.g., sleep or low power) state 12002.

In some embodiments, computer system 101 is a head-mounted device. When the head-mounted device is off-head (e.g., not positioned on a head of user 7002, covering the user 7002's eyes), the head-mounted device is in either first state 12002 or second state 12004. When user 7002 dons the head-mounted device (e.g., positioning the head mounted device on a head of user 7002, covering user 7002's eyes, such that a user interface generated by one or more display generation components of the head-mounted device is visible to user 7002), the head-mounted device transitions to third state 12006. Upon biometric verification of user 7002 (e.g., eye tracking of user 7002, or facial recognition of user 7002), the head-mounted device transitions from third state 12006 to fourth state 12008. When user 7002 doffs the head-mounted device (e.g., removes the head mounted device from a head of user 7002), and the device detects a loss of biometric feedback from user 7002, the head-mount device transitions from fourth state 12008 to second state 12004. After a timeout period in which the head-mounted device fails to transition to third state 12006 or fourth state 12008, the head-mounted device transitions to first state 12002, or the sleep state.

Table 4 below describes the behavior of the computer system 101 in each of the four states described in FIG. 12A.

-continued

| First (e.g., sleep, or low power) state 12002 | Second (e.g., lower power, standby, or hibernation) state 12004 | Third (on-body unauthenticated) state 12006 | Fourth (on-body authenticated) state 12008 |
|---|---|---|---|
| Screen off | | Screen on | |
| Over ear audio off, speaker audio available | | Over ear audio on, speaker audio not available | |
| Applications are not active | | Applications are not active until authenticated (no lock screen apps) | Applications are active |
| Hand tracking off | | Hand tracking on | |
| Gaze tracking and world tracking off | Gaze tracking and world tracking on | | |
| Applications backgrounded, recording session terminated | | | Focused app is foregrounded, phone call, video call/conferencing, media session, screen mirroring resume |
| Phone call, video call/ conferencing, media session, screen mirroring terminated. | Phone call and video call/conferencing muted, terminated after timeout; Media is paused, screen mirroring is paused, terminated after timeout. | | |

First (e.g., sleep, or low power) state 12002 differs from second (e.g., low power, standby, or hibernation) state 12004 in that, for example, first (e.g., sleep, or low power) state 12002 uses less power than second (e.g., lower power, standby, or hibernation) state 12004 but also takes longer to wake from. The computer system 101 reduces a frequency of sensor measurements and/or sensor measurement processing (e.g., sensors for gaze tracking, and sensors for world tracking) to a greater degree during first (e.g., sleep, or low power) state 12002 compared to second (e.g., lower power, standby, or hibernation) state 12004.

Fourth (on-body authenticated) state 12008 differs from the second (e.g., lower power, standby, or hibernation) state 12004 in that the fourth state 12008 consumes more power compared to the second state 12004 (e.g., a display generation component (e.g., a screen) on the computer system 101 is turned off, over ear audio is off; hand tracking is off in the second state, but are all turned on in the fourth (on-body authenticated state)). Fourth (on-body authenticated) state 12008 differs from the second (e.g., low power, standby, or hibernation) state 12004 in that the fourth state 12008 allows significantly more user interactions compared to second (e.g., low power, standby, or hibernation) state 12004 (e.g., applications run in the background in the second state 12004, but run in the foreground in the fourth state 12008). Separately, speaker audio is available in the second (e.g., low power, standby, or hibernation) state 12004, but not available in fourth (on-body authenticated) state 12008.

Fourth (on-body authenticated) state 12008 differs from the third (e.g., on-body unauthenticated) state 12006 in that applications are not active in the third (e.g., on-body unauthenticated) state 12006, until the user is authenticated. Various applications (e.g., phone calls, video call/conferencing, media delivery, screen mirroring) are also paused in the third (e.g., on-body unauthenticated) state 12006 but are resumed or continues running in the fourth (on-body authenticated) state 12008.

Fourth (on-body authenticated) state 12008 differs from the first (e.g., sleep, or low power) state 12002 in that power consumption is much lower in the first (e.g., sleep, or low power) state 12002. For example, the screen is off, over ear audio is off, applications are not active, gaze tracking, hand tracking, and world tracking are off, application are backgrounded or terminated in first (e.g., sleep, or low power) state 12002 but the screen is on, over ear audio is on, applications are active and running in the foreground, gaze tracking, hand tracking, and world tracking are on, in fourth (on-body authenticated) state 12008.

Third (on-body unauthenticated) state 12006 differs from the second (e.g., low power, standby, or hibernation) state 12004 in that the third (on-body unauthenticated) state 12006 consumes more power compared to the second state 12004 (e.g., a display generation component (e.g., a screen) on the computer system 101 is turned off, over ear audio is off, hand tracking is off in the second state, but these are all turned on in the third (on-body unauthenticated) state 12006).

Third (on-body unauthenticated) state 12006 differs from the first (e.g., sleep, or low power) state 12002 in that the third (on-body unauthenticated) state 12006 consumes more power compared to the first (e.g., sleep, or low power) state 12002 (e.g., a display generation component (e.g., a screen) on the computer system 101 is turned off, over ear audio is off, hand tracking, gaze tracking, world tracking are all off in the first (e.g., sleep, or low power) state 12002, but all are turned on in the third (on-body unauthenticated) state 12006). Various applications (e.g., phone calls, video call/conferencing, media delivery, screen mirroring) are terminated in first (e.g., sleep, or low power) state 12002 but are paused in the third (e.g., on-body unauthenticated) state 12006.

When the computer system 101 corresponds to a watch, in both first (e.g., sleep, or low power) state 12002 and second (e.g., low power, standby, or hibernation) state 12004, the display generation component 7100 of the watch (e.g., screen of the watch) is turned off. In contrast, in both third state 12006 and fourth state 12008, the display generation component 7100 of the watch (e.g., screen of the watch) is turned on.

When the computer system 101 corresponds to a head-mounted device, in both first (e.g., sleep, sleep, or low power) state 12002 and second (e.g., low power, standby, or hibernation) state 12004, over-ear audio of the head-mounted device is off, and speaker audio is available. In both third state 12006 and fourth state 12008, over-ear audio of the head-mounted device is on, and speaker audio is unavailable. In some embodiments, speaker audio refers to an audio output component on the head-mounted device that broadcasts sound waves over a larger spatial region (e.g., like a speaker device), when compared to over-ear audio that delivers sound waves closer to a user's ear(s). For example, when the head-mounted device is off of the body of the user in the first (e.g., sleep, or low power) state 12002, or second (e.g., low power, standby, or hibernation) state 12004, the over-ear audio is unavailable as sound waves are not delivered close to a user's ear(s). Instead, the head-mounted device can function as a speaker device, and broadcasts audio (sound waves) over a larger spatial region.

In both first (e.g., sleep, or low power) state 12002 and second (e.g., low power, standby, or hibernation) state 12004, no software application is active on the computer system 101. In third state 12006, software applications are not active until user 7002 is authenticated. In other words, no applications run while the screen is locked (e.g., no lock screen applications are executed and, more generally, software applications on the computer system do not produce user interfaces or provide information to the user). In fourth state 12008, one or more software applications are active on the computer system 101.

In both first (e.g., sleep, or low power) state 12002 and second (e.g., low power, standby, or hibernation) state 12004, hand tracking functionality of computer system 101 is turned off. In contrast, in both third state 12006 and fourth state 12008, hand tracking functionality of computer system 101 is turned on.

The absence of gaze tracking and world tracking in first state 12002 is a distinction between the behavior of computer system 101 in first (e.g., sleep, or low power) state 12002 and second (e.g., low power, standby, or hibernation) state 12004. In some embodiments, gaze tracking includes detecting presence of eyes (e.g., using a camera to capture images and image processing techniques to determine if one or more user 7002's eyes have been captured in any images). In some embodiments, world tracking includes using optical tracking to determine a position and orientation of the computer system 101. In some embodiments, world tracking includes using inertial tracking from accelerometers and gyroscopes, and/or other positioning sensors, to determine a position of the computer system 101 in the physical three-dimensional environment in which the computer system 101 is located. In some embodiments, a computer system 101 in second state 12004 is already warming up and sensing its environment, and responds more quickly (e.g., recognizes user 7002 more quickly, and/or provides visual and audio output to user 7002 more quickly) when user 7002 dons the computer system 101.

In first state 12002, second state 12004, and third state 12006, software applications running on computer system 101 continue running in the background ("backgrounded") and any recording sessions that may have been ongoing in fourth state 12008 are terminated when computer system 101 transitions to any of first state 12002, second state 12004, third state 12006.

In first state 12002, phone calls, video call or conferencing sessions, media sessions (e.g., music, video, or podcast), and any screen mirroring of computer system 101 are all terminated. In second state 12004 and third state 12006, phone calls and video call or conferencing sessions are muted and terminated after a timeout period (e.g., about 1 minutes, about 5 minutes, less than 10 minutes). Media sessions (e.g., music, video, or podcast) are paused. Any screen mirroring of computer system 101 is paused and terminated after a timeout period. In some embodiments, paused media sessions are terminated after a timeout period.

In fourth state 12008, the display generation component 7100 of computer system 101 presents in the foreground an application that is in focus (sometimes herein called a "focused app" that is "foregrounded"). Phone calls, video call or conferencing sessions, media sessions, and screen mirroring all resume when computer system 101 transitions from any of first state 12002, second state 12004, or third state 12006, to fourth state 12008. In screen mirroring, the visual output generated by the display generation component 7100 is replicated on a different display unit (e.g., another screen, or presented by a projector) external to (e.g., not a part of) computer system 101. In some embodiments, the display generation component also displays an indication (e.g., a predefined icon or object) that mirroring of the output from the display generation component is paused. Screen mirroring has been described above in reference to FIG. 9A. In some embodiments, other users with whom user 7002 performs screen mirroring are participants in a communication session with user 7002. Real-time communication sessions are described in reference to FIG. 9D. Providing an indication that mirroring of the output from the display generation component is paused automatically communicates a disruption to other participants, without requiring an active input from the authorized user. The indication helps to minimize confusion and reduces the chance of other participants' misunderstanding the pause in screen mirroring as requiring troubleshooting.

FIGS. 12B1 and 12B2 show computer system (e.g., watch 12010 or HMD 12011) on a wrist of user 7002 and/or on a head of user 7002. In FIGS. 12B1-12G2, HMD 12011 is optionally showing a view of content displayed in a right optical module of an HMD, which would typically be paired with a left optical module showing a slight variation of the content shown in right optical module in order to generate the appearance of stereoscopic depth to the displayed content. Computer system (e.g., watch 12010 or HMD 12011) includes crown 12014 that is configured to receive both rotational inputs (as indicated by the curved arrow) and press inputs. Computer system (e.g., watch 12010 or HMD 12011) also includes button 12016. In some embodiments, crown 12014 and/or button 12016 correspond to hardware input element 7108 described above. The displayed application interface 12018 in this example includes an audio player having playback controls. FIGS. 12B1 and 12B2 show computer system (e.g., watch 12010 or HMD 12011) in fourth state 12008 because the audio player is active, and the audio player application, having the application interface 12018, is presented in the foreground.

FIGS. 12C1 and 12C2 show computer system (e.g., watch 12010 or HMD 12011) after it is taken off the wrist of user 7002 such that computer system (e.g., watch 12010 or HMD 12011) is off-body (e.g., computer system (e.g., watch 12010 or HMD 12011) is not in contact with any part of user 7002's body). Application interface 12018 shows that audio player is now paused. FIGS. 12C1 and 12C2 show computer system (e.g., watch 12010 or HMD 12011) in second state 12004 as the media session is paused, but not yet terminated. After a timeout period (e.g., less than 10 minutes, less than 5 minutes), if computer system (e.g., watch 12010 or HMD 12011) does not transition to third state 12006 or fourth state 12008, computer system (e.g., watch 12010 or HMD 12011) transitions to first (e.g., sleep, or low power) state 12002 and the media application (e.g., audio player application) terminates.

In general, while a session (e.g., a media consumption session, a recording session, a content-sharing session) in an application (e.g., a media application, a conferencing application, a phone application, a gaming application, a web content browsing application, or other native application or third-party application) is active (e.g., in a foreground of the user interface) and while the wearable device is being worn, in response to the wearable device detecting a first signal indicating that the wearable device has been taken off (e.g., the first signal is a signal from a biometric sensor. For example, the biometric sensor may include a camera and an image processing component, and when the image processing component is unable to locate the presence of the user's eyes, or any eyes, in an image captured by the camera, the biometric sensor outputs a control signal that the wearable device has not been placed in front of a user's eye. In another example, the biometric sensor may be a pulse sensor (e.g., for detecting the pulse of a user) that, when the wearable device has been taken off, outputs a signal to indicate that no pulse has been detected. In another example, the first signal is a control signal provided by an inertial measurement device (e.g., an accelerometer, gyroscope, and/or inertial measurement unit), and when the inertial measurement device (or the computer system, using information from the inertial measurement device) determines that the inertial measurement device it is oriented in a way that is incompatible with the wearable device being worn (e.g., the wearable device is positioned upside down, the wearable device is lying on its side, or a camera in the wearable device, due to the orientation of the wearable device, is pointed skyward or to the ground), the inertial measurement device outputs the first signal. In yet another example, the first signal is a control signal provided by a thermal sensor, for example, a thermal sensor that detects when it has been removed from a source of body heat of the wearer. In some embodiments, signals from multiple biometric sensors are jointly analyzed to determine if the wearable device is being worn. For example, when a user places the wearable device on her forehead, the camera will not detect the presence of any eyes, but the thermal sensor will still detect body heat and the inertial measurement device will detect an "upright" position of the wearable device, the wearable device transitions to a different state (e.g., a first (e.g., sleep, or low power) state 12002 or a second (e.g., low power, standby, or hibernation) state 12004).

FIGS. 12D1 and 12D2 show computer system (e.g., watch 12010 or HMD 12011) in first state 12002, being off-body, and resting on its side. Computer system (e.g., watch 12010 or HMD 12011) is in first (e.g., sleep, or low power) state 12002, and the screen on computer system (e.g., watch 12010 or HMD 12011) is off. The screen of computer system (e.g., watch 12010 or HMD 12011) is off, even though speaker audio is available. Applications are not active on the computer system (e.g., watch 12010 or HMD 12011) when it is in first (sleep) state 12002. Computer system (e.g., watch 12010 or HMD 12011) is not tracking any biometric input from user 7002 (e.g., no hand tracking, no gaze tracking). In addition, in the first (e.g., sleep, or low power) state 12002, computer system (e.g., watch 12010 or HMD 12011) is also not tracking its external environment. Recording sessions, phone calls, video call or conferencing sessions, media sessions, and screen mirroring are all turned off (e.g., not executing) when computer system (e.g., watch 12010 or HMD 12011) is in first state 12002. Any open applications on computer system (e.g., watch 12010 or HMD 12011) run in the background in first state 12002. In some embodiments, the applications running in the background are terminated after a timeout period (e.g., after an hour, after 30 minutes, after 15 minutes).

In some embodiments, computer system 101 is a head-mounted device. In first state 12002 and second state 12004, the display generation component 7100 of the head-mounted device is turned off and no display is provided to user 7002. In some embodiments, the head-mounted device includes audio outlets that direct sound towards user 7002's ears. Such audio outlets provide over ear audio to user 7002. In some embodiments, the head-mounted device includes audio outlets that broadcast sound to a wider region from the head-mounted device. Such audio outlets provide speaker audio. In first state 12002 and second state 12004, the head-mounted device is off-head from user 7002 (e.g., user 7002 does not don the head-mounted device), and the over ear audio is off while speaker audio is available. In some embodiments or circumstances, such as when the computer system 101 (e.g., head-mounted device) is receiving audio from a source that provides spatial audio (e.g., while the user is watching a movie or participating in a shared audio or video session that includes spatial audio), audio provided to the user by computer system 101 is spatial audio. Spatial audio provides audio to the user at simulated locations in the three-dimensional environment in which the computer system (e.g., head-mounted device) is located.

Applications are not active on the head-mounted device when it is in first (e.g., sleep, or low power) state 12002 and second (e.g., low power, standby, or hibernation) state 12004. Any applications that are active prior to the head-mounted device transitioning to the first (e.g., sleep, or low power) state 12002 or second (e.g., low power, standby, or hibernation) state 12004 switches to run in the background. Recording sessions, phone calls, video call or conferencing sessions, media session, and screen mirroring running on the head-mounted device are all terminated or turned off when the head-mounted device is in first state 12002.

Hand tracking is not activated when the head-mounted device is in first (e.g., sleep, or low power) state 12002 and second (e.g., low power, standby, or hibernation) state 12004. In some embodiments, hand tracking is performed by an optical or infrared camera provided in an outward facing fashion on the head-mounted device to image user 7002's hand.

In first (e.g., sleep, or low power) state 12002, the head-mounted device also does not detect a device context. Detecting a device context can include performing gaze tracking or world tracking. In some embodiments, gaze tracking is performed by an optical or infrared camera that is provided in an inward facing fashion on the head-mounted device to sense user 7002's eyes. Once user 7002's eyes are detected, movements of the eyes are followed to track the user 7002's gaze. In some embodiments, world tracking (or world detection) is performed by one or more inertia measurement devices (e.g., one or more accelerometer, gyroscopes, and/or inertial measurement units) provided within the head-mounted device. In some embodiments, world tracking is performed by an optical or infrared camera provided in an outward facing fashion on the head-mounted device to image an external environment user 7002 is in.

In response to detecting computer system (e.g., watch 12010 or HMD 12011) being lifted, watch 12012 transitions from first state 12002 to second state 12004, as shown in FIGS. 12E1 and 12E2. Computer system (e.g., watch 12010 or HMD 12011) transitions to second state 12004 when the watch detects that it has been lifted. Optionally, computer system (e.g., watch 12010 or HMD 12011) also transitions to second (e.g., low power, standby, or hibernation) state 12004 when computer system (e.g., watch 12010 or HMD 12011) detects a press input to button 12016 or a press input to crown 12014. Alternatively, computer system (e.g., watch 12010 or HMD 12011) also transitions from first (e.g., sleep, or low power) state 12002 to second (e.g., low power, standby, or hibernation) state 12004 when computer system (e.g., watch 12010 or HMD 12011) receives an incoming invitation (e.g., a voice call invitation, or a video call invitation). Providing one or more intermediate (e.g., standby) states in which the wearable device senses its physical environment allows the wearable device to more quickly warm up and be ready to deliver an experience (e.g., media experience, a communication session) once the wearable device is positioned on the body of the authorized user. The wearable device senses its surrounding and is better prepared to transition to (e.g., perform a faster transition to) an active on-body state when the authorized user interacts with it, making the transition more operationally efficient for the wearable device and more time-efficient to the authorized user.

In some embodiments, computer system 101 is a head-mounted device. In second (e.g., low power, standby, or hibernation) state 12004, after transitioning from first (e.g., sleep, or low power) state 12002, the head-mounted device begins to perform gaze tracking and world tracking, functions that it does not perform when the head-mounted device is in first (e.g., sleep, or low power) state 12002. Phone calls and video call or conferencing sessions are muted while the head-mounted device is in second (e.g., low power, standby, or hibernation) state 12004. After a timeout period (e.g., head-mounted device does not leave second state 12004 within 1 minute, within 5 minutes, or within 10 minutes), phone calls and video calls or conferencing sessions are terminated. Any media session is paused, and screen mirroring running on the head-mounted device is also paused while the computer system 101 is in the second (e.g., low power, standby, or hibernation) state. After a timeout period, both the screen mirroring and the media session are terminated.

In general, while a session of an application is inactive in first (e.g., sleep, or low power) state 12002 or second (e.g., low power, standby, or hibernation) state 12004 (e.g., running in a background, paused, not receiving any user input, not providing any output to the user), in response to the wearable device detecting a second signal indicating that the wearable device is being put on (e.g., the second signal is a signal provided by a biometric sensor. For example, the biometric sensor may include a camera and an image processing component, and when the image processing component is able to locate the presence of the user's eyes, or alternatively any person's eyes, in an image captured by the camera, the biometric sensor outputs a signal that the wearable device has now been placed in front of a user's eye. In another example, the biometric sensor may be a pulse sensor that returns a control signal as an output to indicate that a pulse has been detected. In another example, the first signal is a signal provided by an inertial measurement device (e.g., accelerometer, gyroscope), and when the inertial measurement device determines that it is oriented in a way that is compatible with the wearable device being worn (e.g., the wearable device is not positioned upside down, the wearable device is not lying on its side, a camera in the wearable device, is not pointed skyward or to the ground) the inertial measurement device outputs the second signal. In yet another example, the second signal is provided by a thermal sensor, for example, the thermal sensor detects a source of body heat of the wearer; in some embodiments. Optionally, signals from multiple biometric sensors are jointly analyzed to determine if the wearable device is being worn. For example, when a user places the wearable device on her forehead, the camera will not detect the presence of any eyes, but the thermal sensor will still detect body heat and the inertial measurement device will detect an "upright" position of the wearable device, and based on those determinations the wearable device resumes the session of the application when first criteria are met (e.g., a user of the wearable device is determined to be an authorized or authenticated user, based on an automatic biometric verification, based on entry of a passcode, or determined to be an authorized user based on a sharing mode being active). On the other hand, the session of the application does not resume when the first criteria are not met.

FIGS. 12F1 and 12F2 show computer system (e.g., watch 12010 or HMD 12011) in third state 12006, in accordance with some embodiments of the present disclosure. For example, by user 7002 donning computer system (e.g., watch 12010 or HMD 12011) after it was lifted off, as shown in FIGS. 12E1 and 12E2, computer system (e.g., watch 12010 or HMD 12011) transitions from second state 12004 to third state 12006. Computer system (e.g., watch 12010 or HMD 12011) is placed on the wrist of user 7002 but computer system (e.g., watch 12010 or HMD 12011) has not yet authenticated user 7002. As a result, a phone call from a caller Abe, as displayed on the user interface 12024, is muted. User 7002 can be authenticated upon computer system (e.g., watch 12010 or HMD 12011) detecting a biometric feature 12026 associated with user 7002. In some embodiments, as shown in FIGS. 12F1 and 12F2, the biometric feature is a 2-dimensional feature (e.g., a tattoo, a mark, a label, a birthmark, a fingerprint) on a portion of user 7002's body. A sensor (e.g., a camera, a scanner) of computer system (e.g., watch 12010 or HMD 12011) detects the biometric feature 12026, and computer system (e.g., watch 12010 or HMD 12011) or the sensor determines if the biometric feature 12026 matches a feature associated with user 7002. In response to determining that the biometric feature 12026 matches a feature associated with user 7002, computer system (e.g., watch 12010 or HMD 12011) authenticates user 7002 and transitions computer system (e.g., watch 12010 or HMD 12011) from third state 12006 to fourth state 12008, as shown in FIGS. 12G1 and 12G2. In response to determining that the biometric feature 12026 does not match a feature associated with user 7002, computer system (e.g., watch 12010 or HMD 12011) does not authenticate user 7002 and remains in third state 12006. After a timeout period (e.g., computer system (e.g., watch 12010 or HMD 12011) does not leave third state 12006 within 1 minute, within 5 minutes, or within 10 minutes) during which computer system (e.g., watch 12010 or HMD 12011) remains in third state 12006, the phone call with Abe is terminated.

In some embodiments, computer system 101 is a head-mounted device. Instead of a biometric feature like 12026, the head-mounted device relies on a gaze location, an iris pattern, a facial expression, an eye color and/or shape to authenticate if the user donning the head-mounted device is an authorized user. In third (unauthenticated) state 12006, the head-mounted device continues to perform gaze tracking and world tracking, functions that it does not perform when the head-mounted device is in first (e.g., sleep, or low power) state 12002. Phone calls and video calls or conferencing sessions are muted while the head-mounted device is in third (unauthenticated) state 12006. After a timeout period (e.g., head-mounted device does not leave third (unauthenticated) state 12006 within 1 minute, within 5 minutes, or within 10 minutes), phone calls and video calls or conferencing sessions are terminated. Any media session is paused, and screen mirroring running on the head-mounted device is also paused. After a timeout period, both the screen mirroring and the media session are terminated.

Unlike computer system (e.g., watch 12010 or HMD 12011), which has the display generation component (e.g., the watch screen) and/or one or more sensor(s) provided on external surfaces of computer system (e.g., watch 12010 or HMD 12011), a head-mounted device can include display generation components that present a visual display to user 7002 in an inner portion of the head-mounted device. For example, the head-mounted device is worn on the head of the user 7002 covering the user 7002's eyes. Similarly, a biometric sensor of the head-mounted device may also be directed to an inner portion of the head-mounted device to track user 7002's gaze, or to perform facial recognition operations.

User 7002 repositions computer system (e.g., watch 12010 or HMD 12011) by sliding computer system (e.g., watch 12010 or HMD 12011) up or down along the forearm and a sensor of computer system (e.g., watch 12010 or HMD 12011) detects the presence of biometric feature 12026, as shown in FIGS. 12G1 and 12G2. In response to detecting the presence of a biometric feature 12026 and upon determining that the biometric feature 12026 corresponds to a feature associated with user 7002, computer system (e.g., watch 12010 or HMD 12011) authenticates user 7002 and, based on the authentication of user 7002, transitions from third state 12006 to fourth state 12008. For a wearable device that is a head-mounted device, a relevant biometric feature includes one or more of a gaze location, an iris pattern, a facial expression, an eye color and/or shape of the authorized user to authenticate if the user donning the head-mounted device matches the authorized user.

Alternatively, computer system (e.g., watch 12010 or HMD 12011) also transitions from third (unauthenticated) state 12006 to fourth (authenticated) state 12008 upon entry of a passcode to computer system (e.g., watch 12010 or HMD 12011) or upon a sharing mode being activated on computer system (e.g., watch 12010 or HMD 12011).

In fourth (authenticated) state 12008, a phone call (e.g., with Abe) resumes (e.g., is unmuted), as shown by user interface 12024 in FIGS. 12G1 and 12G2. In general, a focused application is displayed in the foreground in fourth (authenticated) state 12008, and phone calls, video calls or conferencing sessions, media sessions, and screen mirroring resume. In some embodiments, even after a user is determined to be an authorized user, some sessions of an application may still not resume without additional user inputs (e.g., a recording session of an application (e.g., a media application, a conference application, a gaming application, a third-party application) does not resume even when the user is determined to be an authorized/authenticated user. Using characteristics of the respective session of the respective application to determine whether to resume the respective session provides improved security/privacy by ensuring that the certain types of sessions that have more security/privacy protection (e.g., recording sessions) are not automatically restarted, after the wearable device has been removed from a user's body, even when an authorized user is detected.

In some embodiments, computer system 101 is a wearable device such as a head-mounted device. In fourth (authenticated) state 12008, the head-mounted device continues to perform gaze tracking and world tracking. When the computer system 101 is taken off the body of a user, the computer system 101 transitions from fourth (authenticated) state 12008 to second (e.g., low power, standby, or hibernation) state 12004.

FIGS. 8A-8G illustrate examples of how different operations are triggered by an input to an input device, depending on a current mode of display. FIG. 14 is a flow diagram of an example method 1400 for how different operations are triggered by an input to an input device, depending on a current mode of display. The user interfaces in FIGS. 8A-8G are used to illustrate the processes described below, including the processes in FIG. 14.

As shown in the examples in FIGS. 7B-11F, content that is visible via a display generation component 7100 of computer system 101 is displayed on a touch screen held by user 7002. In some embodiments, display generation component 7100 of computer system 101 is a head-mounted display worn on user 7002's head (e.g., what is shown in FIGS. 7B-11F as being visible via display generation component 7100 of computer system 101 corresponds to user 7002's field of view when wearing a head-mounted display).

Additional descriptions regarding FIGS. 7A-7O, 8A-8G, 9A-9D, 10A-10D, 11A-11F, and 12A-12G2 are provided below in reference to methods 13000, 14000, 15000, 16000, 17000, 18000 and 20000 described with respect to FIGS. 13-18 and 20 below.

FIG. 13 is a flow diagram (also called a flowchart) of an example method 1300 for displaying a home menu user interface within a three-dimensional environment, in accordance with some embodiments.

In some embodiments, method 13000 is performed at a computer system (e.g., computer system 101 in FIG. 1) including a display generation component (e.g., display generation component 120 in FIGS. 1A, 3, and 4) (e.g., a heads-up display, a display, a touchscreen, or a projector) and one or more cameras (e.g., a camera (e.g., color sensors, infrared sensors, and other depth-sensing cameras) that point downward at a user's hand or a camera that points forward from the user's head). In some embodiments, the method 13000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 13000 are, optionally, combined and/or the order of some operations is, optionally, changed.

In some embodiments, the method 13000 is performed at a computer system (e.g., computer system 101 in FIG. 1) that is in communication with a first display generation component (e.g., display generation component 120 in FIGS. 1A, 3, and 4, display generation component 7100) (e.g., a heads-up display, an HMD, a display, a touchscreen, a projector,), one or more audio output devices (e.g., earphones, speakers located in the physical environment, speakers within the same housing or attached to the same support structure as the first display generation component (e.g., built-in speakers of an HMD)), and one or more input devices (e.g., cameras, controllers, touch-sensitive surfaces, joysticks, buttons, gloves, watches, motion sensors, or orientation sensors). In some embodiments, the first display generation component is a display component facing the user and provides a CGR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from one or more of the display generation components (e.g., a heads-up display, a touch-screen, or a standalone display), the one or more output devices (e.g., earphones, or external speakers) and the one or more input devices. In some embodiments, the display generation components and the one or more audio output devices are integrated and enclosed in the same housing.

In the method 13000, at a device that includes or is in communication with one or more display generation components and one or more input devices (e.g., a button, dial, rotatable input element, switch, a moveable hardware input device or a solid-state hardware input device that detects localized sensor input such as intensity or force sensor input; in some embodiments, the device (e.g., sometimes herein called a computer system) uses the localized sensor input from the solid-state hardware input device to trigger corresponding operations and optionally provides tactile feedback such as haptic feedback corresponding to the detected inputs), while the device displays, via the one or more display generation components an application user interface (e.g., while application user interface 7018, as shown and described in reference to FIG. 7B, is being displayed), the device detects (13002) a first input to an input device of the one or more input devices (e.g., device detects a press input to hardware input element 7108 (e.g., button, crown, or rotatable and depressible input element), as shown and described in reference to FIG. 7B), the input device provided on (e.g., integrated into) a housing of the device that includes the one or more display generation components; in response to detecting (13004) the first input (e.g., a press input) to the input device (e.g., a solid state button, a hardware button) provided on the housing of the device: the device replaces (13006) display of at least a portion of the application user interface (e.g., ceasing display of at least a portion of the application user interface; ceasing display of the application user interface 7018 as shown and described in reference to FIG. 7C; occluding at least a portion of the application user interface with the home menu user interface; occluding at least portions of the application user interface with the home menu user interface) by displaying a home menu user interface (e.g., the home menu user interface 7110 as shown and described in reference to FIG. 7C includes application icons (e.g., representations 7112-7126 as shown and described in reference to FIGS. 7C), widgets, communication options (e.g., representations 7138, 7140, and 7142, as shown and described in reference to FIG. 7D), and/or affordances for displaying extended reality (XR) backgrounds (e.g., representations 7144 and 7146, as shown and described in reference to FIG. 7E); e.g., the home menu user interface is superimposed over the application user interface (UI); e.g., objects (e.g., application icons, virtual UI icons, and other objects) in the home menu UI are either opaque or partially transparent, thereby blocking or obscuring corresponding portions of the application UI (e.g., those portions of the application UI positioned behind the home menu UI; in some embodiments, the home menu UI comprises a platter with a plurality of objects on the platter, and the platter is either opaque or partially transparent, thereby blocking or obscuring those portions of the application UI positioned behind the home menu UI) via the one or more display generation components; and while displaying via the one or more display generation components the home menu user interface, the device detects (13008) a second input to the input device provided on the housing of the device (e.g., the device detects a second press input to hardware input element 7108 (e.g., button, crown, or rotatable and depressible input element), as shown and described in reference to FIG. 7H); in response to detecting (13010) the second input to the input device provided on the housing of the device: the device dismisses (13012) the home menu user interface (e.g., ceasing display of the home menu user interface 7110, as shown and described in reference to FIG. 7J, ceasing display of at least a portion of the home menu user interface).

Using a single input to an input device (e.g., hardware input element 7108 (e.g., button, crown, or rotatable and depressible input element), as shown and described in reference to FIG. 7B, is provided on a housing of one or more display generation components 7100, through which portions of the physical environment and the virtual environment are rendered visible), provides intuitive top level access to different collections of representations (e.g., a collection of representations of applications, as shown and described in reference to FIGS. 7C, a collection of representation of people with whom user 7002 can initiate or maintain communications, as shown and described in reference to FIG. 7D, a collection of representations of selectable virtual environments as shown and described in reference to FIG. 7E), without displaying additional controls (e.g., without requiring the user to navigate through user interface elements), increasing operational efficiency of user-machine interactions based on the single input. The use of the single input to the input device (e.g., hardware input element 7108 (e.g., button, crown, or rotatable and depressible input element), as shown and described in reference to FIG. 7B) reduces the amount of time needed to navigate within a virtual environment or transition out of the virtual environment. The physical location of the input device provides an intuitive and reliable mechanism (e.g., a tactile touch/mechanical actuation mechanism) for receiving user inputs, which improves the reliability and operational efficiency of the device (e.g., computer system).

In some embodiments, the method 13000 includes, concurrently with displaying the application user interface, providing to the user of the device a view of a passthrough portion of a physical environment of the device or a physical environment of at one of the one or more display generation components (e.g., a passthrough portion that includes a display of representation 7014' is displayed while the mini player application user interface 7154 is also displayed, as shown and described in reference to FIG. 7M), and optionally furthermore displaying a portion of a virtual environment. For example, in some embodiments, the application user interface is displayed over or in front of portions of a mixed reality environment that includes both a passthrough portion of a physical environment of the device (or a physical environment of at one of the one or more display generation components), and virtual elements distinct from the application user interface (e.g., a portion of a virtual environment, box 7016, as shown and described in reference to FIG. 7M).

In some embodiments, the device is a head mounted device that includes the input device and the one or more display generation components, and the method includes generating a user interface that is visible to a user when the head mounted device is positioned on a head of the user, covering the user's eyes. In some embodiments, the device is a tablet or other computer system with one or more integrated cameras and an integrated display (e.g., camera 10010, integrated on a tablet, as shown and described in reference to FIG. 10C); the input device is provided on (e.g., integrated into) a housing of the head-mounted device (e.g., hardware input element 7108 (e.g., button, crown, or rotatable and depressible input element), or button 7508, as shown and described in reference to FIGS. 10A-10D), not on a separate controller.

The physical location of the input device on a head mounted device facilitates direct user control of the head mounted device (e.g., without the user having to hold on to any separate physical controllers, keeping one or more of the user's hands free from having to hold on to a separate controller), without displaying additional controls, and offers an intuitive and reliable mechanism for receiving user inputs (e.g., hardware input element 7108 (e.g., button, crown, or rotatable and depressible input element), or button 7508, as shown and described in reference to FIGS. 10A-10D, tactile touch/mechanical actuation), which improves the reliability and operational efficiency of the head mounted device.

In some embodiments, the home menu user interface is presented substantially in a central portion of a field of view of a user of the device (e.g., in a middle portion 7104 of the virtual environment 7000, as shown and described in reference to FIGS. 7B-7C, 7H-7I, 7L-7M, 8C, 9B, and 11D, along a gaze direction of a user, not below a display of the application, in a central portion of a user's field of view).

Presenting the home menu user interface substantially in a central portion of a field of view of a user of the device improves operational efficiency by obviating further inputs (e.g., lowering or elevating a user's gaze, or visually searching for the home menu user interface and/or tilting/rotating a user's head to focus on the home menu user interface), and reduces the amount of time needed to begin navigating within the home menu user interface, improving the operational efficiency of the device (e.g., computer system).

In some embodiments, the input device is a hardware button or a solid state button (e.g., a button or a rotatable input element 7108, as shown and described in reference to FIGS. 7A-7O, or a button 7508, as shown and described in reference to FIG. 10A).

A hardware or solid-state button provides an efficient mechanism for the user to transition out of a virtual environment or to navigate within the virtual environment, without displaying additional controls (e.g., navigating through user interface elements), which improves the reliability and operational efficiency of the device (e.g., computer system). The solid state button reduces the number of moving parts and allows the system to be reconfigurable (e.g., by a firmware update that allows the solid-state button to provide different feedback, to offer other functionality, to receive additional types of inputs), improving performance and efficiency of the device (e.g., computer system).

In some embodiments, the device detects a rotational input to the hardware button; and in response to detecting the rotational input, the device performs a second operation (e.g., changing an immersion level presented to the user of the device, as shown and described in reference to FIGS. 11B-11D; changing a volume of audio provided to the user of the device, scrolling through a user interface presented to the user of the device) different from displaying or dismissing the home menu user interface.

Providing multiple system operations in response to different inputs to a single input device (e.g., operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret distinct inputs from a smaller number of input devices.

In some embodiments, in response to detecting the first input to the input device, the device dismisses the application user interface prior to, or concurrently with displaying of the home menu user interface (e.g., application user interface 7018 is dismissed when home menu user interface 7110 is displayed as shown and described in reference to FIGS. 7B-7C, resized application user interface 8002 is dismissed when home menu user interface 7110 is displayed, as shown and described FIGS. 8B-8C, and application user interfaces 9004, 9006, and 9008 are dismissed when home menu user interface 7110 is displayed, as shown and described in reference to FIGS. 9A-9B).

Using the first input to the input device to dismiss the application user interface prior to or concurrently with displaying the home menu user interface brings the home menu user interface into focus more readily. Instead of requiring the user to separately instruct closing the application and/or navigating to special user interface control elements to manually select a display of home menu user interface, responding to the first input by both dismissing the application and bringing the home menu user interface into focus, without having to display additional controls, improves operational efficiency of the device and makes more efficient use of the user's time.

In some embodiments, prior to detecting the first input to the input device of the one or more input devices, the device generates and displays a first user interface object associated with the application user interface (e.g., a "quick look" object, a "quick look" object that is dragged out of the application); and in response to detecting the first input to the input device (e.g., an input device provided on the housing of the device, such as rotatable input element 7108, or button 7508, as shown in FIGS. 7A and 10A): the device maintains display of the first user interface object concurrently with dismissing the application user interface (e.g., the "quick look" object remains (continues to be displayed) when the application is dismissed).

Providing the first user interface object (e.g., the first user interface object is an instance of the application or an object extracted or dragged out of the application, sometimes herein called a "quick look object") allows the user to maintain use of an application (e.g., using an instance of the application) or maintaining display of data associated with the application even after the main application is dismissed (e.g., the quick look object is an instance replicated from the application). Maintaining display of such user interface objects allows a user to continue controlling the application while multitasking (e.g., navigating on the home menu user interface), without displaying additional controls. The multitasking functionality is not affected by the presence of the home menu user interface triggered by the first input, improving performance and efficiency of the device (e.g., computer system).

In some embodiments, prior to detecting the first input, the device generates and displays the first user interface object associated with the application user interface by extracting the first user interface object from the application user interface based on a third input (e.g., a user gesture, a user gesture that includes pulling the first user interface object out of the application user interface) directed to (e.g., corresponding to, or on) the application user interface.

Providing the first user interface object (e.g., the first user interface object is an instance of the application extracted from or dragged out of an application, a "quick look object") allows the user to maintain use of an application (e.g., an instance of the application) or maintain display of data associated with the application even after the home menu user interface is displayed (e.g., the quick look object is an instance replicated from the application). Maintaining display of such user interface objects allows a user to continue controlling the application while multitasking (e.g., navigating on the home menu user interface), without displaying additional controls. The multitasking functionality is not affected by the presence of the home menu user interface triggered by the first input, improving performance and efficiency of the device (e.g., computer system).

In some embodiments, in response to detecting the second input (e.g., a second button press), the device dismisses both the first user interface object and the home menu user interface.

Dismissing both the first user interface object and the home menu user interface using a single input (e.g., the second button press) obviates the need for displaying additional controls. The user does not need to waste time separately closing the first user interface object and/or navigating to special user interface control elements to manually close the first user interface object, thereby improving performance and operational efficiency of the device (e.g., computer system).

In some embodiments, while the device displays via the one or more display generation components the home menu user interface and the first user interface object (e.g., mini player user interface 7154, as shown and described in reference to FIG. 7M), the device detects a fourth input directed to (e.g., corresponding to, or on) a representation of a second application (e.g., different from the first application, representation 7126 of a web browsing application, as shown and described in reference to FIG. 7M) displayed on (e.g., included in) the home menu user interface, and in response to detecting the fourth input, displaying an application user interface of the second application concurrently with displaying the first user interface object (e.g., application user interface 7178 of a web browsing application, is displayed concurrently with the mini player user interface 7154, as shown and described in reference to FIGS. 7L-7N).

Launching a second application from the home menu user interface while the first user interface object is displayed obviates the need for displaying additional controls. Maintaining display of the first user interface object provides a visual reminder to the user that may be helpful for selecting a suitable second application. In some circumstances, the displayed first user interface object provides information that can be used in the second application, without the user having to re-launch the first application after the second application is launched, allowing multiple tasks to be accomplished at the same time, improving performance and operational efficiency of the device (e.g., computer system).

In some embodiments, the device detects a fifth input (e.g., a drag input) to move the first user interface object (e.g., a video clip, an audio clip, a text file, or a message) onto the application user interface of the second application (e.g., a message or a document); and in response to detecting the fifth input, the device performs an operation in the second application based on the first user interface object (e.g., adding a video clip to a message or a document).

The ability to drag the first user interface object directly into the second application allows an operation in the second application to be performed based on the first user interface object, without displaying additional controls. Dragging the first user interface object allows a more direct and efficient user-machine interaction than having to go through the home menu user interface to sequentially open a particular application, and furthermore the first user interface object is displayed and readily accessible while the user interacts with the second application, improving performance and operational efficiency of the device (e.g., computer system).

In some embodiments, the device dismisses the home menu user interface by replacing display of the home menu user interface with presentation of a passthrough portion of a physical environment of the device via the one or more display generation component (e.g., home menu user interface 7110 is dismissed when the passthrough portion containing the representation 7014' is presented, as shown and described in reference to FIG. 7K). In some embodiments, the passthrough portion is an optical passthrough in which a portion of a head-mounted display or heads-up display that is made semi-transparent or transparent, such that the user can see through it to view the real world surrounding the user without removing the head-mounted display or moving away from the heads-up display; the passthrough portion gradually transitions from semi-transparent or transparent to fully opaque when displaying a virtual or mixed reality environment; is some embodiments, the passthrough portion is a virtual passthrough in which a portion of the display generation component displays a live feed of images or video of at least a portion of physical environment (e.g., a representation 7014' of physical table 7014 is displayed in the virtual passthrough, as shown and described in reference to FIG. 7K, captured by one or more cameras (e.g., rear facing camera(s) of a mobile device or associated with a head-mounted display, or other cameras that feed image data to the device.)

Dismissing the home menu user interface by replacing display of the home menu user interface with a presentation of a passthrough portion of a physical environment of the head-mounted device via the display generation component improves safety for the user, allowing the user to be cognizant of the physical environment of the device (via the passthrough portion of the physical environment of the device) (e.g., to respond to an emergency or other situations that require the user's attention or require the user to interact with the physical environment) after a user is done navigating the home menu user interface. Using a second input to activate display of a passthrough portion allows the user to retreat from the virtual environment and view at least a portion of the physical environment, without displaying additional controls.

Dismissing the home menu user interface includes ceasing to display a virtual environment (e.g., the virtual environment includes virtual content that is computer generated content distinct from a passthrough portion of the physical environment) in which the home menu user interface is displayed.

Ceasing to display a virtual environment while dismissing the home menu user interface allows the user to retreat from the virtual environment and view at least a portion of the physical environment (e.g., dismissing a display of the virtual environment), by having the second input function similarly to an input to an escape button, without displaying additional controls.

In some embodiments, the device detects a sixth input on a representation of a first virtual environment displayed in the home menu user interface; and in response to detecting the sixth input on the representation of the first virtual environment displayed in the home menu user interface: the device replaces any currently displayed virtual environment with the first virtual environment (e.g., a virtual environment depicting an office environment that includes office table 7148 surrounded by office chairs as shown and described in reference to FIGS. 8C, is replaced by a virtual environment depicting beach scenery, in response to a user selection directed to representation, 7144 as shown and described in reference to FIGS. 8C-8E).

Displaying a home menu user interface that provides quick access to a collection of selectable virtual environments offers a way to alter a user's virtual experience, without displaying additional controls, minimizing the number of inputs required to select a desired virtual environment, thereby improving performance and operational efficiency of the device (e.g., computer system).

In some embodiments, the device displays in the home menu user interface representations of software applications executable on the device (e.g., representations 7112-7126, as shown and described in reference to FIG. 7M); detecting a seventh input directed to a respective representation of a software application in the representations of software applications executable on the device displayed in the home menu user interface (e.g., a user input directed to representation 7126, as shown and described in reference to FIG. 7M); and in response to detecting the seventh input directed to the respective representation of the software application: displaying (e.g., in a foreground of the three-dimensional environment, causing the software application corresponding to the representation to run in the foreground, as a focused application) an application user interface of the software application (e.g., application user interface 7178 is displayed as shown and described in reference to FIG. 7N).

Allowing a single input to trigger display of the home menu user interface allows a user to quickly access and navigate a collection of applications in the home menu user interface regardless of whatever operation (e.g., while a first application is running) is in progress, without displaying additional controls, minimizing the number of inputs required to select a desired operation, improving performance and operational efficiency of the device (e.g., computer system).

In some embodiments, the device displays in the home menu user interface a first representation of a first person, and a second representation of a second person, the first representation and the second representation for initiating (e.g., or continuing) communication with the first person and the second person, respectively (e.g., as shown and described in reference to FIG. 7C); detecting an eighth input directed to the first representation of the first person; and in response to detecting the eighth input directed to the first representation of the first person: displaying a communication user interface for initiating a communication session with the first person.

Allowing a single input to trigger display of the home menu user interface allows a user to quickly access and navigate a collection of representations in the home menu user to interact with other people, regardless of whatever operation (e.g., while a first application is running) is in progress, without displaying additional controls, minimizing the number of inputs required to select a desired operation, improving performance and operational efficiency of the device (e.g., computer system).

In some embodiments, the device detects a ninth input directed to a representation of a collection displayed in the home menu user interface; and in response to detecting the ninth input directed to the representation of the collection: displaying representations of one or more virtual three-dimensional environments or one or more augmented reality environments (e.g., as shown and described in reference to FIGS. 7E, and 8C-8E).

Allowing a single input to trigger display of the home menu user interface allows a user to quickly access and navigate a collection of representations for changing a virtual environment for that user, regardless of whatever operation (e.g., while a first application is running) is in progress, without displaying additional controls, minimizing the number of inputs required to select a desired operation, improving performance and operational efficiency of the device (e.g., computer system).

In some embodiments, while displaying the home menu user interface, the device detects a tenth input (e.g., a hand gesture, a gaze input, or a rotational input to the rotatable button, a user input of a hand movement provided by hand 7020, as shown and described in reference to FIG. 7H); and in response to detecting the tenth input: the device scrolls through the home menu user interface based on the tenth input (e.g., a duration of the third input, a magnitude of the third input, or a velocity of the third input) so that first content in at least a portion of the home menu user interface is replaced with second content (e.g., representations 7112-

7126 are replaced by representations 7156-7174, as a second page of representations of applications, as shown and described in reference to FIGS. 7H-7I; page-by-page scrolling, or continuous scrolling).

Scrolling through the home menu user interface allows a user to navigate through a large number of items without being overwhelmed with too many items being concurrently presented to the user, aiding the timely selection of a desired operation, without displaying additional controls. Furthermore, providing a scrollable home menu user interface in response to the first input efficiently provides the user with a larger range of applications, people, virtual environments or other operations than would be possible with a static, non-scrollable home menu user interface.

In some embodiments, while displaying the home menu user interface having a first section, the device detects an eleventh input (e.g., a hand gesture, a gaze input, or a rotational input to the rotatable button, a user input directed to tab 7134, as shown and described in reference to FIGS. 7C, user input directed to tab 7136, as shown and described in reference to FIG. 7D); and in response to detecting the eleventh input: the device displays a second section of the home menu user interface based on the eleventh input (e.g., a collection of representations of people with whom user 7002 can initiate or maintain communication with, as shown and described in reference to FIG. 7D is displayed in response to the user input directed to tab 7134; a collection of representations of selectable virtual environments, as shown and described in reference to FIG. 7E is displayed in response to the user input directed to tab 7136; each section corresponds to different a collection of selectable options, a collection of representations of software applications executable on the device, as shown and described in reference to FIGS. 7C, 7H, and 7I), a collection of representations of one or more virtual three-dimensional environments, or one or more augmented reality environments, as shown and described in reference to FIGS. 7E, and 8C-8E), the first section being different from the second section.

Allowing a single input to trigger display of the home menu user interface allows a user to quickly access and navigate a collection of applications in the home menu user interface and/or change a virtual environment for that user and/or interact with additional users regardless of whatever process (e.g., while a first application is running) is in progress, without displaying additional controls, minimizing the number of inputs required to select a desired operation, improving performance and efficiency of the device (e.g., computer system). Furthermore, providing in response to the first input a home menu user interface having sections that can be navigated by the user efficiently provides the user with a larger range of applications, people, virtual environments or other operations than would be possible with a static home menu user interface.

In some embodiments, while displaying a first section (e.g., sections correspond to different respective collections of selectable options, such as a first collection of representations of software applications executable on the device, and a second collection of representations of one or more virtual three-dimensional environments, or one or more extended reality environments. Although not shown, in response to a user input (e.g., a press input) to the hardware input element 7108 (e.g., button, crown, or rotatable and depressible input element), after the collection of representations of virtual environments is displayed as shown and described in reference to FIG. 7E, the home menu user interface 7110 that displays the collection of representations of virtual environments is dismissed. When the user provides a next user input (e.g., a subsequent press input) to the hardware input element 7108 (e.g., button, crown, or rotatable and depressible input element) within a first period of time (e.g., within 5 minutes, within 1 minute) the home menu user interface 7110 displays the collection of representations of virtual environments, as shown and described in reference to FIG. 7E, instead of the collection of representations of applications, as shown and described in reference to FIG. 7C) of the home menu user interface, the device detects a twelfth input to the input device provided on the housing of the device, and in response to detecting the twelfth input to the input device provided on the housing of the device: the device dismisses the home menu user interface 7110, for example as shown in the transition from FIG. 7I to FIG. 7J. In some embodiments, the device detects (e.g., while the home menu user interface 7110 is not displayed) a thirteenth input to the input device provided on the housing of the device (a press input to the hardware input element 7108 (e.g., button, crown, or rotatable and depressible input element)), and in response to detecting the thirteenth input to the input device provided on the housing of the device: the device displays the first section of the home menu user interface (e.g., the first section includes the collection of representations of applications, as shown and described in reference to FIG. 7C) based on the thirteenth input, for example as shown in the transition from FIG. 7K to FIG. 7L.

Retaining information about the last accessed section on the home menu user interface reduces disruptions, allowing a user to quickly return to a previously accessed portion of the home menu user interface when the user accesses the home menu user interface after leaving it, without displaying additional controls. Such a feature helps save a user's time, obviating the need to re-navigate through various sections of the home menu user interface to return to a previously accessed section of the home menu user interface, for example, when a user leaves the home menu user interface briefly to execute a different operation, such as an operation in a particular application.

In some embodiments, in accordance with a determination that a time difference between detecting the twelfth input and detecting the thirteenth input is within a time threshold (e.g., the next day, next session, or one hour, the time threshold optionally depends on the section of the home menu user interface (e.g., an application section resets within a smaller time threshold compared to a people/contacts section)), the device displays the first section of the home menu user interface (e.g., the first section of the home menu user interface is the same section that was displayed prior to the user leaving the home menu user interface) based on the thirteenth input, and in accordance with a determination that the time difference exceeds the time threshold, the device resets a display of the home menu user interface to a predetermined section (e.g., a first page of applications, or a first page of contacts).

Retaining information about the last accessed section on the home menu user interface reduces disruptions, allowing a user to quickly return to a previously accessed portion of the home menu user interface when the user accesses, within a preset time threshold, the home menu user interface after leaving it, without displaying additional controls. Such a feature helps save a user's time, obviating the need to re-navigate through various sections of the home menu user interface to return to a previously accessed section of the home menu user interface, when a user leaves the home menu user interface briefly to execute a different operation, such as an operation in a particular application.

In some embodiments, while displaying via the one or more display generation components an application user interface that includes a first application user interface of a media content playing application (e.g., application user interface 7152 as shown and described in FIG. 7F; application user interface 110002 as shown and described in reference to FIG. 11C), and while playing media content using the media content playing application, the device detects a first input to an input device provided on (e.g., integrated into) a housing of the device that includes the one or more display generation components). In response to detecting the first input to the input device (e.g., provided on the housing of the device), the device displays the home menu user interface (e.g., the home menu user interface includes application icons, widgets, communication options, and/or affordances for displaying XR backgrounds) via the one or more display generation components and replaces display of the first application user interface of the media content playing application with a second application user interface of the media content playing application, wherein the second application user interface of the media content playing application is smaller in size than the first application user interface of the media content playing application (e.g., home menu user interface 7110 and mini-player user interface 7154 as shown and described with reference to FIG. 7H; or home menu user interface 7110 and mini-player user interface 11012 as shown and described in FIG. 11D are displayed in conjunction with dismissing the media application and displaying a mini-player).

Providing a way for a user to multitask and continue playing media content while navigating to the home menu user interface improves performance and efficiency of the computer system. Providing a mini-player allows a user continued control over playback of the media content, and/or indicates to the user a current "location" of the media content playback (e.g., by displaying a time index corresponding to the current content media playback position, or, for video content, displaying a video frame at the current location in of the video content) while the user navigates via the home menu user interface, without displaying additional controls.

In some embodiments, replacing display of the first application user interface of the media content playing application with a second application user interface of the media content playing application includes displaying a media player (e.g., a video Picture-in-Picture (PiP) player, such as mini player user interface 11012, as shown and described in reference to FIG. 11D, or displaying an audio player, such as mini-player user interface 7154 in FIGS. 7G-71); and the second application user interface of the media content playing application includes one or more of: a representation of the media content playing on the media content playing application (e.g., a name or other identifier of the currently playing media content, a time index corresponding to the current content media playback position, or, for view content, a video frame at the current location in the video content, as shown in mini player user interface 11012, FIG. 11D), and playback controls (e.g., pause, play, fast forward, or rewind, as shown in mini-player user interface 7154, FIG. 7H, or mini player user interface 11012, FIG. 11D) for the media content playing application.

Providing a way for a user to multitask and continue a media experience (at least in some capacity) while navigating virtually via the home menu user interface improves performance and efficiency of the device (e.g., computer system). Providing a video Picture-in-Picture (PiP) player or displaying an audio mini-player allows a user control over the media experience (e.g., by providing playback controls in the min-player), and/or indicates to the user a current "location" of a user's media experience (e.g., by displaying a time index, or, for video content, a representation of a current video frame) while the user navigates via the home menu user interface, without displaying additional controls.

In some embodiments, in response to detecting the second input to the input device while displaying the home menu user interface, the device dismisses the home menu user interface and continues to display the second application user interface of the media content playing application (e.g., the mini-player user interface 7154 persists after home menu user interface 7110 is hidden, as shown and described in reference to FIGS. 7H-7J).

Having the mini-player persist after the home menu user interface is dismissed provides an uninterrupted media experience, even after the navigation in the virtual environment via the home menu user interface has concluded, thereby improving operational efficiency of the device (e.g., computer system) (e.g., the user does not need to re-launch the media application after navigating and then dismissing the home menu user interface).

In some embodiments, the device detects a first number of inputs to the input device provided on the housing of the device within a first period of time (e.g., double press quickly, double press within 1 second, double press within 0.5 second or less), and in response to detecting the first number of inputs to the input device provided on the housing of the device within the first period of time, the device displays an application management user interface (e.g., in response to detecting two press inputs in quick succession, system user interface 7180, e.g., a force quit menu or multitasking user interface, is displayed, as shown and described in reference to FIG. 7O and Table 3).

Triggering multiple system operations using different types of inputs on a single input device (e.g., triggering operations not specific to a particular application) reduces the number of distinct input devices that have to be provided to accomplish different tasks (e.g., N input devices can effect M operations, where N<M). Reducing the number of input devices that has to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret distinct inputs from a smaller number of input devices. Using the same user input device, a user can quickly get to an application management user interface without having to presented with additional/intermediary controls.

In some embodiments, while displaying, via the one or more display generation components, a system user interface (e.g., system interface 7180, as shown and described with reference to FIG. 7O), the device detects a respective input to the input device provided on the housing of the device, the respective input being a same type of input as the first input to the input device, and in response to detecting the respective input to the input device provided on (e.g., integrated into) the housing of the device while displaying the system user interface: the device replaces display of at least a portion of the system user interface by displaying the home menu user interface (e.g., although not shown in FIG. 7O, in response to detecting a user input (e.g., a press input to hardware input element 7108 (e.g., button, crown, or rotatable and depressible input element)) while the system user interface 7108 is displayed as shown and described in reference to FIG. 70, the system user interface 7108 is dismissed, and a home menu user interface 7110, as shown and described in reference to FIGS. 7C, is presented, the home menu user interface includes application icons, widgets, communication options, and/or affordances for displaying XR backgrounds) via the one or more display generation components.

Streamlining (e.g., by standardizing) the display of a home menu user interface in response to detecting a respective input that is a the same type of input as the first input, without regard to the user interface that is being currently displayed (e.g., system user interface, or an application user interface), reduces the number of distinct control elements needed by the device, and allows the user to navigate through different collections of representations (e.g., representations of applications, people, and/or virtual environments), without displaying additional controls.

In some embodiments, after dismissing the home menu user interface, and while the home menu user interface is not displayed, the device detects a fourteenth input to the input device provided on the housing of the device. In response to detecting the fourteenth input to the input device provided on the housing of the device: the device redisplays the home menu user interface (e.g., the home menu user interface includes application icons, widgets, communication options, and/or affordances for displaying XR backgrounds) via the one or more display generation components.

An additional input enables redisplaying the home menu user interface after it has been dismissed, without displaying additional controls. Allowing the additional input to redisplay home menu user interface provides an easy way for the user to return to the home menu user interface based on a single input regardless of whatever process the user might have been using on the device after dismissing the home menu user interface. The input serves as a universal mechanism that enables the user to directly navigate to a top-level home menu user interface, and then to navigate through different collections of representations (e.g., representation of applications, people, and/or virtual environments) in the home menu user interface, without displaying additional controls.

FIG. 14 is a flow diagram (also called a flowchart) of an example method 1400 for performing different operations based on an input to an input device, depending on a current mode of display, in accordance with some embodiments.

In some embodiments, the method 14000 is performed at a computer system (e.g., computer system 101 in FIG. 1) including a display generation component (e.g., display generation component 120 in FIGS. 1A, 3, and 4) (e.g., a heads-up display, a display, a touchscreen, or a projector) and one or more cameras (e.g., a camera (e.g., color sensors, infrared sensors, and other depth-sensing cameras) that point downward at a user's hand or a camera that points forward from the user's head). In some embodiments, the method 14000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 14000 are, optionally, combined and/or the order of some operations is, optionally, changed.

In some embodiments, the method 14000 is performed at a computer system (e.g., computer system 101 in FIG. 1) that is in communication with a display generation component (e.g., display generation component 120 in FIGS. 1A, 3, and 4, or display generation component 7100) (e.g., a heads-up display, an HMD, a display, a touchscreen, or a projector) and one or more input devices (e.g., cameras, controllers, touch-sensitive surfaces, joysticks, buttons, gloves, watches, motion sensors, orientation sensors, and/or a rotatable input mechanism, such as a crown). In some embodiments, the display generation component is a display component facing the user and provides a XR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from one or more of the display generation components (e.g., a heads-up display, a touchscreen, or a standalone display), the one or more output devices (e.g., earphones, or external speakers) and the one or more input devices. In some embodiments, the display generation components and the one or more audio output devices are integrated and enclosed in the same housing.

Method 14000 includes the computer system, while displaying via the display generation component an application user interface, detecting (14002) a first input to an input device of the one or more input devices (e.g., a press input to hardware input element 7108 (e.g., button, crown, or rotatable and depressible input element), as shown and described in reference to FIG. 8A, is detected while application user interface 8000 is displayed). In response to detecting (14004) the first input to the input device, in accordance with a determination that the application user interface is in a first mode of display (e.g., the application user interface 8000 is in a first mode (e.g., fully-immersive mode) of display, as shown and described in reference to FIG. 8A), wherein the first mode of display comprises an immersive mode in which only content of the application user interface is displayed (e.g., content of the application user interface is displayed within the a user's field of view without displaying content other than content of the application user interface, and/or the content of the application user interface substantially occupies all of a user's field of view), the computer system displays (14006) via the display generation component the application user interface in a second mode of display (e.g., resized application user interface 8004 is displayed, as shown and described in reference to FIG. 8B), wherein the second mode of display comprises a non-immersive mode in which respective content of the application user interface and other content are concurrently displayed (e.g., content of the application user interface and content other than content of the application user interface is displayed within the a user's field of view, the content of the application user interface occupies only a portion of a user's field of view). On the other hand, in response to detecting (14004) the first input to the input device, in accordance with a determination that the application user interface is in the second mode of display (e.g., a press input to hardware input element 7108 (e.g., button, crown, or rotatable and depressible input element), as shown and described in reference to FIG. 8B, is detected while resized application user interface 8004 is displayed), the computer system replaces (14008) display of at least a portion of the application user interface by displaying a home menu user interface (e.g., home menu user interface 7110, is displayed, as shown and described in reference to FIG. 7C) the home user interface provides access to different collections of user navigable items, including applications, people or contact lists, and virtual environments). Optionally, the home menu user interface includes application icons, widgets, communication options, and/or affordances for displaying XR backgrounds; e.g., the home menu UI is superimposed over the application UI. Optionally, objects (e.g., application icons, virtual UI icons, and other objects) in the home menu UI are either opaque or partially transparent, thereby blocking or obscuring corresponding portions of the application UI (e.g., those portions of the application UI positioned behind the home menu UI). In some embodiments, the home menu UI comprises a platter with a plurality of objects on the platter, and the platter is either opaque or partially transparent, thereby blocking or obscuring those portions of the application UI positioned behind the home menu UI) via the display generation component.

A single input to an input device can be used by the user to transition the device from a high level of immersion (e.g., a fully immersive mode, in which only content of a respective application is displayed, application user interface 8000 as shown and described in reference to FIG. 8A) into a less immersive mode or non-immersive mode (e.g., resized application user interface 8004, as shown and described in reference to FIG. 8B), or from a non-immersive mode to one in which a home menu user interface is also displayed), and provides intuitive top level access to different collections of representations (e.g., home menu user interface 7110, as shown and described in reference to FIGS. 8C), when the user is in a non-immersive experience, without displaying additional controls (e.g., without requiring the user to navigate through user interface elements), thereby increasing operational efficiency of user-machine interactions based on the single input. The use of the single input to the input device (e.g., a single press input to hardware input element 7108 (e.g., button, crown, or rotatable and depressible input element), as shown and described in reference to FIGS. 8A and 8B) reduces the amount of time needed to navigate within a virtual environment or transition out of a virtual environment.

In some embodiments, while displaying the home menu user interface via the display generation component (e.g., while a non-immersive experience is displayed, while non-immersive application user interface 9002, as shown and described in reference to FIGS. 9B, is displayed), the computer system detects a second input to the input device (e.g., a hardware button, a solid-state button, or a rotatable input element, a subsequent press input to hardware input element 7108 (e.g., button, crown, or rotatable and depressible input element)); and in response to detecting the second input (e.g., a second press input) to the input device, the computer system dismisses the home menu user interface (e.g., ceasing a display of the home menu user interface 7110 as shown and described in reference to FIG. 9C).

Using the second input to dismiss the home menu user interface while the computer system is operating in a non-immersive mode (e.g., providing a non-immersive experience to the user, for example, by providing a mini player user interface 7154 to the user, as shown and described in reference to FIGS. 71-7J) provides an efficient way to terminate navigational activities on the home menu user interface without disrupting the application user interface in the non-immersive experience. No additional controls have to be provided to the user, and the user does not need to navigate through any additional user interface control elements to exit the home menu user interface, improving operational efficiency of the computer system.

In some embodiments, displaying the application user interface in the non-immersive mode includes concurrently displaying a virtual environment and the application user interface (e.g., resized application user interface 8004 is displayed in the non-immersive mode, and includes a display of a virtual environment depicting an office environment, as shown and described in reference to FIG. 8B), and in response to detecting the first input to the input device while the application user interface is displayed in the non-immersive mode, the computer system continues to display at least a portion of the virtual environment (e.g., the virtual environment depicting the office environment continues to be displayed, as shown in FIGS. 8C, while the home menu user interface 7110 is displayed in response to a press input on the hardware input element 7108 (e.g., button, crown, or rotatable and depressible input element), displaying the application user interface in the second mode in the virtual environment). After detecting the first input to the input device of the one or more input devices, the computer system maintains display of the application user interface in the second mode of display in the virtual environment (e.g., a non-immersive experience is displayed in a virtual environment that continues to be displayed after the button is pressed as shown and described in reference to FIGS. 8B and 8C).

The virtual environment forms a part of the user experience when interacting with an application user interface in a non-immersive mode. Displaying the application user interface in a non-immersive experience while maintaining display of the virtual environment after the first input is detected minimizes disruption to the user while navigating the home menu user interface, without displaying additional controls. By maintaining display of the virtual environment, a user does not need to re-initialize the virtual environment after navigation in the home menu user interface, improving performance and operational efficiency of the computer system.

In some embodiments, the computer system continues to display at least the portion of the virtual environment while the home menu user interface is displayed (e.g., as shown and described in reference to FIGS. 7H, 8B, and 8C, resized application user interface 8004 is displayed in the non-immersive mode, as shown and described in reference to FIG. 8B, the virtual environment depicting the office environment continues to be displayed, as shown in FIGS. 8C, while the home menu user interface 7110 is displayed in response to a press input on the hardware input element 7108 (e.g., button, crown, or rotatable and depressible input element)).

Continuing to display the virtual environment while the home menu user interface is displayed minimizes disruption to the user while navigating the home menu user interface, without displaying additional controls. By maintaining display of the virtual environment, a user does not need to re-initialize the virtual environment after navigation in the home menu user interface, improving performance and efficiency of the computer system.

In some embodiments, the computer system displays, in the home menu user interface, representations of two or more virtual environments (e.g., as shown and described in reference to FIG. 8D); and in response to detecting a selection of a first virtual environment of the two or more virtual environments: replacing at least a respective portion of the virtual environment with the first virtual environment (e.g., as shown and described in reference to FIG. 8E, the first virtual environment is different from the portion of the virtual environment).

Displaying a home menu user interface that provides quick access to a collection of selectable virtual environments, offers a way to alter a user's virtual experience, without displaying additional control, minimizing the number of inputs required to select a desired virtual environment, improving performance and efficiency of the computer system.

In some embodiments, while the computer system displays in the home menu user interface representations of software applications executable on the device, the computer system detects a third input directed to a respective representation of a software application in the representations of software applications executable on the device displayed in the home menu user interface, and in response to detecting the third input directed to the respective representation of the software application: the computer system displays an application user interface of the software application an application user interface of the software application (e.g., in a foreground of the three-dimensional environment, causing the software application corresponding to the representation to run in the foreground, as a focused application, for example application user interface 7178, as shown and described in reference to FIGS. 7L and 7M).

Allowing a single input to trigger display of the home menu user interface allows a user to quickly access and navigate a collection of applications in the home menu user interface regardless of whatever operation (e.g., while a first application is running) is in progress, without displaying additional controls, minimizing the number of inputs required to select a desired operation, improving performance and operational efficiency of the device (e.g., computer system).

In some embodiments, while the computer system displays in the home menu user interface a first representation of a first person, and a second representation of a second person, the first representation and the second representation for initiating or continuing communication with the first person and the second person, the computer system detects a fourth input directed to the first representation of the first person, and in response to detecting the fourth input directed to the first representation of the first person, the computer system displays a communication user interface for initiating a communication session with the first person (e.g., a representation 7138 of the first person, a representation 7140 of the second person, a representation 7142 of the third person are shown in FIG. 7D, in response to a user input directed at the representation 7138 of the first person, the computer system displays a communication user interface for initiating a communication session (e.g., the communication session as shown and described in reference to FIG. 9D) with the first person).

Allowing a single input to trigger display of the home menu user interface allows a user to quickly access and navigate a collection of representations in the home menu user to interact with other people, regardless of whatever operation (e.g., while a first application is running) is in progress, without displaying additional controls, minimizing the number of inputs required to select a desired operation, improving performance and operational efficiency of the device (e.g., computer system).

In some embodiments, while the computer system displays in the home menu user interface representations of one or more virtual three-dimensional environments, or one or more extended reality environments, the computer system detects a fifth input directed to a respective representation of the representations of one or more virtual three-dimensional environments, or one or more extended reality environments, and in response to detecting the fifth input directed to the respective representation of the representations of one or more virtual three-dimensional environments, or one or more extended reality environments, the computer system replaces any currently displayed virtual environment with the virtual three-dimensional environment, or extended reality environment, associated with the respective representation (e.g., a virtual environment depicting an office environment that includes office table 7148 surrounded by office chairs as shown and described in reference to FIGS. 8C, is replaced by a virtual environment depicting beach scenery, in response to a user selection directed to representation 7144, as shown and described in reference to FIGS. 8C-8E).

Allowing a single input to trigger display of the home menu user interface allows a user to quickly access and navigate a collection of representations for changing a virtual environment for that user, regardless of whatever operation (e.g., while a first application is running) is in progress, without displaying additional controls, minimizing the number of inputs required to select a desired operation, improving performance and operational efficiency of the device (e.g., computer system).

In some embodiments, the input device is a hardware button or a solid state button. Using inputs to a hardware or solid-state button to control the level of immersion (e.g., from a fully immersive mode to a non-immersive mode) with which application content is provided, or to display a home menu user interface, provides intuitive top level access to basic operational functions of the computer system, without displaying additional controls (e.g., without requiring the user to navigate through user interface elements), thereby improving the operational efficiency of the computer system. The solid state button reduces the number of moving parts, which improves reliability, and allows the system to be reconfigurable (e.g., by a firmware update that allows the solid-state button to provide different feedback, to offer other functionality, to receive additional types of inputs), improving performance and efficiency of the computer system.

FIG. 15 is a flow diagram (also called a flowchart) of an example method 1500 for performing one or more different operations based on an input to an input device, wherein the operation performed depends on a characteristic of a displayed application user interface, in accordance with some embodiments.

In some embodiments, the method 15000 is performed at a computer system (e.g., computer system 101 in FIG. 1) including a display generation component (e.g., display generation component 120 in FIGS. 1A, 3, and 4) (e.g., a heads-up display, a display, a touchscreen, or a projector) and one or more cameras (e.g., a camera (e.g., color sensors, infrared sensors, and other depth-sensing cameras) that point downward at a user's hand or a camera that points forward from the user's head). In some embodiments, the method 15000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 15000 are, optionally, combined and/or the order of some operations is, optionally, changed.

In some embodiments, the method 15000 is performed at a computer system (e.g., computer system 101 in FIG. 1) that is in communication with a display generation component (e.g., display generation component 120 in FIGS. 1A, 3, and 4, or display generation component 7100) (e.g., a heads-up display, an HMD, a display, a touchscreen, or a projector) and one or more input devices (e.g., cameras, controllers, touch-sensitive surfaces, joysticks, buttons, gloves, watches, motion sensors, orientation sensors, and/or a rotatable input mechanism, such as a crown). In some embodiments, the display generation component is a display component facing the user and provides a XR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from one or more of the display generation components (e.g., a heads-up display, a touch-screen, or a standalone display), the one or more output devices (e.g., earphones, or external speakers) and the one or more input devices. In some embodiments, the display generation components and the one or more audio output devices are integrated and enclosed in the same housing.

In the method 15000, the computer system includes or is in communication with a display generation component and one or more input devices (e.g., a button, a dial, a rotatable input mechanism, switch, a movable component, or a solid state component, e.g., a device that detects localized sensor input such as intensity or force sensor input and the computer system uses that input to trigger corresponding operations and optionally provides tactile feedback such as haptic feedback corresponding to the detected inputs). In method 15000, while the computer system is displaying via the display generation component an application user interface of an application, the computer system detects (15002) a first input (e.g., a press input) to an input device (e.g., a button, a solid state button, a hardware button, or a rotatable input mechanism) of the one or more input devices. In response to detecting (15004) the first input to the input device: the computer system displays (15006) a home menu user interface via the display generation component (e.g., home menu user interface 7110 is displayed as shown and described in reference to FIG. 9B). The home menu user interface is sometimes called a home screen user interface, and the home screen user interface does not necessarily block or replace all other displayed content. The home menu user interface is a virtual user interface that is optionally displayed in a XR environment, not a default landing user interface that is displayed to a user whenever interaction with the computer system is initiated. The home screen user interface is distinct from a default landing user interface that automatically displays various representations to a user without specific user inputs. Furthermore, in response to the first input, in accordance with a determination that the application is currently being shared in a content-sharing session in which content of the application is concurrently visible to multiple participants in the content-sharing session (e.g., sharing media content for joint consumption with multiple participants, sharing/streaming gaming content to multiple participants in a multi-player game, and/or sharing video conferencing content between multiple participants of a video conference), the computer system maintains (15008) display of at least a portion of the application user interface while displaying the home menu user interface (e.g., application user interface 9002 continues to be displayed as shown and described in reference to FIGS. 9B-9D). On the other hand, in response to the first input, in accordance with a determination that the application is not being shared in a content-sharing session (e.g., the application is not being shared in any content-sharing session, and is not in a content-sharing session), the computer system ceases (15010) display of the application user interface (e.g., application user interfaces 9004, 9006, 9008 cease to be displayed, as shown and described in reference to FIGS. 9A and 9B).

Using the first input to the input device to dismiss private applications of a user while not affecting any shared applications minimizes disruption to both the user and other users during the shared experience, increasing an efficiency of multi-user interaction. The ability to use the first input to distinguish between shared applications and private (e.g., not-shared) applications allows separate control of the two categories of applications (e.g., prioritizing the shared applications over the private applications), without having to display additional controls. The amount of disruption the user may experience while in a group interaction session is reduced by the ability to quickly dismiss private applications using the first input, and to more readily bring shared applications into focus.

In some embodiments or in some circumstances, the computer system shares the application currently in the content-sharing session with the multiple participants in a real-time communication session (e.g., as shown and described in reference to FIG. 9D, the video-player application user interface 9002 is shared in a content-sharing session with Abe, Mary, Edwin, and Isaac, as shown and described in reference to FIG. 9D). For example, the multiple participants of the real-time communication session can communicate with one another using audio (e.g., via microphones and/or speakers that are in communication with the respective computer systems of the users) and video, and/or a 3D representation such as an avatar that represents changes in a position and/or expression of a participant in the real-time communication session over time. In some embodiments, audio received from a respective user is simulated as being received from a position corresponding to the respective user's current position in the three-dimensional environment (e.g., the sound of Edwin's voice is presented to the participants as originating at the location 9408 within the shared three-dimensional environment 9200'. For example, Abe who is at location 9402, hears Edwin's voice as coming from a position to the right hand direction of Abe's position, while Isaac, who is at location 9406, hears Edwin's voice as coming from a forward direction from Edwin's position, as shown and described in reference to FIG. 9D). In some embodiments, the location in the virtual three-dimensional environment where the content-sharing session occurs is different from a location of representations of the multiple participants (e.g., the content-sharing session of application user interface 9002 occurs near a location 9010, and is different from the locations of Abe, Mary, Isaac, and Edwin, who are at positions 9402, 9404, 9406, and 9408, respectively as shown and described in reference to FIG. 9D).

Providing a content-sharing session within a real-time communication session (e.g., a "copresence session") expands the range of media experience in the real-time communication session. Instead of only exchanging participant-originated data (e.g., video conference audio and video data of or generated by the participants), independent sources of data (e.g., media content, gaming content, web content) can be shared in the real-time communication session with multiple participants.

In some embodiments, the application user interface of the application currently being shared in the content-sharing session, or an element or a respective portion of the application user interface of the application currently being shared in the content-sharing session, has a shared spatial relationship in which one or more user interface objects that are visible to the multiple participants in the content-sharing session (e.g., in a real-time communication session as shown and described in reference to FIG. 9D, the content-sharing session of application user interface 9002 occurs near a location 9010, which is behind box 7016, a user interface objects which is visible to the multiple participants in the content sharing session, and a spatial relationship between box 7016 and the application user interface 9002 is consistent for Abe, Mary, Isaac, and Edwin, who are at positions 9402, 9404, 9406, and 9408, respectively as shown and described in reference to FIG. 9D) have a consistent spatial relationship from different viewpoints of the multiple participants in the content-sharing session (e.g., box 7016 appears to the left of Edwin, and most of application user interface 9002 appears on the right of the box 7016, with respect to Edwin who is located at position 9408. In contrast, box 7016 appears to the right of Abe, and most of application user interface 9002 also appears on the right of box 7016, with respect to Abe who is located at position 9402, as shown and described in reference to FIG. 9D, method 1500 optionally includes maintaining a shared spatial relationship for the application user interface, an element or a portion of the application user interface, or one or more user interface objects that are visible to the multiple participants in the content-sharing session such that different viewpoints of the multiple participants in the content-sharing session have a consistent spatial relationship, as shown and described in reference to FIG. 9D).

Allowing a shared application to have shared spatial relationships relative to multiple users increases a three-dimensional realism of the experience and increases the ease of use for each user. Each user can independently position herself at a location relative to a user interface object that represents respective content that is selected for/fine-tuned to the particular user. A spatial relationship (between the user interface object and the representation of a particular user) selected for a particular user would not impact the spatial relationship that is desired for another user. Allowing different spatial relationships between an application, or elements or portions of the application, and different users enhances the ability of the different users to control their individual interactions (e.g., viewing interaction) with the application, or elements or portions of the application.

In some embodiments, the shared spatial relationship is such that: a spatial relationship between a first user interface object that represents respective content to a first participant and a viewpoint of the first participant from a perspective of the first participant is consistent with a spatial relationship between a second user interface object that represents the respective content to a second participant and a representation of the first participant from a perspective of the second participant; and a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant (e.g., a representation of Edwin (located at position 9408) appears to the right of Abe (located at position 9402), and most of the application user interface of 9002 appears between box 7016 and the representation of Edwin at position 9408, in a direction to the right of Abe, from Abe's viewpoint. In contrast, a representation of Abe, appears to the left of Edwin, and most of application user interface 9002 appears on the right of the box 7016, in a direction to the left of Edwin, from Edwin's viewpoint as shown and described in reference to FIG. 9D).

Allowing a shared application to have different spatial relationships relative to multiple users increases a three-dimensional realism of the experience and increases the ease of use for each user. Each user can position herself at a location relative to a user interface object that represents respective content that is selected for/fine-tuned to the particular user. The spatial relationship (between the user interface object and the representation of a particular user) selected for a particular user would not impact the spatial relationship that is desired for another user. Allowing different spatial relationships to be obtained between different users enhances the ability of the different users to control their individual interactions (e.g., viewing interaction) with each of the user interface object.

In some embodiments, the computer system detects an input by the first participant of the multiple participants to move the application user interface of the application currently being shared in the content-sharing session; and in response to detecting the input by the first participant to move the application user interface, the computer system moves, for both the first participant and the second participant of the multiple participants, the application user interface of the application currently being shared in the content-sharing session, or the element or the respective portion of the application user interface of the application currently being shared in the content-sharing session (e.g., as shown and described in reference to FIG. 9D). For example, during and after moving the application user interface or an element or portion of the application user interface, the spatial relationship of the application user interface or element or portion of the application user interface, changes in a consistent way relative to the first participant and second participant of the multiple participants. If the second participant moves content (e.g., the second user interface object, or the application user interface), the content will also move for the first user (e.g., the "same content" will move in the representations of the application user interface, or the representations of a three-dimensional environment, that are provided to both the first participant and the second participant. Multiple participants can control playback of media (e.g., music, video, or animated content) shared in the content-sharing session, for example, by performing media playback control actions such as scrubbing (e.g., positioning a control element of a scrub bar), fast forwarding, rewinding and/or playing/pausing.

Allowing one participant to move the user interface of the application for another participant obviates the need to sequentially or manually apply the same changes to multiple participants, improving communication efficiency for the multiple participants. Allowing simultaneous changes in spatial relationships in a self-consistent way between user interface objects that represent respective content to different participants increases the realism of the multi-user experience and better simulates a content-sharing experience in the physical environment.

In some embodiments, the computer system displays the home menu user interface in front of the application user interface of the application (e.g., the home menu user interface 7110 is presented closer to the user, in a z-direction, than the application user interface 9002, as shown and described in reference to FIG. 9B).

Displaying the home menu user interface in front of the application user interface of the application allows a user to navigate a collection of applications in the home menu user interface and/or change a virtual environment for that user and/or interact with additional users while an ongoing content-sharing session is in progress. Displaying the home menu user interface in front of the application user interface increases operational efficiencies—obviating the need to disrupt (e.g., by having to close out of) the content-sharing session of a shared application in order for a particular user to navigate the home menu user interface.

In some embodiments, the computer system concurrently displays application user interfaces of two or more applications (e.g., the two of more applications include private applications and/or applications used in a content-sharing session, for example, video player application having application user interface 9002, which is in a content-sharing session with Abe, Mary, Isaac, and Edwin, and application user interface 9004, which corresponds to a messaging application, application user interface 9006, which corresponds to a calendaring application, and application user interface 9008, which corresponds to a web browsing application, as shown and described in reference to FIG. 9A).

Concurrently displaying application user interfaces of two or more applications allows a user to multi-task, providing more information to the user without requiring additional user input, increasing operational efficiency of the computer system.

In some embodiments, in response to the first input: the computer system ceases to display a respective application user interface of the two of more applications while continuing to display another application user interface of the two or more applications (e.g., ceasing to display the application user interface of the two of more applications include ceasing to display the application user interface of a private application, like application user interfaces 9004, 9006, and 9008, as shown and described in reference to FIGS. 9A and 9B, and continuing to display another application user interface of the two or more applications include continuing to display the application user interface of an application used in a content-sharing session, like application user interface 9002, as shown and described in reference to FIG. 9B).

Using a first input to cease displaying application user interfaces of a first application while continuing to display an application user interface of another application helps to reduce the amount of disruption the user may experience while in a group interaction session, without having to display additional controls. Further, dismissing private applications while continuing to display a shared application in response to the first input enables the user to bring the shared application into focus, without having to display additional controls.

In some embodiments, in response to the first input: the computer system ceases to display (e.g., application user interfaces of) a first plurality of applications of the two or more applications (e.g. the first plurality of applications of the two or more applications is the group of private applications having no on-going content-sharing session) while continuing to display (e.g., an application user interface of) at least one application of the two or more applications (e.g., the at least one application of the two or more applications are applications currently in a content-sharing session, like application user interface 9002 as shown and described in reference to FIG. 9B).

Using a first input to cease displaying application user interfaces of a first plurality of applications while continuing to display an application user interface of another application helps to reduce the amount of disruption the user may experience while in a group interaction session. Dismissing private applications while continuing to display a shared application in response to the first input enables the user to bring the shared application into focus, without having to display additional controls. Further, the number of inputs needed to dismiss the private applications and maintain display of the shared application is reduced-instead of having to individually minimize or dismiss the first plurality of applications, the first input is sufficient to cease display of the first plurality of applications.

In some embodiments, in response to the first input: the computer system maintains a display of (e.g., application user interfaces of) a second plurality of applications of the two or more applications (e.g., the second plurality of applications of the two or more applications are applications currently in a content-sharing session, such as the application user interface 9002, which is in a content-sharing sessions with Abe, Isaac, Mary, and Edwin, as shown and described in reference to FIG. 9A) while the computer system ceases to display (e.g., an application user interface of) at least one application of the two or more applications (e.g. the at least one application is a private application having no on-going content-sharing session (e.g., application user interface 9004, 9006, and/or 9008), as shown and described in reference to FIG. 9B).

Using a first input to maintain a display of application user interfaces of a second plurality of applications while ceasing to display an application user interface of another application helps to reduce the amount of disruption the user may experience while in a group interaction session. Dismissing one or more private applications while continuing to display shared applications in response to the first input enables the user to bring the shared applications into focus, without having to display additional controls. Further, the number of inputs needed to dismiss the private applications and maintain display of the shared application is reduced—instead of having to individually minimize or dismiss the at least one application of the two or more applications, the first input is sufficient to maintaining display of a second plurality of applications of the two or more applications while ceasing to display at least one application of the two or more applications.

In some embodiments, while displaying both the home menu user interface and at least the portion of the application user interface of the application currently being shared in the content-sharing session (e.g., this state is reached after the first press input), the computer system detects a second input (e.g., a second press input); and in response to detecting the second input: the computer system ceases display of the home menu user interface but maintains display of the portion of the application user interface of the application currently being shared in the content-sharing session while not displaying the home menu user interface (e.g., while displaying the home menu user interface 7110, and the application user interface 9002, which is in a content-sharing session, as shown and described in reference to FIGS. 9B, the computer detects a second press input on the hardware input element 7108 (e.g., button, crown, or rotatable and depressible input element), and in response to detecting the second press input on the hardware input element 7108 (e.g., button, crown, or rotatable and depressible input element), the computer system dismisses the home menu user interface 7110, while maintaining display of the application user interface 9002, as shown and described in reference to FIG. 9C).

Using a second input, such as a press input, to dismiss the home menu user interface provides an efficient way to terminate navigational activities on the home menu user interface without disrupting the content-sharing session of the shared application. No additional controls have to be provided to the user, and the user does not need to navigate through any additional user interface control elements to exit the home menu user interface, improving operational efficiency of the device.

In some embodiments, the computer system concurrently displays, via the display generation component, the application (e.g., an application user interface of the application) currently being shared in the content-sharing session and a passthrough portion of a physical environment of the computer system (e.g., concurrently displaying both application user interface 9002, which is in a content-sharing session, and a passthrough portion of the physical environment of the computer system, as described in reference to FIG. 9C).

Allowing the shared application to be displayed concurrently with passthrough content improves safety for the user, by allowing the user to be cognizant of the physical environment of the computer system (via the passthrough portion of the physical environment of the computer system) (e.g., to respond to an emergency or other situations that require the user's attention or require the user to interact with the physical environment) while not disrupting an ongoing content-sharing session that involves more than one user.

In some embodiments, while displaying the home menu user interface, the computer system detects a movement of the application user interface by the second participant of the multiple participants, and in response to detecting the movement of the application user interface by the second participant, the computer system moves the application user interface for the multiple participants, including the first participant and the second participant, based on the movement of the application user interface by the second participant (e.g., application user interface 9002 is moved from one position to another position, as described above with reference to FIG. 9D).

Allowing other participants to move the user interface of the application while a first participant is navigating a home user interface on her individual computer system helps to minimize disruption to the multi-user experience (e.g., the content-sharing session of an application). For example, other participants can continue to interact with the user interface of the application that is in the content-sharing session without having to take into account or be constrained by the fact that a home menu user interface is displayed for the first participant. Further, allowing simultaneous changes in spatial relationships in a self-consistent way between user interface objects that represent respective content to different participants increases the realism of the multi-user experience and better simulates a content-sharing experience in the physical environment. Simultaneous changes to a position of the user interface of the application for two or more participants also obviates the need to sequentially or manually apply the same changes to the application user interface as seen by (e.g., displayed by respective computer systems of the) multiple participants, improving communication efficiency for the multiple participants.

In some embodiments, the first input to the input device includes a press input on a hardware button or a solid state button. In some embodiments, the hardware button includes a rotatable input element or mechanism such as a digital crown.

Providing a dedicated button (e.g., a solid state button, or a hardware button) to receive the first input allows a user (e.g., without having to interact with the user interface of any software application) to more quickly and responsively distinguish between shared applications and private applications. Instead of wasting time closing applications and/or navigating to special user interface control elements to manually select shared applications, the dedicated button (e.g., hardware, or solid state button) is able to quickly dismiss private applications and bring shared applications into focus, without having to display additional controls. Reducing the number of inputs needed to dismiss private applications and bring shared applications into focus enhances the operability of the device and makes the user-device interface more efficient which, additionally, reduces power usage and improves battery life of the device by enabling the user to use the device more quickly and efficiently.

FIG. 16 is a flow diagram (also called a flowchart) of an example method 1600 for resetting an input enrollment process, in accordance with some embodiments.

In some embodiments, the method 16000 is performed at a computer system (e.g., computer system 101 in FIG. 1) including a display generation component (e.g., display generation component 120 in FIGS. 1A, 3, and 4) (e.g., a heads-up display, a display, a touchscreen, or a projector) and one or more cameras (e.g., a camera (e.g., color sensors, infrared sensors, and other depth-sensing cameras) that point downward at a user's hand or a camera that points forward from the user's head). In some embodiments, the method 16000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 16000 are, optionally, combined and/or the order of some operations is, optionally, changed.

In some embodiments, the method 16000 is performed at a computer system (e.g., computer system 101 in FIG. 1) that is in communication with a display generation component (e.g., display generation component 120 in FIGS. 1A, 3, and 4, or display generation component 7100) (e.g., a heads-up display, an HMD, a display, a touchscreen, or a projector) and one or more input devices (e.g., cameras, controllers, touch-sensitive surfaces, joysticks, buttons, gloves, watches, motion sensors, orientation sensors, and/or a rotatable input mechanism, such as a crown). In some embodiments, the display generation component is a display component facing the user and provides a XR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from one or more of the display generation components (e.g., a heads-up display, a touch-screen, or a standalone display), the one or more output devices (e.g., earphones, or external speakers) and the one or more input devices. In some embodiments, the display generation components and the one or more audio output devices are integrated and enclosed in the same housing.

In the method 16000, the computer system includes or is in communication with a display generation component and one or more input devices (e.g., a button, a dial, a rotatable input element, switch, a movable component, or a solid state component, camera, infrared sensors, accelerometers, gyroscopes, inertial measurement sensors, touch-sensitive surfaces (e.g., a device that detects localized sensor input such as intensity or force sensor input, which the computer system uses to trigger corresponding operations and optionally provides tactile feedback such as haptic feedback corresponding to the detected inputs), cameras, controllers, and/or joysticks). While the computer system is in operation (e.g., while an application is running, or while an application to which the user is providing the first type of input is running), the computer system detects (16002) a first input of a first type of input via an input device (e.g., camera, infrared sensors, and/or inertial measurement sensors, accelerometers, or gyroscopes) of the one or more input devices, wherein the first type of input is determined based on a location and/or movement of a first biometric feature (e.g., a position and/or movement of an eye, pupil, face, head, body, arm, hand, finger, leg, foot, toe, or other biometric feature of a user of the device).

In response to detecting (16004) the first input via the input device, the computer system performs (16006) a first operation in accordance with the first input, wherein the operation is determined at least in part by first input enrollment information from a previous input enrollment process for the first type of input. After performing the first operation in accordance with the first input (e.g., the first operation is not satisfactorily performed due to inaccurate calibration of the first type of input or other defects relating to the previous input enrollment process, or recalibration is needed due to a change in one or more characteristics of the user (e.g., an impairment that changes the appearance or other characteristics of the user's fingers, wrist, arms, eyes (e.g., due to infection or change of contact lens types/colors), or voice (e.g., due to illness))), the computer system detects (16008) a second input of a second type of input (e.g., the second type of input is different from the first type of input) via an input device of the one or more input devices (e.g., the same input device or a different input device), and in response to detecting (16010) the second input, the computer system initiates (16012) a process for input enrollment for the first type of input (e.g., by presenting one or more of user interface 10004, user interface element 10006, user interface element 10008, visual indication 10012 as shown and described in reference to FIGS. 10B-10D).

Using a second type of input to initialize input enrollment reset for a first type of input allows more precise and accurate input enrollment information to be used for calibration and/or performing operations based on the first type of input. Instead of having a user navigate through user interface elements (e.g., menus or other control elements) using the first type of input in order to reset the input enrollment for the first type of input (e.g., first type of input may need to be reset due to inaccurate calibration, making it difficult use the inaccurately calibrated first type of input to navigate interface control elements), using a second type of input to initialize input enrollment improves operational efficiency, reduces user frustration, and reduces the number of inputs needed for initializing an input enrollment reset process. The use of the second type of input to reset input enrollment also helps to reduce the amount of time needed to begin the input enrollment reset process. For example, the use of the second type of input enables input enrollment reset to be initialized without displaying additional controls (e.g., navigating through user interface elements using the first type of input).

In some embodiments, the first type of input includes the user's gaze, the first biometric feature includes a position and/or movement of the user's eye (e.g., input enrollment for the first type of input includes determining, or calibrating, an interpupillary distance, a size of an iris, and/or a range of angular movement of the user's eye), and the input device via which the first input of the first type of input is detected includes a camera (e.g., a RGB/visible spectrum camera, and/or infrared camera).

Allowing an input enrollment reset for eyes/gaze using a second type of input (e.g., a pressure input or a touch input) on a different input device (e.g., a hardware or a solid state button) allows an input of a first modality (e.g., tactile touch/mechanical actuation, a button 7508, as shown and described in reference to FIGS. 10A-10D) to reset calibration for input of a different modality (e.g., gaze). Calibration corrections in one modality (gaze/eye tracking) can be initialized using a more reliable mode of input that does not require calibration (e.g., tactile touch/mechanical actuation on a hardware/solid state button), which improves the reliability and operational efficiency of the computer system.

In some embodiments, the first type of input includes the user's hand movement, the first biometric feature includes a position and/or movement of one or more portions of the user's hand (e.g., input enrollment for the first type of input includes determining, or calibrating, a size of a person's hand, a range of motion of a user's hand or wrist, lengths of different articulated joints in the user' hand, and/or range of motion of different articulated joints in the hand), and the input device via which the first input of the first type of input is detected includes a camera (e.g., a RGB/visible spectrum camera, and/or an infrared camera).

Allowing an input enrollment reset for hand tracking using a second type of input (e.g., pressure/touch) on a different input device (e.g., hardware/solid state button) allows an input of a first modality (e.g., tactile touch/mechanical actuation) to reset calibration for input of a different modality (e.g., hand tracking, visual hand tracking, infrared hand tracking). Calibration corrections in one modality (hand-tracking) can be initialized using a more reliable mode that does not require calibration (e.g., tactile touch/mechanical actuation on a hardware/solid state button, such as button 7508 as shown and described in reference to FIGS. 10A-10D), which improves the reliability and operational efficiency of the computer system.

In some embodiments, initiating the process for input enrollment for the first type of input includes presenting to the user instructions (e.g., user interface element 10006 and user interface element 10008, as shown and described in reference to FIG. 10C) for input enrollment for the first type of input (e.g., instructions to rotate the user's head slowly, rotate the user's head in a particular direction, as shown and described in reference to FIG. 10C, or gaze at a displayed virtual object (e.g., as the virtual object is moved, or displayed at a fixed location), move the user's hands to various locations, and/or perform different hand gestures), and collecting second input enrollment information for the first type of input based on user actions performed in accordance with the presented instructions. (e.g., causes a new input enrollment experience to be presented to the user as shown and described in reference to FIGS. 10B-10D.)

Collecting second input enrollment information after the enrollment reset is initiated allows calibration of the first type of input to be updated and improved, increasing operational efficiency of user-machine interactions based on the first type of input.

In some embodiments, the computer system detects a third input of the first type of input via the input device of the one or more input devices; in response to detecting the third input via the input device, the computer system performs a second operation in accordance with the third input, wherein the second operation is determined at least in part by the second input enrollment information for the first type of input. In some embodiments, the computer system extracts statistical information from the previous input enrollment process and the second input enrollment information, and the computer system calibrates the first type of input using a weighted average of all collected input enrollment information.)

Performing the second operation based at least in part on the second input enrollment information of the first type of input allows new operations to be performed using the first type of input that is better calibrated, updated, and/or improved, increasing operational efficiency of user-machine interactions based on the first type of input.

In some embodiments, the input device includes a button (e.g., a hardware button, a solid-state button, a rotatable input element).

Providing a dedicated button (e.g., a solid state button, a hardware button, button 7508 as shown and described in reference to FIGS. 10A-10D) to reset other types of user input (e.g., hand tracking or gaze tracking) allows a user (e.g., while using any software application) to more quickly and responsively trigger an input enrollment reset. Instead of wasting time closing applications and/or navigating to special user interface control elements using inaccurately calibrated biometric input, an actual button (e.g., a hardware, or a solid state button) is able to quickly trigger a user input enrollment reset for inputs of the first type without relying on inaccurately calibrated inputs, e.g., biometric inputs, to trigger the user input enrollment reset.

In some embodiments, the button is further configured to turn the computer system on or off, and method 1600 includes, while the computer system is not in operation, the computer system 101 detects a fourth input on the button, and in response to detecting the fourth input on the button, the computer system is turned on. Optionally, method 1600 further includes, prior to turning off the computer system, the computer system determines if a prior input is a press and hold input, in accordance with a determination that the prior input is a press and hold input, the computer system is turned off. Further, in accordance with a determination that the prior input is not a press and hold input, the computer system refrains from turning off. In some embodiments, the press and hold input is provided to a rotatable input element (e.g., rotatable input element 7108, as shown and described in reference to FIGS. 11A-11F).

In some embodiments, prior to initiating the process for input enrollment for the first type of input, the computer system determines if the second input is a first series of press inputs, and if the input device is a button (e.g., or a rotatable input element that is configured to detect both press and rotational inputs, like rotatable input element 7108 as shown and described in reference to FIGS. 11A-11F), in accordance with a determination that the second input is a first series of press inputs and that the input device is a button (e.g., or a rotatable input element), the computer system initiates the process for input enrollment for the first type of input; and in accordance with a determination that the second input is not a first series of press inputs or that the input device is not a button (e.g., not a rotatable input element), the computer system refrains from initiating the process for input enrollment for the first type of input. In some embodiments, the first series of press inputs includes four consecutive press inputs.

Triggering multiple system operations using different types of inputs on a single input device (e.g., triggering operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret distinct inputs from a smaller number of input devices.

In some embodiments, while the computer system is in a sleep mode, the computer system detects a fifth input on the button; and in response to detecting the fifth input on the button, the computer system wakes the computer system from the sleep mode (e.g., when button 12016 on computer system (e.g., watch 12010 or HMD 12011) is pressed, the computer system (e.g., watch 12010 or HMD 12011) wakes from the sleep mode as shown and described in reference to FIGS. 12D1 and 12D2, to the standby mode of operation as shown and described in reference to FIGS. 12E1 and 12E2). In some embodiments, prior to waking the computer system from the sleep mode, the computer system determines if the fifth input is a press input. In accordance with a determination that the fifth input is a press input, the computer system wakes from the sleep mode; and in accordance with a determination that the fifth input is not a press input, the computer system refrains from waking from the sleep mode.

Providing multiple system operations in response to different inputs to a single input device (e.g., triggering operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret distinct inputs from a smaller number of input devices.

In some embodiments, the computer system detects a sixth input on the button; and in response to detecting the sixth input on the button, the computer system captures media rendered visible via the display generation component. In some embodiments, prior to capturing media rendered visible via by the display generation component, the computer system determines if the sixth input is a press input. In accordance with a determination that the sixth input is a press input, the computer system captures media rendered visible via by the display generation component (e.g., when button 7508 is pressed, media provided by display generation component through application user interface 11002 as shown in FIG. 11C is captured); and in accordance with a determination that the sixth input is not a press input, the computer system refrains from capturing media rendered visible via by the display generation component.

Providing multiple system operations in response to different inputs to a single input device (e.g., operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret distinct inputs from a smaller number of input devices.

In some embodiments, the computer system detects a seventh input on the button in conjunction with detecting an eighth input on a second input device. In some embodiments, the seventh input and the eighth input are concurrent or overlapping inputs. In response to detecting the seventh input to the button in conjunction with the eighth input on the second input device, the computer system performs one or more system operations (e.g., when button 7508 and hardware input element 7108 (e.g., button, crown, or rotatable and depressible input element) are pressed and released together, a screenshot of the display as shown in FIG. 11E is captured; when button 7508 and hardware input element 7108 (e.g., button, crown, or rotatable and depressible input element) are pressed and held, all displays generated by the display generation component shown in FIG. 11E cease, as the computer system powers off). In some embodiments, which system operation(s) is (are) performed depends on a duration and a pattern of the seventh input and the eighth input. Concurrently detected inputs, such as the seventh input and the eighth input, are sometimes called chorded inputs. In some embodiments, prior to performing the one or more system operations, the computer system determines if the seventh input is a press input, if the eighth input is a press input, and if the second input device is a rotatable input element. In accordance with a determination that the seventh input is a press input, the eighth input is a press input, and the second input device is a rotatable input element, the computer system performs one or more system operations. In accordance with a determination that the seventh input is not a press input, the eighth input is not a press input, or the second input device is not a rotatable input element, the computer system refrains from performing one or more system operations.

The combined use of more than one input device to request or instruct respective system operations (e.g., operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret chorded inputs from a smaller number of input devices.

In some embodiments, the one or more system operations are selected from a group consisting of: taking a screenshot, restarting the computer system, or resetting the computer system (e.g., as shown and described in reference to Table 2). The use of chorded inputs enables system operations (e.g., operations not specific to a particular application) such as capturing screenshots, restarting the computer and resetting the computer system to be performed without displaying additional controls.

FIG. 17 is a flowchart of a method 17000 for adjusting a level of immersion of a user's extended reality (XR) experience in a three-dimensional environment, in accordance with some embodiments.

In some embodiments, the method 17000 is performed at a computer system (e.g., computer system 101 in FIG. 1) including a display generation component (e.g., display generation component 120 in FIGS. 1A, 3, and 4) (e.g., a heads-up display, a display, a touchscreen, or a projector) and one or more cameras (e.g., a camera (e.g., color sensors, infrared sensors, and other depth-sensing cameras) that point downward at a user's hand or a camera that points forward from the user's head).

In some embodiments, the method 17000 is governed by instructions that are stored in a computer-readable storage medium (optionally a non-transitory computer-readable storage medium) and that are executed by one or more processors of a computer system, such as the one or more processors 202 of computer system 101 (e.g., control unit 110 in FIG. 1A). Some operations in method 17000 are, optionally, combined and/or the order of some operations is, optionally, changed.

In some embodiments, the method 17000 is performed at a computer system (e.g., computer system 101 in FIG. 1) that includes or is in communication with a display generation component (e.g., display generation component 120 in FIGS. 1A, 3, and 4, or display generation component 7100) (e.g., a heads-up display, an HMD, a display, a touchscreen, or a projector) and one or more input devices (e.g., cameras, controllers, touch-sensitive surfaces, joysticks, buttons, gloves, watches, motion sensors, orientation sensors, and/or a rotatable input mechanism, such as a crown). In some embodiments, the display generation component is or includes a display component facing the user and provides a XR experience to the user. In some embodiments, the computer system is an integrated device with one or more processors and memory enclosed in the same housing as a first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from one or more of the display generation components (e.g., a heads-up display, a touch-screen, or a standalone display), the one or more output devices (e.g., earphones, or external speakers) and the one or more input devices. In some embodiments, the display generation components and the one or more audio output devices are integrated and enclosed in the same housing.

In the method 17000, the computer system includes or is in communication with a display generation component and one or more input devices (e.g., a button, a dial, a rotatable input element, a switch, a movable component, a solid state component, a touch-sensitive input device (e.g., a device that detects localized sensor input such as touch, touch movement and/or touch intensity, which the computer system uses to trigger corresponding operations and optionally provides tactile feedback such as haptic feedback corresponding to the detected inputs), cameras, infrared sensors, accelerometers, and/or gyroscopes)). The computer system detects (17002) a first input (e.g., a rotational input, or a press input) on a rotatable input mechanism (e.g., a bidirectional rotatable input mechanism) of an input device of the one or more input devices. In response to detecting (17004) the first input on the rotatable input mechanism, in accordance with a determination that the first input is a first type of input (e.g., a rotational input), the computer system changes (17006) an immersion level associated with display of an extended reality (XR) environment (e.g., a three-dimensional environment) generated by the display generation component (e.g., while displaying the application user interface 110002 at a first immersion level as shown in FIGS. 11B, in response to detecting a rotational input in a first rotational direction on the rotational input element 7108, the display generation component presents a second immersion level as shown in FIG. 11C, in which a larger view of angle of the user's field of view is presented with virtual content 11006 to the user; while displaying the application user interface 110002 at the second immersion level as shown in FIG. 11C, in response to detecting a rotational input in a second rotational direction on the rotational input element 7108, the display generation component presents the first immersion level as shown in FIGS. 11B, in which a smaller view of angle of the user's field of view is presented with virtual content 11004 to the user). For example, immediately prior to detecting the first input, the computer system provides a display of the XR environment, and in response to the first input the computer system decreases an immersion level of the displayed environment from an initial immersion level, in which the computer system displays a virtual reality (VR) environment in which no passthrough portion of a physical environment of the computer system is displayed (e.g., the three-dimensional environment 11000 shown in FIG. 11C has no passthrough portion of the physical environment of the computer system), to a first immersion level in which display of the XR environment concurrently includes virtual content from an application and a passthrough portion of a physical environment of the computer system (e.g., an immersion level includes a passthrough region showing representations 7004', 7006', 7008', and 7014' of the physical environment 7000, and virtual content such as box 7016, as shown and described in reference to FIG. 11A).

Level of immersion influences a user's perception experience by changing properties of a mixed reality three-dimensional environment. Changing a level of immersion changes a relative prominence of virtual content to content from the physical world (visual and/or audio). For example, for audio components, increasing an immersion level includes, for example, increasing noise cancellation, increasing a spatiality of spatial audio associated with the XR environment (e.g., by moving audio sources to more points around the user or increasing a number and/or volume of point sources of audio), and/or by increasing a volume of audio associated with the virtual environment. In some embodiments, increasing a level of immersion changes a degree to which the mixed-reality environment reduces (or eliminates) signals from the physical world that are presented to the user (e.g., audio and/or visual passthrough of a portion of the physical environment of the computer system). For example, increasing an immersion level includes increasing a proportion of the visual field of view that displays the virtual content, or decreasing a prominence of a representation of the real world (e.g., physical environment 7000 as shown and described in reference to FIG. 7A) by dimming, fading, or reducing an amount of the representation of the real world that is presented to the user.

Changing a level of immersion can also include changing a visual presentation of the mixed-reality environment, including an extent of a field of view and a degree to which visibility of the external physical environment is reduced. Changing a level of immersion can include varying a number or extent of sensory modalities that a user can use to interact with the mixed-reality three-dimensional environment (e.g., interacting through user's voice, gaze, and body motion). Changing a level of immersion can also include changing an extent of a fidelity and a resolution with which the mixed-reality environment simulates a desired environment. Changing a level of immersion can also include modifying an extent to which a viewpoint of the mixed-reality environment is modified to match a user's viewpoint or perspective, e.g., through capture of the user's motion and timely adjustment of portions of the three-dimensional environment that lie within a field of view. In some embodiments, the change in the level of immersion optionally has a magnitude based on a magnitude of rotation and/or has a direction based on a direction of rotation, e.g., changing an immersion level includes increasing a proportion of the visual field of view that displays the virtual content, or decreasing a prominence of a representation of the real world (e.g., by dimming, fading, or reducing an amount of the representation of the real world that is displayed). For audio components, changing an immersion level includes, for example, increasing noise cancellation, increasing a spatiality of spatial audio associated with the virtual environment (e.g., by moving sources to more points around the user or increasing a number and/or volume of point sources of audio), and/or by increasing a volume of audio associated with the virtual environment). In some embodiments, the first input is a press input and a number of presses is matched to a level of immersion (e.g., three presses corresponds to a higher level of immersion compared to two presses).

In accordance with a determination that the first input is a second type of input (e.g., a press input), the computer system performs (17008) an operation different from changing the immersion level associated with display of the XR environment. Optionally, the operation may be displaying home menu user interface 7110 as shown and described in reference to FIG. 11D, where the virtual content is computer generated content distinct from the passthrough portion of the physical environment, or the operation may be taking a screenshot, powering off the device, restarting the device, entering a hardware reset mode, or the like, as described in reference to Table 2.) In some embodiments, the operation is, optionally, performed without changing the immersion level. In some embodiments, the first input is a merged input that starts as a first type of input and ends as a second type of input, and/or the first input terminates when physical contact with the rotatable input mechanism ceases.

The use of a single input device (e.g., rotatable input element 7108, as shown and described in reference to FIGS. 11A-11F) that accepts two or more different types of input reduces the number of distinct input devices that have to be provided to request or instruct performance of different functionalities. The use of a rotational input mechanism allows the user to provide a continuous range of inputs, and bidirectionality of the rotational input mechanism allows the input to be easily and intuitively varied, in either direction, without having to display additional controls to the user. The same rotational input mechanism is able to receive a second type of input (e.g., a press input) that effects discrete functions (e.g., dismiss or display a user interface object). Reducing the number of input devices that have to be provided reduces physical clutter on the device, freeing up more physical space on the device and helps to prevent accidental inputs from inadvertent contacts. The use of the rotational input mechanism provides direct access to changes in immersion levels and the performance of different operations, reducing the amount of time needed to effect particular outcomes (e.g., the user does not have to navigate through menus or visually displayed control elements to make a selection for performing the operation and/or changing an immersion level), thereby improving operational efficiency of the computer system. Increasing an immersion level helps to remove constraints in the physical environment of the computer system (e.g., a more spacious virtual environment is realistically simulated by blocking out sensory out inputs from the physical environment (e.g., blocking visual input of a small/confined room, removing (audio) echoes from a small physical space) to provide a virtual environment that is more conducive for the user to interact with the application.

In some embodiments, in response to a second input of the first type of input, the computer system changes the immersion level associated with display of the XR environment generated by the display generation component to a second immersion level in which display of the XR environment concurrently includes different virtual content (e.g., additional virtual content is displayed at the second immersion level, which is a higher immersion level than the first immersion level, for example, at the second immersion level, a larger virtual content 11006 (e.g., virtual content extending over a larger angle of view) is presented to the user as shown and described in reference to FIG. 11C, compared to the first immersion level associated with the smaller virtual content 11004 (e.g., virtual content extending over a smaller angle of view) as shown and described in reference to FIG. 11B). In another example, virtual content is eliminated at the second immersion level, which is a lower immersion level than the first immersion level) or virtual content displayed with a different level of fidelity (e.g., same virtual content is displayed at a higher fidelity (e.g., in sharper contrast, at a higher resolution, and/or more realistic) at the second immersion level, which is a higher immersion level than the first immersion level. In another example, the same virtual content is displayed at a lower fidelity (e.g., in lower contrast, at a lower resolution, and/or less realistic, blends more into the display of the XR environment) at the second immersion level, which is a lower immersion level than the first immersion level) from the virtual content displayed when the first immersion level is associated with display of the XR environment. For example, the second immersion level includes different virtual content than the first immersion level, or the second immersion level has virtual content that is computer generated content distinct from the passthrough portion of the physical environment (e.g., virtual content 11006 as shown and described in reference to FIG. 11C, has computer generated content that is distinct from the passthrough portion of the physical environment, compared to virtual content 11004 as shown and described in reference to FIG. 11B).

The use of a rotational input mechanism allows the user to provide a continuous range of inputs, and observe direct visual changes in the XR environment, without having to display additional controls to the user. The use of the rotational input mechanism provides direct access to changes in immersion levels and the performance of different operations, reducing the amount of time needed to effect particular outcomes (e.g., the user does not have to navigate through menus or visually displayed control elements to make a selection for changing an immersion level), thereby improving operational efficiency of the computer system.

In some embodiments, the second type of input includes a press input, the computer system detects a third input provided to the rotatable input mechanism, and in response to the rotatable input mechanism detecting the third input as a press input, the computer system performs an operation selected from a group consisting of: dismissing an active application; dismissing a virtual object displayed via the display generation component; displaying an application manager user interface; enabling an accessibility mode; and redisplaying in the XR environment a plurality of previously displayed user interface elements (e.g., while an active application, such as the application user interface 7018 is displayed as shown in FIG. 7B, in response to detecting a user input (e.g., a press input on hardware input element 7108 (e.g., button, crown, or rotatable and depressible input element)), the application user interface 7018 is dismissed; while an active application, such as the application user interface 7018 is displayed as shown in FIG. 7B, in response to detecting two press inputs in quick succession, the system user interface 7180, as shown and described in reference to FIG. 7O, is displayed). In some embodiments, redisplaying in the XR environment a plurality of previously displayed user interface elements includes presenting user interface elements at new positions in the XR environment, in response to the user re-centering a field of view. In some embodiments, the computer system performs one or more operations described in reference to Table 3 in response detecting the third input.

The same rotational input mechanism is able to receive a second type of input (e.g., a press input, or a sequence of press inputs) that requests and instructs respective discrete/binary-type (e.g., on or off) functions (e.g., dismissing an active application; dismissing a virtual object displayed via the display generation component; displaying an application manager user interface; enabling an accessibility mode; and/or redisplaying in the XR environment a plurality of previously displayed user interface elements, as described in reference to Table 3).

In some embodiments, changing the immersion level (17006) associated with the display of the XR environment is based on detecting rotational inputs to the rotatable input mechanism (e.g., as shown and described in reference to FIGS. 11A-11F).

The use of a rotational input mechanism allows the user to provide a continuous or semi-continuous range (e.g., five (or eight or ten) or more distinct input values or levels) of inputs, and bidirectionality of the rotational input mechanism allows the input to be easily and intuitively varied, in either direction, without having to display additional controls to the user.

In some embodiments, changing the immersion level (17006) associated with display of the XR environment based on detecting the rotational inputs includes, in accordance with a determination that the first input is a rotational input in a first direction, the computer system increasing the immersion level (e.g., while displaying the application user interface 110002 at a first immersion level as shown in FIGS. 11B, in response to detecting a clockwise rotational input on the rotational input element 7108, the display generation component presents a second immersion level as shown in FIG. 11C, in which a larger view of angle of the user's field of view is presented with virtual content 11006 to the user); and in accordance with a determination that the first input is a rotational input in a second direction different from (e.g., opposite to) the first direction, the computer system decreasing the immersion level (e.g., while displaying the application user interface 110002 at the second immersion level as shown in FIG. 11C, in response to detecting a counter-clockwise rotational input on the rotational input element 7108, the display generation component presents the first immersion level as shown in FIGS. 11B, in which a smaller view of angle of the user's field of view is presented with virtual content 11004 to the user). In some embodiments, first direction is clockwise and second direction is counter-clockwise (or vice versa), clockwise rotational inputs increase the level of immersion and counterclockwise rotational inputs decrease the level of immersion (or vice versa).

The use of a rotational input mechanism allows the user to provide a continuous range of inputs, and bidirectionality of the rotational input mechanism allows the input to be easily and intuitively varied, in either direction, without having to display additional controls to the user.

In some embodiments, the first type of input includes a rotational input of the rotatable input mechanism, and the second type of input includes a press input of the rotatable input mechanism.

The use of a single input device (e.g., rotatable input element 7108, as shown and described in reference to FIGS. 11A-11F) that accepts two (or more) different types of input reduces the number of distinct input devices that have to be provided to effect different functionalities. Reducing the number of input devices that have to be provided reduces physical clutter on the device, freeing up more physical space on the device and helps to prevent accidental inputs from inadvertent contacts.

In some embodiments, in response to detecting the first input: in accordance with a determination that the first input is the second type of input and comprises a first number of press inputs, the computer system performs a first operation, and in accordance with a determination that the first input is the second type of input and includes a second number of press inputs different from the first number, the computer system performs a second operation different from the first operation. In some embodiments, the computer system is configured to perform a different operation based on a number of press inputs detected, as described in reference to Table 3. For example, for a single press input: (1) a home menu user interface is displayed (as shown and described in reference to FIGS. 7A and 7B), (2) a pass-through portion of the physical environment is provided (as shown and described in reference to FIGS. 7J-7K), or (3) the application exits a full-screen or immersive display mode (as shown and described in reference to FIGS. 8A, 8B, 8F and 8G). For example, in response to two press inputs, a force quit menu is displayed, as shown and described in reference to FIG. 7O. For three press inputs, the three press inputs toggle between an accessibility mode being active and the accessibility mode being inactive, or displays an option for enabling or disabling an accessibility mode.

Using the number of press inputs to influence operations reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret more types of inputs (e.g., based on a number of press inputs) from a particular input device.

In some embodiments, the computer system detects a first number of press inputs directed to the rotatable input mechanism; and in response to detecting the first number of press inputs directed to the rotatable input mechanism, the computer system dismisses an active application by causing the active application to run in a background and/or displaying, via the display generation component, a home menu user interface (e.g., while the application user interface 7018 is displayed as shown in FIG. 7B, in response to detecting a user input (e.g., a press input on hardware input element 7108 (e.g., button, crown, or rotatable and depressible input element)), the application user interface 7018 is dismissed and the home menu user interface 7110 is presented as shown and described in reference to FIG. 7C).

In some embodiments, the computer system detects a second number of press inputs directed to the rotatable input mechanism; and in response to detecting the second number of press inputs directed to the rotatable input mechanism, the computer system displays an application manager user interface. In some embodiments, the second number of press inputs is optionally different from the first number of press inputs. In some embodiments, the application manager user interface includes system interface 7180, a force quit menu from which the user can close currently running applications as shown and described in reference to FIG. 7O.

In some embodiments, the computer system detects a third number of press inputs directed to the rotatable input mechanism; and in response to detecting the third number of press inputs directed to the rotatable input mechanism, the computer system performs or enables an accessibility mode operation. In some embodiments, the first number of inputs, the second number of inputs, and/or the third number of press inputs, are optionally different from one another, as shown and described in reference to Table 2. In some embodiments, the three press inputs toggle between an accessibility mode being active and the accessibility mode being inactive, or displays an option for enabling or disabling an accessibility mode.

In some embodiments, the computer system detects a fourth number of press inputs directed to the rotatable input mechanism; and in response to detecting the fourth number of press inputs directed to the rotatable input mechanism, the computer system dismisses a virtual object by displaying a respective passthrough portion of the physical environment of the computer system (e.g., in response to detecting a press input to 7108, the computer system dismissed the blank virtual background shown in FIG. 7J, and presents the passthrough portion that includes the representation 7014', as shown and described in reference to FIG. 7K, and in response to detecting a press input to 7108, the computer system dismissed the blank virtual background on which the home menu user interface 7110 depicted in FIG. 9B is shown, and presents the passthrough portion that includes the representation 7014', as shown and described in reference to FIG. 9C). In some embodiments, the first number of inputs, the second number of inputs, the third number of press inputs, and/or the fourth number of press inputs are optionally different from one another. In some embodiments, all virtual objects are dismissed and the computer system is transitioned to (or remains in) the lowest level of immersion (e.g., no immersion) in response to the press input to the rotatable input element. In some embodiments, in response to the press input to the rotatable input element, the immersion level decreases (e.g., more aspects of the physical environment are presented to user 7002) but virtual content from the application running in a foreground is still displayed (e.g., a passthrough portion that includes the representation 7014' is presented, but box 7016 is still displayed, as shown and described in reference to FIGS. 7K and 9C).

Using the number of press inputs to influence operations reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret more types of inputs (e.g., based on a number of press inputs) from a particular input device.

In some embodiments, in response to detecting the first input: in accordance with a determination that the first input is the second type of input and has a duration meeting first criteria, the computer system performs a first operation, and in accordance with a determination that the first input is the second type of input and has a duration meeting second criteria different from the first criteria, (e.g., the duration meeting the second criteria is different from the duration meeting the first criteria) the computer system performs a second operation different from the first operation. In some embodiments, the computer system is configured to perform different operations for press inputs of different durations. In some embodiments, pressing and holding the rotatable input element (e.g., hardware input element 7108 (e.g., button, crown, or rotatable and depressible input element)) causes the display to re-center (e.g., fade out and fade in), whereas a tap or short, single press input causes (1) the home menu user interface to be displayed (e.g., as shown and described in reference to FIGS. 7C), (2) a passthrough portion of the physical environment to be provided (e.g., as shown and described in reference to FIGS. 7K and 9C), or (3) an application (e.g., application user interface 8000) to exit a full-screen mode, as shown and described in reference to FIGS. 8A, 8B, 8F, and 8G.

The use of an input duration to influence system operations (e.g., operations not specific to a particular application) reduces the number of distinct input devices that have to be provided to accomplish different tasks (e.g., N input devices can effect M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret more types of inputs (e.g., a short press, a long press and hold) from a particular input device.

In some embodiments, in accordance with the determination that the first input is the second type of input (e.g., a press input), the computer system displays in the XR environment a home menu user interface (e.g., the home menu user interface 7110 appears in a foreground, closer to the user than other objects or features of the XR environment, as shown and described in reference to FIGS. 9B, 11D and 11F).

The ability to navigate a home menu user interface (e.g., by accessing the collection of applications on the home menu user interface, or the collection of contacts capable of interacting with the user) while the user is in the XR environment reduces the amount of time needed to complete the user's desired operation, independently of the current display mode (e.g., VR or AR). Navigation of the home menu user interface is not restricted to specific modes, and no additional controls needs to be displayed to the user for accessing the home menu user interface.

In some embodiments, the computer system detects a fourth input of the second type of input in conjunction with detecting a fifth input on a second input device. In some embodiments, the fourth input and the fifth input are concurrent or overlapping inputs. In some embodiments, the second input device is a hardware or solid state button (e.g., the second input device is button 7508 and the first input device is rotatable input element 7108, as shown and described in reference to FIGS. 10A-10D). In some embodiments, the second input device is a camera. In response to detecting the fourth input of the second type of input in conjunction with the fifth input on the second input device, the computer system performs one or more third operations (e.g., when button 7508 and hardware input element 7108 (e.g., button, crown, or rotatable and depressible input element) are pressed and released together, a screenshot of the display as shown in FIG. 11E is captured; when button 7508 and hardware input element 7108 (e.g., button, crown, or rotatable and depressible input element) are pressed and held, all displays generated by the display generation component shown in FIG. 11E cease, as the computer system powers off). In some embodiments, which operation(s) is (are) performed as the one or more third operations depends on a duration and a pattern of the fourth input and the fifth input. In some embodiments, the computer system optionally performs the one or more third operations without performing operations that are performed when the rotatable input element is pressed by itself. Concurrently detected inputs, such as the fourth and fifth inputs, are sometimes called chorded inputs.

The combined use of more than one input device to request and instruct respective system operations (e.g., operations not specific to a particular application) reduces the number of distinct input devices that have to be provided to accomplish different tasks (e.g., N input devices can request and instruct M operations, where N<M). Reducing the number of input devices that have to be provided reduces physical clutter on the device, freeing up more physical space on the device and helps to prevent accidental inputs from inadvertent contacts. Reducing the number of input devices also reduces the need to provide additional hardware wiring within the device, and instead, the processor can be programmed to interpret chorded inputs from a smaller number of input devices.

In some embodiments, the third operation is an element selected from a group consisting of: taking a screenshot, powering off the computer system, restarting the computer system, and entering a hardware reset mode of the computer system (e.g., as shown and described in reference to Table 2). In some embodiments, the third operation is taking a screenshot when the button and the rotatable input element are pressed and released together (e.g., when button 7508 and hardware input element 7108 (e.g., button, crown, or rotatable and depressible input element) are pressed and released together, a screenshot of the display as shown in FIG. 11E is captured). In some embodiments, the third operation is powering off the computer when the button and the rotatable input element are pressed and held (e.g., when button 7508 and hardware input element 7108 (e.g., button, crown, or rotatable and depressible input element) are pressed and held, all displays generated by the display generation component shown in FIG. 11E cease, as the computer system powers off). In some embodiments, the third operation is force restarting the computer system when the button and the rotatable input element are pressed and held. In some embodiments, the third operation is entering a hardware reset mode when the button and the rotatable input element are pressed and initially held together, and then the button is released (e.g., the fifth input, which is a press input on the button, ends) while the fourth input, which is press input on the rotatable input element, continues.

The use of chorded inputs enables system operations (e.g., operations not specific to a particular application) such as capturing screenshots, powering off, restarting the computer and resetting the computer system to be performed without displaying additional controls.

FIG. 18 is a flowchart of a method 18000 for controlling a computer system based on physical positioning and changes in the physical position of the computer system relative to a user, and the state of the computer system, in accordance with some embodiments.

In some embodiments, the method 18000 is performed at a computer system (e.g., computer system 101 in FIG. 1) including a display generation component (e.g., display generation component 120 in FIGS. 1A, 3, and 4) (e.g., a heads-up display, a display, a touchscreen, or a projector) and one or more cameras (e.g., a camera (e.g., color sensors, infrared sensors, and other depth-sensing cameras) that point downward at a user's hand or a camera that points forward from the user's head). In some embodiments, the method 18000 is governed by instructions that are stored in a (optionally non-transitory) computer-readable storage medium and that are executed by one or more processors of a computer system, such as the one or more processors 202 of computer system 101 (e.g., control unit 110 in FIG. 1A). Some operations in method 18000 are, optionally, combined and/or the order of some operations is, optionally, changed.

In some embodiments, the method 18000 is performed at a computer system (e.g., computer system 101 in FIG. 1) that is in communication with a display generation component (e.g., display generation component 120 in FIGS. 1A, 3, and 4, or display generation component 7100) (e.g., a heads-up display, an HMD, a display, a touchscreen, or a projector) and one or more input devices (e.g., cameras, controllers, touch-sensitive surfaces, joysticks, buttons, gloves, watches, motion sensors, orientation sensors, and/or a rotatable input mechanism, such as a crown). In some embodiments, the display generation component is a display component facing the user and provides a XR experience to the user. In some embodiments, the computer system is an integrated device with one or more processors and memory enclosed in the same housing as the first display generation components, the one or more audio output devices, and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from one or more of the display generation components (e.g., a heads-up display, a touch-screen, or a standalone display), the one or more output devices (e.g., earphones, or external speakers) and the one or more input devices. In some embodiments, the display generation components and the one or more audio output devices are integrated and enclosed in the same housing.

In the method 18000, the computer system is a wearable device (e.g., a watch, a pair of head phones, a head-mounted device, and/or a strapped-on device) that includes or is in communication with a display generation component and one or more input devices (e.g., a button, a dial, a rotatable input element, a switch, a movable component, or a solid state component, a device that detects localized sensor input such as intensity or force sensor input and the computer system uses that input to trigger corresponding operations and optionally provides tactile feedback such as haptic feedback corresponding to the detected inputs, a biometric sensor, a pulse sensor, a thermal sensor, a camera, and/or inertia measurement sensors). While a respective session (e.g., a media consumption session, a recording session, and/or a content-sharing session) is active (e.g., running and/or displayed in a foreground of the user interface) in a respective application (e.g., a media application, a conferencing application, a phone application, a gaming application, a web content browsing application, or other native application or third-party application) and while the wearable device is being worn (e.g., while the wearable device is in a state corresponding to the wearable device being worn), the wearable device detects (18002) a first signal indicating that the wearable device has been taken off (e.g., indicating that the wearable device is in the process of being taken off; computer system (e.g., watch 12010 or HMD 12011) is taken off the wrist of user as shown and described in reference to FIGS. 12C1 and 12C2; in addition to the computer system (e.g., watch 12010 or HMD 12011) shown in FIGS. 12B1-12G2, in some embodiments, the wearable device is a head-mounted display device (HMD). When the HMD is no longer covering the eyes of the user, the HMD is unable to continue gaze tracking the eyes of the user because a camera on the HMD (e.g., an interior camera positioned in the HMD to capture images of a user's eyes while the HMD is worn by the user) is no longer able to detect a presence of the user's eyes. The HMD then determines that the HMD device has been taken off).

In some embodiments, the first signal is a signal provided by a biometric sensor, for example, the biometric sensor may include a camera and an image processing component. When the image processing component is unable to locate the presence of any eyes in an image captured by the camera, the biometric sensor outputs a signal indicating that the wearable device has not been placed in front of a user's eye. In some embodiments, the biometric sensor is a pulse sensor (e.g., for detecting the pulse of a user) that returns a signal as an output to indicate that no pulse has been detected. In some embodiments, the first signal is a signal provided by an inertial measurement device (e.g., accelerometer, or gyroscope), when the inertial measurement device determines that it is oriented in a way that is incompatible to the wearable device being worn (e.g., the wearable device is positioned upside down, the wearable device is lying on its side, a camera in the wearable device, due to the orientation of the wearable device, is pointed skyward or to the ground). In some embodiments, the first signal is a signal provided by a thermal sensor. For example, the thermal sensor detects when it has been removed from a source of body heat of the wearer. In some embodiments, signals from multiple biometric sensors are jointly analyzed to determine if the wearable device is being worn, has been taken off, or is in the process of being taken off. For example, when a user places the wearable device on her forehead (e.g., as a result of the user moving the wearable device from a position over the user's eyes to a position on the user's forehead), a camera of the wearable device does not detect the presence of any eyes, but a thermal sensor of the wearable device detects body heat and an inertial measurement device of the wearable device detects an "upright" position of the wearable device, and the wearable device determines based on those signals that the wearable device is being worn, but may be in the processing of being taken off.

In response to detecting (18004) the first signal, the wearable device causes (18006) the respective session of the respective application to become inactive (e.g., computer system (e.g., watch 12010 or HMD 12011) pauses a song when computer system (e.g., watch 12010 or HMD 12011) is taken off the wrist of user, as shown and described in reference to FIGS. 12C1 and 12C2), and while the respective application is inactive (e.g., the respective application is inactive when a respective session of the respective application is inactive, the respective application is inactive when it is running in a background, paused, not receiving any user input, and/or not providing any output to the user), the wearable device detects (18008) a second signal indicating that the wearable device is being put on. In some embodiments, the second signal is a signal provided by a biometric sensor. For example, the biometric sensor may include a camera and an image processing component. When the image processing component is able to locate the presence of any eyes in an image captured by the camera, the biometric sensor outputs a signal indicating that the wearable device has now been placed in front of a user's eye. In some embodiments, the biometric sensor may be a pulse sensor that returns a signal as an output to indicate that a pulse has been detected. In some embodiments, the second signal is a signal provided by an inertial measurement device (e.g., accelerometer, or gyroscope) when the inertial measurement device determines that it is oriented in a way that is compatible to the wearable device being worn (e.g., the wearable device is not positioned upside down, the wearable device is not lying on its side, a camera in the wearable device is not pointed skyward or to the ground). In some embodiments, the second signal is a signal provided by a thermal sensor. For example, the thermal sensor detects a source of body heat of the wearer. In some embodiments, signals from multiple biometric sensors are jointly analyzed to determine if the wearable device is being worn. For example, when a user places the wearable device on her forehead, the camera will not detect the presence of any eyes, but the thermal sensor will still detect body heat and the inertial measurement device will detect an "upright" position of the wearable device).

In response (18010) to detecting the second signal, in accordance with a determination that respective criteria are met, the wearable device resumes (18012) the respective session of the respective application; and in accordance with a determination that respective criteria are not met, the wearable device forgoes (18014) resuming the respective session of the respective application, wherein the respective criteria include a criterion that is met when a current user of the wearable device is determined to be an authorized user of the wearable device. In some embodiments, the wearable device determines a user to be an authorized user based on an automatic biometric verification, based on entry of a passcode, or based on a sharing mode being active (e.g., using biometric feature 12026 as shown and described in reference to FIGS. 12F1, 12F2, 12G1 and 12G2). When the wearable device corresponds to a head-mounted display device, instead of a biometric feature like 12026, the head-mounted device relies on a gaze location, an iris pattern, a facial expression, an eye color and/or shape to authenticate if the user donning the head-mounted device is an authorized user.

Using respective criteria to determine whether to automatically resume a respective session of the respective application enables the respective session to be resumed without any active user input and without displaying additional controls. Using the respective criteria causes the device to automatically resume the respective session when the respective criteria are met, providing a more efficient man-machine interface for the wearable device, which provides a more efficient way for the user to control the wearable device, while minimizing disruptions, or requiring a user to navigate through additional control element before the respective session can be resumed. Determining whether a current user of the wearable device is an authorized user of the wearable device provides improved security and/or privacy protection by ensuring that the respective session of the respective application is only resumed when an authorized user is detected.

In some embodiments, the respective criteria include a type of the respective session satisfying predefined criteria (e.g., belonging to, or not belonging to) with respect to a predefined set of session types. In some embodiments, in accordance with a determination that the respective criteria are met because the respective session of the respective application is a first type of session (e.g., media consumption or real-time communication): the wearable device resumes the respective session of the respective application; and in accordance with a determination that the respective criteria are met because the respective session of the respective application is a second type of session (e.g., a recording session), the wearable device forgoes resuming the respective session of the respective application.

Using characteristics of the respective session of the respective application to determine whether to resume the respective session provides improved security/privacy by ensuring that the certain types of sessions that have more security/privacy protection (e.g., recording sessions) are not automatically restarted, after the wearable device has been removed from a user's body, even when an authorized user is detected.

In some embodiments, the respective criteria are met when the respective session of the respective application is configured to deliver media content to the authorized user of the wearable device. In some embodiments, the respective criteria are met when the respective session of the respective application is configured to allow generation, by participants of the respective session, real-time audio data or real-time video data of the participants and that the respective session is configured to provide information regarding positions of the participants in a three-dimensional environment (although not shown in FIGS. 12G1 and 12G2, if the user 7002 removes the computer system (e.g., watch 12010 or HMD 12011) on her wrist, and subsequently places the computer system (e.g., watch 12010 or HMD 12011) back on her wrist, the user interface 12024 will allow user 7002 resume the phone call with Abe, as shown in FIGS. 12G1 and 12G2). In some embodiments, the respective criteria include session criteria that are met if the session is a playback session of a media application or a non-recording session of a real-time communication application (although not shown in FIGS. 12C1 and 12C2, if the user 7002 places computer system (e.g., watch 12010 or HMD 12011) on her wrist (after taking off computer system (e.g., watch 12010 or HMD 12011), as shown in FIGS. 12C1 and 12C2) the user interface 12018 will resume delivery of media content, as shown in FIGS. 12B1 and 12B2). In some embodiments, the wearable device resumes the respective session of the respective application includes resuming a content-sharing session in which content of the respective application is concurrently visible to multiple participants in the content-sharing session.

In some embodiments, the respective criteria are not met when the respective application includes recording of content (e.g., audio data, and/or video data) generated during the respective session, and the wearable device forgoes resuming the respective session of the respective application. In some embodiments, the session criteria are not met if the application is a recording session in an application).

Not automatically resuming a recording session improves security/privacy by ensuring that, after the wearable device has been removed from an authorized user's body, even when the authorized user is detected, additional user inputs (e.g., permissions from other participants, navigating through additional control elements) are required before the recording session is resumed.

In some embodiments, the respective criteria are met when a time between detecting the first signal and detecting the second signal is less than a predetermined threshold (e.g., less than the timeout period, between the second (e.g., low power, standby, or hibernation) state to the fourth (authenticated) state), in which case the wearable device resumes the respective session of the respective application; and the respective criteria are not met when a time between detecting the first signal and detecting the second signal is equal to or greater than the predetermined threshold (greater than the timeout period, between the first (e.g., sleep, or low power) or second (e.g., low power, standby, or hibernation) state to the fourth (authenticated) state), in which case the wearable device forgoes resuming the respective session of the respective application (e.g., terminating the respective session of the respective application, although not shown in FIGS. 12C1 and 12C2, if the user 7002 places computer system (e.g., watch 12010 or HMD 12011) on her wrist (after taking off computer system (e.g., watch 12010 or HMD 12011), as shown in FIGS. 12C1 and 12C2) before the predetermined threshold has elapsed, the user interface 12018 will resume delivery of media content, as shown in FIGS. 12B1 and 12B2. If the user 7002 places computer system (e.g., watch 12010 or HMD 12011) on her wrist after the predetermined threshold has elapsed, the user interface 12018 forgoes resuming delivery of media content).

Not automatically resuming the respective session of the respective application after a predetermined time threshold helps to conserve battery power of the wearable device.

In some embodiments, the wearable device causes respective session of the respective application to become inactive by pausing playback of media content (e.g., video, audio, and/or other media playback are paused, as indicated by application user interface 12018 in FIGS. 12C1 and 12C2) from the respective session of the respective application.

Automatically pausing media playback helps to ensure an uninterrupted media experience for the authorized user once the wearable device is put on again. The authorized user does not need to proactively or manually pause the media consumption session when the wearable device is taken off. The authorized user also does not need to proactively or manually resume the media consumption session after the wearable device is put on again. Nor does the authorized user need to rewind the media to an earlier time point as would have been the case if the media playback was not paused.

In some embodiments, the wearable device causes the respective session of the respective application to become inactive by at least one of: muting audio data associated with the respective session of the respective application (e.g., application user interface 12018 as shown and described in reference to FIGS. 12C1 and 12C2, application user interface 12024 as shown and described in reference to FIGS. 12F1 and 12F2), or pausing video recording of content generated (e.g., video, audio, and/or other multimedia data) in the respective session of the respective application. In some embodiments, a real-time communication session of an application provides information regarding positions (e.g., real-time positions) of participants (e.g., in the form of avatars) in a three-dimensional environment.

Automatically muting audio (e.g., application user interface 12018 as shown and described in reference to FIGS. 12C1 and 12C2) and stopping video recording removes the need for the authorized user to proactively/manually mute the audio and stop the video recording when the wearable device is taken off. Such automatic audio muting and stopping of video recording also improves security/privacy by ensuring that no audio is played and no video is recorded without the authorized user being present.

In some embodiments, the wearable device causes the respective session of the respective application to become inactive by pausing a mirroring of an output from the display generation component of the computer on a different device (e.g., screen mirroring, although not shown in FIGS. 12B1 and 12B2, screen mirroring of computer system (e.g., watch 12010 or HMD 12011) replicates a display of the user interface 12018 on a display component separate from the computer system (e.g., watch 12010 or HMD 12011) (e.g., a separate display monitor), and when the respective session of the media playing application becomes inactive, the replication of the display of the user interface 12018 on the display monitor pauses (e.g., the display of the user interface 12018 becomes blurry, and is not updated on the display monitor)).

Automatically pausing a mirroring of an output from the display generation component removes the need for the authorized user to proactively/manually pause a mirroring. Such automatic pausing of the mirroring of an output also improves security/privacy by ensuring that no data from the wearable device is shared with others without the authorized user being present.

In some embodiments, in conjunction with pausing the mirroring of the output from the display generation component of the computer on the different device, the wearable device displays, via the display generation component, an indication that mirroring of the output from the display generation component is paused (e.g., an indication that "screen mirroring paused" is displayed).

Providing an indication that mirroring of the output from the display generation component is paused automatically communicates a disruption to other participants, without requiring an active input from the authorized user. The indication helps to minimize confusion and reduces the chance of other participants' misunderstanding the pause in mirroring as requiring troubleshooting.

In some embodiments, after the first signal has been detected (e.g., while the wearable device is off of head, or while the wearable device is off of body), the wearable device monitors, using one or more sensors (e.g., a camera, a photodiode, an inertial measurement devices, an accelerometer, a gyroscope, and/or a GPS system, e.g., the computer system (e.g., watch 12010 or HMD 12011) as shown and described in reference to FIGS. 12E1 and 12E2, while in the standby state of operation, monitors a context of the watch (e.g., whether a user has put the computer system (e.g., watch 12010 or HMD 12011) on a body of the user), using a pulse sensor) included or in communication with the wearable device, a context of the wearable device (e.g., a location, an orientation, an operational state, presence of trackable eyes, presence of trackable hands, or trackable portions of a hand). In some embodiments, when the wearable device corresponds to a head-mount device, a camera or photodiode on the head-mounted device continues to determine a context of the device (e.g., determining if one or more eyes are captured within a field of view of the camera).

Providing one or more intermediate (e.g., standby) states while the wearable device is off of the body of the authorized user, as described above with reference to FIGS. 12E1 and 12E2, allows the wearable device to more quickly warm up and be ready to deliver an experience (e.g., a media experience provided by application user interface 12018 as shown and described in reference to FIGS. 12B1 and 12B2, or a communication session provided by application user interface 12024 as shown and described in reference to FIGS. 12G1 and 12G2) once the wearable device is on the body of the authorized user. In the intermediate state, the wearable device senses its surrounding and is better prepared to transition to (e.g., a faster transition) an active on-body state when the authorized user interacts with it, making the experience more time-efficient to the authorized user.

In some embodiments, the wearable device detects characteristics of a physical environment (e.g., presence of a user, presence of an authorized user, a location of the wearable device within the physical environment, an orientation of the wearable device in the physical environment, and/or a brightness of the physical environment) of the wearable device using the one or more sensors (e.g., camera, photodiode, inertial measurement devices, accelerometer, gyroscope, or GPS) to monitor the context (e.g., a location, an orientation, or an operational state) of the wearable device.

Providing one or more intermediate (e.g., standby) states in which the wearable device senses its physical environment allows the wearable device to more quickly warm up and be ready to deliver an experience (e.g., media experience, a communication session) once the wearable device is on the body of the authorized user. The wearable device senses its surrounding and is better prepared to transition to (e.g., a faster transition) an active on-body state when the authorized user interacts with it, making the experience more time-efficient to the authorized user.

In some embodiments, the wearable device detects a biometric feature (e.g., presence of an eye, or a portion of a hand or arm, within a field of view of a camera, a pulse of a user, a biometric feature 12026 as shown and described in reference to FIGS. 12F1, 12F2, 12G1 and 12G2) using the one or more sensors (e.g., a camera, an infrared sensor, and/or a pulse sensor) to monitor the context of the wearable device. When the wearable device corresponds to a head-mounted display device, a gaze location, an iris pattern, a facial expression, an eye color and/or shape are relevant to authenticating if a user donning the head-mounted display device matches the authorized user. In some embodiments, the wearable device determines whether the wearable device is in a vicinity of any users.

Providing one or more intermediate (e.g., standby) states in which the wearable device senses biometric input allows the wearable device to more quickly warm up and be ready to interact with the authorized user (e.g., authenticate the authorized user) or receive a hand gesture input from the authorized user once the wearable device is on the body of the authorized user. The wearable device senses biometric input and is better prepared to transition to (e.g., a faster transition) an active on-body state when the authorized user interacts with it, making the experience more time-efficient to the authorized user.

In some embodiments, in accordance with a determination that a threshold amount of time (e.g., a predetermined timeout period) has elapsed since detection of the first signal without detecting the second signal: the wearable device transitions into a sleep state of operation (e.g., although not shown in FIGS. 12C1 and 12C2, after the predetermined timeout period has elapsed, the screen on computer system (e.g., watch 12010 or HMD 12011), as shown and described in reference to FIGS. 12C1 and 12C2, will turn off, and the computer system (e.g., watch 12010 or HMD 12011) enters a sleep state in which sensors are no longer detecting device context) in which the wearable device reduces a frequency at which the one or more sensors are used to monitor the context of the wearable device (which, optionally, includes ceasing to use the one or more sensors to monitor the context of the wearable device). In some embodiments, the sleep state is a state in which the one or more sensors are no longer detecting the context of the wearable device. In some embodiments, the sensor is a camera on or in the wearable device, the sensor is an inertia measurement device in the wearable device, and/or the sensor is a device separate from the wearable device but in communication with the wearable device (e.g., an external beacon that sends a signal to a detector on the wearable device, or an external beacon that detects a signal sent by the wearable device). In some embodiments, the context of a wearable device is a physical orientation of the wearable device, a location of the wearable device, a presence state that indicates whether a presence of eyes, or hands as determined from image(s) captured by a camera of the wearable device is detected, and/or a presence state that indicates whether a presence of movements of a living being is detected by an infrared thermal sensor.

Entering the sleep state after a timeout period helps to conserve battery power for the wearable device, and reduces the amount of charging required to operate the wearable device.

In some embodiments, while the wearable device is in the sleep state, the wearable device detects an upward displacement (e.g., a lift of the entire wearable device, a lift of a portion of the wearable device, or a displacement that causes a change in height of at least a portion of the wearable device, a lift to the computer system (e.g., watch 12010 or HMD 12011), as shown and described in reference to FIGS. 12E1 and 12E2) of at least a portion of the wearable device; and in response to detecting the upward displacement of at least the portion of the wearable device, the wearable device transitions from an active state into a standby state of operation (e.g., computer system (e.g., watch 12010 or HMD 12011) transitions to the standby state of operation, as shown and described in reference to FIGS. 12E1 and 12E2). In some embodiments, the wearable device monitors a context of the wearable device while in a standby state of operation. The standby state is a lower power state, compared to an on-body state of the wearable device. The wearable device enters into the standby state when a respective session of a respective application becomes inactive, for example, due to the wearable device being taken off a portion of the user's body. Entering into the lower power standby state compared to the on-body state helps to conserve battery power. Continuing with device context monitoring while the wearable device is in the standby state (e.g., so that the wearable device is warmed up), instead of ceasing device context monitoring (as is done while the wearable device is in the sleep state), allows the wearable device to more quickly provide an output once the wearable device is in the on-body state.

Transitioning out of the sleep state into a standby state while the wearable device is still off of the body of the authorized user (but after the user lifts up the wearable device, as shown and described in reference to FIGS. 12A, 12E1 and 12E2) allows the wearable device to more quickly warm up and be ready to interact with the authorized user once the wearable device is on the body of the authorized user, making the experience more time-efficient to the authorized user.

In some embodiments, while the wearable device is in the sleep state, the wearable device detects a first input (e.g., a press input, a press input to button 12014 or button 12016, as shown and described in reference to FIGS. 12D) to the one or more input devices (e.g., a hardware button, a solid state button, a crown, a camera, and/or a thermal sensor); and in response to detecting the first input, the wearable device transitions the wearable device from the sleep state into a standby state of operation (e.g., the computer system (e.g., watch 12010 or HMD 12011) transitions to a standby state of operation includes monitoring a context of the wearable device, as shown and described in reference to FIGS. 12E, in response to detecting a press input to button 12014 or button 12016).

Transitioning out of the sleep state into a standby state while the wearable device is still off of the body of the authorized user (but after a first input is provided to the wearable device in the sleep state) allows the wearable device to more quickly warm up and be ready to interact with the authorized user once the wearable device is on the body of the authorized user, making the experience more time-efficient to the authorized user.

It should be understood that the particular order in which the operations in FIG. 18 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 13000, 14000, 15000, 16000, 17000, 18000 and 20000) are also applicable in an analogous manner to method 18000 described above with respect to FIG. 18. For example, the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described above with reference to method 18000 optionally have one or more of the characteristics of the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described herein with reference to other methods described herein (e.g., methods 13000, 14000, 15000, 16000, 17000, 18000 and 20000). For brevity, these details are not repeated here.

FIGS. 19A-19P illustrate example techniques for navigating an accessibility menu during system configuration. FIG. 20 is a flow diagram of an exemplary method 2000 for navigating an accessibility menu during system configuration, in accordance with some embodiments. The user interfaces in FIGS. 19A-19P are used to illustrate the processes described below, including the processes in FIG. 20.

FIG. 19A illustrates an example physical environment 7000 that includes user 7002 interacting with computer system 101. As shown in the example of 19A, computer system 101 is placed on a trunk. In some embodiments, the computer system 101 is handheld, head-mounted or other computer system, as described in more detail above with reference to FIG. 7A. Physical environment 7000 that includes physical walls 7004 and 7006, floor 7008, and physical object 7014, as described in more detail above with reference to FIG. 7A.

FIG. 19A illustrates a view of a three-dimensional environment 7000' that is visible to a user, such as user 7002 in FIG. 7A, via a display generation component of computer system, such as display generation component 7100 of computer system 101, as described in further detail with reference to FIG. 7A. The view of the three-dimensional environment 7000' (also called view 7000' for ease of reference) of FIG. 19A includes a representation (or optical view) of a portion of physical environment 7000 that includes physical walls 7004 and 7006, floor 7008, and physical object 7014, as described herein with reference to FIG. 7A. For example, view 20000' includes representations of objects in physical environment 7000 (e.g., digital passthrough as captured by one or more cameras of computer system 101) or optical views of objects in the physical environment (e.g., optical passthrough as visible through one or more transparent or semi-transparent portions of display generation component 7100). For example, in FIG. 20A, view 7000' includes representations (or optical views) of wall 7004', wall 7006', floor 7008', and box 7014', as described herein with reference to FIGS. 7A-7B.

In some embodiments, during an initial configuration of a computer system (e.g., computer system 101), an input on a hardware input device (e.g., button 7508 or hardware input element 7108 (e.g., button, crown, or rotatable and depressible input element)) is detected, that causes the computer system 101 to display an accessibility configuration menu, such as accessibility configuration menu 1900. The accessibility configuration menu is navigated through, and options in the accessibility menu are selected, with various inputs (e.g., press inputs and/or rotational inputs) detected on or more hardware input devices (e.g., button 7508 or hardware input element 7108 (e.g., button, crown, or rotatable and depressible input element)), as described in further detail with reference to FIGS. 19B-19P. Even though the computer system is enabled to be controlled with air gestures (e.g., optionally in conjunction with gaze inputs), during the initial configuration of the computer system is enabled to be controlled with alternative inputs that are different from air gestures (e.g., press inputs and/or rotational inputs on one or more hardware input devices), as described in further detail with reference to FIGS. 19B-19P. Further, verbal descriptions of options and controls available in the accessibility configuration menu are provided as the accessibility configuration menu is navigated through, as described in further detail with reference to FIGS. 19B-19P. During such initial configuration of the computer system, the user selects preferred modalities for interacting with the computer system with little assistance required from others.

Figure 19B:
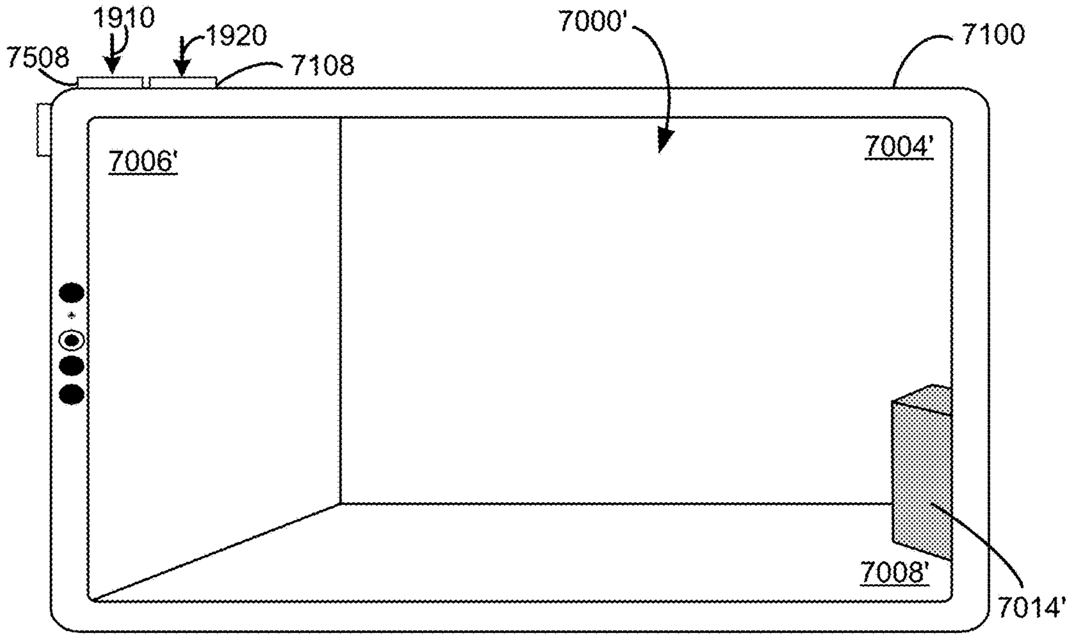

FIG. 19B illustrates view 7000' of the three-dimensional environment (e.g., a mixed reality three-dimensional environment) that is available for viewing to user 7002 upon powering on the computer system 101. For example, view 7000' shows a portion of physical environment 7000 when the computer system 101 is powered on for the first time, or is activated for the first time after factory settings or other settings has been reset on the computer system, or otherwise during an initial set up of the computer system (e.g., when input modalities are not enrolled, personalized and/or calibrated yet, e.g., the user's voice, hand gestures and/or gaze are not yet enrolled and/or calibrated). In the scenario of FIG. 19B, view 7000' does not yet include any virtual content.

FIG. 19C (e.g., FIGS. 19C1, 19C2 and 19C3, where a user interface analogous to the user interface shown in FIG. 19C3 is shown on HMD 7100*a* in FIG. 19C1) illustrates a transition from FIG. 19B in response to input 1910 detected on hardware button 7508. Hardware button 7508 responds to tactile and mechanical actuation, including presses, as described in further detail with reference to FIGS. 7A-7D, 8A-8G, 9A-9D, 10A-10D, 11A-11F, 12A-12G2 and Tables 1, 2, 3, and 4. In some embodiments, input 1910 is a multi-press input, such as three presses that are detected on hardware button 7508. In some embodiments, the In response to input 1910, the computer system 101 displays accessibility configuration menu 1900 in view 70000', as illustrated in FIG. 19C. Accessibility configuration menu 1900 includes options 1902, 1904, 1906, and 1908 (collectively referred to options 1902-1908) for configuring one or more interaction models, e.g., assistive and/or adaptive interaction models for people with vision, motor, hearing, and/or cognitive disabilities and/or other accessibility needs. For example, option 1902 is used to configure interaction model for people with visual impairments, e.g., an interaction model that uses modalities of interaction that enable a user to interact with the computer system even if a user is not able to see. Option 1904 is used to configure interaction model for people with motor impairments, e.g., an interaction model that uses modalities of interaction that enable a user to interact with the computer system even if a user is not able to move portions of their body. Option 1906 is used to configure interaction model for people with hearing impairments, e.g., an interaction model that uses modalities of interaction that enable a user to interact with the computer system even if a user is not able to hear. Option 1908 is used to configure interaction model for people with cognitive impairments, e.g., an interaction model that uses modalities of interaction that assist a user to interact with the computer system even if a user has certain cognitive impairments.

In some embodiments, in conjunction with displaying accessibility configuration menu 1900, computer system 101 generates and optionally outputs verbal description of accessibility configuration menu 1900. In some embodiments, the verbal description of accessibility configuration menu 1900 includes verbal description of the accessibility configuration menu 1900 as a whole and/or verbal description of options 1902-1908 (e.g., irrespective of whether user 7002 navigates through the options 1902-1908 or not). In some embodiments, computer system 101 outputs verbal description of accessibility configuration menu 1900, such that it can be heard by bystanders and people that are nearby. Accordingly, based on the verbal description, a person other than user 7002 can assist with navigating accessibility configuration menu 1900 without the need for user 7002 to unmount (e.g., remove or take off) computer system 101 (and/or display generation component 7100), e.g., if computer system 101 is mounted on user 7002's head.

In some embodiments, in response to an input, such as input 1920 in FIG. 19B, that is directed to another hardware input device, hardware input element 7108 (e.g., button, crown, or rotatable and depressible input element), an accessibility mode, such as a "read aloud" mode, is activated directly (e.g., without the need for further user inputs, such as inputs directed to accessibility configuration menu 1900, and without the need to interact with an accessibility menu, such as accessibility configuration menu 1900). In the "read aloud" mode, navigation inputs (e.g., air gestures, such as pinch gestures performed with one or two hands) cause the computer system to move a focus selector between user interface elements in a displayed user interface, and correspondingly output an audio description of the element that has input focus, thereby enabling a user to interact with virtual content that the user unable to see. In some embodiments, input 1920 is a multi-press input detected on hardware input element 7108 (e.g., button, crown, or rotatable and depressible input element). Hardware input element 7108 (e.g., button, crown, or rotatable and depressible input element) responds to tactile and mechanical actuation, including press inputs and rotational inputs, as described in further detail with reference to FIGS. 7A-7D, 8A-8G, 9A-9D, 10A-10D, 11A-11F, 12A-12G2 and Tables 1, 2, 3, and 4.

In some embodiments, accessibility configuration menu 1900 is enabled to be controlled (e.g., can be navigated through and options in the accessibility configuration menu 1900 can be selected) with inputs detected on a single hardware button, such as hardware input element 7108 (e.g., button, crown, or rotatable and depressible input element) (e.g., using rotational inputs on a rotatable mechanism and press inputs on depressible input mechanism hardware input element 7108 (e.g., button, crown, or rotatable and depressible input element)), as described in further detail with respect to FIGS. 19C-19P.

In some embodiments, the accessibility configuration menu 1900 is displayed before user's gaze is calibrated and/or enrolled, such that the computer system 101 can respond to inputs based on gaze or that include gaze.

In some embodiments, in conjunction with displaying accessibility configuration menu 1900, in response to input 1910 on hardware button 7508, the computer system 101 displays dwell control 1901. For example, the computer system 101 displays dwell control 1901 without the need for user 7002 to provide additional inputs (e.g., inputs other than the input that causes the computer system 101 to display accessibility configuration menu 1900. In the scenario of FIGS. 19C, the computer system 101 activates dwell control mode in accordance with a determination that a gaze input 1903 is directed to and remains directed to dwell control 1901 for a threshold amount of time (e.g., remains directed to dwell control 1901 without changing gaze direction outside dwell control 1902 before the threshold amount of time passed). The dwell control mode is an accessibility mode, in which a user 7002's gaze and/or head direction are used to perform a variety of actions that are otherwise performed with a mouse, keyboard, touch gestures, and/or air gestures (e.g., without the need to use hardware input devices and/or user 7002's hands).

In the scenario of FIGS. 19C, options 1902-1908 of accessibility configuration menu 1900 are scrolled through using rotatable input detected on hardware input element 7108 (e.g., button, crown, or rotatable and depressible input element). For example, a rotatable input on hardware input element 7108 (e.g., button, crown, or rotatable and depressible input element) in a first direction (e.g., a clockwise or counter clockwise) moves an input focus (e.g., optionally in conjunction with a visual indicator of the location of the input focus) down one option from the list of options 1902-1908, and a rotatable input on hardware input element 7108 (e.g., button, crown, or rotatable and depressible input element) in a different second direction (e.g., a clockwise or counter clockwise) moves the input focus up one option from the list of options 1902-1908. In some embodiments, rotational inputs on hardware input element 7108 (e.g., button, crown, or rotatable and depressible input element) in the same direction move input focus from one option to another (e.g., of options 1902-1908) sequentially. In the scenario of FIGS. 19C, an option of options 1902-1908 that has an input focus can be selected using press input detected on hardware input element 7108 (e.g., button, crown, or rotatable and depressible input element).

In some embodiments, upon displaying the accessibility configuration menu 1900, an input focus is by default positioned on the first option in the accessibility configuration menu 1900, e.g., option 1902 in the scenario of FIG. 19C. In some embodiments, in response to selecting an option from options 1902-1908, a respective sub-menu, corresponding to the selected option, of the accessibility configuration menu 1900 is displayed. In the scenario of FIGS. 19C, input 1930, detected on hardware input element 7108 (e.g., button, crown, or rotatable and depressible input element), selects option 1902 for configuring input modalities that assist users with vision impairments.

FIG. 19D illustrates a transition from FIG. 19C in response to detecting input 1930 on hardware input element 7108 (e.g., button, crown, or rotatable and depressible input element). In some embodiments, input 1930 is a single press on hardware input element 7108 (e.g., button, crown, or rotatable and depressible input element). In response to input 1930 on hardware input element 7108 (e.g., button, crown, or rotatable and depressible input element), vision sub-menu 1902*a* of accessibility configuration menu 1900 is displayed, as illustrated in FIG. 19D. Vision sub-menu 1902*a* corresponds to option 1902. In some embodiments, a user can exit the vision sub-menu 1902*a* and return to the main accessibility configuration menu 1900 in response to selecting return control 1918 (e.g., selecting via one or more press inputs on hardware input element 7108 (e.g., button, crown, or rotatable and depressible input element)). In some embodiments, in conjunction with displaying vision sub-menu 1902*a*, the computer system 101 output verbal description of vision sub-menu 1902*a*. The verbal description optionally corresponds to or includes information that is also included in the written description 1910. In some embodiments, both the verbal description and the written description 1910 explain functionality, purpose of vision sub-menu 1902*a*, how the vision sub-menu 1902*a* can be navigated (e.g., the description can explain that input A is used to scroll through the options and input B is used to select an option that has input focus, as illustrated in FIG. 19D), and/or what options are included in the vision sub-menu 1902*a* (e.g., zoom option 1912 for enabling zoom). In the scenario of FIG. 19D, vision sub-menu 1902*a* is a sub-menu for configuring functionality that magnifies content (e.g., passthrough and/or virtual content) in view 7000'. For example, upon enabling zoom option 1912 for enabling zoom, the computer system activates a virtual magnifier. In some embodiments, when the virtual magnified is active, computer system 101 automatically magnifies virtual content and/or representations of physical objects within the bounds of the virtual magnifier (e.g., as a user's viewpoint changes). In some embodiments, zoom option 1912 can be toggled on/off (e.g., enabled or disabled) in response to press inputs (e.g., single press inputs) detected on hardware input element 7108 (e.g., button, crown, or rotatable and depressible input element).

In the scenario of FIG. 19D, input 1932 selecting Continue button 1914 is detected. Input 1932 is detected on hardware input element 7108 (e.g., button, crown, or rotatable and depressible input element) while the Continue button 1914 has input focus (e.g., optionally the computer system 101 navigated to Continue button 1914 in response to a rotational input detected on hardware input element 7108 (e.g., button, crown, or rotatable and depressible input element), e.g., changing focus from zoom option 1912 to Continue button 1914). In some embodiments, in response to selecting Continue button 1914 the computer system 101 navigates to another sub-menu associated with the currently selected option in the main accessibility configuration menu 1900, such as sub-menu 1902*b*, if there is such sub-menu, as described in further detail below with respect to FIG. 19E, or the computer system 101 navigates automatically back to main accessibility configuration menu 1900.

Figure 19E:
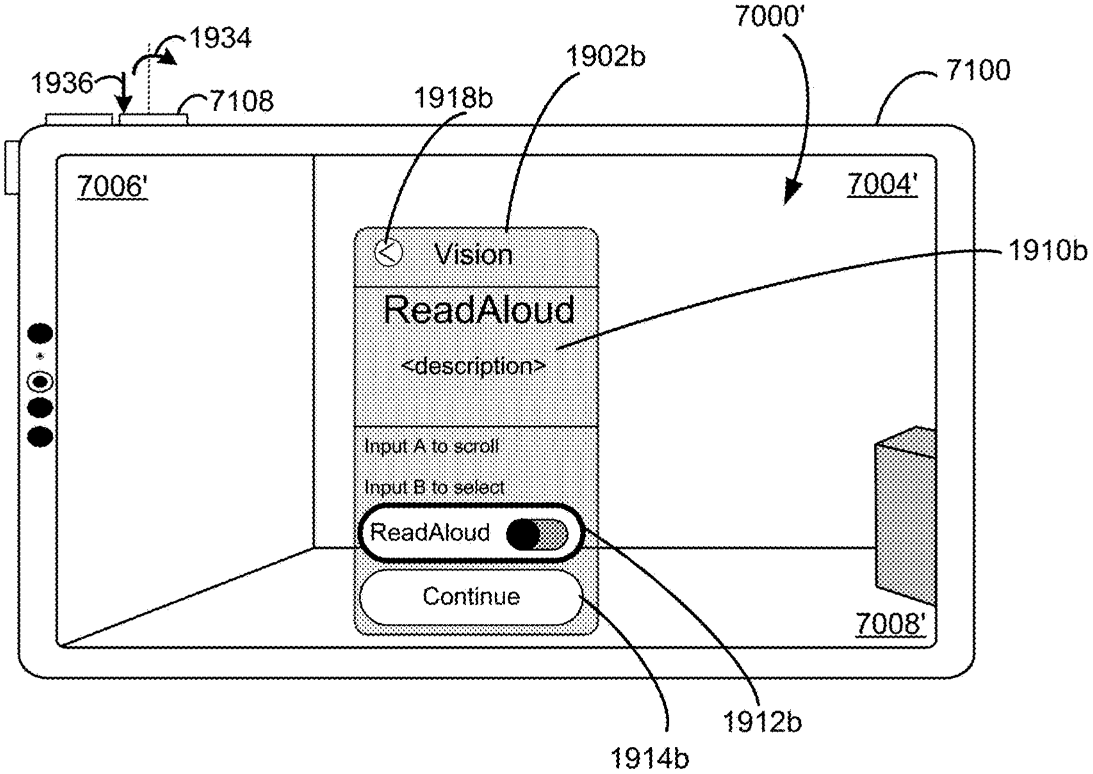

FIG. 19E illustrates a transition from FIG. 19D in response to detecting input 1932 selecting Continue button 1914. In some embodiments, input 1932 is a subsequent press input detected on hardware input element 7108 (e.g., button, crown, or rotatable and depressible input element) (e.g., a single press that activates the functionality associated with the Continue button 1914). In response to detecting input 1932 selecting Continue button 1914, the computer system 101 navigates to sub-menu 1902*b*, which is another sub-menu associated with the currently selected option 1902 in the main accessibility configuration menu 1900.

Vision sub-menu 1902 *b* is a menu for configuring the read aloud mode in which navigation inputs (e.g., air gestures, such as pinch gestures performed with one or two hands) cause the computer system to move a focus selector between user interface elements in a displayed user interface, and correspondingly output an audio description of the element that has input focus. In some embodiments, in conjunction with displaying vision sub-menu 1902 *b*, the computer system 101 output verbal description of vision sub-menu 1902 *b*. The verbal description optionally corresponds to or includes information that is also included in the written description 1910 *b*. In some embodiments, both the verbal description and the written description 1910 *b* explain functionality, purpose of vision sub-menu 1902 *b*, how the vision sub-menu 1902 *b* can be navigated (e.g., the description can explain that input A is used to scroll through the options and input B is used to select an option that has input focus, as illustrated in FIG. 19E), and/or what options are included in the vision sub-menu 1902 *b* (e.g., read aloud control option 1912 for enabling and/or disabling the read aloud mode).

Vision sub-menu 1902*b* includes read aloud control option 1912 for enabling and/or disabling the read aloud mode and Continue button 1914*b* that when selected causes the computer system to navigate forward to next available sub-menu or to return back to the main accessibility configuration menu 1900. In the scenario of FIG. 19E, the read aloud mode is activated in response input 1936 detected on hardware button. For example, input 1936 is a single press input detected on hardware button (e.g., input 1936 toggles on read aloud control option 1912). In some embodiments, a user can exit the vision sub-menu 1902*b* and return back to previous sub-menu 1902*a* in response to selecting return control 1918*b* (e.g., via one or more press inputs on hardware input element 7108 (e.g., button, crown, or rotatable and depressible input element)).

In some embodiments, when a control is enabled in one of the sub-menus of accessibility configuration menu 1900, the computer system 101 advances automatically to the next available sub-menu. For example, in the scenario of FIG. 19F, upon enabling the read aloud mode by toggling on control 1912*b*, the computer system moves to next available menu, such as vision sub-menu 1902*d* (e.g., without the need for further user inputs selecting Continue button 1914*b*).

In the scenario of FIG. 19E, the computer system 101 detects input 1934 on hardware input element 7108 (e.g., button, crown, or rotatable and depressible input element).

Figure 19F:
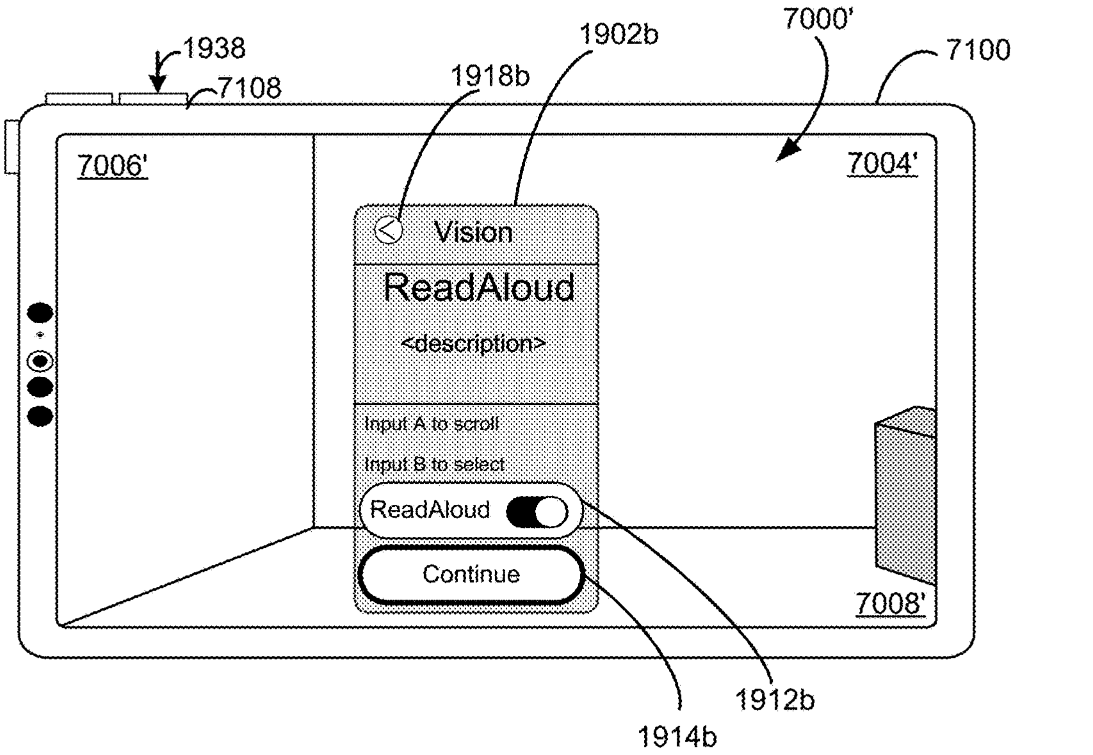

Input 1934 is a rotational input that scrolls through or moves an input focus from read aloud control option 1912*b* to Continue button 1914*b*, as illustrated in FIG. 19F.

FIG. 19F illustrates a transition from FIG. 19E in response to detecting input 1934 on hardware input element 7108 (e.g., button, crown, or rotatable and depressible input element). In response to input 1934 on hardware input element 7108 (e.g., button, crown, or rotatable and depressible input element), the computer system moves an input focus from read aloud control option 1912*b* to Continue button 1914*b*, as illustrated FIG. 19F. In the scenario of FIG. 19F, while input focus is positioned on Continue button 1914*b*, the computer system 101 detects input 1938 on hardware input element 7108 (e.g., button, crown, or rotatable and depressible input element) that selects Continue button 1914*b*.

Figure 19G:
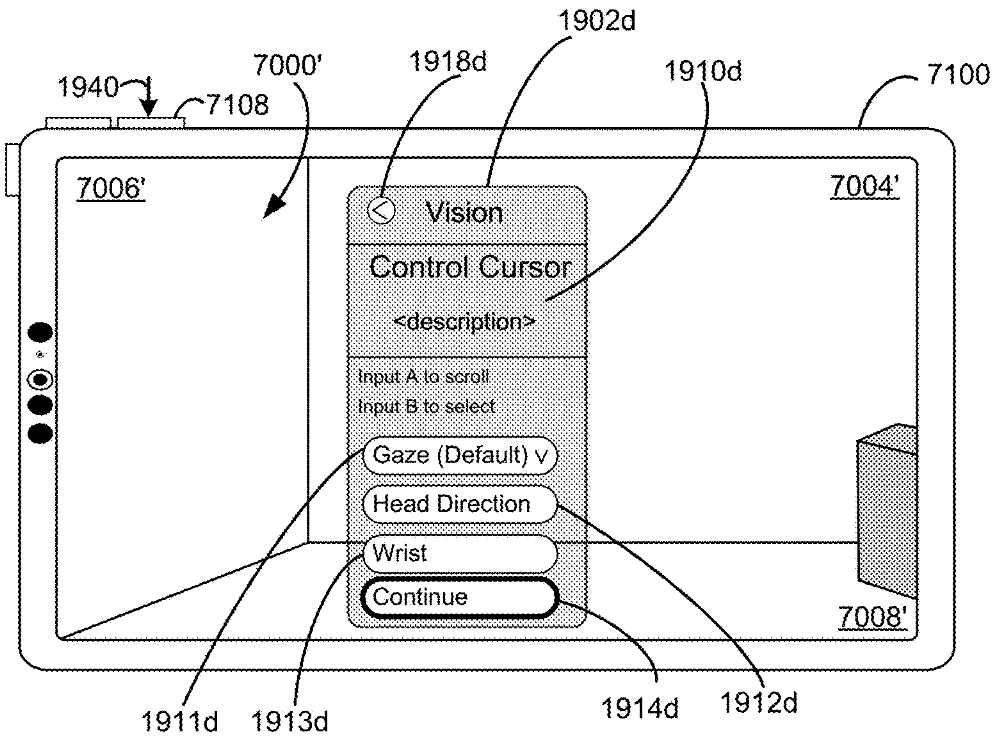

FIG. 19G illustrates a transition from FIG. 19F in response to detecting input 1938 on hardware input element 7108 (e.g., button, crown, or rotatable and depressible input element) selecting Continue button 1914*b*. In some embodiments, input 1938 is a subsequent press input detected on hardware input element 7108 (e.g., button, crown, or rotatable and depressible input element) (e.g., a single press that selects the Continue button 1914). In response to detecting input 1938 selecting Continue button 1914, the computer system 101 navigates to sub-menu 1902*d*, which is another sub-menu associated with the currently selected option 1902 in the main accessibility configuration menu 1900.

Vision sub-menu 1902*d* is a menu for configuring how a cursor or focus indicator is controlled in the view 7000'. For example, vision sub-menu 1902*d* includes three alternative options for controlling a focus indicator, such as gaze cursor control 1911*d*, head cursor control 1912*d*, and wrist cursor control 1913*d*. When gaze cursor control 1911*d* is activated (e.g., optionally via a press input detected on hardware input element 7108 (e.g., button, crown, or rotatable and depressible input element)) the computer system determines location of the focus indicator based on direction of user 7002's gaze. When head cursor control 1912*d* is activated (e.g., optionally via a press input detected on hardware input element 7108 (e.g., button, crown, or rotatable and depressible input element)) the computer system determines location of the focus indicator based on direction of user 7002's head. When wrist cursor control 1913*d* is activated (e.g., optionally via a press input detected on hardware input element 7108 (e.g., button, crown, or rotatable and depressible input element)) the computer system determines location of the focus indicator based on direction at which user 7002's wrist is pointing at.

In some embodiments, in conjunction with displaying vision sub-menu 1902*d*, the computer system 101 outputs verbal description of vision sub-menu 1902*d*. The verbal description optionally corresponds to or includes information that is also included in the written description 1910*d*. In some embodiments, both the verbal description and the written description 1910*d* explain functionality, purpose of vision sub-menu 1902*d*, how the vision sub-menu 1902*d* can be navigated (e.g., the description can explain that input A is used to scroll through the options and input B is used to select an option that has input focus, as illustrated in FIG. 19E), and/or what options are included in the vision sub-menu 1902*d* (e.g., gaze cursor control 1911*d*, head cursor control 1912*d*, and wrist cursor control 1913*d*). In some embodiments, a user can exit the vision sub-menu 1902*d* and return back to previous sub-menu 1902*b* in response to selecting return control 1918*d* (e.g., via one or more press inputs on hardware input element 7108 (e.g., button, crown, or rotatable and depressible input element)).

In the scenario of FIG. 19E, the computer system 101 detects input 1940 on hardware input element 7108 (e.g., button, crown, or rotatable and depressible input element) while Continue button 1914*d* is in focus. In response to input 1940 selecting Continue button 1914*d*, the computer system 101 automatically returns back to the main accessibility menu 1900 because there are no further sub-menus available for the selected option 1902, as illustrated in FIG. 19G. In some embodiments, after all sub-menus for a selected option have been navigated through, the computer system 101 displays accessibility configuration menu 1900 with the next available option selected by default, such as option 1904 related to motor impairments, as illustrated in FIG. 19H.

Figure 19H:
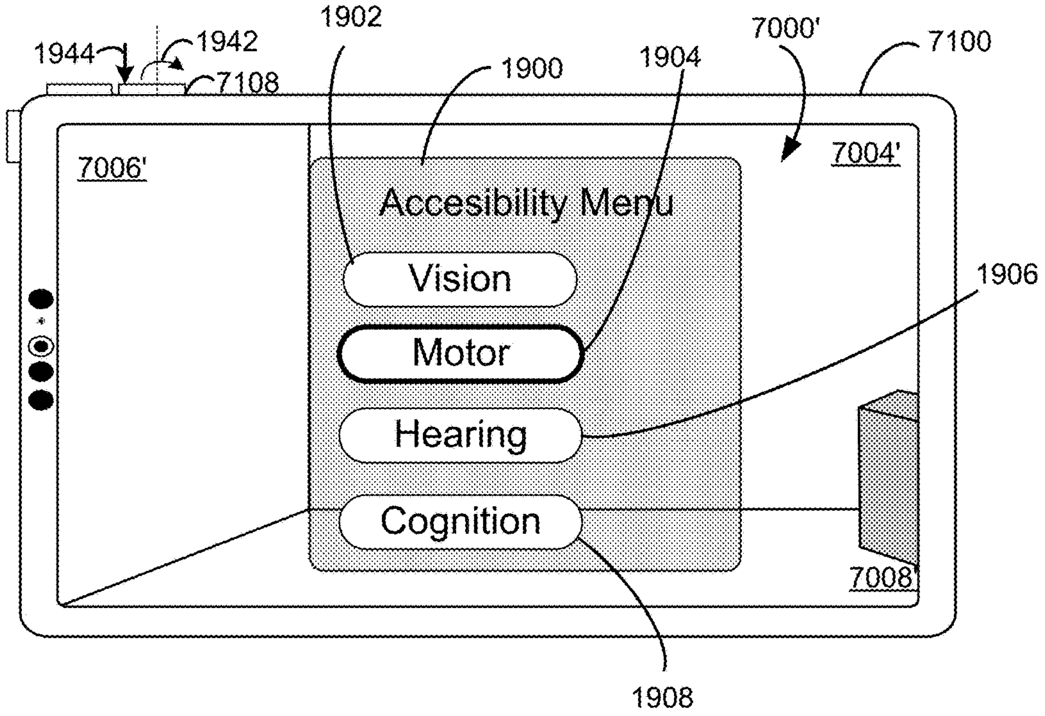

FIG. 19H illustrates a transition from FIG. 19G in response to input 1940 selecting Continue button 1914*d*. In response to input 1940 selecting Continue button 1914*d* the computer system 101 automatically returns back to the main accessibility menu 1900 because there are no additional sub-menus available for the selected option 1902. In the scenario of FIG. 19H, the computer system 101 moves the input focus from control option 1902 to control option 1904 in response to rotational input 1942 detected on hardware input element 7108 (e.g., button, crown, or rotatable and depressible input element). Further, in the scenario of FIG. 19H, the computer system 101 detects press input 1944 detected on hardware input element 7108 (e.g., button, crown, or rotatable and depressible input element) while input focus is positioned on control option 1904.

Figure 19I:
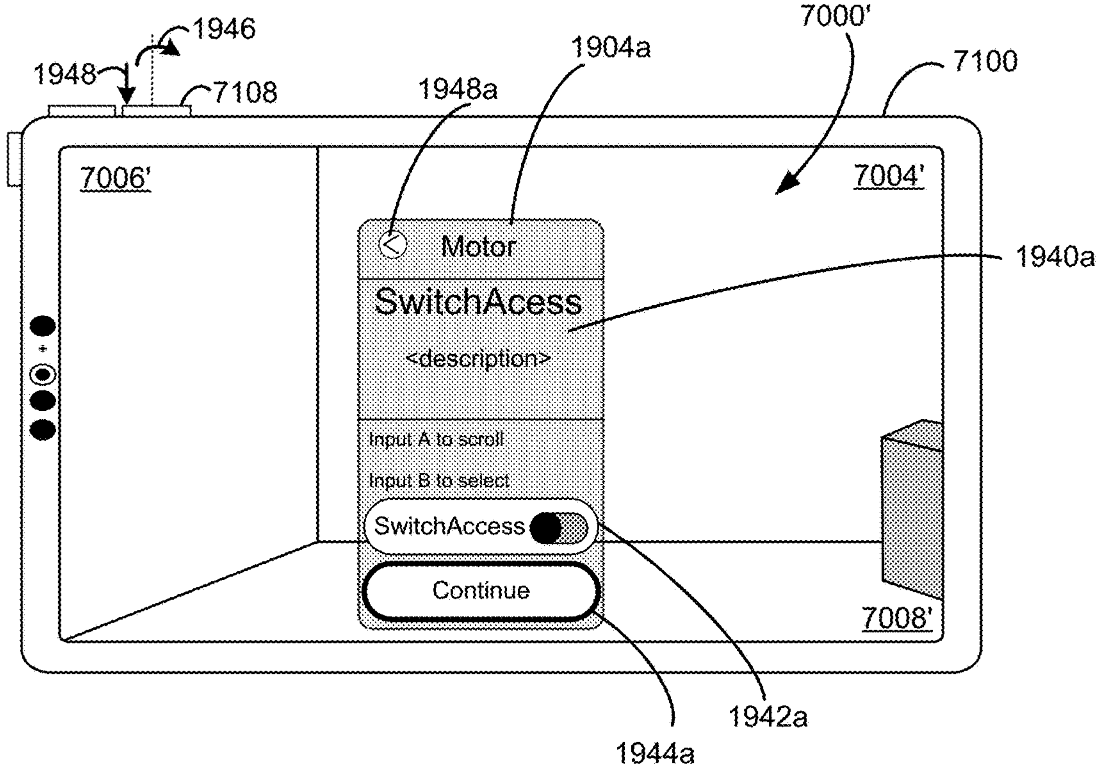

FIG. 19I illustrates a transition from FIG. 19H in response to detecting press input 1944 on hardware input element 7108 (e.g., button, crown, or rotatable and depressible input element) while input focus is positioned on control option 1904. In response to detecting press input 1944 on hardware input element 7108 (e.g., button, crown, or rotatable and depressible input element) while input focus is positioned on control option 1904, the computer system selects control option 1904 for configuring input modalities that assist users with motor impairments, and displays motor sub-menu 1904*a* of accessibility configuration menu 1900, as illustrated in FIG. 19I.

Motor sub-menu 1904*a* is a menu for configuring (e.g., enabling/disabling) a switch control mode (e.g., also referred to as switch interaction mode sometimes). In the switch control mode, a target location in the three-dimensional environment, such as view 7000', is selected for interaction using ray and point scanning. In the switch control mode, respective action is optionally performed in response to one or more inputs detected on a distinct (e.g., remote, or separate) hardware device (e.g., assistive device). Motor sub-menu 1904*a* includes switch access control option 1942*a* for enabling and/or disabling the switch control mode, and Continue button 1944*a* for advancing to the next available sub-menu. The switch control mode is activated in response to an input (e.g., a press input) detected on hardware input element 7108 (e.g., button, crown, or rotatable and depressible input element) while input focus is positioned on switch access control option 1942*a*. In some embodiments, upon activation of the switch control mode, the computer system 101 automatically displays a menu for configuring a wireless connection with an assistive input device (e.g., hardware input device). In some embodiments, upon establishing between the computer system and the assistive input device (e.g., upon detecting that the assistive input device is connected. In some embodiments, in conjunction with displaying motor sub-menu 1904*a*, the computer system 101 outputs verbal description of motor sub-menu 1904*a*. The verbal description optionally corresponds to or includes information that is also included in the written description 1940*a*. In some embodiments, both the verbal description and the written description 1940*a* explain functionality, purpose of motor sub-menu 1904*a*, how the motor sub-menu 1904*a* can be navigated (e.g., the description can explain that input A is used to scroll through the options and input B is used to select an option that has input focus, as illustrated in FIG. 191), and/or what options are included in motor sub-menu 1904*a* (e.g., switch access control option 1942*a* for enabling and/or disabling the switch control mode).

In the scenario of FIG. 191, while the input focus is on switch access control option 1942*a*, the computer system 101 detects rotational input 1946 on hardware input element 7108 (e.g., button, crown, or rotatable and depressible input element). In response to rotational input 1946, the computer system 101 system moves the input focus from switch access control option 1942*a* to Continue button 1944*a*. In the scenario of FIG. 19I, while the input focus is on Continue button 1944*a*, the computer system 101 detects press input 1948 on hardware input element 7108 (e.g., button, crown, or rotatable and depressible input element). In response to input 1948 selecting Continue button 1914*d*, the computer system 101 advances or navigates to the next available sub-menu, such as motor sub-menu 1904*b*, as illustrated in FIG. 19J.

Figure 19J:
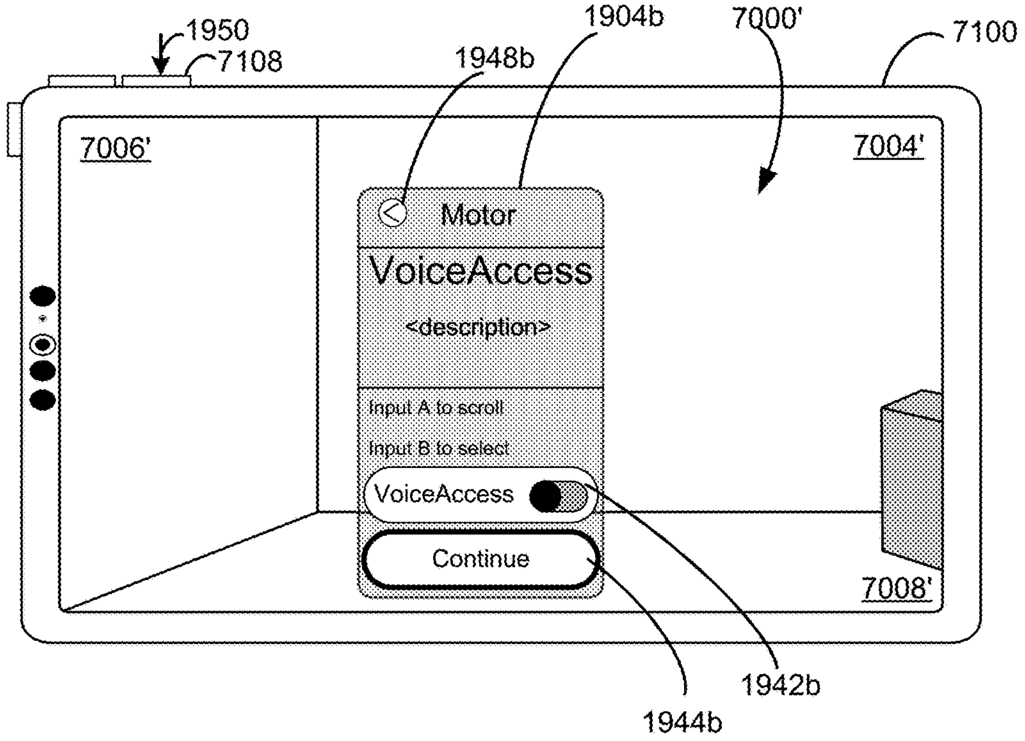

FIG. 19J illustrates a transition from FIG. 191 in response to input 1948 selecting Continue button 1914*d*. In response to input 1948 selecting Continue button 1914*d*, the computer system 101 displays motor sub-menu 1904*b* (e.g., optionally in place of motor sub-menu 1904*a*). Motor sub-menu 1904*b* is a menu for configuring (e.g., enabling/disabling) a voice control mode (e.g., configuring whether or not the computer system 101 responds to voice commands as an alternative input modality). In the voice control mode, spoken commands provide instructions to the computer system (e.g., to navigate, to select, and/or to perform other tasks). Motor sub-menu 1904*b* includes voice access control option 1942*b* for enabling and/or disabling the voice control mode, and Continue button 1944*b* for advancing to the next available sub-menu. The voice control mode is activated in response to an input (e.g., a press input) detected on hardware input element 7108 (e.g., button, crown, or rotatable and depressible input element) while input focus is positioned on voice access control option 1942*b*. Upon activating the voice control mode, the computer system 101 responds to voice commands (e.g., detected via one or more microphones in communication with computer system 101). In some embodiments, analogously applicable to the accessibility configuration menu 1900 and each sub-menu of a selected option of options 1902-1908, in conjunction with displaying motor sub-menu 1904*b*, the computer system 101 outputs verbal description of motor sub-menu 1904*b*. The verbal description optionally corresponds to or includes information that is also included in the written description 1940*b*. In some embodiments, both the verbal description and the written description 1940*b* explain functionality, purpose of motor sub-menu 1904*b*, how the motor sub-menu 1904*b* can be navigated (e.g., the description can explain that input A is used to scroll through the options and input B is used to select an option that has input focus, as illustrated in FIG. 19J), and/or what options are included in motor sub-menu 1904*b* (e.g., voice access control option 1942*b*).

In the scenario of FIG. 19J, the computer system 101 detects input 1950 on hardware input element 7108 (e.g., button, crown, or rotatable and depressible input element) while Continue button 19144*b* has input focus. In response to input 1950 selecting Continue button 1944*b*, the computer system 101 advances to the next available menu, such as motor submenu 1904*c* (e.g., as opposed to returns back to the main accessibility menu 1900 since there is another sub-menu that is available), as illustrated in FIG. 19K.

Figure 19K:
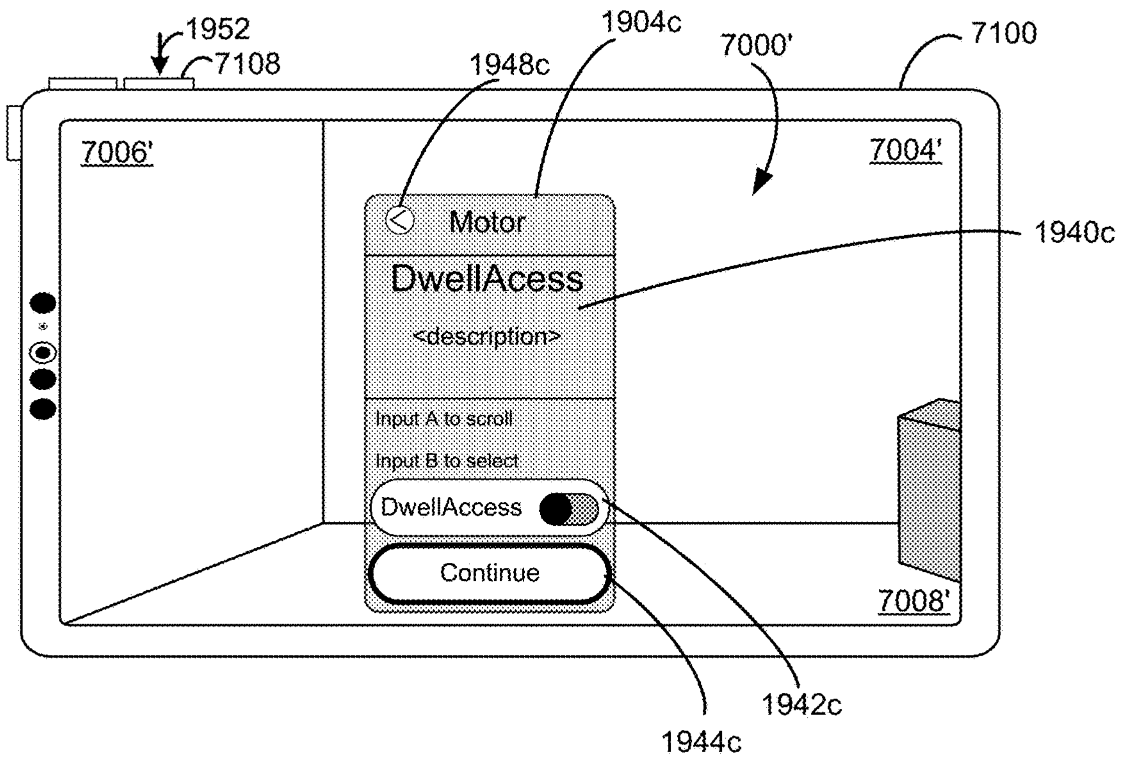

FIG. 19K illustrates a transition from FIG. 19J in response to input 1950 selecting Continue button 1944*b*. In response to input 1950 selecting Continue button 1944*b*, the computer system 101 displays motor sub-menu 1904*c* (e.g., optionally in place of motor sub-menu 1904*b* or in conjunction with ceasing to display the prior sub-menu such as motor sub-menu 1904*b*). Motor sub-menu 1904*c* is a menu for configuring (e.g., enabling/disabling) a dwell control mode. In the dwell control mode, respective actions are performed in response to a gaze input remaining for more than a dwell threshold amount of time at a respective action control (e.g., a control that is enabled to responds to gaze inputs without the need of further type of inputs to be provided). Motor sub-menu 1904*c* includes dwell access control option 1942*c* for enabling and/or disabling the dwell control mode, and Continue button 1944*c* for advancing to the next available sub-menu (e.g., if any are available, or for returning back to the main accessibility menu 1900 because there are no further sub-menus available). The dwell control mode is activated in response to an input (e.g., a press input) detected on hardware input element 7108 (e.g., button, crown, or rotatable and depressible input element) while input focus is positioned on dwell access control option 1942*c*. Upon activating the dwell control mode, the computer system 101 responds to gaze inputs (e.g., without the need to be controlled by alternative input mechanisms or modalities) (e.g., detected via one or more cameras in communication with computer system 101). In some embodiments, analogously applicable to the accessibility configuration menu 1900 and each sub-menu of a selected option of options 1902-1908, in conjunction with displaying motor sub-menu 1904*b*, the computer system 101 outputs verbal description of motor sub-menu 1904*c*.

In the scenario of FIG. 19K, the computer system 101 detects input 1952 on hardware input element 7108 (e.g., button, crown, or rotatable and depressible input element) while Continue button 1944*c* has input focus. In response to input 1952 selecting Continue button 1944*c*, the computer system 101 automatically returns back to the main accessibility menu 1900, as described in further detail below with respect to FIG. 19L.

Figure 19L:
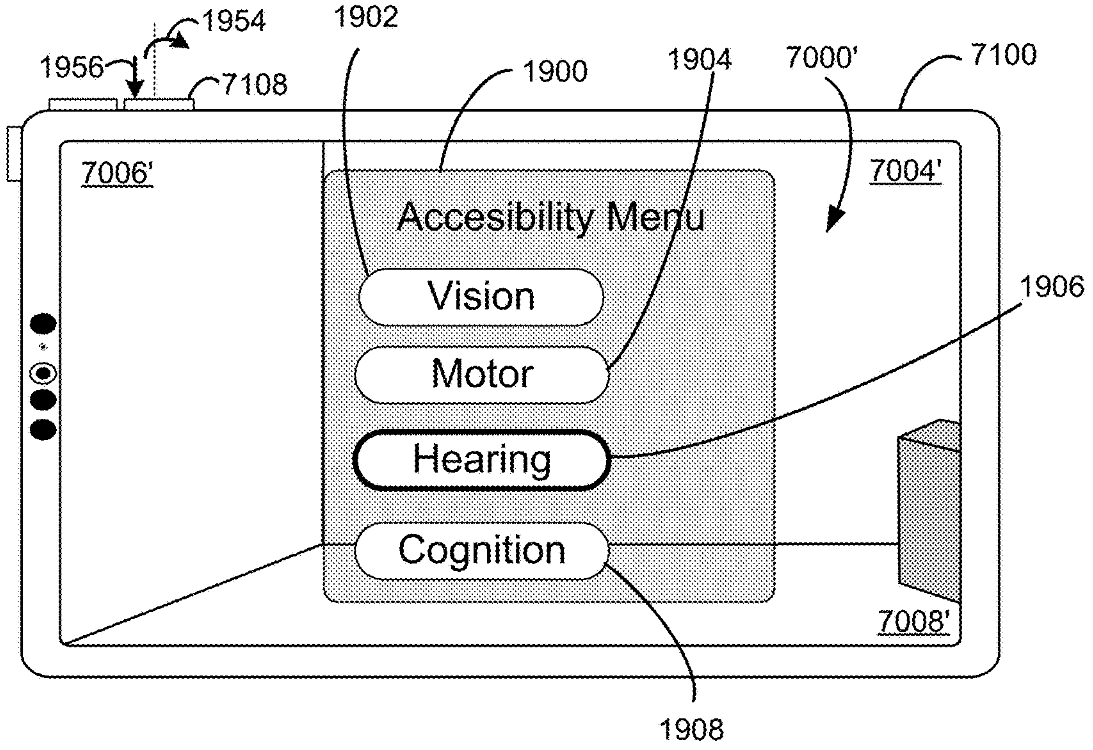

FIG. 19L illustrates a transition from FIG. 19K in response to input 1952 selecting Continue button 1944*c*. In response to input 1952 selecting Continue button 1944*c*, the computer system 101 automatically returns back to the main accessibility menu 1900 because there are no additional sub-menus available for the selected option 1904. In the scenario of FIG. 19L, the computer system 101 moves the input focus from control option 1904 to control option 1906 in response to rotational input 1954 detected on hardware input element 7108 (e.g., button, crown, or rotatable and depressible input element). In some embodiments, the computer system 101 automatically moves the input focus to control option 1906 in conjunction with returning back to the main accessibility menu 1900 from the last sub-menu available for the selected option 1904 (e.g., from sub-menu 1904*c* which is the last sub-menu for selected option 1904). Further, in the scenario of FIG. 19L, the computer system 101 detects press input 1956 detected on hardware input element 7108 (e.g., button, crown, or rotatable and depressible input element) while input focus is positioned on control option 1906.

Figure 19M:
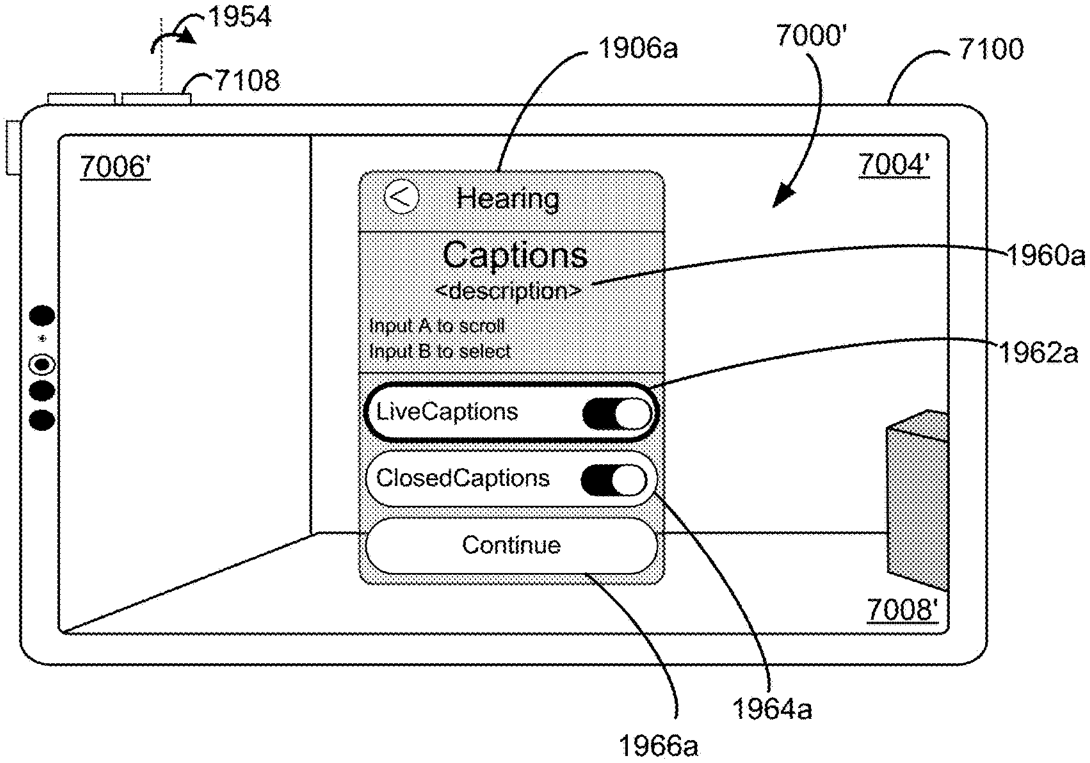

FIG. 19M illustrates a transition from FIG. 19L in response to detecting press input 1956 on hardware input element 7108 (e.g., button, crown, or rotatable and depressible input element) while input focus is positioned on control option 1906. In response to detecting press input 1956 on hardware input element 7108 (e.g., button, crown, or rotatable and depressible input element) while input focus is positioned on control option 1906, computer system 101 selects control option 1906 for configuring input modalities that assist users who are deaf or hard of hearing or otherwise use hearing assistive features, and displays hearing sub-menu 1906*a* of accessibility configuration menu 1900 (e.g., optionally in conjunction with ceasing to display the main accessibility configuration menu 1900 or displaying sub-menu 1906*a* in place of main accessibility configuration menu 1900), as illustrated in FIG. 19M.

Hearing sub-menu 1906*a* is a menu for configuring (e.g., enabling/disabling) whether one or more types of captions are provided. For example, hearing sub-menu 1906*a* includes controls for two different types of captioning: live captions control option 1962*a* for enabling and/or disabling display of text generated from live transcription in real time for audio such as spoken dialogue (e.g., being played in an application executing on computer system 101 and/or in conversations occurring around the user that are detected as ambient sound via one or more microphones of computer system 101); and closed captions control option 1964*a* for enabling and/or disabling display of closed captioning text (e.g., a transcription generated for and optionally stored with recorded content prior to the content being played by the user, such as in metadata, which can often be more accurate than live transcription but is limited to content for which the closed captioning text is already prepared and available). In some embodiments, analogously applicable to the accessibility configuration menu 1900 and each sub-menu of a selected option of options 1902-1908, in conjunction with displaying hearing sub-menu 1906*a*, the computer system 101 outputs verbal description of hearing sub-menu 1906*a*.

Live captions are enabled in response to an input (e.g., a press input) detected on hardware input element 7108 (e.g., button, crown, or rotatable and depressible input element) while input focus is positioned on live captions control option 1962*a*. Upon activating the live captions, the computer system 101 provides live captions upon detecting spoken dialogue. In the scenario of FIG. 19M, a rotational input 1958 is detected on hardware input element 7108 (e.g., button, crown, or rotatable and depressible input element).

Figure 19N:
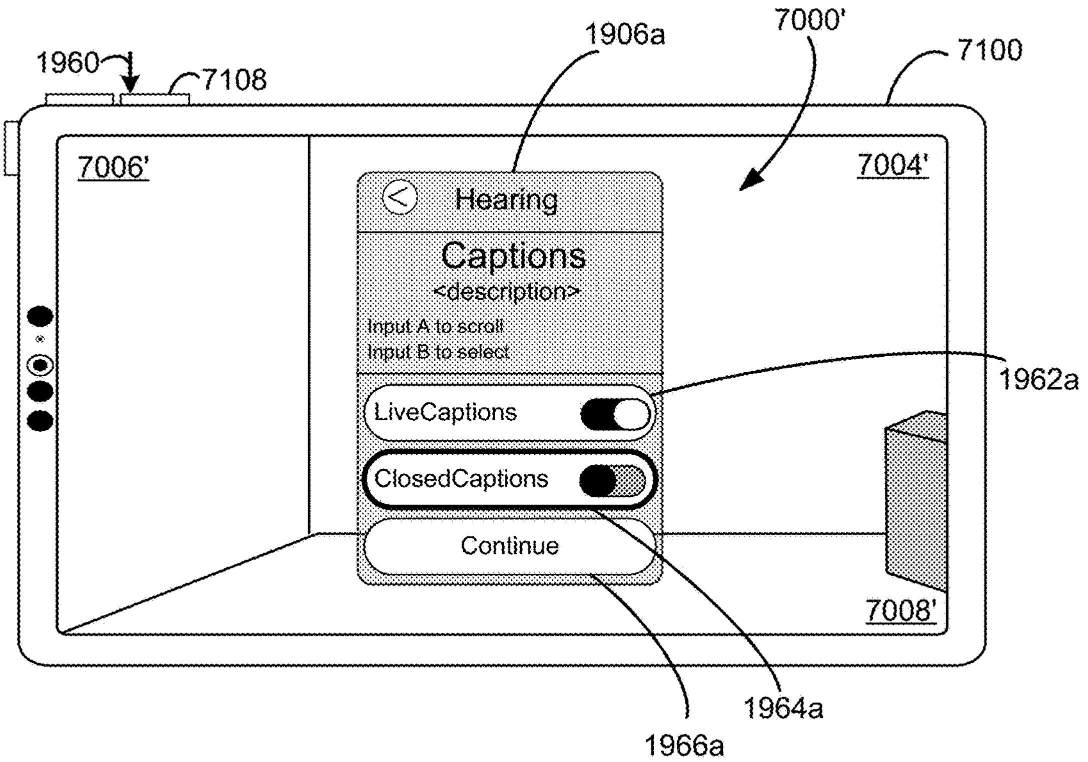
Figure 19O:
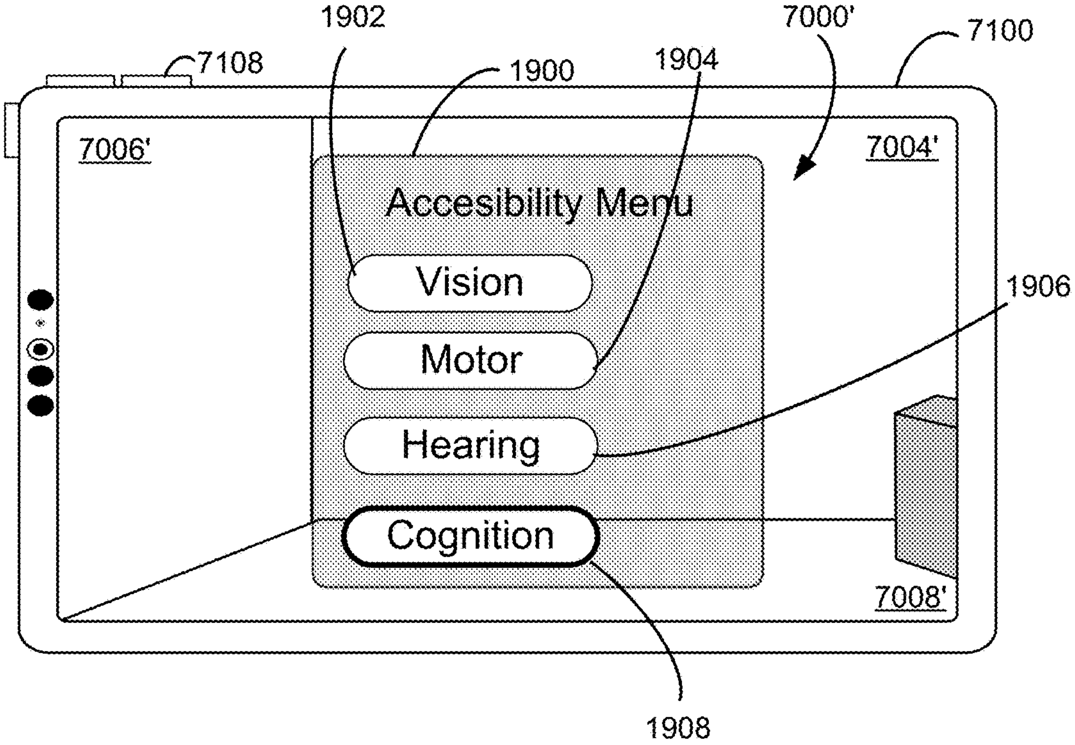

FIG. 19N illustrates a transition from FIG. 19M in response to detecting rotational input 1958 on hardware input element 7108 (e.g., button, crown, or rotatable and depressible input element) while input focus is positioned on live captions control option 1962*a*. In response to rotational input 1958 on hardware input element 7108 (e.g., button, crown, or rotatable and depressible input element) while input focus is positioned on live captions control option 1962*a*, the input focus is moved from live captions control option 1962*a* to closed captions control option 1964*a*. In the scenario of FIG. 19N, the computer system detects press input 1969 on hardware input element 7108 (e.g., button, crown, or rotatable and depressible input element) while input focus is positioned on closed captions control option 1964*a*. In response, closed captions are enabled, and the closed captions control option 1964*a* is toggled on. Further, in conjunction with enabling closed captions, the computer system 101 automatically navigates to the next available sub-menu or, as in the case of the scenario in FIG. 19N-19O, the computer system 101 automatically returns back to the main accessibility menu 1900 because there are no further sub-menus available for the selected option 1902, as illustrated in FIG. 19O. Accordingly, once closed captions are enabled, the computer system 101 automatically advances through the accessibility configuration menu 1900 (e.g., without the need for further user input, such as input detected on Continue button 1966*a*).

FIG. 19O illustrates a transition from FIG. 19N in response to input press input 1969 on hardware input element 7108 (e.g., button, crown, or rotatable and depressible input element) while input focus is positioned on closed captions control option 1964*a*. In response to press input 1969 on hardware input element 7108 (e.g., button, crown, or rotatable and depressible input element) while input focus is positioned on closed captions control option 1964*a*, in conjunction with enabling closed captions, the computer system 101 automatically returns back to the main accessibility menu 1900 from the last sub-menu available for the selected option 1906, including automatically moves the input focus to control option 1908.

FIG. 19P illustrates a transition from FIG. 19O in response to detecting press input 1962 on hardware input element 7108 (e.g., button, crown, or rotatable and depressible input element) while input focus is positioned on control option 1908. In response to detecting press input 1962 on hardware input element 7108 (e.g., button, crown, or rotatable and depressible input element) while input focus is positioned on control option 1908, computer system 101 selects control option 1908 for configuring input modalities that assist users who use cognitive assistive features, and displays cognitive sub-menu 1908*a* of accessibility configuration menu 1900 (e.g., optionally in conjunction with ceasing to display the main accessibility configuration menu 1900, or sub-menu 1906*a* is displayed in place of main accessibility configuration menu 1900), as illustrated in FIG. 19P. In some embodiments, analogously applicable to the accessibility configuration menu 1900 and each sub-menu of a selected option of options 1902-1908, in conjunction with displaying cognitive sub-menu 1908*a*, the computer system 101 outputs verbal description of cognitive sub-menu 1908*a*.

Cognitive sub-menu 1908*a* is a menu for configuring (e.g., enabling/disabling) whether typing feedback is provided. For example, cognitive sub-menu 1908*a* includes typing feedback control option 1982*a* for enabling/disabling typing feedback. When typing feedback is enabled the computer system 101 generates and/or outputs verbal description of typed letters, words, or other textual content that is typed. In some embodiments, the computer system 101 outputs the verbal description as the user 7002 is typing (e.g., substantially concurrently, e.g., less than a second or half a second delay or substantially without delay). Typing feedback are enabled in response to an input (e.g., a press input) detected on hardware input element 7108 (e.g., button, crown, or rotatable and depressible input element) while input focus is positioned typing feedback control option 1982*a*. Upon activating the live captions, the computer system 101 provides typing feedback when subsequent typing inputs are detected.

In some embodiments, analogously applicable to each of the options 1902, 1904, 1906, 1908, the respective one or more sub-menus (e.g., vision submenus 1902*a*, 1902*b*, and 1902*d*; motor submenus 1904*a*, 1904*b*, and 1904*c*, hearing submenu 1906*a*, and/or cognitive submenu 1908*a*) for each control option of control options 1902-1908 are displayed one at a time (e.g., without displaying other sub-menus corresponding to a selected option). For example, as user 7002 is advancing through or navigating though the vision menus associated with the option 1902, vision submenu 1902*b* is displayed in place of 1902*a*, and 1902*d* is displayed in place of vision submenu 1902*a*. In some embodiments, analogously applicable to each of the options 1902, 1904, 1906, 1908, after all sub-menus for a selected option have been navigated through, the computer system 101 automatically moves the input focus to the next available control option in conjunction with returning back to the main accessibility menu 1900 from the last sub-menu available for a respective selected option 1904. In some embodiments, analogously applicable to each of the vision submenus 1902*a*, 1902*b*, and 1902*d*; motor submenus 1904*a*, 1904*b*, and 1904*c*, hearing submenu 1906*a*, and/or cognitive submenu 1908*a*, rotational inputs detected on hardware input element 7108 (e.g., button, crown, or rotatable and depressible input element) advance through (e.g., navigate or scroll) the control options, and press inputs detected on hardware input element 7108 (e.g., button, crown, or rotatable and depressible input element) select a respective control option that has input focus. In some embodiments, instead of performing both navigation and selection inputs with the same hardware button (e.g., as in the scenarios of FIG. 19B-19P, both navigation and selection inputs are detected on hardware input element 7108 (e.g., button, crown, or rotatable and depressible input element)), navigation and selection inputs can be performed on separate hardware input device (e.g., rotational inputs are performed on hardware input element 7108 (e.g., button, crown, or rotatable and depressible input element) and selection inputs are performed on hardware button 7508). In some embodiments, when one input modality is enabled, other input modalities are automatically disabled. For example, more than one input modality can be enabled at the same time.

In some embodiments, after the configuration process is complete, and the user 7002 exits the accessibility configuration menu 1900 (e.g., via an input direction to a control for closing accessibility configuration menu 1900), inputs directed to hardware input element 7108 (e.g., button, crown, or rotatable and depressible input element) no longer invoke the accessibility configuration menu 1900. For example, after the configuration process is complete, a user can use a different settings menu to reconfigure (e.g., enable/disable) any desired assistive feature and inputs detected on hardware input element 7108 (e.g., button, crown, or rotatable and depressible input element) are reserved for different functions, as described in further detail with reference to FIGS. 7A-7D, 8A-8G, 9A-9D, 10A-10D, 11A-11F, 12A-12G2 and Tables 1, 2, 3, and 4.

FIG. 20 is a flowchart of a method 20000 for providing a menu for selecting an input mechanism in accordance with some embodiments.

In some embodiments, the method 20000 is performed at a computer system (e.g., computer system 101 in FIG. 1) that is in communication with a display generation component (e.g., display generation component 120 in FIGS. 1A, 3, and 4, or display generation component 7100) (e.g., a heads-up display, an HMD, a display, a touchscreen, or a projector) and one or more input devices (e.g., cameras, controllers, touch-sensitive surfaces, joysticks, buttons, gloves, watches, motion sensors, orientation sensors, and/or a rotatable input mechanism, such as a crown). In some embodiments, the display generation component is a display component facing the user and provides a XR experience to the user. In some embodiments, the computer system is an integrated device with one or more processors and memory enclosed in the same housing as the first display generation components, the one or more audio output devices, and at least some of the one or more input devices. In some embodiments, the display generation components and the one or more audio output devices are integrated and enclosed in the same housing. In some embodiments, the method 20000 is governed by instructions that are stored in a (optionally non-transitory) computer-readable storage medium and that are executed by one or more processors of a computer system, such as the one or more processors 202 of computer system 101 (e.g., control unit 110 in FIG. 1A). Some operations in method 20000 are, optionally, combined and/or the order of some operations is, optionally, changed.

While a configuration of the computer system is being performed (e.g., during an initial configuration such as a first configuration, activation, or set up of the computer system, such as when the computer system is first activated or powered on or the first time the computer system is activated after factory settings or other settings has been reset on the computer system), the computer system detects (20002) a first input (e.g., a press input or a multi-press input, such as double- or triple-press, and/or a long press) directed to a first input device (e.g., a button, dial, crown, switch, a moveable hardware input device or a solid-state hardware input device such as a button, dial, crown, or switch, or combination thereof and/or a device that detects localized sensor input such as intensity or force sensor input and the computer system uses that input to trigger corresponding operations and optionally provides tactile feedback such as haptic feedback corresponding to the detected inputs) of the one or more input devices. In some embodiments, during such initial set up of the computer system, input mechanisms are not enrolled, personalized and/or calibrated yet, e.g., the user's voice, hand gestures and/or gaze are not yet enrolled and/or calibrated. In some embodiments, during such initial set up, input mechanisms and/or modalities are selected and/or personalized. The computer system includes one or more sensors that detect inputs including one or more of air gestures and gaze inputs. In some embodiments, the first input device is a hardware input device that is provided on a housing of the computer system (e.g., integrated into the housing of the computer system as opposed to external to the device).

In response to detecting the first input to the first input device, the computer system displays (20004) a menu (e.g., a configuration menu for accessibility interaction models) including a plurality of selectable options for configuring one or more interaction models (e.g., assistive and/or adaptive interaction models for people with vision, motor, hearing, and/or cognitive disabilities and/or other accessibility needs) (e.g., other than the first input device). For example, in the scenario of FIG. 19B-19C, the computer system 101 displays accessibility configuration menu 1900 in view 70000' in response to input 1910 (e.g., a multi-press input, such as three presses) detected on hardware button 7508. In some embodiments, an interaction model includes multiple input modalities, e.g., multiple channels of human-computer interaction (e.g., including input and output) based on different sensory systems (e.g., visual, auditory, tactile, and/or others sensory systems) and different forms of processing data (e.g., image, text, sound, gaze, motion of portions of the user's body, and/or others). In some embodiments, the computer system is multimodal and some of the tasks can be executed by more than one input modality. In some embodiments, a first selectable option corresponds to a control option for configuring an accessibility interaction model related to visual impairments; a second selectable option corresponds to a control option for configuring an accessibility interaction model related to motor impairments; a third selectable option corresponds to a control option for configuring an accessibility interaction model related to hearing impairments; and/or a fourth selectable option corresponds to a control option for configuring an accessibility interaction model related to cognition impairments. In some embodiments, a respective selectable option of the plurality of selectable options is associated with one or more submenus for configuring an accessibility interaction model (e.g., the computer displays one or more submenus in response to selecting the respective selectable option). In some embodiments, the menu including the plurality of selectable options includes multiple sections (e.g., also referred to as submenus). In some embodiments, the multiple sections are displayed one at a time (e.g., without displaying other sections of the menu). In some embodiments, the multiple sections are displayed concurrently.

In some embodiments, the menu is displayed in a view of a mixed reality three-dimensional environment that is visible via a display generation component that is in communication with the computer system. Providing (e.g., whether displaying and/or reading aloud) a menu of options for different interaction models with a computer system during configuration of the computer system (e.g., during initial setup of the computer system) enables a user to choose upfront their preferred ways of interacting with the computer system, including ways that are more intuitive to the user, so as to later reduce the number and/or extent of inputs and/or the amount of time needed to interact with the computer system, and especially to enable a user who uses interaction models that are different from the default and who would otherwise require assistance to use the computer system to need only one-time assistance (e.g., at the outset of initializing the computer system) to set up the computer system with interaction models appropriate for the user, so that the user can later use the computer system independently.

In some embodiments, the first input device is a hardware input device that is a hardware button (e.g., as opposed to a user interface element). In some embodiments, the hardware button includes a depressible input mechanism. For example, hardware button 7508 includes depressible input mechanism, and hardware input element 7108 (e.g., button, crown, or rotatable and depressible input element) includes depressible mechanism (FIG. 19B). In some embodiments, the hardware button is a solid-state button. In some embodiments, the hardware button detects press inputs and/or rotational inputs. For example, hardware input element 7108 (e.g., button, crown, or rotatable and depressible input element) includes a rotatable mechanism (FIG. 19E). In some embodiments, the hardware button is referred to as a side button (e.g., if the hardware button is provided on a side of a physical housing of the computer system). Providing a hardware button that can be used to interact with (e.g., provide selection inputs to) a menu of options for configuring different interaction models with a computer system reduces the number and/or extent of inputs and/or the amount of time needed for a user, or someone assisting the user, to set up the computer system with interaction models appropriate for the user.

In some embodiments, the first input device is a hardware input device that includes a rotatable input mechanism (e.g., a digital crown, rotational ring, rotational control wheel, and/or rotatable hardware input mechanism). For example, hardware input element 7108 (e.g., button, crown, or rotatable and depressible input element) includes a rotatable mechanism (FIG. 19E). In some embodiments, the rotational input mechanism is bidirectional. In some embodiments, rotational inputs detected on the hardware button can be used to navigate complex user interfaces (e.g., with multiple elements across multiple user interface hierarchies), scroll, adjust immersion level, adjust volume, control other functions that are based on ranges of values (e.g., continuous, semi-continuous values, or distinct values), and/or can be used to perform other functions. In some embodiments, the computer system includes more than one hardware input device, e.g., a digital crown and a side button (e.g., optionally both the digital crown and the side button are provided on or integrated into a housing of the computer system). Providing a rotatable input mechanism that can be used to interact with (e.g., scroll, change focus within, or otherwise navigate) a menu of options for configuring different interaction models with a computer system reduces the number and/or extent of inputs and/or the amount of time needed for a user, or someone assisting the user, to set up the computer system with interaction models appropriate for the user.

In some embodiments, the one or more input devices include a second input device (e.g., a digital crown) (optionally, the first input device and the second input device are hardware input devices), distinct from the first input device, and the computer system: detects a second input (e.g., multiple presses or clicks, such as a double press, a triple press, or other number of presses detected in a quick or immediate succession (e.g., within a threshold amount of time of each other) to the second input device. In some embodiments, in response to detecting the second input to the second input device, the computer system activates a first accessibility mode (e.g., of one or more accessibility modes) (e.g., a "read aloud" mode in which navigation inputs (e.g., air gestures, such as pinch gestures performed with one or two hands) cause the computer system to move a focus selector between user interface elements in a displayed user interface, and correspondingly output an audio description of the element that has input focus), in which verbal descriptions of virtual objects (e.g., user interfaces, user interface elements in user interfaces, the selectable options for configuring the one or more interaction models and selectable options in submenus thereof, and/or other virtual objects) are provided in response to user inputs (e.g., navigation inputs that move a focus selector forward or backward sequentially, across multiple user interface hierarchies of a single application, and/or across multiple applications). For example, in the scenario of FIG. 19B, triple press or click on hardware input element 7108 (e.g., button, crown, or rotatable and depressible input element) invokes the read aloud mode. In some embodiments, the navigational inputs used in the "read aloud" mode are air gestures. In some embodiments, the navigational inputs in the "read aloud" mode are performed on a hardware device, such as the first input device and/or the second input device. In some embodiments, a triple press (e.g., or click) on a digital crown (e.g., a hardware button that detects both presses and/or rotational inputs) causes the computer system to display the menu (e.g., the configuration menu for accessibility interaction models) and a tripe press (e.g., or click) on a side button (e.g., a second hardware button different from the digital crown) causes the computer system to directly activate an accessibility mode (e.g., the "read aloud" mode) without the need to select a selectable option from the menu. Providing an input device that can be used to directly activate a "read aloud" accessibility mode in which an audio description of a user interface element currently in focus is provided during navigation within a menu of options for configuring different interaction models with a computer system reduces the number and/or extent of inputs and/or the amount of time needed to enable features that help a user, or someone assisting the user, to set up the computer system with interaction models appropriate for the user.

In some embodiments, the first input includes two or more presses (e.g., a double click, a triple click, and/or other number of presses in immediate succession (e.g., within a threshold amount of time of each other, such as 0.5, 1, 2, 3, 5, seconds, or other threshold amount of time)) on the first input device (e.g., optionally a hardware input device, such as a button or a digital crown). For example, in the scenario of FIGS. 19B-19C, in response to input 1910 detected on hardware button 7508, the computer system displays accessibility configuration menu 1900 in view 70000'. In some embodiments, the first input includes a first number of presses, and a second input on the first input device includes a second number of presses (e.g., different from the first number of presses) that causes the computer system to perform a different operation (e.g., dismiss or exit the configuration menu, display a different menu, such as a home menu user interface, launch a user interface of a respective application, and/or other functions). In some embodiments, a third input on the first input device that includes a third number of presses (optionally different from the first number of presses or the second number of presses) is used to activate or deactivate an accessibility mode (e.g., a "read aloud" mode). Directly activating a "read aloud" accessibility mode in response to a quick succession of presses via a corresponding input device provides a user, or someone assisting the user, with an input shortcut that reduces the number and/or extent of inputs and/or the amount of time needed to enable features that help the user or assistant to set up the computer system with interaction models appropriate for the user.

In some embodiments, the computer system detects a third input (optionally, the third input is a subsequent input that is detected after the first input) (e.g., the third input is a navigation input, such as a rotation input in one or more directions (e.g., clockwise or counterclockwise) on a rotatable mechanism of the hardware input device, one or more press inputs on depressible mechanism of the hardware input device, a combination of one or more rotation input and press inputs, and optionally in conjunction with gaze input) directed to a first hardware input device of the one or more input devices (e.g., the first input device or another hardware input device). In some embodiments, in response to detecting the third input (e.g., a navigation input) directed to the first hardware input device, the computer system positions an input focus (optionally, in conjunction with positioning a visual focus indicator that represents the input focus) on a first selectable option of the plurality of selectable options (e.g., for configuring one or more interaction models). For example, in the scenarios of FIGS. 19C-19P, analogously applicable to each option of options 1902-1908 of accessibility configuration menu 1900 and analogously applicable to each of the vision submenus 1902*a*, 1902*b*, and 1902*d*; motor submenus 1904*a*, 1904*b*, and 1904*c*, hearing submenu 1906*a*, and/or cognitive submenu 1908*a*, rotational inputs detected on hardware input element 7108 (e.g., button, crown, or rotatable and depressible input element) advance through (e.g., navigate or scroll) the control options, and press inputs detected on hardware input element 7108 (e.g., button, crown, or rotatable and depressible input element) select a respective control option that has input focus. In some embodiments, positioning the input focus on the first selectable option includes moving the input focus (optionally, in conjunction with moving the visual focus indicator that represents the input focus) from a second selectable option of the plurality of selectable options (optionally, the first selectable option and the selectable option are navigated though sequentially). In some embodiments, the third input is a rotational input on a hardware input device (e.g., the hardware input device that includes a rotatable input mechanism, such as the digital crown). Moving input focus between selectable options in a menu for configuring different interaction models with a computer system in response to an input via a hardware input device enables navigation within the menu to be performed without displaying additional controls, which reduces the number and/or extent of inputs and/or the amount of time needed for a user, or someone assisting the user, to set up the computer system with interaction models appropriate for the user.

In some embodiments, the computer system detects a fourth input (e.g., a selection input optionally detected after the first input is detected (e.g., the first input causing the computer system to display the configuration menu for accessibility interaction models)) directed to a second hardware input device of the one or more input devices (e.g., same as the first hardware input device or a different hardware input device). In some embodiments, in response to detecting the fourth input (e.g., a selection input) directed to the second hardware input device, the computer system selects the first selectable option (e.g., that has input focus) of the plurality of selectable options (e.g., for configuring one or more interaction models). In some embodiments, selecting the first selectable option includes activating or enabling a respective interaction model of the one or more interaction models. In some embodiments, the fourth input is a press input on a hardware button (e.g., the side button). For example, in the scenario of FIGS. 19C, analogously applicable to each option of options 1902-1908 of accessibility configuration menu 1900, a respective option of options 1902-1908 that has an input focus can be selected using press input detected on hardware input element 7108 (e.g., button, crown, or rotatable and depressible input element). Selecting an option in a menu for configuring different interaction models with a computer system in response to an input via a hardware input device reduces the number and/or extent of inputs and/or the amount of time needed for a user, or someone assisting the user, to set up the computer system with interaction models appropriate for the user.

In some embodiments, the computer system detects a third input (e.g., the third input is a navigation input or selection input) directed to a hardware input device of the one or more input devices (e.g., the first input device or another hardware input device). In some embodiments, in response to detecting the third input directed to a respective hardware input device (e.g., the hardware input device has a rotatable input mechanism and/or a depressible input mechanism), the computer system: in accordance with a determination that the third input meets first input criteria (e.g., the first input is a first type of input via the hardware input device, such as a navigation input, such as a rotational input), positions an input focus (optionally, in conjunction with positioning a visual focus indicator that represents the input focus) on a first selectable option of the plurality of selectable options (e.g., for configuring one or more interaction models); and in accordance with a determination that the third input meets second input criteria (e.g., the first input is a different, second type of input via the same hardware input device, such as a selection input, such as a press or a click input), selects a second selectable option (e.g., that has input focus) of the plurality of selectable options (e.g., for configuring one or more interaction models). For example, in the scenarios of FIGS. 19C-19P, accessibility configuration menu 1900 is controlled or interacted with (e.g., is navigated through and options in the accessibility configuration menu 1900 are selected) with inputs detected on hardware input element 7108 (e.g., button, crown, or rotatable and depressible input element) (e.g., using rotational inputs on a rotatable mechanism and press inputs on depressible input mechanism hardware input element 7108 (e.g., button, crown, or rotatable and depressible input element)) (e.g., without the need to use other inputs detected on other devices). In some embodiments, the first selectable option is the same as the second selectable option. In some embodiments, the first selectable option and the second selectable option are different. In some embodiments, the third input is a subsequent input that is detected after the first input is detected (e.g., the first input causing the computer system to display the configuration menu for accessibility interaction models). In some embodiments, the configuration menu for accessibility interaction models can be navigated and/or interacted with a single input device that optionally has a rotatable input mechanism and/or a depressible input mechanism. Providing an input device that can be used to perform both navigation and selection inputs within a menu of options for configuring different interaction models with a computer system reduces the number and/or extent of inputs and/or the amount of time needed for a user, or someone assisting the user, to set up the computer system with interaction models appropriate for the user.

In some embodiments, positioning the input focus on the first selectable option of the plurality of selectable options is performed in response to detecting a rotational input on the hardware input device. In some embodiments, the third input that meets the first input criteria is a navigation input that includes rotation in one or more directions (e.g., clockwise or counterclockwise) on a rotatable mechanism of the hardware input device (e.g., the first input criteria require that the third input include rotation in one or more directions in order for the third input to meet the first input criteria). For example, in the scenario of FIGS. 19C, options 1902-1908 of accessibility configuration menu 1900 are scrolled using rotatable input detected on hardware input element 7108 (e.g., button, crown, or rotatable and depressible input element). Providing an input device that can be rotated to navigate within a menu of options for configuring different interaction models with a computer system reduces the number and/or extent of inputs and/or the amount of time needed for a user, or someone assisting the user, to set up the computer system with interaction models appropriate for the user.

In some embodiments, selecting the second selectable option (e.g., that has input focus) of the plurality of selectable options is performed in response to detecting a press input on the hardware input device (e.g., the first input device or another hardware input device) (e.g., the second input criteria require that the third input include a press input on the hardware input device in order for the third input to meet the second input criteria). For example, press input 1930 on hardware input element 7108 (e.g., button, crown, or rotatable and depressible input element) in FIG. 19C selects option 1902 of accessibility configuration menu 1900. Providing an input device that can be pressed to select or activate an option within a menu for configuring different interaction models with a computer system (e.g., where the input device optionally can also be rotated to navigate within the menu) reduces the number and/or extent of inputs and/or the amount of time needed for a user, or someone assisting the user, to set up the computer system with interaction models appropriate for the user.

In some embodiments, in conjunction with positioning the input focus (optionally, in conjunction with positioning the visual focus indicator that represents the input focus) on the first selectable option of the plurality of selectable options (e.g., for configuring one or more interaction models), the computer system outputs an audio description of the first selectable option (e.g., verbally describes what type of user interface element is the first selectable option, what are the functions associated with the first selectable option, and/or name or label associated with first selectable option) of the plurality of selectable options. For example, in the scenario of FIGS. 19B-19C, in conjunction with displaying accessibility configuration menu 1900, computer system 101 generates and optionally outputs verbal description of accessibility configuration menu 1900, optionally including verbal description of the accessibility configuration menu 1900 as a whole and/or verbal description of options 1902-1908 (e.g., irrespective of whether user 7002 navigates through the options 1902-1908 or not). In some embodiments, a respective accessibility mode (e.g., the "read aloud" mode), in which verbal description of virtual objects (e.g., user interfaces, user interface elements in user interfaces, and/or other virtual objects) is provided in response to user inputs, is not active when the third input is detected (e.g., the third input that causes the computer system to position the input focus on the first selectable option). In some embodiments, the computer system detects a fourth input (optionally, the third input is a subsequent input that is detected after the first input) (e.g., the third input is a navigation input) directed to the first hardware input device (e.g., the first input device or another hardware input device). And, in response to detecting the fourth input (e.g., a navigation input) directed to the first hardware input device, the computer system outputs, in conjunction with positioning the input focus (optionally, in conjunction with positioning a visual focus indicator that represents the input focus) on a different selectable option of the plurality of selectable options (e.g., for configuring one or more interaction models), an audio description (e.g., verbally describes what type of user interface element is the different selectable option, what are the functions associated with the different selectable option, and/or a name or label associated with different selectable option) of the different selectable option of the plurality of selectable options, wherein the respective accessibility mode (e.g., the read aloud mode) is active. In some embodiments, while the configuration of the computer system is being performed (e.g., and/or the configuration menu for accessibility interaction models is being navigated through), audio descriptions of the selectable options for configuring one or more interaction models are provided. For example, the computer system outputs audio descriptions of one or more selectable options (e.g., including the first selectable option) that are navigated through in response to detecting one or more navigation inputs for navigating one or more selectable options of the plurality of one or more selectable options. In some embodiments, the computer system outputs audio descriptions of one or more selectable options (e.g., including the first selectable option) that are navigated through irrespective of whether an accessibility mode from the one or more accessibility modes is active or inactive (e.g., even if the "read aloud" is inactive). Providing audio descriptions of user interface elements currently in focus or the target of an input during interaction with a menu of options for configuring different interaction models with a computer system, without regard to whether a "read aloud" accessibility mode is enabled, provides improved feedback that reduces the number and/or extent of inputs and/or the amount of time needed for a user, or someone assisting the user, to set up the computer system with interaction models appropriate for the user.

In some embodiments, while the configuration of the computer system is being performed, the computer system displays a control (e.g., a user interface element, such as a dwell control indicator) for activating a dwell control mode. In some embodiments, the dwell control mode is an accessibility mode, in which a user's gaze and/or head direction are used to perform a variety of actions that are otherwise performed with a mouse, keyboard, touch gestures, and/or air gestures (e.g., without the need to use hardware input devices and/or a user's hands). In some embodiments, in the dwell control mode, a user's gaze is set on a dwell action control for a respective amount of time (e.g., dwell threshold amount of time), and after the respective amount of time passes (e.g., while the user's gaze continues to be set on the dwell action, an operation associated with the dwell action control is performed (e.g., clicking, dragging, scrolling, and/or other action). In some embodiments, the computer system detects a gaze input directed to the control for activating the dwell control mode; and in response to detecting the gaze input directed to the control for activating the dwell control mode (e.g., after the gaze input is directed to the control for activating the control mode for more than a threshold amount of time (optionally without moving the gaze input in a different direction, e.g., outside the control for activating the control mode)), automatically (e.g., without the need for additional user inputs and/or other conditions to be met) activates the dwell control mode. For example, in the scenario of FIGS. 19C, the computer system 101 activates dwell control mode in accordance with a determination that a gaze input 1903 is directed to and remains directed to dwell control 1901 for a threshold amount of time (e.g., remains directed to dwell control 1901 without changing gaze direction outside dwell control 1902 before the threshold amount of time passed). In some embodiments, in response to detecting the gaze input directed to the control for activating the dwell control mode, the computer system activates the dwell control mode in accordance with a determination that the gaze input remains directed at the to the control for activating the dwell control mode (e.g., a dwell control) for a threshold amount of time (e.g., since the gaze input was directed to the control for activating the control mode) (e.g., a predefined amount of time, or amount of time dynamically determined by the computer system, such 3, 4, 5, 6 seconds or other threshold amount of time), and the computer system forgoes activating the dwell control mode in accordance with a determination that the gaze input moves in a direction outside the dwell control for activating the dwell control mode before the threshold amount of time passed. Directly activating a "dwell control" accessibility mode in which user interface elements can be activated in response to inputs, directed to the user interface elements, that persist for at least a threshold amount of time automatically in response to such an input directed to a control for activating the "dwell control" mode provides a way for a user, independently, to enable an interaction model that is appropriate for the user, without requiring assistance.

In some embodiments, after the configuration of the computer system is completed (e.g., after the initial configuration of the computer system has ended), the computer system detects a subsequent input directed to the first input device (e.g., the subsequent input is the same as the first input (e.g., another instance of the same type of input) but performed at a different time, such as after the configuration of the computer system is completed, whereas the first input is performed while the configuration is being performed). In some embodiments, in response to detecting the subsequent input to the first input device after the configuration of the computer system is completed, the computer system forgoes displaying the menu (e.g., the configuration menu for accessibility interaction models) including the plurality of selectable options for configuring the one or more interaction models. For example, after the configuration process is complete, and the user 7002 exits the accessibility configuration menu 1900, inputs directed to hardware input element 7108 (e.g., button, crown, or rotatable and depressible input element) no longer invoke the accessibility configuration menu 1900, and the same inputs on hardware input element 7108 (e.g., button, crown, or rotatable and depressible input element) that invoked accessibility configuration menu 1900 are reserved for different functionality, as described in further detail with reference to FIGS. 7A-7D, 8A-8G, 9A-9D, 10A-10D, 11A-11F, 12A-12G2 and Tables 1, 2, 3, and 4. Enabling a menu of options for configuring different interaction models with a computer system to be invoked in response to an input via a particular input device during configuration of the computer system and not outside of configuration of the computer system (e.g., after configuration has ended) reduces the chance of accidentally invoking the menu and/or changing interaction model settings during later use of the computer system beyond the initial configuration process.

In some embodiments, in response to detecting the subsequent input to the first input device after the configuration of the computer system is completed, the computer system performs an operation that is different from displaying the menu (e.g., the configuration menu for accessibility interaction models) including the plurality of selectable options for configuring the one or more interaction models. In some embodiments, the operation is a preset operation. In some embodiments, the preset operation is different depending on the number of presses detected on a depressible mechanism of the hardware input device, depending on whether the a hold of the press is detected and/or for what period of time, and/or depending on the state of the computer system, depending on a direction of a rotation input, and other criteria, as described in further detail herein with reference to Table 1, Table 2, Table 3, and Table 4. Example preset operations include taking a screenshot, powering off the device, restarting the device, entering a hardware reset mode, answering a phone call, recording video or audio, changing immersion level, displaying a home user interface, and/or other operations. In some embodiments, the operation depends on what mode, such as what accessibility mode, is active when the first input is detected. In some embodiments, the operation (optionally, additionally) depends on what element has an input focus. For example, after the configuration process is complete, and the user 7002 exits the accessibility configuration menu 1900, the same inputs on hardware input element 7108 (e.g., button, crown, or rotatable and depressible input element) that invoked accessibility configuration menu 1900 and other inputs detected on hardware input element 7108 (e.g., button, crown, or rotatable and depressible input element) are reserved for different functionality, as described in further detail with reference to FIGS. 7A-7D, 8A-8G, 9A-9D, 10A-10D, 11A-

11F, 12G2 and Tables 1, 2, 3, and 4. Enabling a menu of options for configuring different interaction models with a computer system to be invoked in response to an input via a particular input device during configuration of the computer system and not outside of configuration of the computer system (e.g., after configuration has ended) makes the input device available for other operations when not needed for configuring the computer system, so that more operations can be performed without displaying additional controls.

In some embodiments, after the configuration of the computer system is completed (e.g., after the initial configuration of the computer system has ended), the computer system detects a press input (e.g., including one or more presses or clicks) to the first input device (e.g., the first input device is a hardware input device with a depressible mechanism). In some embodiments, in response to detecting the press input to the first input device, the computer system activates a respective accessibility function (e.g., including activating the "read aloud" mode in which verbal descriptions of virtual objects (e.g., user interfaces, user interface elements in user interfaces, and/or other virtual objects) are provided in response to user inputs (e.g., navigation inputs that move a focus selector forward or backward sequentially, across multiple user interface hierarchies of a single application, and/or across multiple applications)). For example, in the scenario of FIG. 19B, triple press or click on hardware input element 7108 (e.g., button, crown, or rotatable and depressible input element) invokes the read aloud mode. Activating an accessibility function, in response to an input via the same input device that was used during initial configuration of a computer system to invoke and/or interact with a menu of options for configuring different interaction models with the computer system, provides a user, or someone assisting the user, with an input shortcut that reduces the number and/or extent of inputs and/or the amount of time needed to enable features that help the user or assistant to set up the computer system with interaction models appropriate for the user, and that intuitively can be provided using the same input device as was previously used to configure accessibility features, without displaying additional controls.

In some embodiments, the computer system detects a fifth input (e.g., a rotational input detected on a hardware input device, such as the first input device, that has a ratable input mechanism (e.g., the digital crown)) on the first input device. In some embodiments, in response to detecting the fifth input on the first input device, the computer system: in accordance with a determination that the fifth input is detected before the configuration of the computer system is completed (e.g., while the configuration of the computer system is being performed), positions an input focus (optionally, in conjunction with positioning a visual focus indicator that represents the input focus) on a respective selectable option of the plurality of selectable options (e.g., for configuring one or more interaction models) (e.g., or more generally, performing a navigation operation, such as scrolling or moving input focus, with respect to the plurality of selectable options during the configuration of the computer system). In some embodiments, in accordance with a determination that the fifth input is detected after the configuration of the computer system is completed, the computer system performs an operation (e.g., a system level operation) that is different from positioning the input focus on the respective selectable option (e.g., or more generally, performing an operation that is not a navigation operation with respect to one or more selectable options). For example, after the configuration process is complete, and the user 7002 exits the accessibility configuration menu 1900, the same inputs on hardware input element 7108 (e.g., button, crown, or rotatable and depressible input element) that invoked accessibility configuration menu 1900 and other inputs detected on hardware input element 7108 (e.g., button, crown, or rotatable and depressible input element) are reserved for different functionality, as described in further detail with reference to FIGS. 7A-7D, 8A-8G, 9A-9D, 10A-10D, 11A-11F, 12A-12G2 and Tables 1, 2, 3, and 4. In some embodiments, the operation that is different from positioning the input focus on the respective selectable option is changing an immersion level (e.g., associated with a mixed-reality three-dimensional environment). For example, in accordance with a determination that the fifth input is a rotational input in a first direction, the computer system increases the immersion level; and in accordance with a determination that the fifth input is a rotational input in a second direction different from (e.g., opposite to) the first direction, the computer system decreases the immersion level. In some embodiments, the computer system scrolls through or navigates through the plurality of selectable options in response to the fifth input if the fifth input is detected before the configuration of the computer system is completed, and the computer system changes an immersion level of a three-dimensional environment that is available for viewing via a display generation component in communication with the computer system. Performing one or more operations that are not menu navigation operations, in response to inputs via an input device that was used during initial configuration of a computer system to navigate a menu of options for configuring different interaction models with the computer system, makes the input device available for other types of operations when not needed for configuring the computer system, so that more types of operations can be performed without displaying additional controls.

In some embodiments, the computer system displays a first user interface of a first subset of user interfaces for configuring a first interaction model of the one or more interaction models (e.g., wherein the first subset of user interfaces for configuring the first interaction model are associated with a respective (e.g., selected) selectable option of the plurality of selectable options). In some embodiments, a second subset of user interfaces, distinct from the first subset of user interfaces, for configuring a second interaction model (e.g., of the one or more interaction models) is associated with a different selectable option of the plurality of selectable options. In some embodiments, the first subset of user interface for configuring the first interaction model are ordered in a sequence, such that the computer system displays a respective user interface from the subset of user interfaces sequentially in response to navigation inputs. In some embodiments, the first subset of user interfaces for configuring the first interaction model correspond to submenus of the configuration menu for accessibility interaction models, and the first user interface corresponds to a first submenu. In some embodiments, the first user interface is displayed without displaying other user interfaces of the first subset of user interfaces. In some embodiments, the computer system detects one or more user inputs (e.g., selection and/or navigation inputs). In some embodiments, the one or more inputs include an input that toggles on and off a configuration option (e.g., enabling or disabling a respective accessibility mode, such as the "read aloud" mode, a "switch interaction mode" (e.g., in which some commands are performed with an external or remote hardware device that is communication with the computer system), and a mode in which a virtual magnifier is active (e.g., in which the computer system automatically magnifies virtual content and/or representations of physical objects within the bounds of the virtual magnifier as a user's viewpoint changes)). In some embodiments, the one or more inputs include an input confirming a selection. In some embodiments, in response to detecting the one or more user inputs, the computer system activates a function of the first interaction model (e.g., in the scenario where the first interaction model includes modes of interaction for visually impaired people, activating the function includes activating the "read aloud" mode, activating a virtual magnifier, selecting a method for determining input focus (e.g., based on what location is a portion of the user's body directed toward)) and automatically displays a second user interface of the first subset of user interfaces (and, optionally, ceasing displaying the first user interface of the first subset of user interfaces). In some embodiments, after a last user interface of the first subset of user interfaces (e.g., interfaces for configuring a first interaction model) is navigated through (e.g., after scrolling through the first subset of user interfaces), the computer system redisplays the menu (e.g., the configuration menu for accessibility interaction models) that includes the plurality of selectable options. For example, in the scenario of FIG. 19F, upon enabling the read aloud mode by toggling on control 1912*b*, the computer system moves to next available menu, such as vision sub-menu 1902*d* (e.g., without the need for further user inputs selecting Continue button 1914*b*). In response to detecting an activation input to configure a first interaction model of a plurality of interaction models configurable via a provided menu, automatically proceeding to a next portion or page of the menu for configuration of a different, second interaction model reduces the number and/or extent of inputs and/or the amount of time needed for a user, or someone assisting the user, to progress through the menu to set up the computer system with interaction models appropriate for the user.

In some embodiments, the plurality of selectable options include a first set of one or more controls for enabling a focus selector to be controlled with a respective portion of a user's body that is different from the user's eyes. In some embodiments, the first set of one or more controls include a first control for controlling the focus indicator using a user's gaze (optionally selected by default); a second control for controlling the focus indicator using the user's head direction (e.g., including orientation and/or elevation); and/or a third control for controlling the focus indicator using the user's head). In some embodiments, the first set of the one or more controls for controlling the focus selector (e.g., for controlling location of the focus selector in a mixed-reality three-dimensional environment) are alternative methods for controlling the focus indicator. In some embodiments, the computer system detects a gaze input; and in response to detecting the gaze input, in accordance with a determination that the focus selector is not enabled to be controlled with a respective portion of a user's body that is different from the user's eyes, the computer system positions the focus selector in accordance with the gaze input, wherein when the focus selector is enabled to be controlled with a respective portion of a user's body that is different from the user's eyes, the device does not respond to the gaze input by positioning the focus selector in response to the gaze input. In some embodiments, in accordance with a determination that focus selector is enabled to be controlled with the respective portion of the user's body that is different from the user's eyes, the computer system forgoes positioning the focus selector in accordance with the gaze input (e.g., the computer system is not responsive to the gaze input). For example, in FIG. 19G, vision sub-menu 1902*d* includes three alternative options for controlling a focus indicator, such as gaze cursor control 1911*d*, head cursor control 1912*d*, and wrist cursor control 1913*d*. Providing a menu of options for different interaction models with a computer system, where the menu can be used to select alternatives to using a user's gaze for determining which user interface element(s) should have focus or be the target of an input, can be particularly beneficial to users who are blind or low vision or whose gaze is otherwise difficult to track, thereby making user interaction with the computer system more accessible to a wider population.

In some embodiments, the menu including the plurality of selectable options for configuring the one or more interaction models is displayed before a calibration process of a user's gaze is performed (e.g., started or completed) (e.g., before user's gaze is calibrated and/or enrolled for use as input modalities). For example, in the scenario of FIGS. 19B-19C, the accessibility configuration menu 1900 is displayed before user's gaze is calibrated and/or enrolled, such that the computer system 101 can respond to inputs based on gaze or that include gaze. In some embodiments, the calibration process involves detecting movements of the user's gaze using one or more cameras and using the movement information to interpret further movement of user's gaze to determine what, if any, inputs are performed based on the user's gaze. Providing a menu of options for different interaction models with a computer system, where the menu can be used to select alternatives to using a user's gaze for determining which user interface element(s) should have focus or be the target of an input, before the calibrating the computer system for the gaze of the particular user, enables the user to access the menu more efficiently and reduces the number of inputs required to activate the menu, thereby making user interaction with the computer system more accessible to a wider population.

In some embodiments, the plurality of selectable options include a second set of one or more controls corresponding to a set of one or more input models that enable the device to be controlled with alternative inputs that are different from air gestures (e.g., motor sub-menus 1904*a*, 1904*b*, and 1904*c* in FIG. 19I-19K). In some embodiments, the second set of one or more controls include a first control for enabling/disabling dwell control (e.g., where actions are performed in response to a gaze input remaining for more than a dwell threshold amount of time at a respective action control); a second control for enabling/disabling voice control (e.g., the computer system accepts and/or responds to voice commands as an input model); and a third control for enabling/disabling a switch control (e.g., a separate hardware device (e.g., a wireless switch device) is used to operate the computer system optionally in conjunction and/or combination with other input models). In some embodiments, the computer system detects an air gesture; and in response to detecting the air gesture, the computer system, in accordance with a determination that the device is enabled to be controlled with air gestures (e.g., button presses, knob rotation, spoken inputs, and/or other inputs), performs the operation in accordance with (e.g., responsive to) the air gesture, wherein when the device is enabled to be controlled with alternative inputs, the device does not respond to the air gesture by performing the operation. In some embodiments, in accordance with a determination that the device is enabled to be controlled with inputs that do not require air gestures, the computer system forgoes performing the operation in accordance with the air gesture (e.g., the computer system is not responsive to the air gesture). Providing a menu of options for different interaction models with a computer system, where the menu can be used to select alternatives for providing inputs other than using air gestures such that the user can provide inputs using non-motor-based modalities, can be particularly beneficial to users who are motor-impaired, thereby making user interaction with the computer system more accessible to a wider population.

In some embodiments, a first control of the second set of one or more controls corresponds to a control for activating (e.g., toggle control for enabling and/or disabling) a dwell control mode (e.g., dwell control 1901 in FIG. 19C). In some embodiments, while the dwell control mode is active, a respective action is performed in response to a gaze input being directed for more than a dwell threshold amount of time at a respective action control. Providing a menu of options for different interaction models with a computer system, where the menu can be used to toggle a dwell control on and/or off, such that the user can provide inputs using non-motor based modalities, such as gaze, reduces the number and/or extent of inputs and/or the amount of time needed to perform operations, which is particularly beneficial to users who are motor impaired, thereby making user interaction with the computer system more accessible to a wider population.

In some embodiments, a second control of the second set of one or more controls corresponds to a control (e.g., toggle control for enabling and/or disabling) for activating a switch control mode (e.g., or switch interaction mode) (e.g., in FIG. 19I, switch access control option 1942*a* for enabling and/or disabling the switch control mode). In some embodiments, while the switch control mode is active, a respective action is performed in response to one or more inputs detected on a distinct (e.g., remote, or separate) hardware device (e.g., assistive device) (e.g., the hardware device optionally communicates with the computer system wirelessly), where optionally the respective action is otherwise performed with one or more air gestures (e.g., when the switch control mode is inactive, or when the computer system is a normal mode (e.g., where accessibility modes, specifically accessibility modes related to motor functions are not active)). In some embodiments, the switch interaction mode of the computer system is enabled (e.g., automatically) in response to detecting the communication being established between the computer system and the assistive input device (e.g., upon detecting that the assistive input device is connected to the computer system, the device automatically becomes responsive to inputs via the assistive input device). In the switch control mode, target location in the three-dimensional environment is selected for interaction using ray and point scanning. Providing a menu of options for different interaction models with a computer system, where the menu can be used to enable use of a physical input device, such as a physical button, a microphone, a straw and/or another input device that optionally does not require hand movement, such that the user can provide inputs using non-gesture based modalities (e.g., using the physical input device), reduces the number and/or extent of inputs and/or the amount of time needed to perform operations, which is particularly beneficial to users who are motor impaired, thereby making user interaction with the computer system more accessible to a wider population.

In some embodiments, the computer system detects an input selecting the control for activating the switch control mode; and in response to detecting the input selecting the control for activating the switch control mode, the computer system: activates the switch control mode; and displays a respective menu for configuring a wireless connection with a hardware input device (e.g., a wireless switch accessory) for use in providing inputs in the switch control mode. For example, in the scenario of FIG. 191, in response to selecting switch access control option 1942*a*, the switch control mode is activated and the computer system 101 automatically displays a respective menu for configuring a wireless connection with an assistive input device (e.g., hardware input device). In some embodiments, options in the menu for configuring the wireless connection with the hardware input device are described verbally (e.g., read aloud) by the computer system in response to user inputs navigating through the options (e.g., rotatable inputs directed at the first input device). Automatically providing a menu (e.g., optionally verbally providing the menu) for setting up and/or connecting a physical input device, such as a physical button, a microphone, a straw and/or another input device that optionally does not require hand movement, in response to enabling user of the physical input device, such that the user can provide inputs using non-gesture based modalities (e.g., using the physical input device), reduces the number and/or extent of inputs and/or the amount of time needed to perform operations, which is particularly beneficial to users who are motor impaired, thereby making user interaction with the computer system more accessible to a wider population.

In some embodiments, the menu including the plurality of selectable options for configuring the one or more interaction models is displayed before a calibration process of a user's hands is performed (e.g., started or completed) (e.g., before user's hands and/or gaze are calibrated for use as input modalities, as described herein with reference to FIG. 19B). In some embodiments, the calibration process involves detecting movements of the user's hands using one or more cameras and/or sensors and using the movement information to interpret further movement of user's hand(s) to determine what, if any, inputs (e.g., air gestures) are performed. Providing a menu of options for different interaction models with a computer system, where the menu can be used to select alternatives to using a user's gaze for determining which user interface element(s) should have focus or be the target of an input, before the calibrating the computer system for the hands of a particular user, enables the user to access the menu more efficiently and reduces the number of inputs required to activate the menu, thereby making user interaction with the computer system more accessible to a wider population.

In some embodiments, the computer system detects an input selecting a first option, of the plurality of selectable options, that corresponds to a vision accessibility mode. In some embodiments, in response to detecting the input selecting the first option that corresponds to the vision accessibility mode, the computer system activates the vision accessibility mode. For example, vision sub-menu 1902*b* is used to configure the read aloud mode (FIG. 19E). In some embodiments, the vision accessibility mode corresponds to a "read aloud" mode, in which verbal descriptions of virtual objects (e.g., user interfaces, user interface elements in user interfaces, and/or other virtual objects) are provided in response to user inputs (e.g., navigation inputs that move a focus selector forward or backward sequentially, across multiple user interface hierarchies of a single application, and/or across multiple applications). Providing a menu of options that can be used to activate a screen reader and/or other visual accessibility modes can be particularly beneficial to users who are blind or low vision or whose gaze is otherwise difficult to track, thereby making user interaction with the computer system more accessible to a wider population.

In some embodiments, the computer system detects an input selecting a second option, of the plurality of selectable options, that corresponds to a hearing accessibility mode. In some embodiments, in response to detecting the input selecting the second option that corresponds to the hearing accessibility mode, the computer system activates the hearing accessibility mode. For example, hearing sub-menu 1906*a* is used to configure assistive features, such as live captions and closed captions (FIGS. 19M-19N). In some embodiments, activating the hearing accessibility mode includes activating one or more of mono audio, live captions, and/or closed captions. Providing a menu of options that can be used to activate display of captions and/or other hearing accessibility modes can be particularly beneficial to users who are deaf or hard of hearing, or otherwise prefer to view textual captions instead of only listening to audio, thereby making user interaction with the computer system more accessible to a wider population.

In some embodiments, the computer system detects an input selecting a third option, of the plurality of selectable options, that corresponds to a display setting; and in response to detecting the input selecting the third option that corresponds to the display setting, the computer system activates the display setting. For example, in the scenario of FIG. 19D, vision sub-menu 1902*a* is a sub-menu for configuring functionality that magnifies content (e.g., passthrough and/or virtual content) in view 7000'. In some embodiments, the display setting corresponds to one or more color filters and/or a virtual magnifier (e.g., the virtual magnifier is used to automatically magnify virtual content and/or representations of physical objects within the bounds of the virtual magnifier as a user's viewpoint changes). In some embodiments, positioning of the virtual magnifier is controlled by user inputs (e.g., a pinch and hold followed by movement input and/or another user input). In some embodiments, positioning of the virtual magnifier is controlled by movement of a portion of a user's body (e.g., based on orientation, direction, pose, and/or other characteristic of a respective portion of the user's body, such as head, eyes, wrist, and/or other portion). Providing a menu of options that can be used to select different display settings, for example, such that the computer system displays a different set of colors and/or applies color filters and/or magnifies displayed content, can be particularly beneficial to users who are blind or low vision or whose gaze is otherwise difficult to track, thereby making user interaction with the computer system more accessible to a wider population.

It should be understood that the particular order in which the operations in FIG. 20 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 13000, 14000, 15000, 16000, 17000, and 18000) are also applicable in an analogous manner to method 20000 described above with respect to FIG. 20. For example, the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described above with reference to method 20000 optionally have one or more of the characteristics of the gestures, gaze inputs, physical objects, user interface objects, controls, movements, criteria, three-dimensional environment, display generation component, surface, representation of physical object, virtual objects, audio output modes, frame of reference, viewpoint, physical environment, representation of the physical environment, views of the three-dimensional environment, levels of immersion, visual effect, and/or animations described herein with reference to other methods described herein (e.g., methods 13000, 14000, 15000, 16000, 17000, and 18000). For brevity, these details are not repeated here.

In some embodiments, aspects/operations of methods 13000, 14000, 15000, 16000, 17000, 18000 and 20000 may be interchanged, substituted, and/or added between these methods. For example, the method of displaying a home menu user interface within a three-dimensional environment as described with reference method 13000 is optionally used to display a home menu user interface at varying levels of immersion in method 17000, or optionally used to control a display of shared applications and a display of private applications in method 15000. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A method, comprising:
- at a wearable device that includes or is in communication with a display generation component and one or more input devices:
  - while a respective communication session is active in a respective application and while the wearable device is being worn, wherein the respective communication session includes sharing real-time audio and/or video with another device, detecting a first signal indicating that the wearable device has been taken off:
  - in response to detecting the first signal:
    - causing the respective communication session of the respective application to become inactive, including ceasing to share real-time audio and/or video with another device; and
  - while the respective application is inactive, detecting a second signal indicating that the wearable device is being put on;
  - in response to detecting the second signal:
    - in accordance with a determination that respective criteria are met:
      - resuming the respective communication session of the respective application, including resuming sharing real-time audio and/or video with another device; and
    - in accordance with a determination that respective criteria are not met:
      - forgoing resuming the respective communication session of the respective application, including forgoing resuming sharing real-time audio and/or video with another device, wherein the respective criteria include a criterion that is met when a current user of the wearable device is determined to be an authorized user of the wearable device.

2. The method of claim 1, wherein the respective criteria include a type of the respective communication session satisfying predefined criteria with respect to a predefined set of session types, and the method includes:
- in accordance with a determination that the respective criteria are met because the respective communication session of the respective application is a first type of session: resuming the respective communication session of the respective application; and
- in accordance with a determination that the respective criteria are not met because the respective communication session of the respective application is a second type of session: forgoing resuming the respective communication session of the respective application.

3. The method of claim 2, wherein the respective criteria are met when the respective communication session of the respective application is configured to deliver media content to the authorized user of the wearable device; and
- wherein the respective criteria are met when the respective communication session of the respective application is configured to allow generation, by participants of the respective communication session, real-time audio data or real-time video data of the participants and that the respective communication session is configured to provide information regarding positions of the participants in a three-dimensional environment.

4. The method of claim 3, wherein the respective criteria are not met when the respective application includes recording of content generated during the respective communication session.

5. The method of claim 1, wherein:

the respective criteria are met when a time between detecting the first signal and detecting the second signal is less than a predetermined threshold; and the respective criteria are not met when a time between detecting the first signal and detecting the second signal is equal to or greater than the predetermined threshold.

6. The method of claim 1, wherein:

causing the respective communication session of the respective application to become inactive includes pausing playback of media content from the respective communication session of the respective application.

7. The method of claim 1, wherein:

causing the respective communication session of the respective application to become inactive includes at least one of: muting audio data associated with the respective communication session of the respective application or pausing video recording of content generated in the respective communication session of the respective application.

8. The method of claim 1, wherein:

causing the respective communication session of the respective application to become inactive includes pausing a mirroring of an output from the display generation component of the wearable device on a different device.

9. The method of claim 8, further including:

in conjunction with pausing the mirroring of the output from the display generation component of the wearable device on the different device, displaying, via the display generation component, an indication that mirroring of the output from the display generation component is paused.

10. The method of claim 1, further comprising:

after the first signal has been detected, monitoring, using one or more sensors included or in communication with the wearable device, a context of the wearable device.

11. The method of claim 10, further including:

detecting characteristics of a physical environment of the wearable device using the one or more sensors to monitor the context of the wearable device.

12. The method of claim 10, further including:

detecting a biometric feature using the one or more sensors to monitor the context of the wearable device.

13. The method of claim 10, further including:

in accordance with a determination that a threshold amount of time has elapsed since detection of the first signal without detecting the second signal:

transitioning the wearable device into a sleep state of operation in which the wearable device reduces a frequency at which the one or more sensors are used to monitor the context of the wearable device.

14. The method of claim 13, further including:

while the wearable device is in the sleep state, detecting an upward displacement of at least a portion of the wearable device; and in response to detecting the upward displacement of at least the portion of the wearable device, transitioning the wearable device from an active state into a standby state of operation.

15. The method of claim 13, further including:

while the wearable device is in the sleep state, detecting a first input to the one or more input devices; and in response to detecting the first input, transitioning the wearable device from the sleep state into a standby state of operation.

16. A non-transitory computer-readable storage medium storing one or more programs configured to be executed by one or more processors of a wearable device that is in communication with a display generation component and one or more input devices, the one or more programs including instructions for:

while a respective communication session is active in a respective application and while the wearable device is being worn, wherein the respective communication session includes sharing real-time audio and/or video with another device, detecting a first signal indicating that the wearable device has been taken off:

in response to detecting the first signal:

causing the respective communication session of the respective application to become inactive, including ceasing to share real-time audio and/or video with another device; and while the respective application is inactive, detecting a second signal indicating that the wearable device is being put on;

in response to detecting the second signal:

in accordance with a determination that respective criteria are met:

resuming the respective communication session of the respective application, including resuming sharing real-time audio and/or video with another device; and in accordance with a determination that respective criteria are not met:

forgoing resuming the respective communication session of the respective application, including forgoing resuming sharing real-time audio and/or video with another device, wherein the respective criteria include a criterion that is met when a current user of the wearable device is determined to be an authorized user of the wearable device.

17. The non-transitory computer-readable storage medium of claim 16, wherein the respective criteria include a type of the respective communication session satisfying predefined criteria with respect to a predefined set of session types, and the one or more programs include instructions for:

in accordance with a determination that the respective criteria are met because the respective communication session of the respective application is a first type session:

resuming the respective communication session of the respective application; and in accordance with a determination that the respective criteria are not met because the respective communication session of the respective application is a second type of session:

forgoing resuming the respective communication session of the respective application.

18. The non-transitory computer-readable storage medium of claim 16, wherein:

the respective criteria are met when a time between detecting the first signal and detecting the second signal is less than a predetermined threshold; and the respective criteria are not met when a time between detecting the first signal and detecting the second signal is equal to or greater than the predetermined threshold.

19. The non-transitory computer-readable storage medium of claim 16, wherein:

causing the respective communication session of the respective application to become inactive includes pausing a mirroring of an output from the displaying generation component of the wearable device on a different device.

20. The non-transitory computer-readable storage medium of claim 16, wherein the one or more programs include instructions for:

after the first signal has been detected, monitoring, using one or more sensors included or in communication with the wearable device, a context of the wearable device.

21. The non-transitory computer-readable storage medium of claim 16, wherein the one or more programs include instructions for:

in accordance with a determination that a threshold amount of time has elapsed since detection of the first signal without detecting the second signal:

transitioning the wearable device into a sleep state of operation in which the wearable device reduces a frequency at which the one or more sensors are used to monitor the context of the wearable device.

22. The non-transitory computer-readable storage medium of claim 21, wherein the one or more programs include instructions for:

while the wearable device is in the sleep state, detecting a first input to the one or more input devices; and in response to detecting the first input, transitioning the wearable devices from the sleep state into a standby state of operation.

23. A wearable device that is in communication with a display generation component and one or more input devices, the wearable device comprising:

one or more processors; and memory storing one or more programs configured to be executed by the one or more processors, the one or more programs including instructions for:

while a respective communication session is active in a respective application and while the wearable device is being worn, wherein the respective communication session includes sharing real-time audio and/or video with another device, detecting a first signal indicating that the wearable device has been taken off:

in response to detecting the first signal:

causing the respective communication session of the respective application to become inactive, including ceasing to share real-time audio and/or video with another device; and while the respective application is inactive, detecting a second signal indicating that the wearable device is being put on;

in response to detecting the second signal:

in accordance with a determination that respective criteria are met:

resuming the respective communication session of the respective application, including resuming sharing real-time audio and/or video with another device; and in accordance with a determination that respective criteria are not met:

forgoing resuming the respective communication session of the respective application, including forgoing resuming sharing real-time audio and/or video with another device, wherein the respective criteria include a criterion that is met when a current user of the wearable device is determined to be an authorized user of the wearable device.

24. The wearable device of claim 23, wherein the respective criteria include a type of the respective communication session satisfying predefined criteria with respect to a predefined set of session types, and the one or more programs include instructions for:

in accordance with a determination that the respective criteria are met because the respective communication session of the respective application is a first type of session:

resuming the respective communication session of the respective application; and in accordance with a determination that the respective criteria are not met because the respective communication session of the respective application is a second type of session:

forgoing resuming the respective communication session of the respective application.

25. The wearable device of the claim 23, wherein:

the respective criteria are met when a time between detecting the first signal and detecting the second signal is less than a determined threshold; and the respective criteria are not met when a time between detecting the first signal and detecting the second signal is equal to or greater than the predetermined threshold.

26. The wearable device of claim 23, wherein:

causing the respective communication session of the respective application to become inactive includes pausing a mirroring of an output from the display generation component of the wearable device on a different device.

27. The wearable device of claim 23, wherein the one or more programs include instructions for:

after the first signal has been detected, monitoring, using one or more sensors included or in communication with the wearable device, a context of the wearable device.

28. The wearable device of claim 23, wherein the one or more programs include instructions for:

in accordance with a determination that a threshold amount of time has elapsed since detection of the first signal without detecting the second signal:

transitioning the wearable device into a sleep state of operation in which the wearable device reduces a frequency at which the one or more sensors are used to monitor the context of the wearable device.

29. The wearable device of claim 28, wherein the one or more programs include instructions for:

while the wearable device is in the sleep state, detecting a first input to the one or more input devices; and in response to detecting the first input, transitioning the wearable devices from the sleep state into a standby state of operation.

* * * * *